(12) United States Patent
Van Ness et al.

(10) Patent No.: US 7,499,058 B2
(45) Date of Patent: Mar. 3, 2009

(54) PROGRAMMATICAL ACCESS TO HANDWRITTEN ELECTRONIC INK IN A TREE-BASED RENDERING ENVIRONMENT

(75) Inventors: Shawn Van Ness, Kirkland, WA (US); Sam George, Duvall, WA (US); Stefan Wick, Sammamish, WA (US); Brian Ewanchuk, Redmond, WA (US); Todd Torset, Woodinville, WA (US); Wayne Zeng, Sammamish, WA (US); Xiao Tu, Sammamish, WA (US); Koji Kato, Sammamish, WA (US); Alexander Kolmykov-Zotov, Sammamish, WA (US); Timothy Kannapel, Bellevue, WA (US); Manoj Biswas, Bellevue, WA (US); Kevin Welton, Redmond, WA (US); Richmond Lough, Woodinville, WA (US); Chandramouli Kompella, Sammamish, WA (US); Hongan Wang, Redmond, WA (US); Steven P. Dodge, Sammamish, WA (US); Todd M. Landstad, Redmond, WA (US); Shiraz Somji, Kenmore, WA (US); Vladimir V. Smirnov, Bothell, WA (US); Stephen A. Fisher, Kenmore, WA (US); Rudolph Balaz, Bellevue, WA (US); Michael Russell, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/379,938

(22) Filed: Apr. 24, 2006

(65) Prior Publication Data

US 2006/0274057 A1    Dec. 7, 2006

Related U.S. Application Data

(60) Provisional application No. 60/673,805, filed on Apr. 22, 2005.

(51) Int. Cl.
*G09G 5/00* (2006.01)
*G09G 1/10* (2006.01)

(52) U.S. Cl. .......................... 345/581; 345/16; 345/17; 345/619

(58) Field of Classification Search ................ 345/581, 345/612, 619, 16, 17; 382/240, 186, 188, 382/202, 205
See application file for complete search history.

(56) References Cited

U.S. PATENT DOCUMENTS 6,340,981 B1 *   1/2002   Graham et al. .............. 715/863
6,642,458 B2 *  11/2003   Panagrossi III et al. .. 178/18.01
2003/0214536 A1 * 11/2003   Jarrett et al. ................ 345/831

* cited by examiner

*Primary Examiner*—Kee M Tung
*Assistant Examiner*—Hau H Nguyen
(74) *Attorney, Agent, or Firm*—Workman Nydegger

(57) ABSTRACT

A system and method for performing ink related operations in a tree-based presentation system is described. Ink-related programmatical interfaces may relate to interactions with a stroke object, a stroke collection object, and ink input elements.

14 Claims, 52 Drawing Sheets

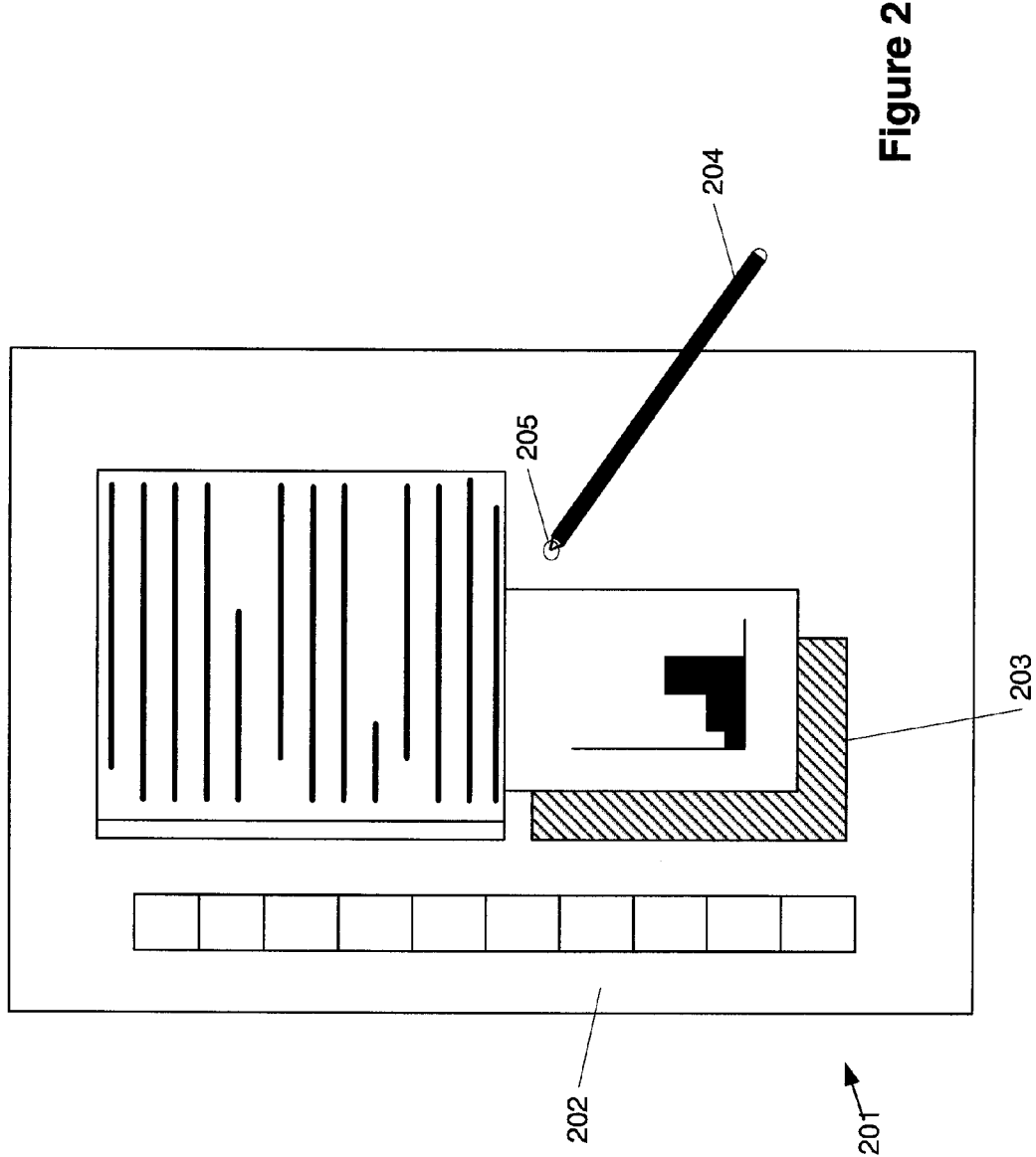

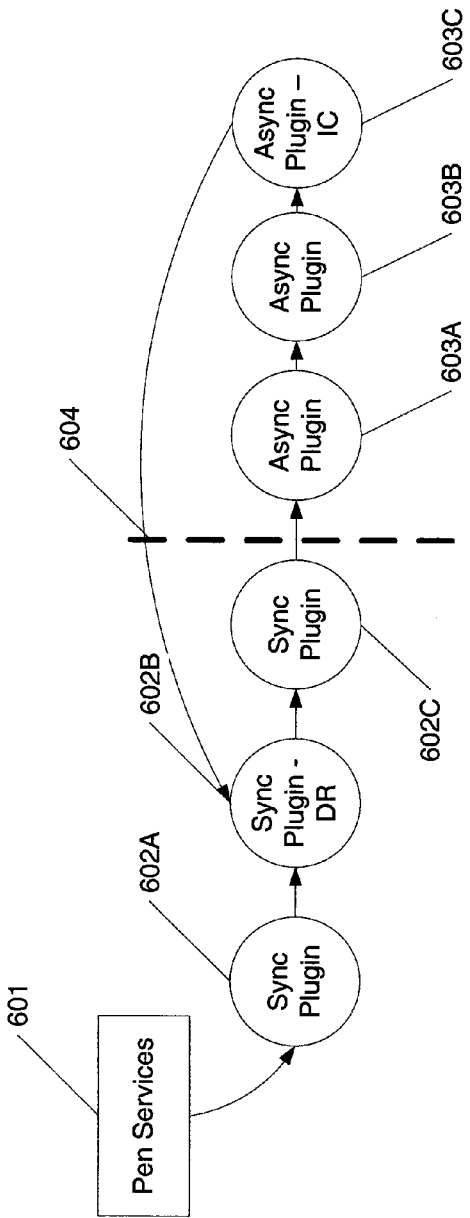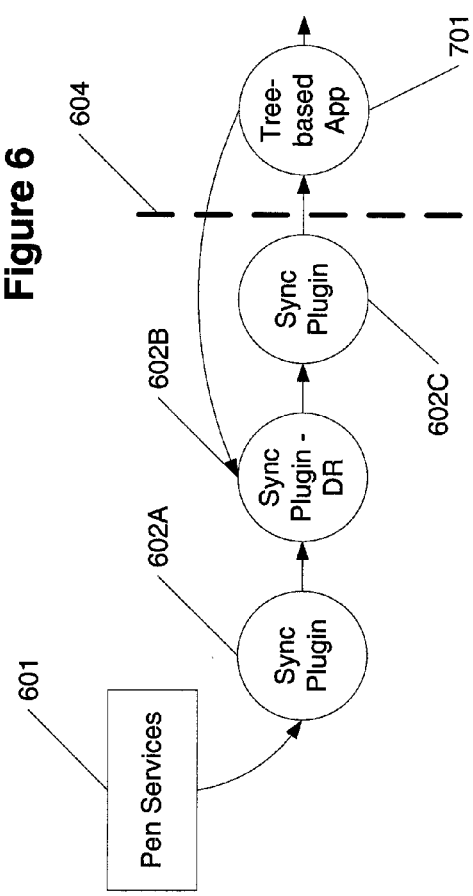
Figure 6
Figure 7

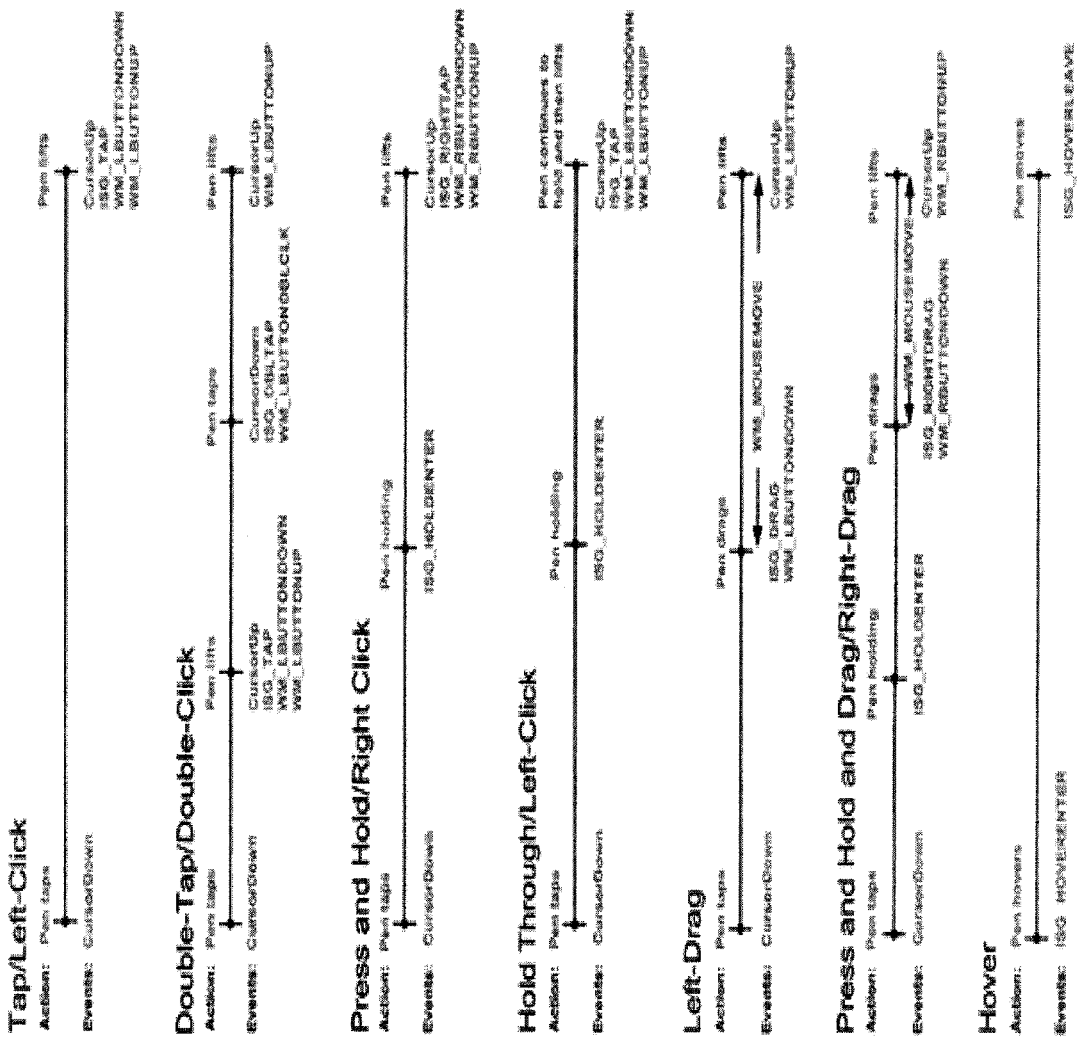

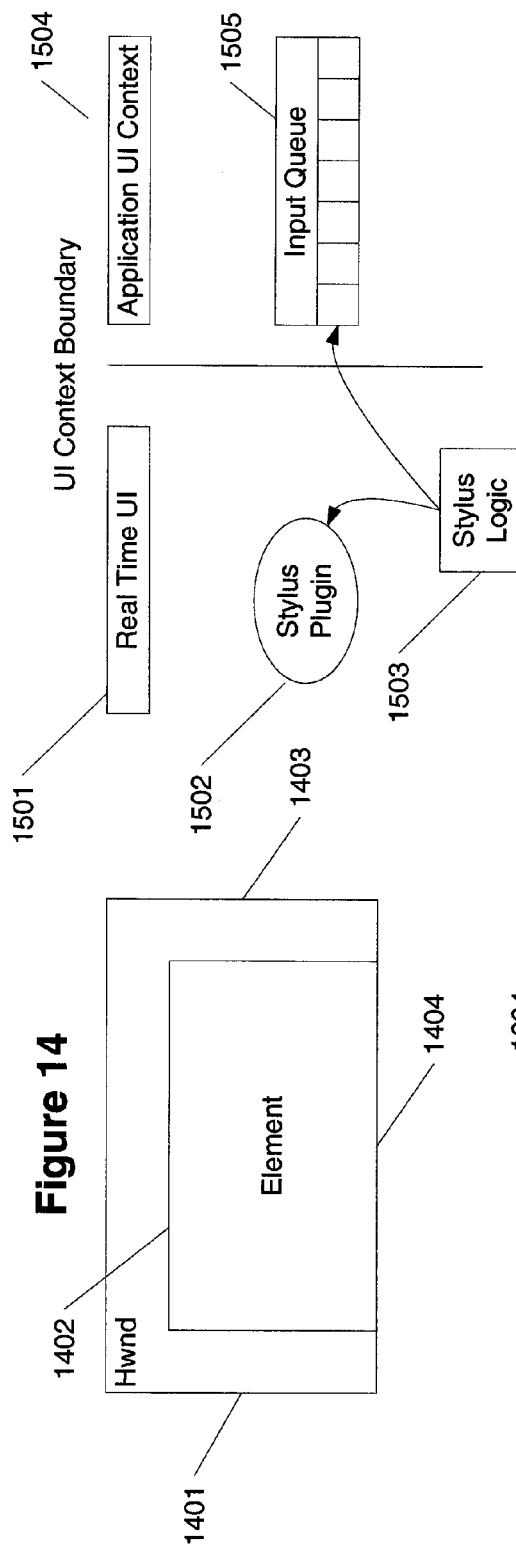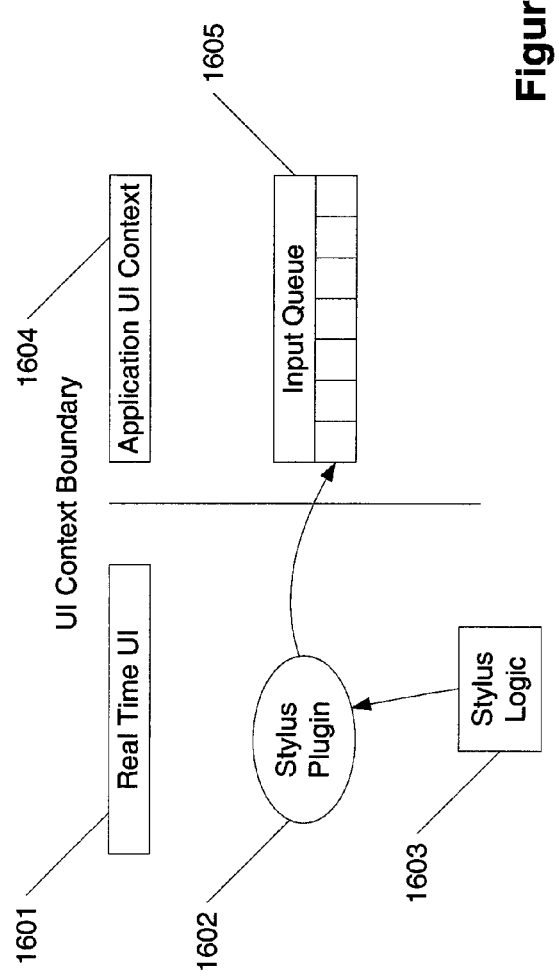

All work and no play makes Jack a dull boy

Figure 21

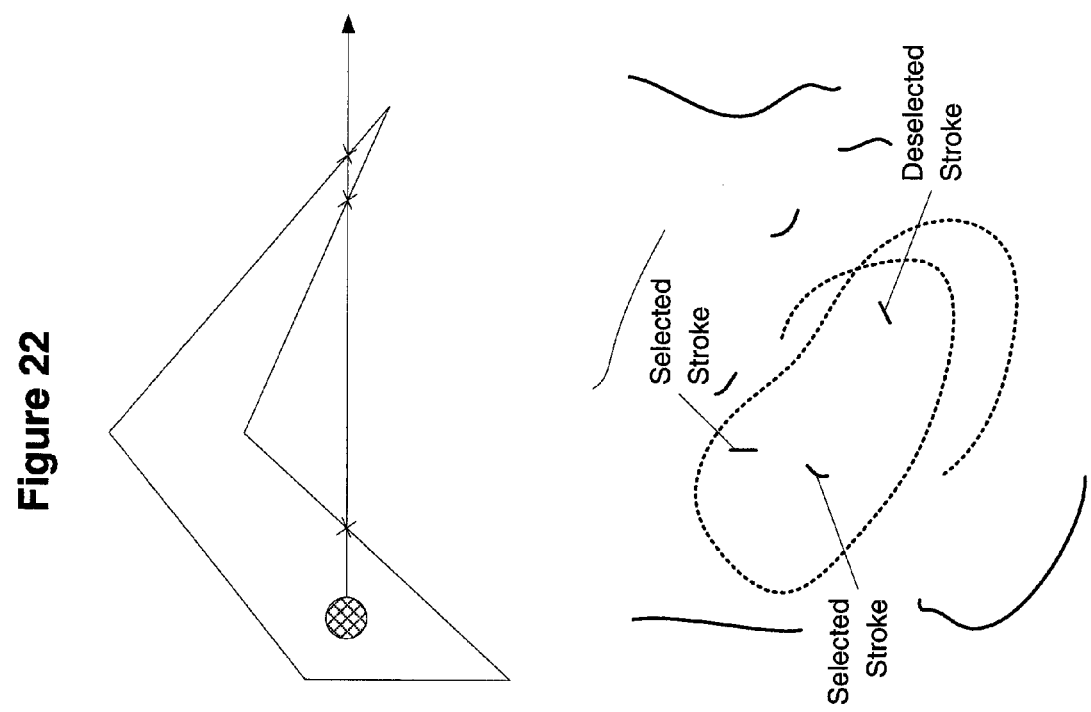

PROGRAMMATICAL ACCESS TO HANDWRITTEN ELECTRONIC INK IN A TREE-BASED RENDERING ENVIRONMENT

RELATED APPLICATION INFORMATION

This application claims priority to U.S. Ser. No. 60/673,805, filed Apr. 22, 2005, whose contents are expressly incorporated herein by reference.

APPENDIX

This application includes an appendix as attached. The contents of the appendix are expressly incorporated herein by reference.

BACKGROUND

1. Technical Field

Aspects of the present invention relate to computing systems. More particularly, aspects of the present invention relate to providing programmatical access to handwritten electronic ink in a tree-based rendering environment.

2. Description of Related Art

Computing systems have embraced stylus-based inputs. Previous implementations of stylus-based systems have provided a few applications, which were either stylus-aware or not. A detriment was that each application needed to be written to handle stylus-based input on its own.

BRIEF SUMMARY

Aspects of the present invention address one or more of the problems described above, thereby providing common interfaces for stylus-based input systems. Other aspects provide enhanced user experiences and data control when using a stylus. Him These and other aspects are described below.

BRIEF DESCRIPTION OF THE DRAWINGS

The present invention is illustrated by way of example and not limited in the accompanying figures.

FIG. 2 shows an example of a stylus-based computing system in accordance with aspects of the present invention.

FIG. 6 shows how synchronous and asynchronous plugins may be attached in a comparative example.

FIG. 7 shows how plugins may be passed to a tree-based presentation system.

FIGS. 9-13B show various relationships between hardware and software modules in accordance with aspects of the present invention.

FIGS. 14-16 show how information may be exchanged over a user interface context boundary in accordance with aspects of the present invention.

FIGS. 17-25 describe the handling of electronic in accordance with aspects of the present invention.

DETAILED DESCRIPTION

Figure 1A:
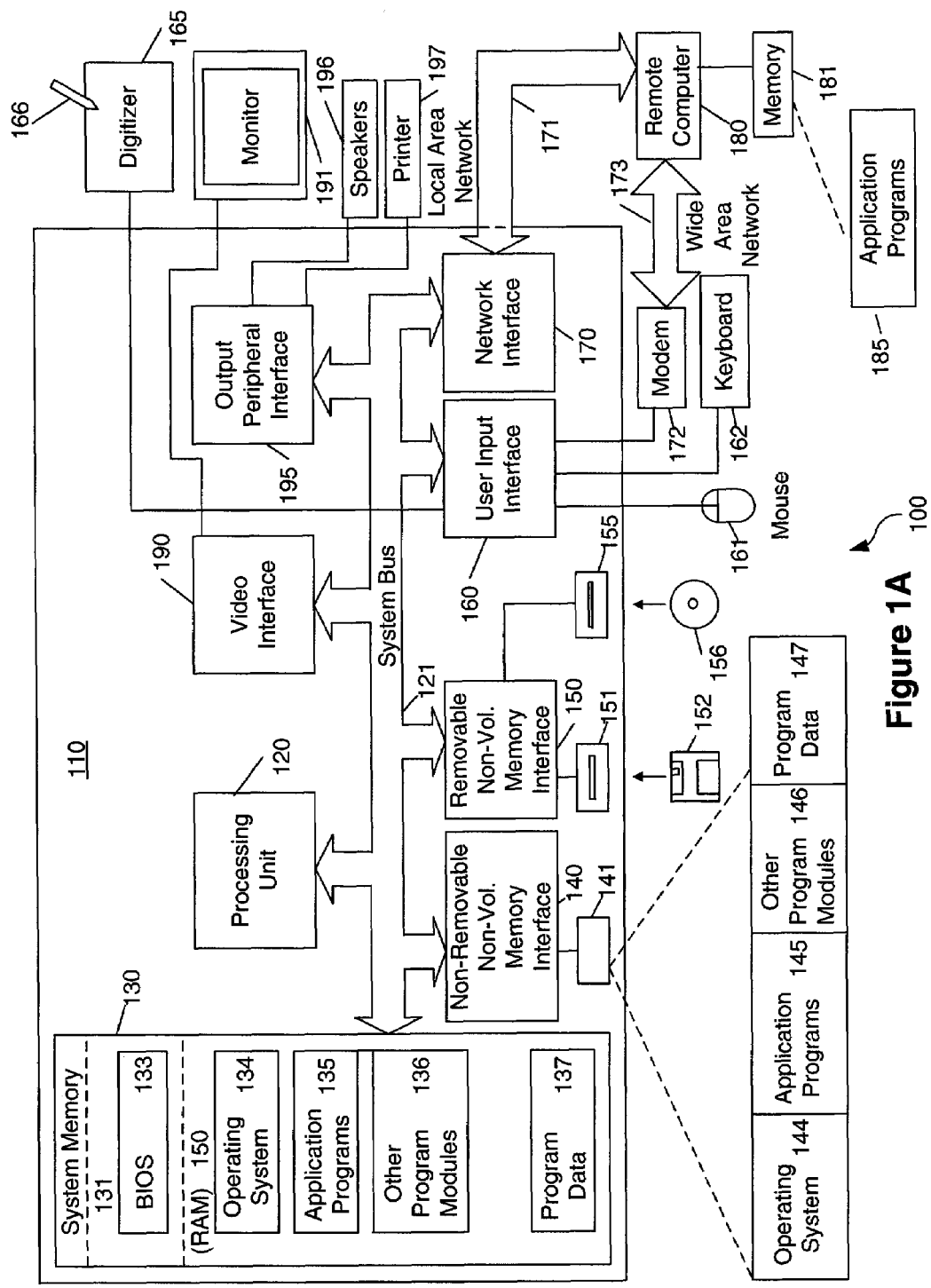
FIG. 1A illustrates a schematic diagram of a general-purpose digital computing environment in which certain aspects of the present invention may be implemented.

Aspects of the present invention relate to providing programmatical access to handwritten electronic ink when used in a tree-based rendering environment.

This document is divided into sections to assist the reader. These sections include: overview, characteristics of ink, terms, general-purpose computing environment, receiving and handling new ink, ink and rendering of the ink, programmatical elements for receiving and displaying ink, and rendering and hit-testing.

It is noted that various connections are set forth between elements in the following description. It is noted that these connections in general and, unless specified otherwise, may be direct or indirect and that this specification is not intended to be limiting in this respect.

Overview

According to various examples of the invention, various application programming interfaces and other programmatical access are provided for ink in a tree-based rendering environment.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Among the characteristics described above, the temporal order of strokes and a stroke being a series of coordinates are primarily used. All other characteristics can be used as well.

Terms

| Term | Definition |
|---|---|
| Ink | A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. |
| Ink object | A data structure storing ink with or without properties. |
| Stroke | A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. |
| Document | Any electronic file that has a viewable representation and content. A document may include a web page, a word processing document, a note page or pad, a spreadsheet, a visual presentation, a database record, image files, and combinations thereof. |
| Tree of Context Nodes | A data structure that describes the relationship between document elements that have already been analyzed and document elements that have yet to be analyzed. The data structure may optionally further include non-ink information (e.g., typed text, images, charts, and the like). This non-ink information may be used to aid in the recognition and/or analysis of the ink content. Further, the non-ink content may be annotated by the ink when an annotation engine is used. Because new content is availed to existing content, the existing content provides a context for the new information. |
| Render or Rendered or Rendering | The process of determining how information (including text, graphics, and/or electronic ink) is to be displayed, whether on a screen, printed, or output in some other manner. |
| Computer-readable medium | Any available media that can be accessed by a user on a computer system. By way of example, and not limitation, "computer-readable media" may include computer storage media and communication media. "Computer storage media" includes volatile and nonvolatile, removable and nonremovable media implemented in any method or technology for storage of information, such as computer-readable instructions, data structures, program modules or other data. |
| Computer storage media | "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. |
| Communication media | "Communication media" typically embodies computer-readable instructions, data structures, program modules or other data in a modulated data signal, such as a carrier wave or other transport mechanism, and includes any information delivery media. |
| Visual | Equivalent to an conventional hwnd, namely a rendering surface |
| Element | Equivalent to a control today, namely a componentized reusable entity |
| Wisptis | Tablet platform's digitizer input to application layer bridge component. It effectively takes hardware input, figures out which hwnd should receive the input, and buffers up the data on shared memory which |

-continued

| Terms | |
|---|---|
| Term | Definition |
| | gets accessed from applications which are bound to that hwnd. |
| Presentation Space | A coordinate system which has it's origin set at the top left of the Presentation window, with Presentation units |
| Element Space | A coordinate system which has it's origin set at an element's top left, with Presentation units |
| Digitizer Space | A coordinate system which has it's origin set at the digitizer's top left, with digitizer units |

General-Purpose Computing Environment

FIG. 1A illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1A, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
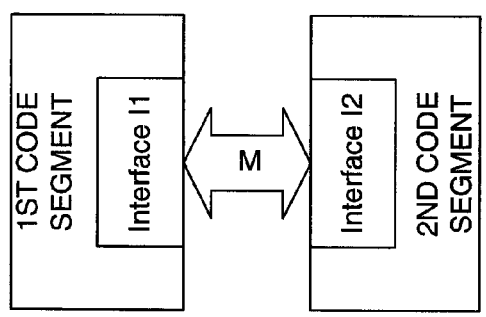
FIGS. 1B through 1M show a general-purpose computer environment supporting one or more aspects of the present invention.
Figure 1E:
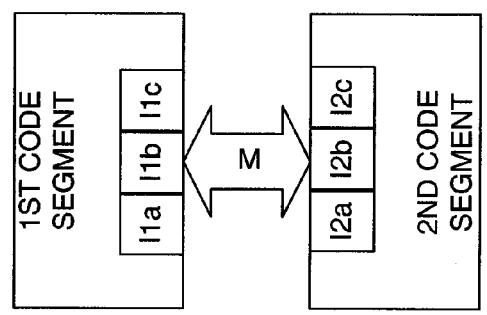
Figure 1B:
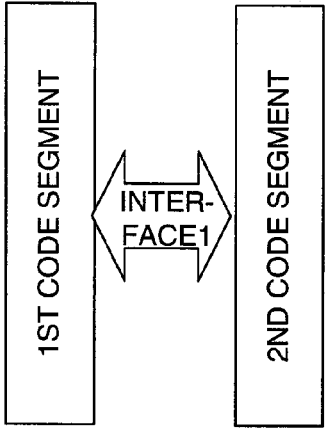

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
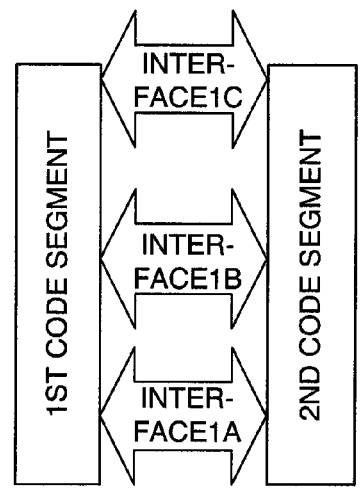

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1G:
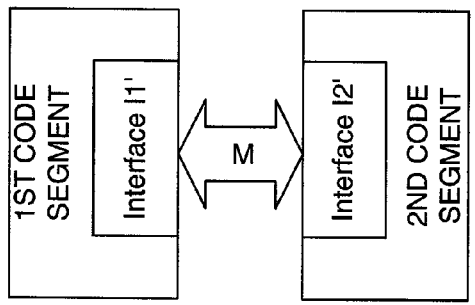
Figure 1I:
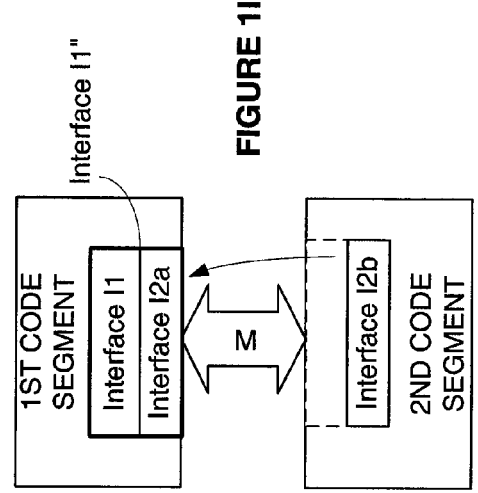
Figure 1F:
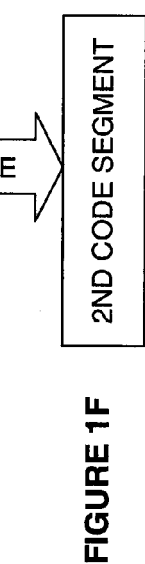

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
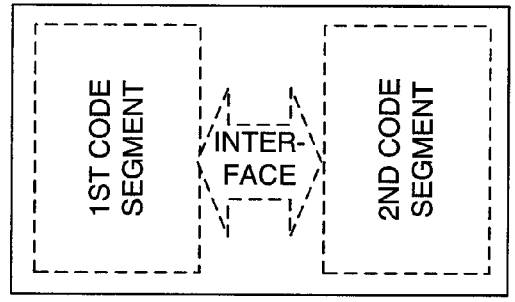

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2$a$ and I2$b$, and interface portion I2$a$ has been coded in-line with interface I1 to form interface I1". For a concrete example, consider that the interface I1 from FIG. 1C performs a function call square (input, output), which is received by interface I2, which after processing the value passed with input (to calculate the square of an input) by the second code segment, passes back the squared result with output. In such a case, the processing performed by the second code segment (squaring input) can be performed by the first code segment without a call to the interface.

D. Divorce

Figure 1K:
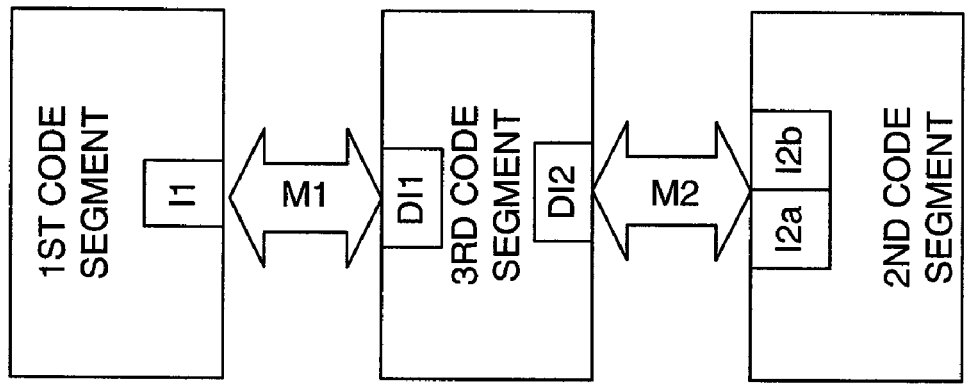
Figure 1J:
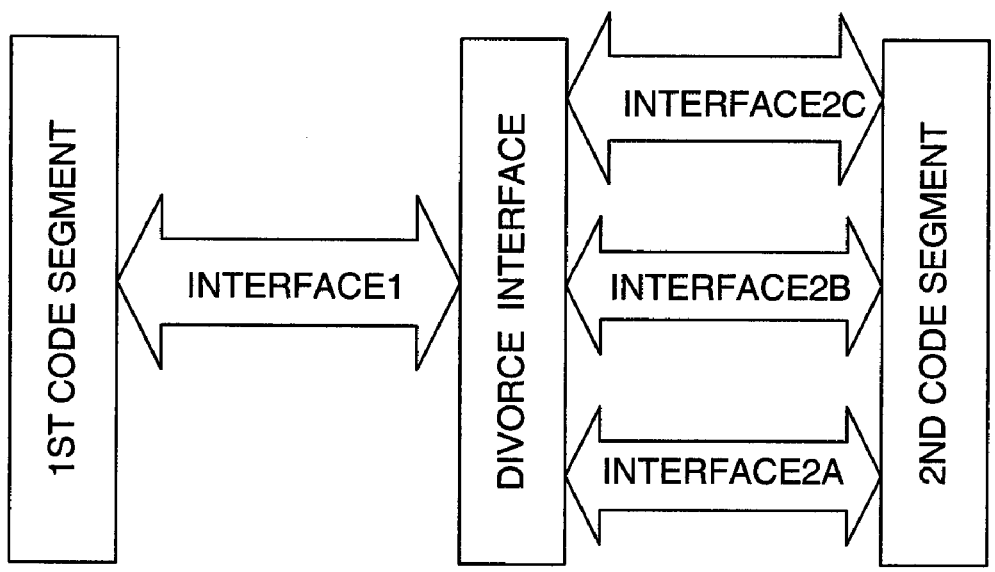

A communication from one code segment to another may be accomplished indirectly by breaking the communication into multiple discrete communications. This is depicted schematically in FIGS. 1J and 1K. As shown in FIG. 1J, one or more piece(s) of code (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
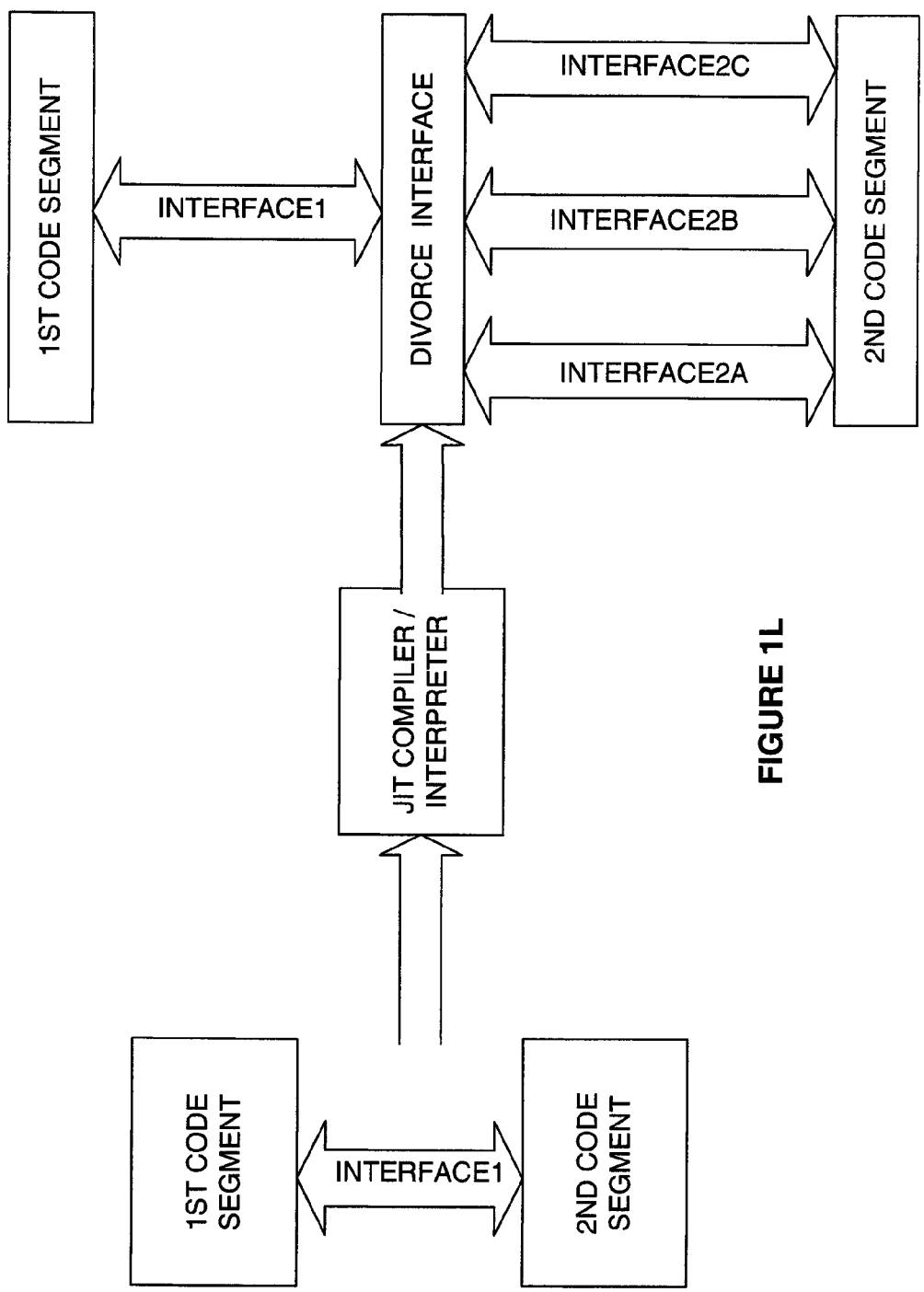
Figure 1M:
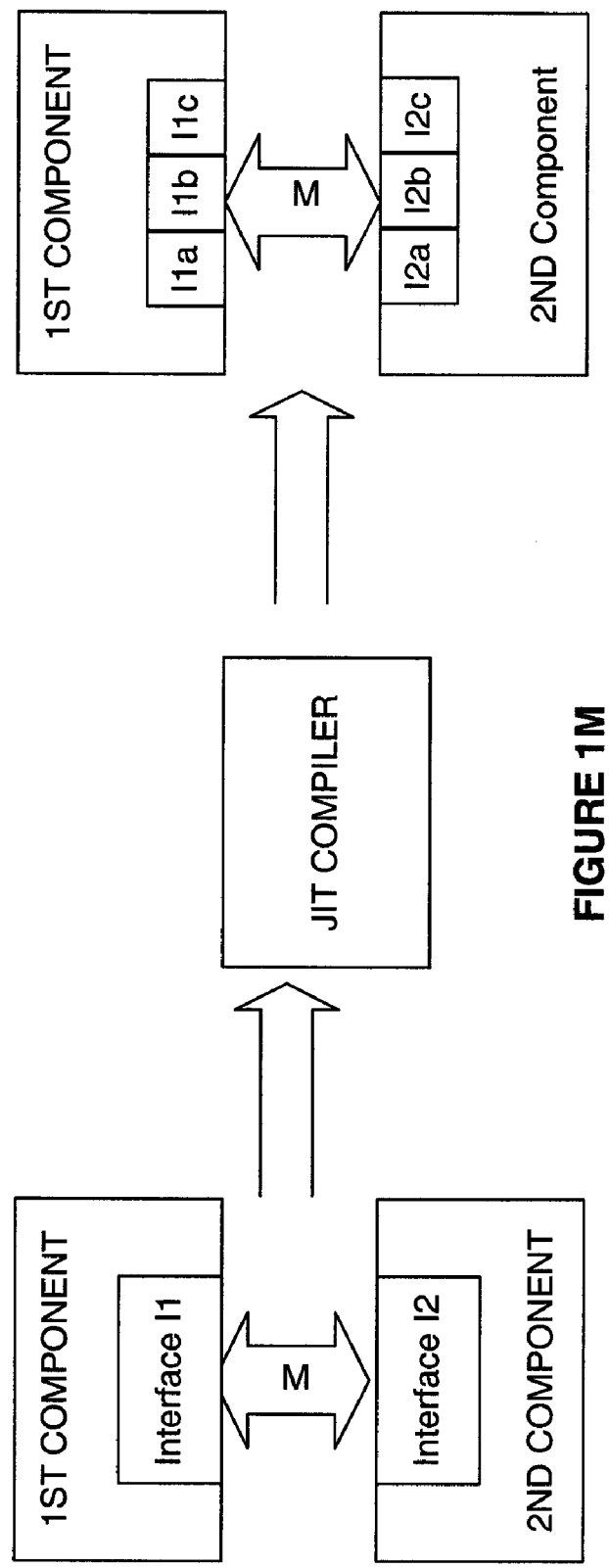

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Receiving and Handling New Ink

Figure 3:
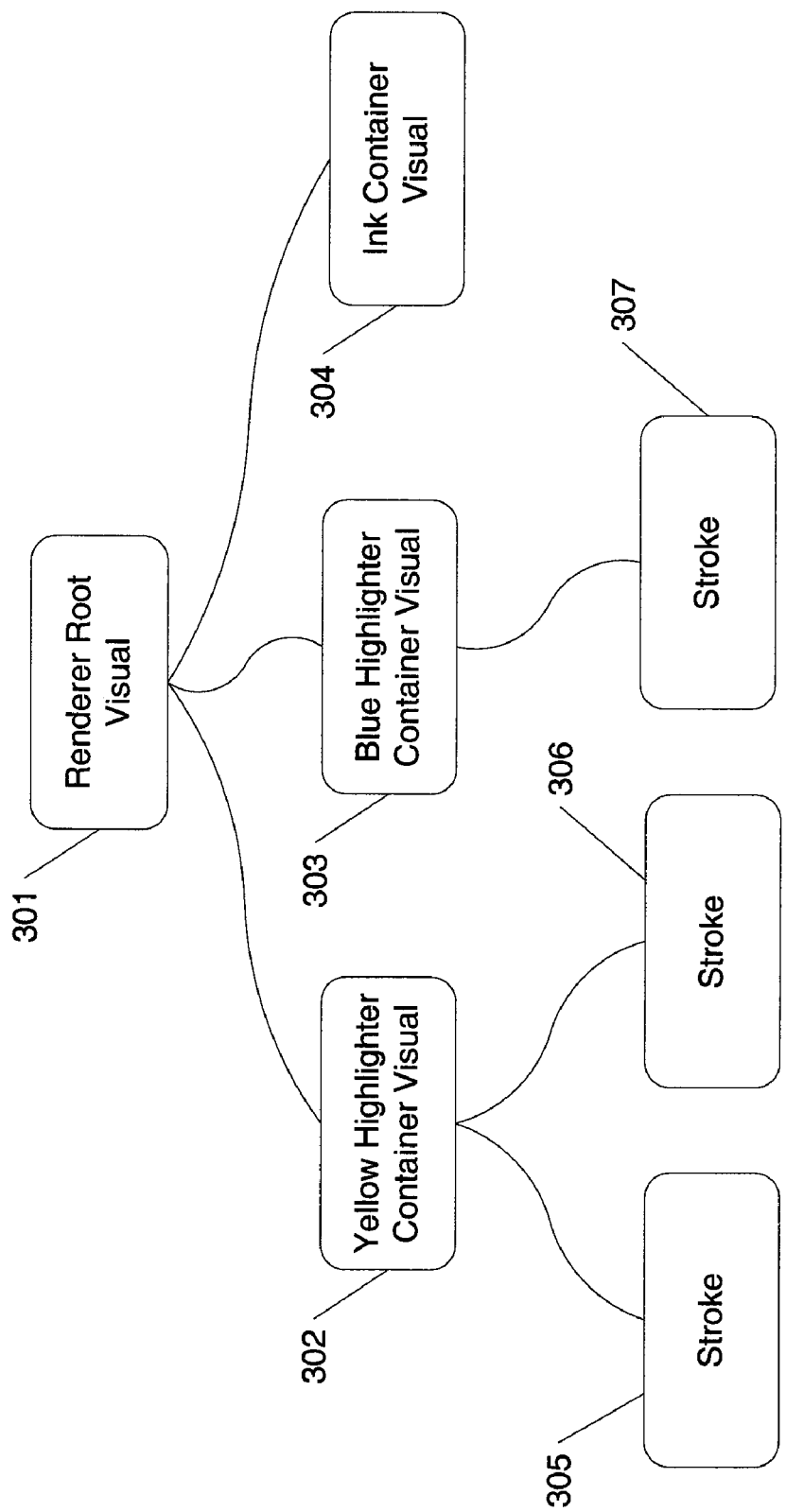
FIG. 3 shows an illustrative example of how a tree-based rendering system may store information in accordance with aspects of the present invention.

The following description relates to the receiving and handling of new ink. For purposes herein, the Presentation system is referred to as a tree-based organizational structure in which information a user will be provided is organized using tree-type relationships. For instance, the Presentation system may have the user interface maintained in two trees: the visual tree and the element tree. FIG. 3 shows an example of a renderer root visual 301 as a root node for a visual tree structure in which yellow and blue highlighting strokes are present. Here, a yellow highlighter content visual 302, a blue highlight container visual 303, and regular ink container visual 304 are the three container visuals that support strokes (305-307). Each of the strokes 305-307 has a parent of container visuals 302-304.

For the two trees, the element tree can map to the contents in XAML. The visual tree is a more granular representation of the contents at sub-XAML element level (namely one can have multiple visuals per XAML element). The Presentation system may or may lack raster operation support. In some aspects, this may require new ways of handling and presenting information. For instance, highlight and translucent layered ink can be handled in specific ways including:

a. The visual tree can branch between normal ink and highlighter ink;
b. The highlighter ink visuals can be created as siblings in the visual tree to ensure that they blend on intersections;
c. The way the blend is implemented may be by rendering the highlighters as solid strokes, and then setting the transparency on the visual;
d. Individual highlighter colors can be segregated into independent container visuals, so that e.g. yellow and blue highlighters will blend together, not simply overlay one another based on rendering order; and
e. All highlighter strokes render behind or in front of normal ink.

In addition to the tree-structure the presentation system, aspects of the invention also relate to handling ink input in real time. This may also be referred to as "real time inking" or "unblocking ink" for purposes here. The unblocking nature of real time inking can be accomplished by creating a dedicated UI context (in old terminology "thread") for real time processing. This real time context has a visual of its own, and this visual can be plugged into the target application's visual tree to render. Visual targets allow visuals to be plugged across contexts.

By plugging in the real time context's Visual Target into the target application's visual tree, various features (e.g. clip, hit testing) can behave appropriately as well.

Real Time Context Hittesting and Application Context Hittesting

The Presentation system enables rich rendering by removing the legacy concept of hwnds, which were only capable of being rectangular. For reference, a hwnd can be a windows handle of a control.

Now with the presentation environment, the primary unit developers work against are elements, which can be sub regions within an hwnd. Wisptis is only hwnd aware, thus the Presentation Stylus input architecture disambiguates which element the digitizer input should go to. Wisptis enables pen data collection from pen-enabled devices.

The factors that complicate the design of Presentation Stylus input are as follows:
 a. Presentation Stylus input uses the element layout to determine which element receives digitizer input
 b. Element layout is maintained by the application context
 c. The application context can block frequently
 d. The real time context cannot enter the application context since it cannot block
 e. In spite of the above, the real time context requires the destination element to be known when processing digitizer input Therefore, in Presentation Stylus input, the real time context can create a cache of element layout and uses this cache to pre-determine the destination element. Since this cache can easily go stale when animation effects are used in the application context, there is a correction process in case of mistakes. At a high level, the digitizer input forwarding can function as follows as shown in FIG. 4.

Figure 4:
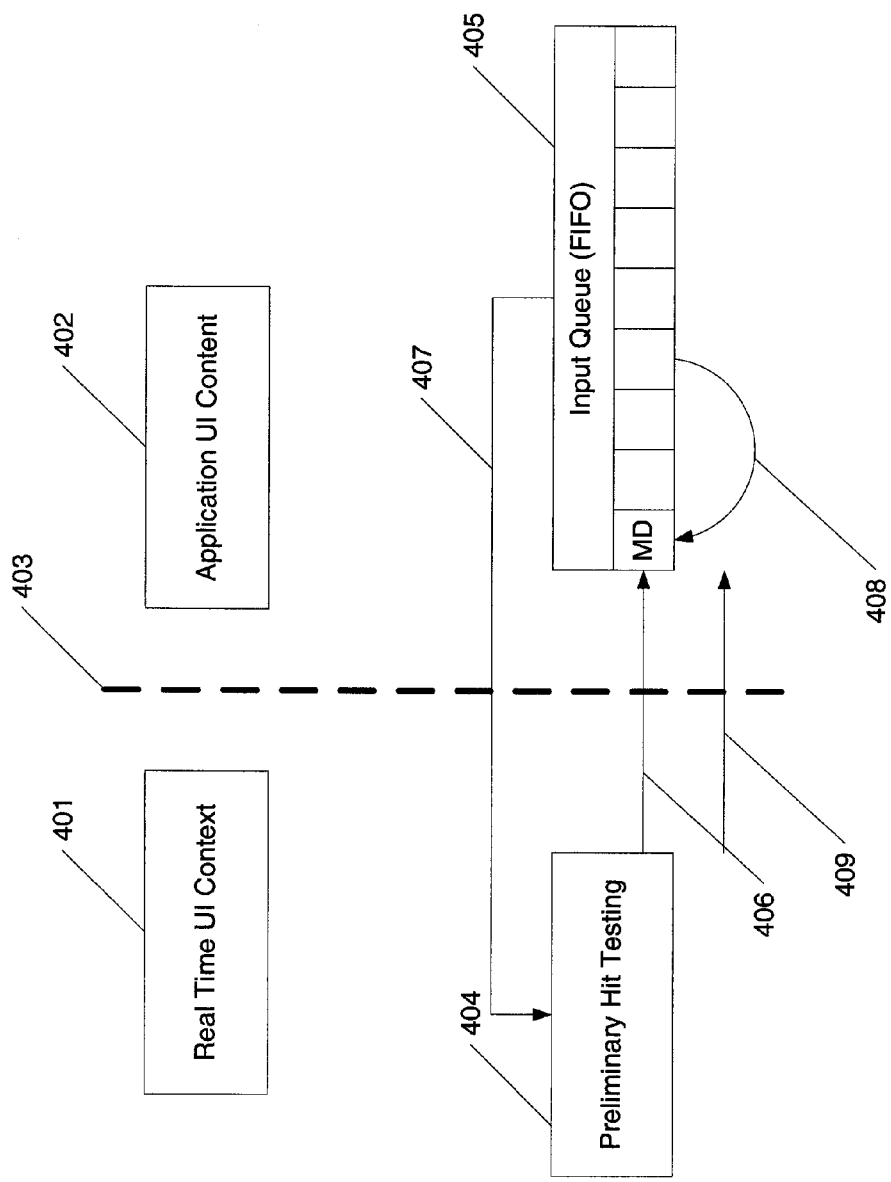
FIGS. 4-5 show approaches for preliminary hit testing in accordance with aspects of the present invention.

FIG. 4 shows a real time context 401, and application user interface context 402 and a boundary 403 between them.
 a. Preliminary hittesting 404 with the cached structures are conducted on the real time context 401, and the relevant digitizer input is sent (406) to the application context's input queue 405.
 b. The application context's input queue 405 does accurate hittesting when it gets an opportunity, and notifies (407) the real time context 401 that there was an inaccuracy in the preliminary hittesting.
 c. The application context 402 updates 408 the existing RawStylusInputReports in the input queue 405 with updated targeting information.
 d. The real time context 402 uses the updated targeting information from the application context for the next digitizer input 409 (while capture status is valid, namely for example until a stylus up occurs).

Real Time StylugPlugins can include custom logic that can be executed on the real time context to perform various tasks. The plugins allow a developer to add functionality to the real time context as needed.

A list of StylusPlugins exists per element and receives digitizer input as soon as the Presentation Stylus conducts preliminary hittesting.

The accurate hittesting correction process affects the control flow of digitizer input. In particular, the lists of plugins which accept the digitizer input can differ.

Figure 5:
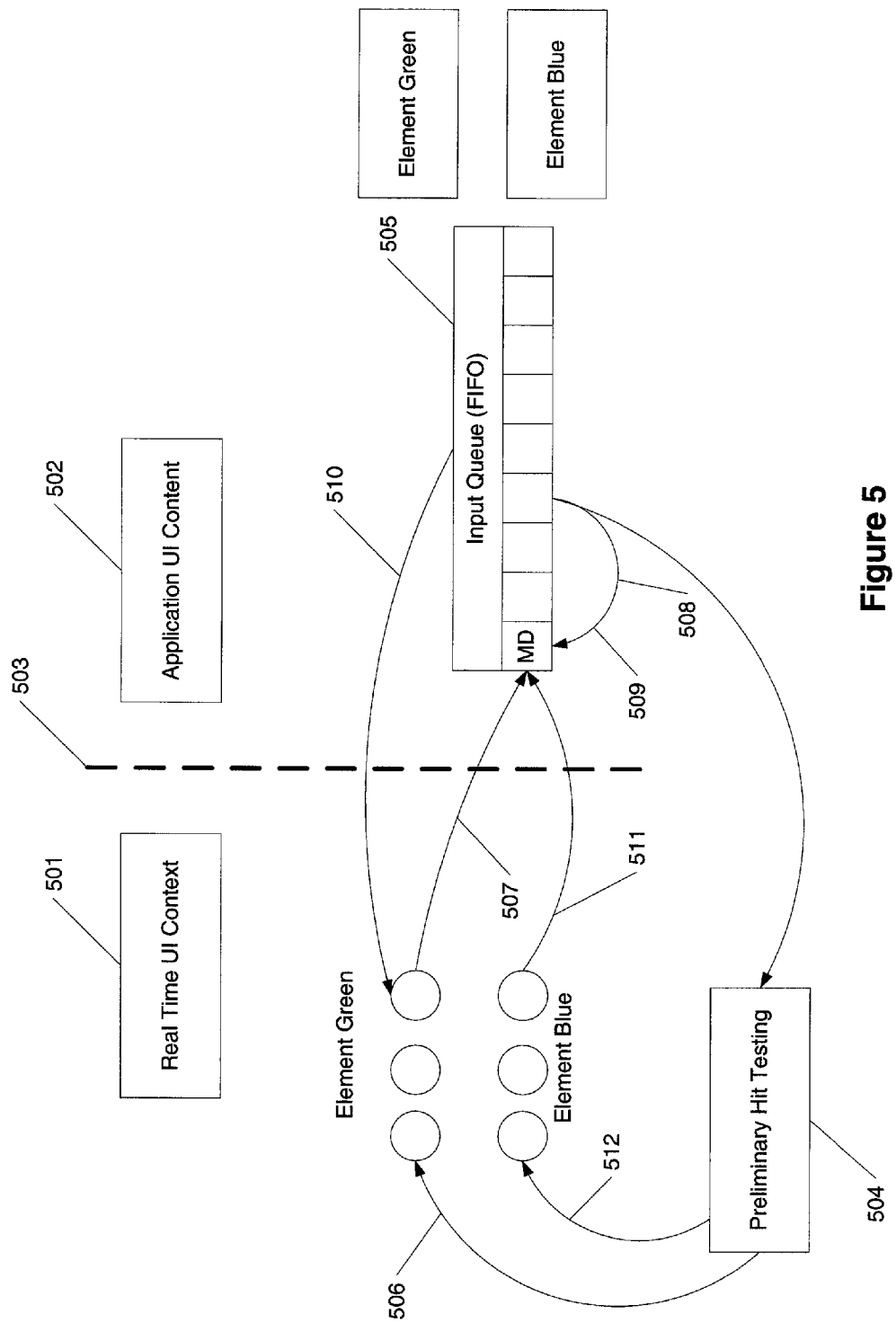

FIG. 5 shows hit testing with various elements. Here, FIG. 5 shows a real time UI context 501, an application UI context 502, and a boundary 503 between them.
 a. Preliminary hittesting 504 with cached structures can be conducted on the real time context 501, and the relevant digitizer input is sent 506/512 to the target element's stylusplugin list (here, the list for element blue or element green).
 b. Digitizer input that passed through the target element's stylusplugin list is now sent 507 or 511 to the application context's input queue 505.
 c. Logic on the application context side conducts accurate hittesting when it gets an opportunity, and notifies 510 the real time context that there was an inaccuracy in the preliminary hittesting—the stylus initiates resend procedures for the digitizer input that was sent to the wrong plugins (for instance).
 d. Transaction instructions are sent to plugins to either commit their internal state transitions or rollback and synthesize/update their internal states while removing the incorrectly accepted digitizer input.
 e. The existing RawStylusInputReports in the input queue is replaced with a RawStylusInputReport generated by processing the original digitizer input through the plugins for the correct target 509.
 f. The real time context 501 uses the updated targeting information from the application context for the following digitizer input (while capture status is valid, namely until a stylus up occurs).

One class provided by the platform that derives from StylusPlugin is the DynamicRenderer, which renders the digitizer input in real time.

The transaction model is a correction process in case there is inaccuracy in the preliminary hittesting done in the real time context.

FIG. 6 shows a comparison to another pen data handling approach using plugins. In FIG. 6, there were synchronous (real time) plugins (602A, 602B, 602C) which processed digitizer input first, which then passed on the processed digitizer input to asynchronous (application) plugins (603A-603C). One of these asynchronous plugins is normally the ink collecting object.

There are 2 aspects to the Presentation Stylus real time/application transaction model:
 a. A transaction model required to cope with hittesting inaccuracies on the real time context.
 b. A transaction model required irrespective of hittesting inaccuracies, and is more an application function where the plugins on the real time thread needs to be in sync with the application.

In FIG. 6, a comparative example is shown. Here, pen services 601 provides pen data to synchronous plugins (602A-602C with 602B being a dynamic renderer plugin). Next, crossing the synchronous/asynchronous boundary 604, the data is handled by asynchronous plugins 603A-603c with 603C being an ink collector plugin.

In FIG. 6, although hittesting inaccuracy is not significant, the need to synchronize the state of the app and plugins exists. The DynamicRenderer plugin in FIG. 6 may require instructions from the application to release cached data for a specific stroke (the application receiving data after the data is handled by plugin 603C).

In Presentation Stylus, there is an increasing need to formalize this transaction between the application and plugins due to a potential hittesting inaccuracy problem. For instance, the system may include a call back mechanism to the stylus plugins from the application context, which can satisfy both transaction needs, namely (i) coping with hittesting inaccuracy, and (ii) state synchronicity.

One illustrative transaction may appear as shown in FIG. 7. Here, the tree-based application 701 forwards calls back to the dynamic renderer 602B. The system of FIG. 7 differs from the system of FIG. 6 in at least some of the following points:

a. A formal method on the plugin can be established for call back. For example, the logic of the method may be established or defined by a developer using the method.

b. The plugins can designate whether or not there should be a call back for a given stylus input.

c. This plugin's designation can be performed by the plugin tacking on custom data to stylus input.

d. Hittesting inaccuracy information is embedded and set by Presentation stylus when a callback is executed.

e. A developer may desire to control plugin state management. To manage plugins, the developer may include state rollback points by tacking customdata to digitizer input (e.g. stylus down =>stylus up for example).

The following is an illustrative example of a transaction of a Dynamic Renderer.

```
Public class DynamicRenderer
{
    Private HashTable __hashDAtoHV;
    Private HashTable __hashRSIMARKtoSUBVISUAL;
    Private RawStylusInput __currentStroke;
    Public DynamicRenderer( )
    {
        __hashDAtoHOSTVISUAL = new HashTable( );
        __hashRSIMARKtoSUBVISUAL = new HashTable( );
    }
    Public Visual SetDrawingAttribute(DrawingAttribute drawingAttribute);
    {
        If (__hashDAtoHOSTVISUAL [drawingAttribute] != null)
        {
            Return __hashDAtoHOSTVISUAL [drawingAttribute];
        }
        Else
        {
            VisualTarget vt = This.base.GetVisualTarget( );
            Visual hv = GetVisual(vt);
            __hashDAtoHOSTVISUAL.Add(drawingAttribute, hv);
            Return hv;
        }
    }
    // Note this method returns the host visual on which strokes for this drawing attribute are rendered onto. The application can
    attach this visual in the appropriate location in the InkPresenter visual tree.
    Public void OnRawStylusInput(RawStylusInput rsi)
    {
        // draw rsi data to the correct hv sub tree based on the currently specified drawing attribute.
        // visualGeneratedFromRSI = drawn visual
        If (rsi.Action == RawStylusActions.Down)
        {
            __currentStroke = rsi;
            ArrayList array = new ArrayList( );
            array.Add(visualGeneratedFromRSI);
            __hashRSIMARKtoSUBVISUAL.Add(rsi, array);
            rsi.SetCustomData(rsi);
        }
        If (Stylus is down && rsi.Action == RawStylusActions.Move)
        {
            ((ArrayList) __hashRSIMARKtoSUBVISUAL[__currentStroke]).Add(visualGeneratedFromRSI);
        }
        If (rsi.Action == RawStylusActions.Up)
        {
            __currentStroke = null;
            rsi.SetCustomData(rsi);
        }
    }
    Public void OnCustomData(RawStylusInputCustomData customData)
    {
        RawStylusInput rsi = (RawStylusInput) customData.Data;
        // this method is assuming RSI is used as the key to correlate digitizer input to visual
        If (customData.IsTargetValid)
        {
            // if the target element is valid, one can remove the wet ink on stylus up
            if (rsi.Action == RawStylusActions.Up)
            {
                Foreach(Visual v in ((ArrayList) __hashRSIMARKtoSUBVISUAL[rsi]))
                {
                    // remove v
                }
            }
        }
    }
```

-continued

```
        Else
        {
            // if the target element is invalid, the system may remove the wet ink immediately
            Foreach(Visual v in ((ArrayList) _hashRSIMARKtoSUBVISUAL[rsi]))
            {
                // remove v
                // Note for this specific pseudo example, the state management actions for a commit transaction
                or a roll back transaction can be the same
            }
        }
    }
}
```

The following is an activity description for a developer using the system of FIG. 7.
    a. Application instantiates a new Dynamic Renderer;
    b. Application attaches the Dynamic Renderer to current application element;
    c. Application sets drawing attribute to Dynamic Renderer: hv=DR.SetDrawingAttributes(da);
    d. Application verifies if the host visual is already in its visual tree: myVisualTree.Contains(hv); and
    e. If it is not in the visual tree, the host visual is attached to the visual tree: myVisualTree.Add(hv, da).

As soon as the application element sees a StylusUp, the wet ink (dynamic ink collected on the real time context) is removed.

The following relates to pen services and input conditions.

Figure 8:
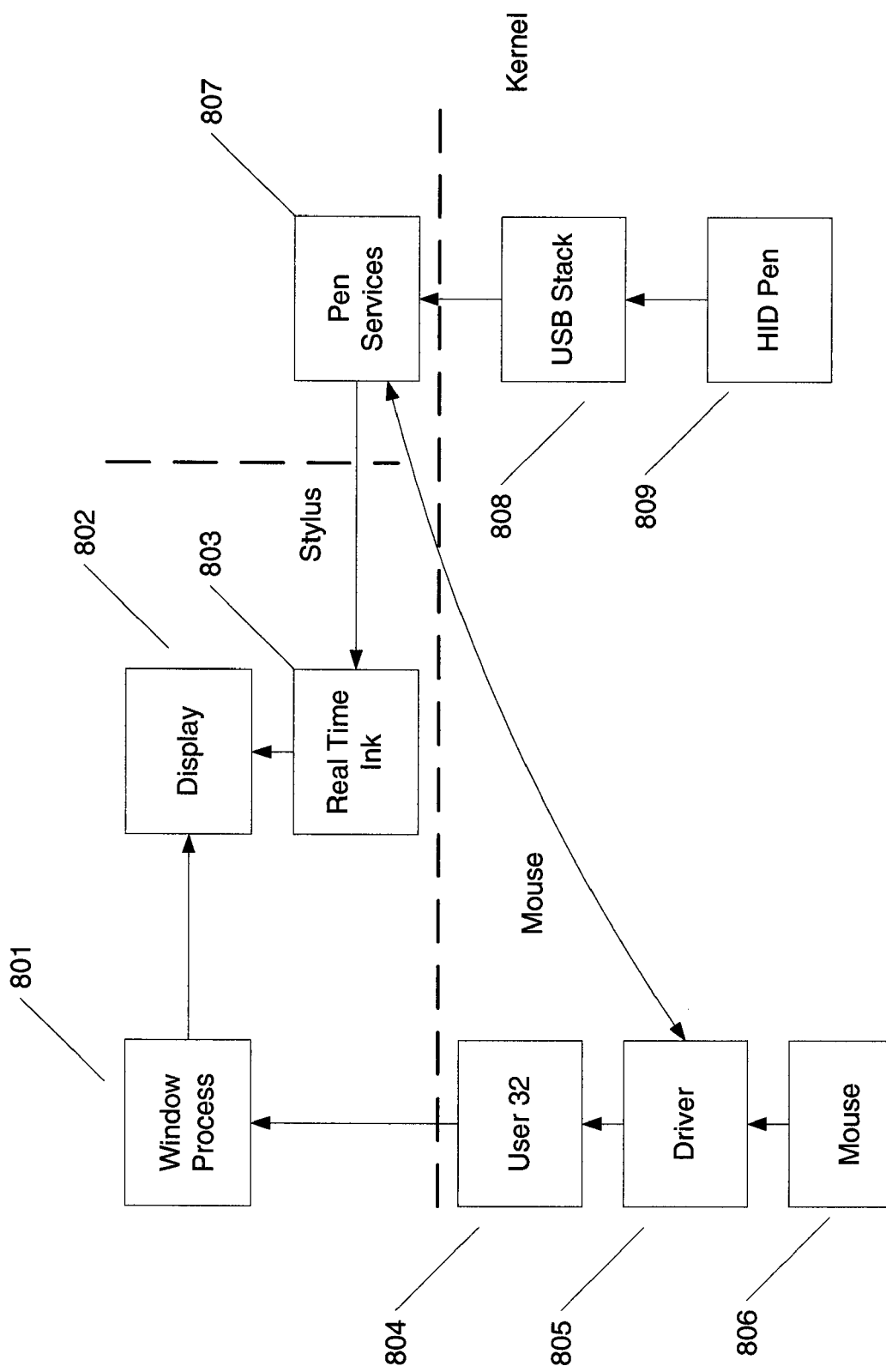
FIG. 8 shows a comparative example of conventional pen services.

FIG. 8 shows a conventional pen services and platform. In FIG. 8, mouse and stylus are shown in relation to a process kernel. Mouse events 806 are sent to mouse driver 805, and to User 32 804. The output of User 32 804 is sent to window process 801 then display 802. Pen events from human interface device HID Pen 809 are sent to USB stack 808 then to pen services 807. The output of pen services 807 are sent to real-time ink 803 then to display 802. Here, mouse driver 805 may communicate with pen services 807.

In the system of FIG. 8, a race condition can exist between whether the stylus or mouse input for a given action arrives at the application first since the input goes through different channels. Also, pen services-generated mouse messages are tagged to indicate they were generated by pen services, but correlation between the actual stylus input and mouse input is not accomplished.

Figure 9:
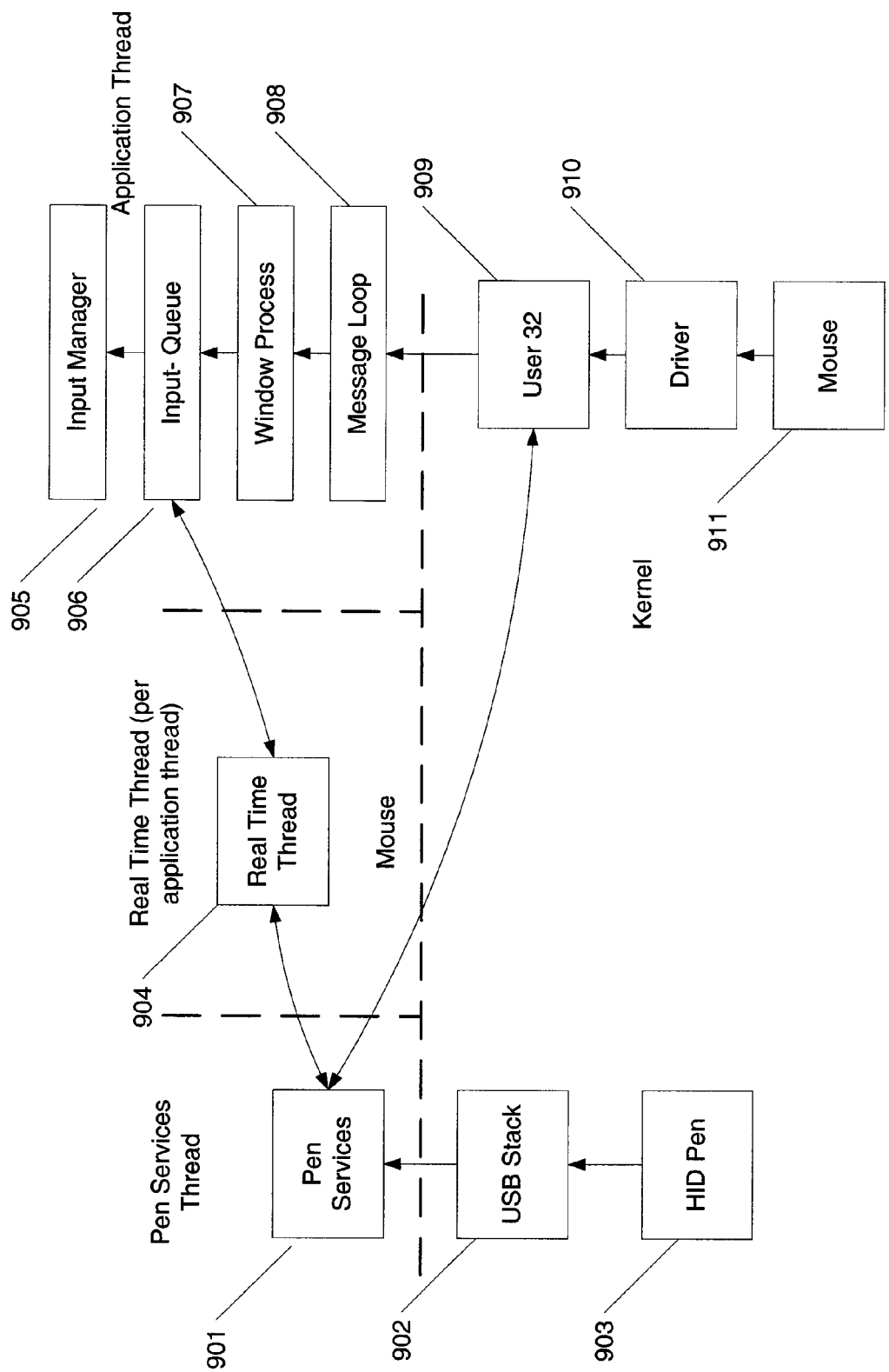

FIG. 9 shows a system in accordance with aspects of the present invention. FIG. 9 shows human interface device HID Pen 903 sending pen events to USB stack 902 and then to pen services 901 in the pen services thread. Mouse events are sent to User 32 909, to message loop 908, to window process 907, input queue 906, and input manager 905. The message loop 908, window process 907, input queue 906, and input manager 905 are in the application thread. Pen services 901 in the pen services thread may communicate with user 32 909 Also pen services 901 may communicate with a real-time thread 904, where there may be one real-time thread per each application thread. Finally, each real-time thread 904 may indicate with the input queue 906 of each application thread.

Here, stylus input (from HID Pen 903) can be interpreted as mouse events. These stylus input events can be posted to input queued 906 for handling as mouse events. Although there is a post of mouse messages from pen services, this mouse input can be programmatically removed at the Input Queue 906 should the mouse message be tagged with the pen services 901 marking. Also the presentation system input only receives stylus input from pens (meaning no mouse messages). This has the event of stylus input having the same level of importance as mouse events.

The following relates to mouse input from a stylus. Stylus input starts as the user bringing a pen into proximity of the Digitizer's surface. The Digitizer detects the pen and identifies the Stylus Pointer and its location on the digitizer surface. The device then forwards this information via the HID protocol to a pen services module. With respect to the Windows® operating system from Microsoft, this may relate to the Tablet PC Tablet Input Service (also known as WISPTIS). The Tablet Input Service then maps the digitizer location to a location on, for example, the Windows Desktop.

Figure 10:
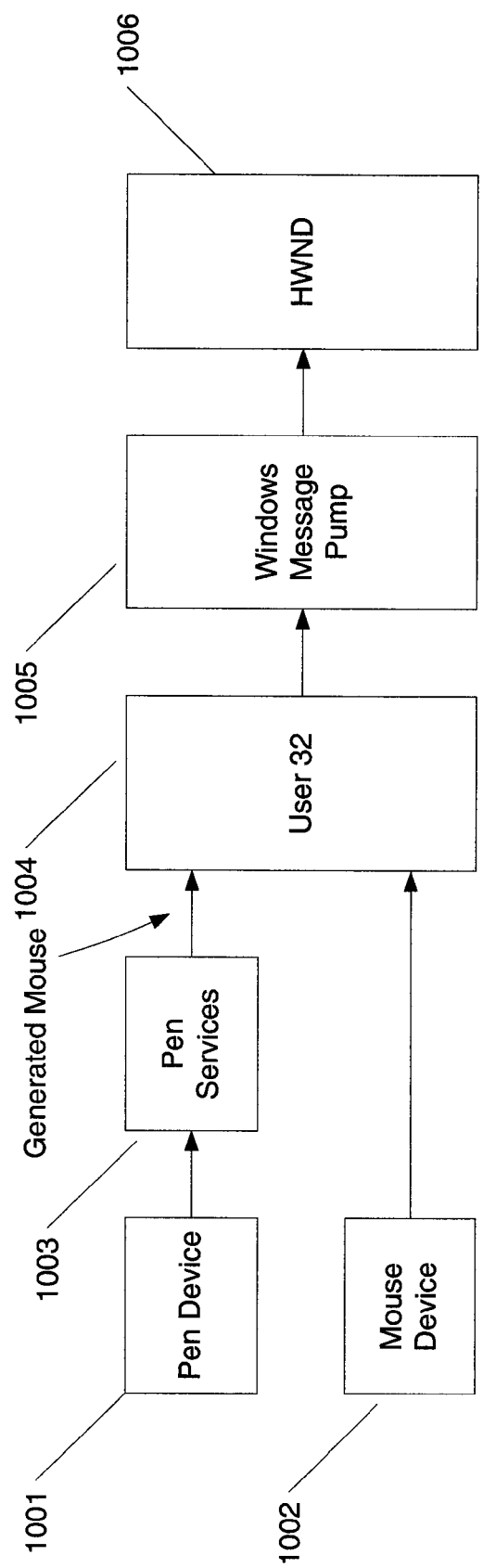

FIG. 10 illustrates how generated mouse events based on pen events are handled. In particular FIG. 10 contrasts the different paths that pen events and mouse events take. Pen services can do a number of other special functions that allow the pen to behave like a mouse in addition to those described here.

FIG. 10 shows and device 1001 sending pen events to pen services 1003, which generates mouse events and forwards them to User 32 1004. Mouse device 1002 sends mouse events to User 32 1004 as well. The output from User 32 1004 is sent to Windows message pump 1005 then to Windows handle HWND 1006 (then to an application for handling).

In both cases the application sees only a mouse event and the operating system considers the Stylus to be just another mouse. The up or down state of the stylus can correspond identically to the up and down state of the mouse.

Figure 11:
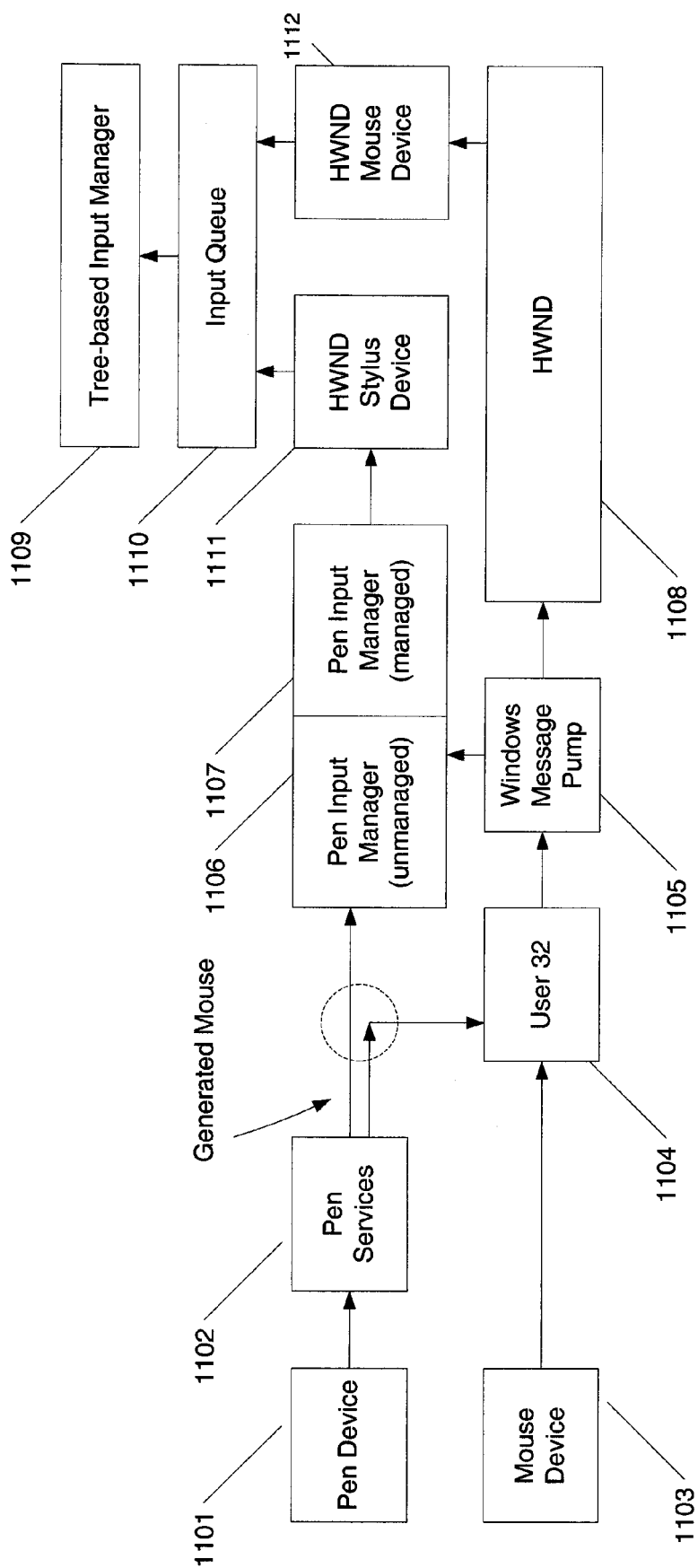

The following relates to stylus input from devices. FIG. 11 shows how pen input is handled when a pen is over top of an inking service. In the presentation system, each "HWND" that contains any ink-able area may be considered a potential inking surfaces and the following process will apply. Referring to FIG. 11, mouse device 1103 outputs mouse events to User 32 1104. Windows message pump 1105 outputs Windows messages to a pen input manager 1106/1107 and/or HWND 1108. From HWND 1108, messages may be sent to HWND mouse device 1112, then to input queue 1110 and tree-based input manager 1109. A pen device 1101 may send pen events to pen services 1102. The system may recognize if the pen events should be considered a mouse events and generates corresponding mouse events and send them to User 32 1104 and removes the pen event. Alternatively, pen events may be sent to pen input manager 1106 (relating to unmanaged code) and an input manager 1107 (relating to managed code). Next, messages may be sent to HWND stylus device 1111, to input queue 1110, and tree-based input manager 1109.

Described another way, as soon as the pen comes into range of a potential inking surface, a Stylus Event is sent to the Pen Input Manager (PIM) 1106 in the application's process space. The Pen Input Manager 1106/1107 handles all the communication between the pen services 1102 (also referred to as the Tablet Input Service (WISPTIS)) and the application on a special high priority stylus input thread.

Pen services 1102 generates various events. All stylus events go directly to the Pen Input Manager 1106/1107 in the application and bypass the traditional Windows messaging system. To maintain the correct "mouse" state for the OS, all stylus movement events can generate an artificial mouse message that is sent to User32. Those artificial mouse events may be disregarded if they do not correspond to an object capable of receiving mouse input or control.

In some scenarios the application may attempt to use the mouse as a pen. In these scenarios the mouse message is intercepted by Pen services in 1102 and first sent to the application as a stylus event, then allowed the mouse message to flow through. The sequence of arrival though of this stylus event and mouse message to the application can be unpredictable.

Pen services 1102 can generate the following types of pen events:

StylusInRange—Stylus has come in range of the digitizer

StylusOutofRange—Stylus can no longer be detected by the digitizer

StylusPointCollection—These are the raw point data from the digitizers. These packets are usually generated while the pen is touching the digitizer only but the application may request they be sent while the pen is above the surface also. Usually only the Down packets are sent since the data rate is so high that it may result in unacceptable performance for the system.

StylusInAirPoints—These are similar to mouse move messages but are specific for the pen. These messages are used to track Stylus focus in the application.

Tablet Added/Removed—In some scenarios, such as a docking station, the digitizer device can come or go. The application can be notified of these events.

System Gesture events—These are global system pen commands such as "Press and Hold", Hover, etc.

The following relates to promotion of events from a stylus and mouse promotion. Here, a number of operations they occur in the presentation stylus system and not in pen services 1102.

As in the above section, pen services 1102 already handles promotion between stylus and mouse. This function is moved into the presentation stylus environment so as to attempt to prevent race conditions between the mouse and a stylus. The race conditions between the mass and the stylus can result in non-deterministic application behavior. This nondeterministic behavior is due to at least one of (i) the Presentation tunnel/bubble eventing model, and (ii) element composition model.

Traditional COM/WF scenarios differ from this, namely there is no tunnel/bubble eventing even when multiple hwnds are composed into an aggregate control, unless explicit windows message process code is written.

For example, two elements may be displayed on a user interface, namely elements A and B.

a. Element A listens to mouse events, and raises a modal dialog in response b. Element B listens to stylus events, and raises a modal dialog in response c. An instance of Element B is hosted within Element A d. The user taps in the nested Element B When mouse arrives before stylus, element A would raise the dialog and lock the application context because the context is believed to relate to mouse input.

When stylus arrives before mouse, element B would raise the dialog and lock the application context because the context is believed to relate to stylus input.

The following relates to Com/WF Tablet Platform Timelines of Mouse Messages and System Gestures When a given action is performed, the system events (for instance, prefixed with ISG_) are sent and received almost instantaneously by the application. The mouse messages (for instance, prefixed with WM_) are sent when the action is performed and are received by the application after the time it takes for the event to be processed by the Windows message pump. In addition, CursorDown and CursorUp are pen events that are received from the pen hardware. They are sent when the tablet pen touches the screen and when it is lifted from the screen, respectively.

For the hold through event sequence, if the user drags the tablet pen before the sequence is complete, the events that are sent can correspond to left-drag. For example, when the drag starts, ISG_DRAG and WM_LBUTTONDOWN can be sent. When the pen is eventually lifted, CursorUp and WM_LBUTTONUP can be sent.

FIG. 12 shows the sequence of system and mouse events that are sent. In short, a double-tap with a tablet pen is often less accurate than a double-click with a mouse. This comes from the inherent nature of performing a double-tap with a tablet pen. Because the user must lift the tablet pen to perform a double-tap, the time between taps is often greater than the corresponding time between clicks of a double-click. In addition, it is likely that the two taps of the tablet pen occur at screen coordinates that are further apart than those for the two clicks of the mouse. To accommodate this, pen based input systems may have settings for the temporal and spatial distance between the two taps of a double-tap that are separate from the mouse settings for a double-click.

Figure 13A:
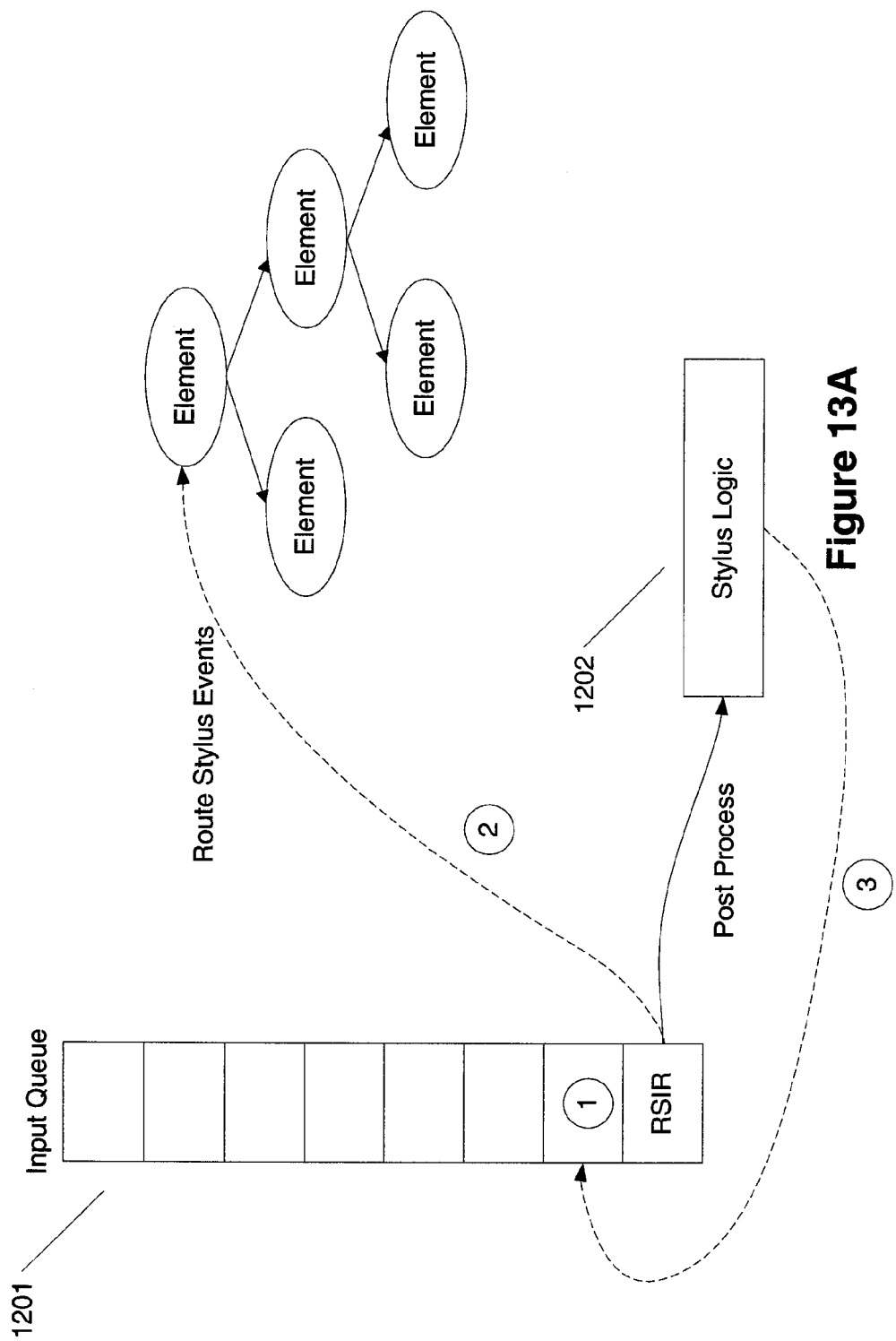

The following relates to Stylus to Mouse promotions. FIG. 13A shows an input queue 1201 with stylus logic 1202 routing stylus events to a visual tree. As referenced below, RSIR=RawStylusInputReport, SIR=StylusInputReport, and RMIR=RawMouseInputReport.

As shown in FIG. 13A, an RSIR is received in step one. In step two, at least one of the following may occur:

a. RSIR is processed through a preprocess input module, a pre-notify input module, Direct, a post notify input module, and a postprocessing input module in the InputManager (for instance, a Filter that subscribes to these events get the information).

b. SIR gets processed through preprocess input module, pre-notify input module, Direct, a post notify input module, a postprocessing of module in the InputManager.

c. PreviewStylusXXX event may be processed through the preprocess input module, the pre-notify input module, Direct, the post notify input module, and the post process input module in the InputManager.

d. StylusXXX event may be processed through the preprocess input module, the pre-notify input module, Direct, the post notify input module, and the post process input module in the InputManager.

In step three, Stylus Logic 1202 injects RMIR after the RSIR in the input queue a. If RSIR was handled, RMIR is injected as handled.

b. If RSIR was not handled, RMIR is injected as not handled.

One example of a rule with which one can create the RMIR out of RSIR can be expressed as follows:

| Raw Stylus Input Report (RSIR) RawStylusActions | Raw Mouse Input Report (RMIR) RawMouseActions |
|---|---|
| Down | Button 1 Press |
| Move | Absolute Move |
| SystemGesture - Tap | Button1Press at the original Down position |
| SystemGesture - DoubleTap | Button1Press at the original Down position, with click count 2 |
| SystemGesture - RightTap | Button2Press at the original Down position |
| SystemGesture - Drag | Button1Press at the original Down position |
| SystemGesture - RightDrag | Button2Press at the original Down position |
| SystemGesture - HoldEnter | <No Promotion> |
| SystemGesture - HoldLeave | <Never implemented> |
| SystemGesture - HoverEnter | <No Promotion> |
| SystemGesture - HoverLeave | <No Promotion> |
| Up | Button1Release |

The following relates to promotion timing.

Stylus to Mouse promotion can be withheld until the system gesture detection time threshold or spatial threshold is reached.

When the system gesture detection thresholds are reached, only the RMIR that corresponds to the initial stylus down may be injected.
  a. The reason this is acceptable is because, unlike mouse, the stylus has high resolution and is real time, thus the only possible position jump is 2 pixels which is insignificant enough to not play back all stylus movements.
  b. Mouse, on the other hand, occurs asynchronously through the Windows message pump and User32, where numerous mouse packets can potentially be queued up before the spatial threshold detection logic kicks in.

Figure 13B:
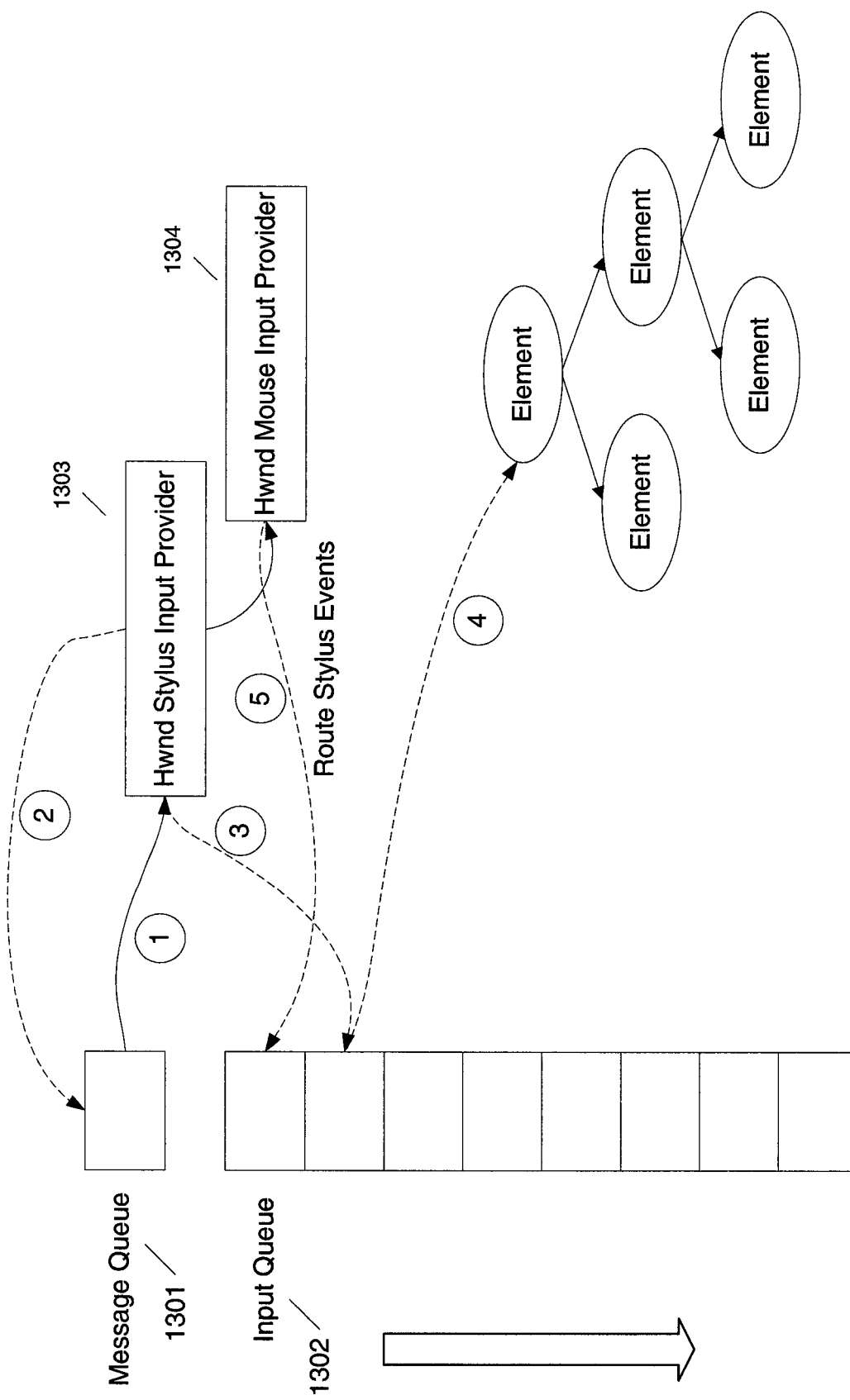

The following relates to Mouse to Stylus promotion. FIG. 13B shows how Mouse events can be promoted to stylus events. Here, the calling process may be the hwndsouce process. For reference, WM_LBD=Windows Message Left Button Down.

In step 1, a WM_LBD is received. In step 2, if WM_LBD is coming from pen services, it is marked handled and no operation occurs. In step 3, otherwise, if Stylus is enabled on the element, a RSIR is injected prior to letting HwndMouseInputProvider inject a RMIR. In step 4, the stylus event is routed. In step 5, after the stylus event is routed, HwndMouseInputProvider gets an opportunity to process WM_LBD, resulting in the injection of RMIR. If the injected RSIR was handled, RMIR is injected as handled. If the injected RSIR was not handled, RMIR is injected as not handled. In step 6, the rule with which the system create the RSIR out of WM mouse messages can be expressed as follows

| WM Message | Mapped RawStylusActions |
|---|---|
| WM_CAPTURECHANGED | |
| WM_LBUTTONDOWN | StylusButtonDown StylusDown |
| WM_LBUTTONUP | StylusButtonUp StylusUp |
| WM_MBUTTONDOWN | StylusButtonDown StylusDown |
| WM_MBUTTONUP | StylusButtonUp StylusUp |
| WM_MOUSEACTIVATE | |
| WM_MOUSEHOVER | System Gesture - HoverEnter |
| WM_MOUSELEAVE | System Gesture - HoverLeave |
| WM_MOUSEMOVE | StylusMove |
| WM_MOUSEWHEEL | |
| WM_NCHITTEST | |
| WM_NCLBUTTONDBLCLCK | |
| WM_NCLBUTTONDOWN | |
| WM_NCLBUTTONUP | |
| WM_NCMBUTTONDBLCLCK | |
| WM_NCMBUTTONDOWN | |
| WM_NCMBUTTONUP | |
| WM_NCMOUSEHOVER | |
| WM_NCMOUSELEAVE | |
| WM_NCMOUSEMOVE | |
| WM_NCRBUTTONDBLCLCK | |
| WM_NCRBUTTONDOWN | |
| WM_NCRBUTTONUP | |
| WM_NCXBUTTONDBLCLCK | |
| WM_NCXBUTTONDOWN | |
| WM_NCXBUTTONUP | |
| WM_RBUTTONDOWN | StylusButtonDown StylusDown |
| WM_RBUTTONUP | StylusButtonUp StylusUp |
| WM_XBUTTONDOWN | StylusButtonDown StylusDown |
| WM_XBUTTONUP | StylusButtonUp StylusUp |

The following relates to promotion timing.

Unlike stylus to mouse promotion, the promotion occurs immediately and unconditionally. The reason why stylus to mouse promotion has a delayed promotion model is in order to take system gestures into consideration and not raise mouse events for system gesture related stylus actions.

The following relates to System Gesture promotion.

Mouse actions do fire system gestures, but the system gesture detection problem is scoped. The principle by which mouse system gesture detection occurs is as follows:
  Mouse actions continue to flow through the input stream, regardless of system gesture detection—this is because the actual mouse hardware is being used, and it does not make sense to hold back mouse input to account for system gestures
  The rule with which the system creates the RSIR out of WM_XXX can be expressed as follows:

| WM_XXX | Raw Mouse Input Report (RMIR) RawMouseActions |
|---|---|
| WM_LBUTTONDOWN | SystemGesture - Tap |
| WM_LBUTTONDOWN ClickCount 2 | SystemGesture - DoubleTap |
| WM_RBUTTONDOWN | SystemGesture - RightTap |
| WM_LBUTTONDOWN + WM_MOUSEMOVE | SystemGesture - Drag |
| WM_RBUTTONDOWN + WM_MOUSEMOVE | SystemGesture - RightDrag |
| <No Promotion> | SystemGesture - HoldEnter |
| <No Promotion> | SystemGesture - HoldLeave |
| WM_MOUSEHOVER | SystemGesture - HoverEnter |
| WM_MOUSELEAVE | SystemGesture - HoverLeave |

The following relates to a comparison of stylus and mouse capture situations (S being Stylus priority, M being mouse priority):

| Capture State | HW | Action | InWindow | OutWindow - Design | OutWindow - Today |
|---|---|---|---|---|---|
| Mouse Capture On Stylus Capture Off | Use HW Mouse | Drag | M & S (M => S) | M (M => S) | M => S |
| | Use HW Mouse | Hover | M & S (M => S) | M (M => S) | M => S |
| | Use HW Stylus | Move | M & S (S => M) | M (S => M) | S => M |
| | Use HW Stylus | InAir | M & S (S => M) | M (M => S) | Nothing |
| Mouse Capture Off Stylus Capture Off | Use HW Mouse | Drag | M & S (M => S) | No M | Nothing |
| | Use HW Mouse | Hover | M & S (M => S) | No M | Nothing |
| | Use HW Stylus | Move | M & S (S => M) | No M | S => M |
| | Use HW Stylus | InAir | M & S (S => M) | No M | Nothing |
| Stylus Capture On Mouse Capture Off | Use HW Mouse | Drag | M & S (M => S) | S (M? => S)[1] | Nothing |
| | Use HW Mouse | Hover | M & S (M => S) | No S | Nothing |
| | Use HW Stylus | Move | M & S (S => M) | S (S => M) | S => M |
| | Use HW Stylus | InAir | M & S (S => M) | No S | Nothing |
| Stylus Capture Off Mouse Capture Off | Use HW Mouse | Drag | M & S (M => S) | No S | Nothing |
| | Use HW Mouse | Hover | M & S (M => S) | No S | Nothing |
| | Use HW Stylus | Move | M & S (S => M) | No S | S => M |
| | Use HW Stylus | InAir | M & S (S => M) | No S | Nothing |

When capture is on, the event gets routed to whatever element calls the capture

When capture is off, the events get routed to whatever element the device is over If developers want hover/inair outside of window, they need to enable mouse capture besides stylus capture The following relates to the handling of coordinates in the event arguments.

In the Presentation environment, elements can be the lowest level of user interface pieces. This is expressed as complex elements contain simple elements. For example, combobox may be a complex element that combines a textbox, button, listbox, scrollbars, borders, etc. Each of these individual child elements are event sources within the Presentation environment. What can happen as a result of the combination of simple elements is that stylus events may be raised at unexpected or not intended elements. Furthermore, events can tunnel & bubble up the element tree.

This suggests that the coordinate system (or more notably the origin of the coordinate system) for the event may possibly be maintained as absolute (for instance, against the top left of the Presentation window) on the event arguments, and a conversion means to cross map the coordinate system to that which is expected by the developer should be provided.

APIs can reflect this consideration. For instance, the APIs may or may not expose any immediate x, y position without specification of the element to which the coordinate space should be mapped to on StylusEventArgs.

Data packets relating to stylus input may be referred to as stylus packet. The stylus packets may have values associated with them. The stylus packet values may or may not metrics. For instance, the following stylus packet values may not have metrics associate with them:

public static readonly Guid PacketStatus;
public static readonly Guid SerialNumber;

In contrast, the following stylus packet values may have metrics associate with them:

public static readonly Guid AltitudeOrientation;
public static readonly Guid AzimuthOrientation;
public static readonly Guid ButtonPressure;
public static readonly Guid NormalPressure;
public static readonly Guid PitchRotation;
public static readonly Guid RollRotation;
public static readonly Guid TangentPressure;
public static readonly Guid TimerTick;
public static readonly Guid TwistOrientation;
public static readonly Guid X;
public static readonly Guid XTiltOrientation;
public static readonly Guid Y;
public static readonly Guid YawRotation;
public static readonly Guid YTiltOrientation;
public static readonly Guid Z;

In some aspects of the invention, the stylus device/tablet device may be a state-less device. In other aspects, the stylus device/tablet device may be a state-based device. In one aspect, both the StylusDevice and TabletDevice can be stateful (namely they represent the specific state event at a snapshot, namely the stylus may be in air now, or in range now, or inverted now, etc.). The StylusEventArgs, for example, can provide a reference to StylusDevice when a specific event occurs.

The system may respond to resolution change. To respond to resolution changes, the stylus input sub system may listen to WM_DISPLAYCHANGE and refreshes its coordinate mapping to ensure proper cursor/physical-stylus coordination.

StylusPointDescription data formats may have an order associated with their information. For instance, X, Y information may be in the 1st and 2nd position within the packet data. If a NormalPressure data is present, it may occupy the 3rd position.

In some operating environments, many tablets may exist. The system may listen to specific tablets or all tablets. For example, COM/Winform platform may allow a developer to be selective about which template to listen to while, in the Presentation system platform, the developer may lack this ability. Rather, the developer may need to a filter on stylus events. On the real time context side, developers can create a custom renderer that handles or operates in a single tablet mode, and then implement single tablet mode code in the stylus event handlers in the application context side. For instance, if events are received and the associated tablet device is a specified tablet device, then a first action may be taken. Alternatively, if events are received and the associate tablet device is not a specified tablet device, then a second action may be taken.

Global Scope InRange/OutOfRange

Expose InRange/OutOfRange as CLR events off of Stylus

Fire the InRange/OutOfRange from RawStylusInputReports since the raising cannot get out of sync from other stylus events.

Stylus events can be fired at various points as a stylus enters or leaves to element. For example, an enter/leave events may be fired when a property changes. For instance, one property that may be monitored can include a property that indicates an element that stylus is directly over.

The following table describes the events that may be fired based on stylus movements in and about an element 1402 nested inside a Windows handle (hwnd) 1401.

| Scenario | Event Sequence |
|---|---|
| Stylus starts and ends inside element 1402 | =>StylusMove<br>=>StylusDown<br>=>StylusMove<br>=>StylusUp<br>=>StylusMove |
| Stylus starts inside element 1402 and ends outside element 1402 but in Hwnd 1401 | =>StylusMove<br>=>StylusDown<br>=>StylusMove<br>=>StylusLeave<br>=>StylusMove<br>=>StylusUp<br>=>StylusMove |
| Stylus starts in element 1402 and leaves Hwnd 1401 at a point 1403 | =>StylusMove<br>=>StylusDown<br>=>StylusMove<br>=>StylusLeave<br>=>OutOfRange |
| Stylus starts in Hwnd 1401 and ends in element 1402 | =>StylusMove<br>=>StylusDown<br>=>StylusMove<br>=>StylusEnter<br>=>StylusMove<br>=>StylusUp<br>=>StylusMove |
| Stylus starts outside Hwnd 1401 and ends in element 1402 | =>InRange<br>=>StylusMove<br>=>StylusEnter<br>=>StylusMove<br>=>StylusUp<br>=>StylusMove |
| Stylus starts inside element 1402 and leaves Hwnd 1401 across a border 1404 common between the element and the Hwnd | =>StylusMove<br>=>StylusDown<br>=>StylusMove<br>=>StylusLeave<br>=>OutOfRange |
| Stylus starts outside Hwnd 1401 and enters both element and Hwnd across common border | =>InRange<br>=>StylusEnter<br>=>StylusMove<br>=>StylusUp<br>=>StylusMove |
| For an element that extends beyond Hwnd, Stylus starts inside element and leaves Hwnd while still in element | =>StylusMove<br>=>StylusDown<br>=>StylusMove<br>=>OutOfRange |
| For an element that extends beyond Hwnd, Stylus starts in element outside Hwnd and enters Hwnd while staying within element | =>InRange<br>=>StylusEnter<br>=>StylusMove<br>=>StylusUp<br>=>StylusMove |

The following table describes a nested element event sequence.

| Scenario | Event Sequence |
|---|---|
| Stylus moves from child to parent | Child StylusLeave => Parent StylusEnter |
| Stylus moves from parent to child | Parent StylusLeave => Child StylusEnter |

Previews may be available for a stylus is also dependent upon a device state. For example, in PreviewStylusDown, InAir=true while in PreviewStylusUp, InAir=false.

The stylus may act as the exclusive input to the system in various circumstances. For example, when the stylus is in range, all mouse input may be filtered out. This may help address leakage situations where generated mouse messages are not properly flagged. If not properly flagged and subsequently filtered, the generated mouse messages may be processed in parallel with the stylus messages, thereby causing a memory leak.

Packets may be modified during their processing by the system. FIG. 15 shows a data flow from a stylus logic 1503 (stylus packet generator) to a stylus plug in 1502 in the real-time user interface 1501. Also, the packet may be sent to input queue 1505 in the application user interface context 1504. However, FIG. 16 shows another approach in which packets from stylus logic 1603 are sent only to a stylus plug in 1602 in the real-time user interface context 1601, and then the stylus plug in 1602 forwards the packet to the input queue 1605 in the application user interface context 1604. FIG. 16 allows stylus plug in 1602 to modify stylus packets before they are sent to the input queue 1605 Indy application user interface context 1604.

Furthermore, by supporting setting of packet data to the RawStylusInput, the packet data can be modified in the Stylus Plugins (1602 etc.).

The API signatures can appear as though the developer is directly updating the packets contained within the RawStylusInput. The original packet data may be destroyed once the stylus plug-in 1602 generates replacement packet data. Alternatively, the original packet data may be maintained alongside new packet data without destroying the original packet data. One benefit of maintaining the original packet data is that one may then refer to the original packet data for the testing.

If plugins are hooked up as PluginA=>PluginB=>PluginC in the plugin collection, PluginC sees packets modified by PluginA & PluginB. Furthermore, the application receives packets that have been post modified by all the plugins.

In some situations, the original packets may be maintained as raw stylus input (RawStylusInput) for situations (i) to resend cases due to inaccurate hittesting on the real time context, and (ii) to conduct accurate hittesting based on the original un-modified packets when the RawStylusInput gets processed by the application context.

Another scenario that is targeted by the RealTimeStylus programming framework is the capability to programmatically simulate various input (e.g. programmatic stylus down, programmatic stylus up, etc.) in the real time UI context.

In the first approach, the system may allow injection of synthesized raw stylus input. In another approach, the system may not allow injection of synthesized RawStylusInput, but rather relies on a data embedding model where plugins in the real time context can insert custom data in the RawStylusInput that are currently being processed by them.

For example, PlugInA can add custom data to the RawStylusInput to indicate that a StylusUp is to be synthesized. The application may then listen to notifications for the custom data, and update its internally maintained stylus state in response. In this usage scenario, it is the application's responbitility to ensure consistency in the stylus state in correspondence with the actual Stylus device state.

Preceding custom data and succeeding custom data can be added to RawStylusInput, and these result in calling back to stylus plugins before and after the specific StylusEvent that results from the RawStylusInput. Of the following is an illustrative example of modification of stylus packets.

i) maintaining a stylus device state, and ii) preventing an increase in complexity related to correcting inaccurate hit testing.

For (i), the stylus device state always needs to be ensured to be correct.

For (ii), if there were to be an error in the preliminary hittesting, the Stylus would need to recall and remove these synthesized RawStylusInputs OR leave them depending on where the RawStylusInput was injected from (the injection logic could be from a plugin, or from elsewhere in the application). This ambiguity in behavior is one reason supporting the more simplified approach as stated above.

Common stylus APIs, RealTimeStylus APIs, hardware APIs, and strings that may be used in conjunction with aspects of the present convention.

Ink and Rendering of the Ink

The following relates to the storage and rendering of ink itself. Various formats for storing ink are known including ISF (Ink Serialized Format) and other vector based storage formats and graphical formats including GIFS, Bit maps, and the like. The ink can be stored in various types of collections including, but not limited to ink collections and stroke collections. In one example, the ink and stroke collections can be separate collections. In another example, the ink and stroke collections can be merged into a single object. In this later example, the single collection may be referred to as Windows.System.Ink.StrokeCollection or any other appropriate name. Benefits of having a single type of collection include eliminating developer confusion over the difference between

```
public class MySingleStrokeGestureRecognizer : StylusPlugin
{
    public MyFilter( )
    {
    }
    void OnRawStylusInput(System.Windows.Input.RawStylusInputEventArgs args)
    {
        // if args.Report.Actions = Up, then do gesture reco
        // inject gesture reco results after the current RawStylusInput
        args.SucceedingCustomData.Add(myGuid, myDataObject);
    }
    void Register(UIElement target)
    {
    }
    void UnRegister(UIElement target)
    {
    }
}
public class MyControl : Control
{
    public MyControl( )
    {
        this.AddHandler(System.Windows.Input.Stylus.StylusCustomDataEventId,
            new StylusCustomDataEventHandler(OnStylusCustomData));
    }
    private void OnStylusCustomData(object sender, StylusCustomDataEventArgs args)
    {
        if args.Id == someValue
        {
            if Args.Value == scratchOut
            {
                // do something
            }
        }
    }
}
```

Advantages where developers are prevented from synthesizing raw stylus input and adding it to the data flow include ink and strokes, allowing developers a single technique of accessing electronic ink, identification of strokes may be linked to the stroke collection, the stroke collections can now be serialized with load and save methods, and events related to undo operations are moved to stroke collections.

The lifetime management of strokes can be handled in a number of ways including but not limited to keeping objects valid as long as a reference is maintained to them, objects cannot be deleted from underneath the developer, and a collection of strokes that have a semantic meaning (for instance recognizing a word) are not subsequently changed or broken. For example, splitting a stroke may result in two new strokes. In one aspect of the invention, he is now up to the application to add the strokes back into the collection. This provides greater control to the application for the adding and removing of strokes. Strokes may be permanently pleaded from a stroke collection. Changing a stroke into a separate stroke collection can be done explicitly, meaning that it may or may not be done as a side effect of other operations.

In yet further aspects of the invention, strokes may be created independently by a method such as new Stroke (points). Also, stylus tips may now have a shape. The shape of the stylus' tip may be referred to as the StylusShape. Alternatively, the shape of the stylus that may be referred to by height and width. For instance, various stylus shapes may include enumerations such as a dot, circle, ellipse, rectangle, triangle, or a set of vertices for a convex shape, and the like. One of the benefits is that now a calligraphic tip may be specified. Further, the stylus shape may now be included in hit testing and bounding boxes as well as in defining a contour of the stroke.

Figure 19:
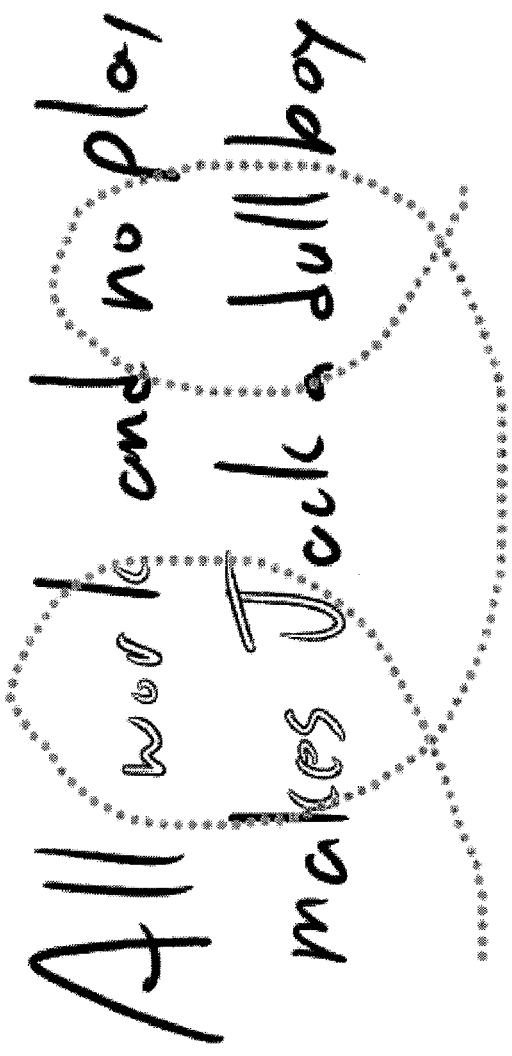

New functionality may be added to how ink strokes are selected. FIG. 19 shows the sentence "all work and no play makes Jack a dull boy". Here, a selection is shown by dotted ink in the figure. The selected ink includes ink in the first closed loop of the selection path. The selected ink is shown by ink strokes with border. In one example, as shown in FIG. 19, the second or subsequent loops of the selection path may not select ink. In another example, the second or subsequent loops of the selection path may select ink.

Figure 20:
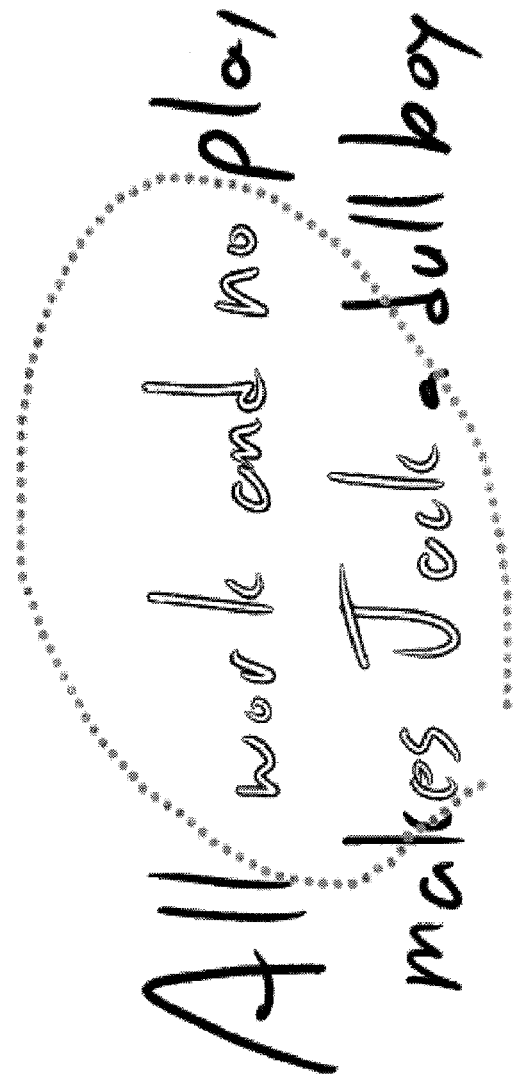

FIG. 20 shows an example where the selection ink path does not complete a closed loop. Rather, the system includes the ink surrounded by the selection path. Various degrees of selection may be made including 100% of an ink stroke being located within the selection region, 80% of an ink stroke being located in the selection region, or any other value that a developer may desire to include additional ink strokes.

In FIG. 20 a connecting line that connects the head and tail of a selection stroke is not shown. In FIG. 21, a connecting line that connects the head and tail of a selection stroke is shown. Not showing a connecting line may improve performance.

The following is a table of types of object methods that may be used in conjunction with aspects of the present invention.

|  | Method | Description |
| --- | --- | --- |
| Renderer | public void Draw(Graphics, Stroke);<br>public void Draw(Graphics, Stroke, DrawingAttributes);<br>public void Draw(Graphics, Strokes);<br>public void Draw(IntPtr, Stroke);<br>public void Draw(IntPtr, Stroke, DrawingAttributes);<br>public void Draw(IntPtr, Strokes); | Draws strokes on a Graphics or device context. |
| Ink | public void Clip(Rectangle r); | Removes the portions of a Stroke object or Strokes collection that are outside a given rectangle. |
|  | public Rectangle GetBoundingBox( );<br>public Rectangle GetBoundingBox(BoundingBoxMode); | Returns the bounding Rectangle that contains all of the Stroke objects in the Ink object. |
|  | public Strokes HitTest(Point, float);<br>public Strokes HitTest(Point[ ], float);<br>public Strokes HitTest(Point[ ], float, out Point[ ]);<br>public Strokes HitTest(Rectangle, float); | Returns the Strokes collection contained within the specified area. |
| Strokes | public void Clip(Rectangle r); | Removes the portions of every Stroke object in the Strokes collection that are outside a given rectangle. |
|  | public Rectangle GetBoundingBox( );<br>public Rectangle GetBoundingBox(BoundingBoxMode); | Returns the bounding Rectangle that contains the Strokes collection. |
|  | public void Move(float offsetX, float offsetY); | Applies a translation to the ink of the Strokes collection. |
|  | public void Rotate(float degrees, Point point); | Rotates the Strokes collection around a center point. |
|  | public void Scale(float scaleX, flroat scaleY); | Scales the Strokes collection in the X and Y dimensions. |
|  | public void Shear(float shearX, float shearY); | Shears the Strokes collection by the specified horizontal and vertical factors. |
|  | public void Transform(Matrix);<br>public void Transform(Matrix, bool); | Applies a linear transformation to a Strokes collection. |
| Stroke | public void Clip(Rectangle r); | Removes the portions of the Stroke object that are outside a given rectangle. |

-continued

| Method | Description |
|---|---|
| public float[ ] FindIntersections(Strokes strokes); | Finds the points where this Stroke object intersects other Stroke objects within a given Strokes collection. |
| public Rectangle GetBoundingBox( ); public Rectangle GetBoundingBox(BoundingBoxMode); | Returns the bounding Rectangle that contains the Stroke object. |
| public Point[ ] GetFlattenedBezierPoints( ); public Point[ ] GetFlattenedBezierPoints(int); | Returns the array of actual points that are used to approximate the Bezier representation of a Stroke object. |
| Public StrokeIntersection[ ] GetRectangleIntersections(Rectangle intersectRectangle); | Returns an array of Point structures that indicate where a Stroke object intersects a given Rectangle. |
| public bool HitTest(Point pt, float radius); | Returns a value that indicates whether a Stroke object is either completely inside or intersected by a given circle. |
| public void Move(float offsetX, float offsetY); | Applies a translation to the ink of the Stroke object. |
| public void Rotate(float degrees, Point point); | Rotates the Stroke object around a center point. |
| public void Scale(float scaleX, float scaleY); | Scales the Stroke object in the X and Y dimensions. |
| public void Shear(float shearX, float shearY); | Shears the Stroke object by the specified horizontal and vertical factors. |
| public Stroke Split(float findex); | Splits the Stroke object at the specified location on the Stroke object and returns the new Stroke object. |
| public void Transform(Matrix); public void Transform(Matrix, bool); | Applies a linear transformation to a Stroke object. |

The methods are extensible to other platforms. For instance, the APIs may be such that they allows sub-classing of Stroke and override key behaviors—the principal scenario is overriding (static) rendering of the Stroke.

The saving and reinstantiation of ink can be handled by the application. At saving time, the application can save any derived-type state into extended properties. At load time, the application may then replace Stroke objects with Stroke-derived types, if those extended properties exist.

The following is an example of how APIs may be made extensible.

Hittesting may also be performed. There are 3 hittesting categories covered by this domain area as follows, with elaboration.

Point Based Hittesting

This hittesting approach is based on using point density as a way to quantify how much of a stroke is meeting the specified filtering criteria (e.g. in a lasso line).

The typical return results of such APIs would be integers to point indices.

```
public class Stroke
{
// APIs relevant to extensibility
public virtual Stroke Clone( );
protected virtual void DrawCore(DrawingContext drawingContext, DrawingAttributes
drawingAttributes);
protected PathGeometry GetPathGeometry(DrawingAttributes drawingAttributes);
protected virtual void OnDrawingAttributesChanged(PropertyDataChangedEventArgs e);
protected virtual void
OnDrawingAttributesReplaced(DrawingAttributesReplacedEventArgs e);
protected virtual void OnInvalidated(EventArgs e);
protected virtual void OnPropertyDataChanged(PropertyDataChangedEventArgs e);
protected virtual void OnStylusPointsChanged(EventArgs e);
protected virtual void OnStylusPointsReplaced(StylusPointsReplacedEventArgs e);
public virtual void Transform(Matrix transformMatrix, bool applyToStylusTip);
}
```

Segment Based Hittesting

This hittesting approach might also be referred to 'spine based hittesting' which may or may not be different from non-tree based rendering hittesting.

This hittesting approach is based on using segment length between points as a way to quantify how much of a stroke is meeting the specified filtering criteria (e.g. in a lasso line).

The other usage model is not saying things are hit, until the calculation target (e.g. eraser shape) touches the spine of the stroke (namely the segments connecting the points in the stroke).

The typical return can result of such APIs would be floating (double) point indices.

Contour Based Hittesting

This hittesting approach is what one might think is the 'correct' hittesting, namely a WYSIWYG raster operation like hittesting done against what is rendered on the screen.

Another way of describing this usage model is saying things are hit, when the calculation target (e.g. eraser shape) touches the outlines of the stroke (which is very different from saying things are hit when the calculation target hits the spine of the stroke).

The event sequent may be maintained. Whenever further ink data modifications are made while in an event handler, the event sequence can become out of order if there are multiple delegates subscribed to the original event.

For example, a. EventHandlerA is subscribed to StrokeCollectionA's Changed event b. EventHandlerB is subscribed to StrokeCollectionA's Changed event as well c. In EventHandlerA, added strokes are removed automatically d. Event sequence: StrokeCollectionA add stroke→EventHandlerA add (1)→StrokeCollection remove stroke→EventHandlerA remove (3)→EventHandlerB remove (4)—EventHandlerB add (2)

It is possible to resolve this issue in 3 ways:

a. Do not fix b. queue all events and operations executed within the event handlers and ensure chronological consistency c. block data modifications while in the middle of processing events The Ink Renderer can be referred to as a visual tree manager designed and optimized for realizing ink effects. The specific example for such unique visual tree organization can include highlighters.

Due to these aspects, the Visual Target construct can work across multiple UI contexts and be plugged into any arbitrary visual tree.

The cross UI context nature comes aids real time inking

The pluggable nature can aid subtractive rendering of highlighter ink

By plugging in the inking Visual Target into the target application's visual tree, various features (e.g. clip) can be organized.

The Renderer is can be highly policied in order to assist the highlighter effect as stated above. The renderer can be a framework element as opposed to an instantiated object to make it more easily handled by developers. By making the Renderer more of an element, the visual tree bridging can be exposed merely through an element containment semantic.

Programmatical Elements Receiving and Displaying Ink

Various approaches may be used to provide programmatical elements that are able to receive ink and/or display ink. The programmatical control may include an Ink Canvas element as referenced herein.

The ink canvas element can host a number of controls including but not limited to the following height, width, and clip properties.

| Property | Description | Default |
|---|---|---|
| Height | The height of the Canvas. This is visible as the height of what is drawn as the background of the Canvas. It is also used to clip any contained elements if those extend below the bottom as determined by this height. | If unspecified, the height is determined as the minimum necessary to host all the content the Canvas contains. |
| Width | The width of the Canvas. This is visible as the width of what is drawn as the background of the Canvas. It is also used to clip any contained elements if those extend to the right of the right edge as determined by this width. | If unspecified, the width is determined as the minimum necessary to host all the content the Canvas contains. |
| Clip | Determines whether hosted elements will be clipped to the bounding rectangle of the Canvas. | True |

If a dimension is unspecified, the Canvas sizes to fit its contents. The following table describes how an ink canvas should be sized based on whether the ink canvas has ink, contents and a specified size:

| Has ink | Has contents | Has size | Result: |
|---|---|---|---|
| Y | Y | Y | Use specified size |
| Y | Y | N | Size to fit contents |
| Y | N | Y | Use specified size |
| Y | N | N | Use 350, 250 |
| N | Y | Y | Use specified size |
| N | Y | N | Size to fit contents |
| N | N | Y | Use specified size |
| N | N | N | Use 350, 250 |

In the above table, the default size is represented as width=350, height=250. This default size is only an example as other default sizes can also be used.

An ink canvas may or may not have a parent. In the situation where the ink canvas does not have a parent, the system may use public constructors to instantiate an ink canvas instance to provide the ink canvas with the following behaviors:
- a. The InkCanvas does not appear on the UI unless inserted into an element tree.
- b. The InkCanvas continues to function in spite of this behind the scenes.

Figure 18:
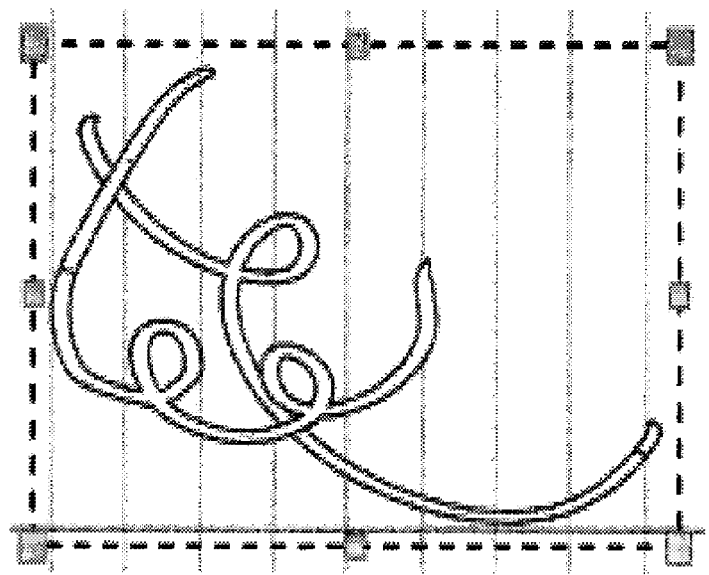
Figure 17:
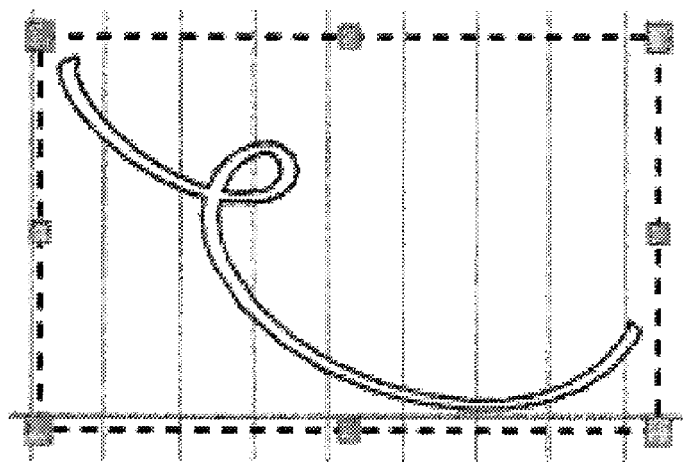

Of the ink canvas may include anything behavior and element bounds. For instance, move, resize, and erasing behavior do not have to be limited by the bounds of the InkCanvas element. The following is a list of editing behaviors that the ink canvas may or may not follow:
- a. Selected ink can render selected, even when in modes besides selection.
- b. Disabling the InkCanvas can allow editing of child textbox
- c. Copy/Delete operations may only apply to the selection within the InkCanvas, and not to itself
- d. Resizing the InkCanvas does not resize the ink
- e. Hovering over selected ink can change the cursor to 'Move' (NWSE arrow) cursor regardless of the editing mode
- f. Selection does not require full enclosure of target elements or ink. For example,
  1. Element can be selected with 80% enclosure
  2. Ink stroke can be selected with 60% enclosure
- g. Cursors can be override-able—as determined by a developer.
- h. Selection state can be maintained in editing modes besides selection, so that mini-select can be realized
- i. EditingModeInverted can specify top of pen editing behavior The selection of ink within an ink canvas can have programmatic behavior as well (relating to ink and elements). For instance,
- a. Selection can be programmatically set
- b. Selection may be background transparent
- c. Selection can render resize adorners
- d. Adorners can be always z-order highest
- e. Selected strokes can maintain their z-order
- f. Entering & leaving selection may or may not raise StylusEnter/StylusLeave events
- g. Selected ink can be rendered hollow
  1. A single stroke can be rendered hollow as shown in FIG. 17
  2. If multiple strokes are selected and rendered hollow, they appear as shown in FIG. 18

The ink in an ink canvas may also include move/resize functionality. Moving and resizing of selected ink may be independent of the bounds of the ink canvas.

The ink canvas may support a selection mini-mode. The mini-mode selection may include a selection made by right clicking the stylus and dragging it to encompass elements to be selected. The mini-mode selection ability may have the following functionality:
- a. Right clicking in all modes does nothing.
- b. Right dragging in all modes does nothing.
- c. The EditingMode may not change due to some other operations (e.g. clipboard paste)
- d. Selection state is only maintained when in selection mode
- e. The developer should implement custom code to switch out of selection mode should a previewstylusdown be detected to be in an off state.

The ink in the ink canvas may be subject to selection by a lasso. Lasso selection may include the following (it is appreciated that other percentages may be used based on a developer's preference for sensitivity for selection):
- a. Only immediate child elements and strokes on the InkCanvas may be made to be selectable
- b. Advanced behaviors such as autoscroll may or may not be not implemented
- c. Precision select cursor (the cross hair) is provided by default, unless turned off by developer
  1. 60% inclusion of a stroke will select it
  2. 80% inclusion of an element will select it
  3. Tapping on a stroke or element selects it Ink canvas content may be erasable. The erasing behavior may include the following:
- a. The erasing behavior may be or may not be limited to only erase ink
- b. Erase only applies to immediate strokes on an InkCanvas, and not those on child InkCanvases
- c. Advanced behaviors such as autoscroll may or may not be implemented The ink canvas may also include the ability showed ink in a high contrast mode. For instance, when the system is in a high contrast mode, rendering of the ink canvas may be overridden as follows:
- a. All ink strokes rendered in the ink canvas may pick up a display window's foreground color
- b. The ink canvas background may pick up the system background color
- c. Highlight strokes may or may not be rendered in the high contrast mode The ink canvas may include the ability to handle gestures. In one illustrative example the system may only support the use of single stroke gestures. In an alternate example, the system may support multistroke gestures in an ink canvas.

The ink canvas may support mid-stroke operations. The functionality of the ink canvas's mid-stroke operations may include the following:
- a. The ink canvas may support changing the editing mode mid stroke. This may include changing from an inking mode to a selection mode and/or changing from and erasing mode to a selection mode. Of course other changes of selection mode may also be possible.
- b. The ink canvas may include editing mode transition scenarios
- c. When changing from an inking mode to a selection mode and/or and erasing mode to a selection mode, the following may be used:
  1. Changing the editing mode may or may not lead to an injection of packet input from the stylus down point up to the current location.
  2. For the inking mode to the selection mode case, a stroke may be rendered in real-time, but then discarded once mode switch occurs. This can be the same regardless of barrel-switch press, or a press and hold-drag.
  3. For the erasing mode to the selection mode case, any strokes erased or split before the mode change can remain modified.

The ink canvas may include Input Event Routing. The input event routing may include the following:
- a. When editing mode is 'Disabled', input events may be passed to child elements
- b. When editing mode is 'Disabled', input events can continue to be received by InkCanvas
- c. When editing mode is some other value besides 'Disabled', events may not be passed to child elements d. When editing mode is some other value besides 'Disabled', input events may continue to be received by InkCanvas The InkCanvas may support the following extensibility scenarios:
  a. Use InkCanvas editing modes and a custom mode implemented by the developer via subscribing to the stylus they shot events and setting editing mode to disabled
     1. The ink canvas may expose all stylus events
     2. The stylus events fire even when the editing mode is 'Disabled'
  b. Replace an InkCanvas editing mode with a custom mode (e.g. custom selection) implemented by the developer via subscribing to the stylus events and setting editing mode to 'disabled'
     1. InkCanvas can expose all stylus events
     2. Stylus events can fire even when editing mode is 'Disabled'
  c. Change editing mode to "select" on barrel button press
     1. Support for mid-stroke editing mode change operations
  d. Change editing mode to "select" on hold-enter system gesture
     1. Support for mid-stroke editing mode change operations
  e. Re-use the selection capability in InkCanvas and implement custom move/resize behaviors (e.g. with inertia)
     1. Expose the selection as adorners
     2. Support suppressing of built-in Move & Resize behaviors In order implement custom move/resize behaviors, developers may desire to:
  a. sub class InkCanvas and adding the editing behavior code there
  b. sub class from the selection adorners and add some APIs on it to receive instructions from the subclassed InkCanvas The following principles may be followed:
  a. The two selection states may be represented by modifying how adorners appear (static and dynamic) so as to provide visual feedback to user
  b. The adorers may provide custom rendering
  c. The adorers may provide custom hit testing
  d. Intelligence to conduct editing may reside in the ink canvas equivalent, may have minimal APIs to interact with this intelligence In view of the above, developers may add custom capabilities to their subclassed InkCanvas and adorner as desired, so long as it is supported by adorners.

The ink canvas may support interaction with the clipboard. The interaction with the clipboard may include the following:
Requirements
  a. The EditingMode may not be changed in response to user-initiated Paste command—in ink mode, for example, ink can be pasted in, but the mode will remain the same and no selection rectangle will appear.
  b. Selected ink can be wrapped in an InkCanvas in the clipboard XAML slot
  c. When an InkCanvas is pasted into the InkCanvas by itself, the ink can be merged into the destination InkCanvas
  d. The ink canvas may support various formats including but not limited to ISF, XAML, and text. For instance:
     1. When copying to the clipboard, ISF and/or XAML may be used
     2. When pasting from the clipboard, ISF and/or XAML and/or text may be used
  e. Default copy & paste case illustrative examples of a pasting content between applications:

| From/To | Presentation InkCanvas | Journal XP | StickyNote XP | Tablet Pack InkCanvas | eDocs | Office apps (Wrd, Xl, Ppt) | OneNote | InfoPath InkPicture control |
|---|---|---|---|---|---|---|---|---|
| Presentation InkCanvas | XAML | ISF | ISF | ISF | XAML | ISF | N/A | ISF |
| Journal XP | ISF | | | | | | | |
| Sticky XP | ISF | | | | | | | |
| TabletPack InkCanvas | ISF | | | | | | | |
| eDocs | XAML | | | | | | | |
| Office apps (Wrd, Xl, Ppt) | ISF | | | | | | | |
| OneNote | DIB | | | | | | | |
| InfoPath InkPicture | ISF | | | | | | | |

The following is a brief list of ink canvas APIs that may be used to allow developers to interact with the ink canvas:
  a. Ink Canvas: Can Paste( )
     1. This method allows one to determine if there is content in the clipboard for pasting. For instance the content may include ISF and/or XAML data.
  b. Ink Canvas: Copy ( )
     1. This method copies the current selection into the clipboard. It may also copy the content as ISF into a portion of the clipboard reserved for ISF and copy the content as XAML into a portion of the clipboard reserved for XAML.
     2. The ISF portion may be filled by
        1. Elements are stripped out from the content to be copied and only ink is converted into ISF 2. If there is no ink selected, then there will be no ISF on the clipboard
3. The XAML portion may be filled by
   1. An InkCanvas may be created to encapsulate all XAML content
   2. Selected strokes may be represented as ink on this container InkCanvas
   3. Child InkCanvases may be represented as child InkCanvases within this container InkCanvas
   4. ID properties may be stripped from XAML elements on the clipboard
   5. If there is no selection at all, there will be no XAML on the clipboard
c. InkCanvas: Paste( ) and InkCanvas: Paste (Point paste)
   1. These methods paste the clipboard content to the InkCanvas.
      1. When a point is specified, the top left of the bounding box of the paste result aligns with this point.
      2. When a point is not specified, the paste content ends up at the origin of the InkCanvas coordinates.
      3. When there is a selection prior to paste, the selection may not be replaced With respect to the paste command, if the format is XAML, the container InkCanvas may be stripped on paste. Strokes on the container InkCanvas can be merged into the paste target InkCanvas.

Of the following describes various formats that may be used in the paste method:
a. XAML—Pasted elements are NOT selected after paste.
b. ISF—Pasted ink is NOT selected after paste.
c. Unicode text—Text element is created and text is inserted. The width & height of the textbox can be deduced as follows:
   1. Create a textbox
   2. Try to resize the textbox width so that it can accommodate the pasted text width
   3. If the textbox width stretches beyond the InkCanvas boundary
      1. The textbox width is reduced so that the textbox fits within the InkCanvas boundary
      2. The wrap Boolean property is set to true for the textbox
   4. Try to resize the textbox height so that it can accommodate the text height
   5. If the textbox height stretches beyond the InkCanvas boundary
      1. The textbox height is reduced so that the textbox fits within the InkCanvas boundary Serialization may be performed on the contents of an ink canvas. For instance, serialization into XAML can be accomplished by using a static class called the Parser. The Parser walks through the tree and generates XML or BAML.

DrawingAttributes may be a complex property, so the syntax for setting DefaultDrawingAttributes can be like the following:

```
<InkCanvas
Width = "100"
Height = "80">
<InkCanvas.DefaultDrawingAttributes>
<Ink:DrawingAttributes xmlns:Ink="sys-win-ink" Color="Red"/>
</InkCanvas.DefaultDrawingAttributes >
</InkCanvas >
```

The serialization of ink canvas content may include the following aspects:
a. All properties mentioned APIs can generally be XAML accessible
b. All types used in properties that are XAML accessible can have associated TypeConverters (except for example DrawingAttributes)
c. Various properties may or may not be hidden and/or XAML accessible
d. All event handlers can be settable from XAML
e. All event handlers can be serialized into XAML
f. The eraser shape is not required to be serialized into XAML Rendering and Hit-Testing Aspects of the present invention can further relate to the rendering and hit testing of ink. The following describes new rendering aspects, lasso selection enhancements, and point erasing enhancements.

Conventional dynamic rendering of ink can be difficult when trying to coordinate with serialization or storage of the ink. One technique of displaying ink that has been selected is to display the ink as hollow. That technique for displaying the ink as hollow required changing the properties of the ink. Serializing or storing the ink when it has been selected then forced the ink to always remain in that selected state. Aspects of the present invention include an alternative approach to displaying select ink. In at least one aspect of the invention, the ink is first rendered slightly larger than its original state and then rendered a second time in the background color (white, gray, tan, and the like) of a displayed page. Using this double rendering approach to selected ink strokes insures that serializing or storing the ink while selected stores it in the desired ink format as compared to a temporary, selected ink format.

Another aspect of the present invention includes modified behaviors of lasso selection techniques. One approach with lasso selection techniques performs the following:
a. The lasso is created by adding an array of points
b. the neighboring points are connected by lines
c. The last point and the first point are connected by a line
d. The resulting complex shaped polygon is checked to determine whether a point is inside or outside of the lassoed region.

One technique for determining if a point is inside or outside of the lasted region is the Jordan Curve Theorem. This theorem states that a point is inside a polygon if, for any ray from this point, there is an odd number of crossings of the ray with the polygon's edges. See FIG. 22. This definition means that some areas that are enclosed by a polygon are not considered inside. The center pentagonal area inside a star is classified as outside because any ray from this area will always intersect an even number of edges.

This works for most of the cases, except for lasso with self-intersections As shown in FIGS. 23 and 24. With respect to FIG. 23, the center "out" region is considered outside the lasso selection shown by the dotted line. As a result, a stroke that appears to be completely within a lasso loop is actually not selected by the lasso. See FIG. 24.

Figure 25:
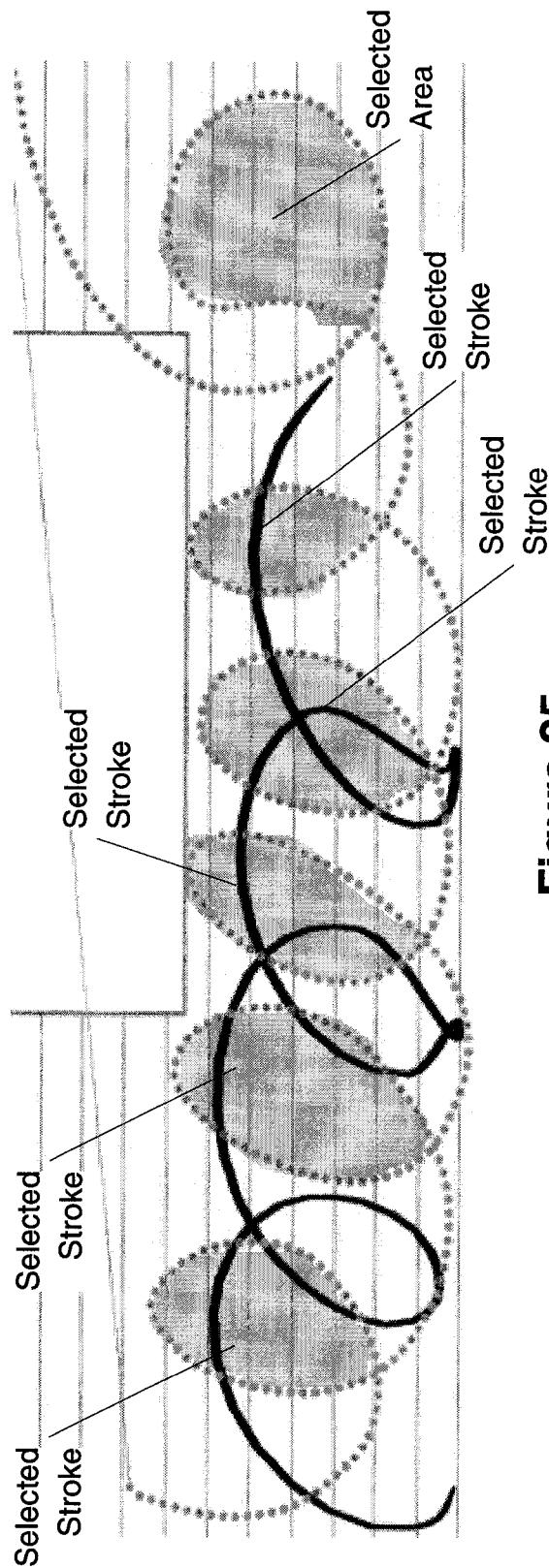

An aspect of the present invention includes an approach where the system walks through the lasso points and finds the first self intersection, use the resulting loop for selection/clipping/erasing, and neglecting the other points. This may result in a selection of content in multiple loops (as shown in FIG. 25) or the selection of content in only the first loop (as shown in FIG. 19).

This approach may walk along a lasso selection path and determine when the lasso has intersected with itself, with the area enclosed by the lasso being a loop. If there is no intersection then the entire lasso path would be used for a selection region.

Another aspect of the lasso selection experience can be related to the description above with respect to the rendering of selected ink. One concern with respect to the selection experience is the undue delay associated with attempting to lasso ink displayed as hollow. One of the difficulties is determining the outline path John entry of strokes being selected. Another difficulty was trying to find what strokes have been hit and what strokes have not been hit. A third difficulty was time associated with calculating the path geometry of the strokes having been selected.

These difficulties above are found with incrementally hit testing along the selection path. In particular, finding the exact with the occasions where a lasso intersects with a stroke is much more expensive than finding out whether a point is within a lasso. Also, the optimization to find intersections incrementally, instead of doing that against the entire lasso when new points are added to the lasso, works well primarily with the very simplest case.

Aspect of the invention relate to an improved lasso experience by using 1) a two pass rendering solution and 2) a weight-based model. With respect to the two pass rendering solution, the outline path geometry issue described above can be resolved. The two pass rendering solution as described above relates to rendering a stroke marginally larger and the second time render it marginally smaller showing the background color. It is expected that, by using two-pass rendering, the time for lasso selection will be reduced.

With respect to the weight-based model, the following equation describes the weighting of the points:

$$percentintersect = \frac{\sum w_i}{TotalStrokeLength} \quad (1)$$

$$w_i = \begin{cases} \frac{Distance(P_i \rightarrow P_{i-1}) + Distance(P_i \rightarrow P_{i+1})}{2}, & \text{if point } p_i \text{ is inside lasso} \\ 0 \end{cases}$$

Figure 26:
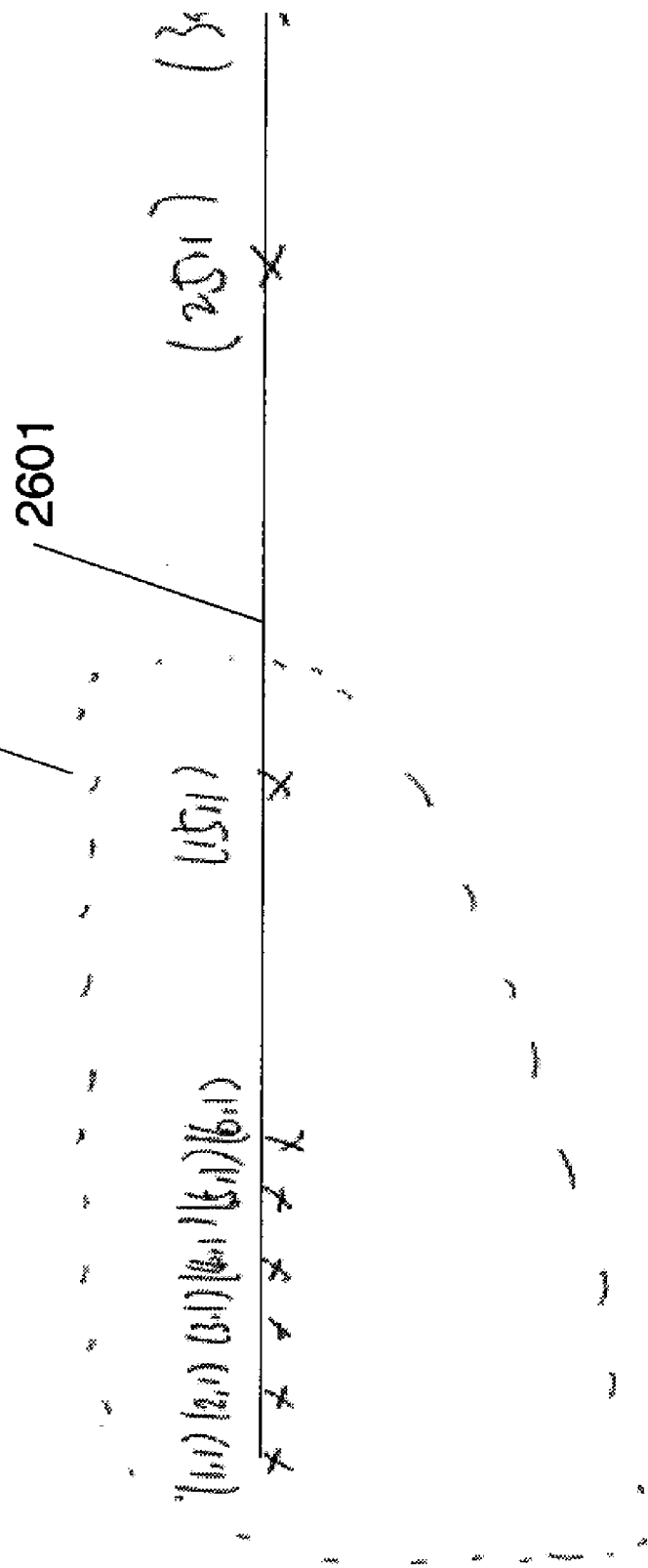
FIG. 26 shows an illustrative user interface for specifying how ink may be selected in accordance with aspects of the present invention.

FIG. 26 shows an example of a line 2601 represented by data points X, of which part of line 2601 has been selected by lasso selection 2602. The data point values are (1,1), (2,1), (3,1), (4,1), (5,1), (6,1), (15,1), (25,1), and (30,1).

The percentage intersection using a weighted-point-based approach, eight-based approach, and a length-based approach are shown as follows:
 a. weighted-point-based: percentIntersect=(0.5+1+1+1+1+5+9.5)/39=48.7%
 b. point-based: percentIntersect=7/10=70%
 c. length-based: percentIntersect=about 44%

The weighted-based approach is expected to have the following benefits:
 a. More accurate selection than the point-based model. If a stroke has a lot of points, the accuracy will approach a length-based model
 b. Performance will be similar to a point-based model, and much better than a length based model
 c. Easy to implement By changing to the weight-based model, plus changing to two-pass rendering, the time for lasso selection is expected to be only 30% of the original value.

One point for two-pass rendering is to calculate a stylus TipTransform given a desired hollowLineSize. This helper function can be used to get the StylusTipTransform for the outer stroke and inner stroke.

In another aspect of the present invention is an improved point erasing experience. Conventional point erasing experiences are slowed when many strokes exist. In some situations, a user can watch the year Acer slowly moving its way through a stroke collection after the user has completed erasing. Significant delays can be found in attempting to find out the path geometry of strokes for rendering, time to update the rendering visual tree and the incremental cake tester when a stroke collection is changed, and time to find out the stroke intersections for erasing. The improved point erasing experience attempts to minimize erasing delays.

Aspects of the present invention include at least performing one of the following three steps:
 a. Adding a path geometry instance variable to the class stroke and caching the value.
 b. Filtering out bogus points. Bogus points may include:
   1. duplicate points (as these will not sacrifice the accuracy of hit testing
   2. points that are too close to the previous point to have any visual difference if neglected
   3. points that are collinear with their previous point and the next point. This will not affect the hit testing results.
 c. The bounding box of an erasing stroke node can be precomputed and cached Rendering The following section relates to rendering of ink. The following is divided into subsections including: static rendering, dynamic rendering, integrating with the static renderer, rendering operations, and ink rendering algorithms.

Static Rendering

Static rendering relates to the rendering of a visual tree where the system has had an opportunity to at least initially process the ink. Dynamic rendering in contrast relates to quickly displaying ink so as to appear to flow from the tip of a stylus. While dynamic rendering is fast, it is at times choppy. The choppiness of dynamic rendering may be resolved by smoothing filters on the static render.

When used in conjunction with a visual tree, a renderer may maintain the visual tree as having a view of a stroke collection. The renderer listens to stroke added events and stroke removed events on the stroke collection and updates the internal visual tree. It also listens to changes to the strokes and drawing attributes and updates the visual state as necessary.

The renderer may take into account a brush shape, and information and other geometry related information. The geometry used for stroke rendering may include a path geometry, which is created by adding path figures to it. The path geometry/path figures are described in greater detail below with respect to ink rendering algorithms.

Figure 27:
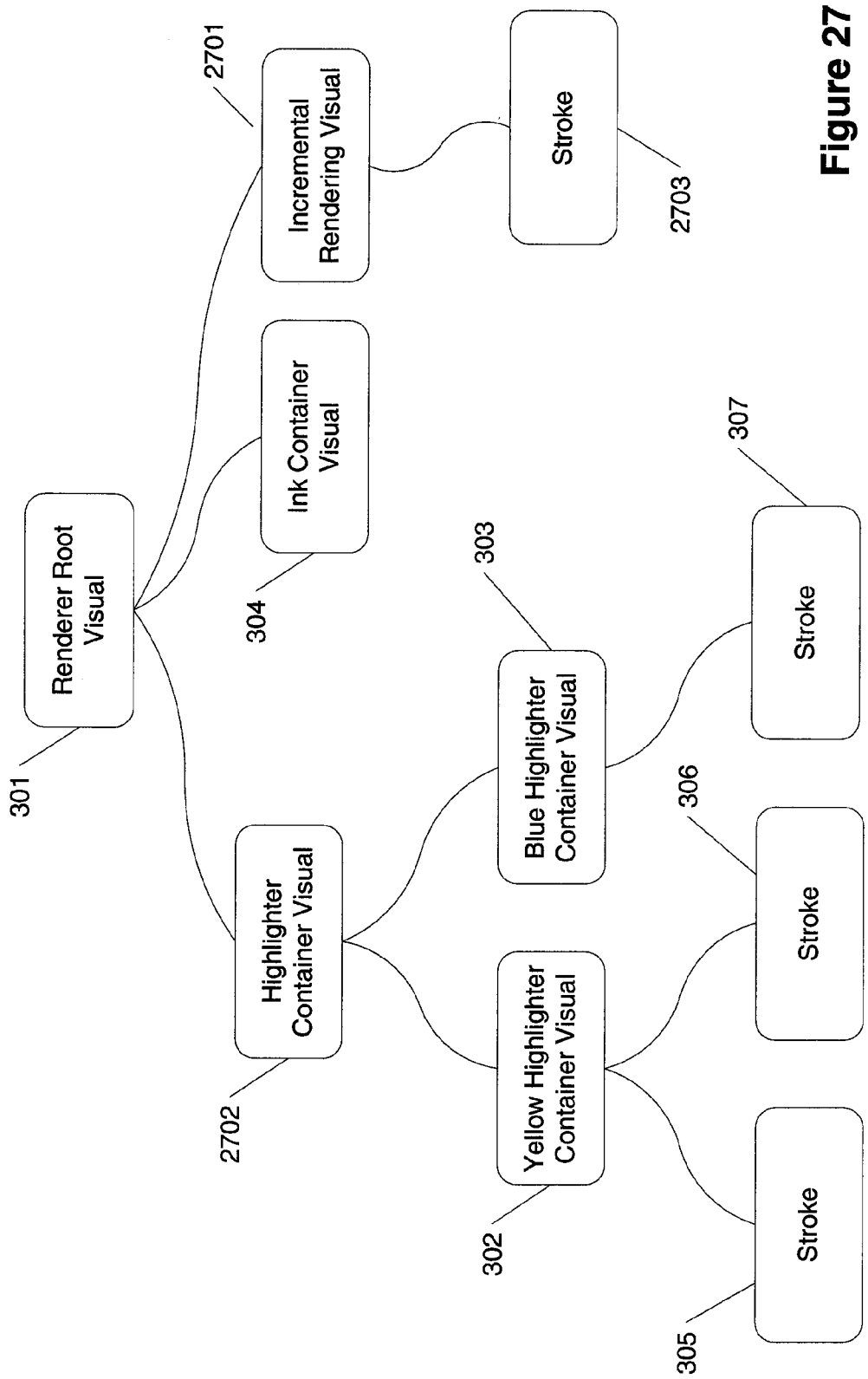
FIGS. 27-28 show techniques for rendering ink in accordance with aspects of the present invention.

One aspect of a static render is its handling of the visual tree. When a visual tree is constructed, four container visuals may be created. As shown in FIG. 27, the four containers of include a renderer root visual 301, an incremental rendering visual 2701, an ink container visual 304, and highlight container visual 2702. The highlight container visual 2702 may include specific color highlighter container visuals 302 and 303, for example. FIG. 27 is similar to FIG. 23 but includes the additional highlight container visual 2702. In terms of rendering order, the highlighters go to the bottom, then regular ink, and regular ink's incremental rendering in on top. By default, the renderer may create a visual per each ink stroke.

Where this Stroke Visual is attached in the visual tree is dependent on whether this stroke is a regular ink or a highlighter ink:
  a. For a regular stroke attached via the AttachIncrementalRendering operation (or in other words, if the stroke is for a dynamic rendering scenario), the StrokeVisual may be attached to the IncrementalRenderingVisual ContainerVisual.
  b. For static rendering of a regular stroke, the StrokeVisual may be attached to the RegularInkVisual.
  c. For a "highlighter" stroke (no matter it is for static rendering or for dynamic rendering), the Renderer may create a ContainerVisual for each solid color corresponding to the highlighter brush, sets 50% transparency to that container, and places it underneath of HighlitersRootVisual. When a highlighter ContainerVisual becomes empty, Renderer removes it.

The following lists an example of the contents of a stroke collection and the organization of the contents of the root visual:
  a. StrokeCollection:
     1. Regular Red Stroke
     2. Highlighter Yellow Stroke #1
     3. Regular Blue Stroke
     4. Highlighter Yellow Stroke #2
     5. Highlighter Red Stroke #1
     6. Highlighter Red Stroke #2
  b. Renderer's RootVisual (from top to bottom):
     1. IncrementalRenderingvisual
     2. RegularInkVisual
        1. Regular StrokeVisual 1 for the Blue Stroke
        2. Regular StrokeVisual 2 for the Blue Stroke
     3. HilightersRootVisual
        1. ContainerVisual for Yellow Highlighter strokes
           a. YellowStrokeVisual1
           b. YellowStrokeVisual2
        2. ContainerVisual for Red Highlighter strokes
           a. RedStrokeVisual1
           b. RedStrokeVisual2

The following relates to strokes and events associated with static rendering. Users can set the strokes property to the collection of strokes to be rendered. When setting a new stroke collection, the following describes how the system may start listing to changes for the new stroke collection:
  a. The Renderer stops listening on events from the current strokes.
  b. The system detaches all the StrokeVisuals corresponding to the current strokes from the visual tree. If this stroke is a highlighter stroke, this might also result in removing the highlighter's parent ContainerVisual.
  c. The system then creates a StrokeVisual for each stroke in the new StrokeCollection and attaches the created Stroke Visuals to the visual tree.
  d. The system starts listening to changes to each stroke in the StrokeCollection and updating its state to reflect the changes. The changes include both change in Drawing Attributes and Points.
  e. The system starts listening to changes to the new Strokecollection When the strokes in the stroke collection changes, the renderer starts to listen to stroke changed events when the strokes property is set. For example,
  a. The StrokeCollection may fire a StrokesChanged event and the Renderer's "OnStrokesChanged" method may be called. The EventArgs contain two collections, one for removed strokes and the other for added strokes.
  b. For each of the removed strokes, the following three actions may be taken
     1. Detach the corresponding visual
     2. Stop listening on the stroke event (DrawingAttributeChanged and PointChanged)
     3. Remove the stroke from the Stroke-to-Visual map
  c. For each of the added strokes, the following actions may be taken
     1. Create a visual for the new stroke and add it to the dictionary
     2. Start listening on the stroke events ((DrawingAttributeChanged and PointChanged)
     3. Attach the created visual to the visual tree When the drawing attributes of a stroke changes, the renderer may start to listen to a drawing actor beads changed event as soon at his a new stroke collection is set or a new stroke is added to an existing stroke collection. For instance, the following may occur:
  a. The Drawing Attributes fires an event when its value changes, and the event propagate to its owner (the stroke) and then to the Renderer.
     1. For the following two cases:
        1. If the changed attribute is the "IsHighlighter"
        2. Or if the change attribute is "color" and the stroke is a highlighter then the corresponding visual of the stroke can be detached. After that, the visual can be re-attached to the visual tree. This is because a highlighter stroke can be treated differently than a non-highlighter one when attaching to a visual tree.
  b. Otherwise, the system may invalidate the visual and the system will re-render so that the changed DrawingAttributes can take effect.

When the points of a stroke change, the renderer may start to listen to a points changed event as soon as a new stroke collection is set or a new stroke is added to an existing stroke collection. This event can be fired by doing one of the following:
  a. Call Stroke.AppendPackets(int[ ] packetData)
  b. Set the property Stroke.Transform Once the Renderer is notified of this event, the renderer than determines the corresponding visual for the stroke (by traversing a visual tree, for example) and calls a method to invalidate the stroke visual, to force the rendering system to pick up the changes.

Dynamic Rendering

Dynamic rendering has a slightly different approach to rendering than compared to static rendering. The dynamic rendering's pattern and use cases are different from the static's one and therefore it's can be implemented in a separate class. For example, a disposable object for incrementally rendering a single stroke while it's being collected may be referred to as an incremental renderer. The incremental renderer's input may be a stroke, collection of strokes, or one or more stylus packets.

The constructor of an incremental renderer may receive three parameters as inputs including: drawing attributes, stylus packet descriptions, and a packet transform matrix. The packet transform matrix may indicate how the packet data may be transformed in size and shape so as to comport with other stylus data.

The following describes how an incremental rendering object may be used:

a. Upon a stylus down event, the system may create an IncrementalRenderer object for the current drawing attributes and, optionally, the new stroke's packet layout. If user does not specify the packet layout, the renderer can use the layout of the Stylus Packet Collection parameter as one of the first calls in the incremental renderer's render packets method.

b. Next, the system attaches the renderer's root visual to the visual tree of one's ink view.

c. Upon new packets events, the system may call the incremental renderer's render packets method (attaching the packets to be rendered) to render the packets. The new packets may be expected to have the same layout or an error may be thrown.

d. Upon a stylus up event, the system adds the new stroke to the view's stroke collection, detaches the dynamic renderer from the tree, and disposes of it.

In an environment where incremental updates on drawing contexts are not supported, a brand new visual for each increment in dynamic rendering (in other words for each call of the incremental renderer's rendering packets method) may be created and the new visual added to the incremental renderer's root visual (which may be a container visual).

Integrating with the Static Renderer

The following relates to integrating dynamic rendering with static rendering. The static renderer can provide a pair of methods for integrating dynamic renderer's visual tree with the visual tree of the static renderer. The methods may include a method for attaching an incremental renderer's visual tree (and its drawing attributes) and a method for detaching the incremental renderer's visual tree.

The drawing attributes parameter may assist the static renderer in determining where on its tree it should attach the particular dynamic renderer's tree.

Next, real-time inking may be integrated with the static renderer. Real-time inking is a process that attempts to display ink as soon as a user creates it. The real-time inking is on a thread (in the User Interface context) while the static renderer is on a different thread (an application thread). That is, IncrementalRenderer's visual tree belongs to a different thread and, since visuals have thread affinity, it can not be directly attached to the static renderer's tree. The presentation system can provide a mechanism to solve this kind of issue by generating a visual target. A visual target is a host visual on which strokes can be rendered into. The application can then attach the visual target to the appropriate location in the visual tree. The following describes process:

a. Create a VisualTarget on the RTI thread.

b. Create a VisualTargetReference (VTR) for that Visual-Target. The VTR has no thread affinity and can be passed to the application thread.

c. On the application thread, the VTR can be wrapped into a VisualTargetHostVisual to become a visual and then attached to the view via a method that attaches the incremental rendering. This is how a visual target on one thread may be attached to a visual tree on another thread.

d. On begin new stroke, the RTI service creates an incremental renderer and attaches it to that visual target:

1. A visual target's root visual is set equal to the incremental renderer's root visual;

1. or, if concurrent pens are supported, a. the visual targets's root visual is set equal to a new container visual;

b. the dynamic renderer's root visual is added a properly to the visual target's root visual's children as needed e. Later, the RTI detaches the dynamic renderer from the tree and disposes it:

1. visual target's root visual may be set equal to null;

2. the visual targets root visual children removes the incremental renderer's root visual;

3. and the incremental renderer is closed.

f. Every time the drawing attributes change for the RTI, it can re-create or re-parent the VisualTarget by repeating the steps b-d.

Rendering Operations

Rendering operations may be performed by using APIs associated with stroke collections classes and stroke classes. For example with respect to the stroke collection class, a draw stroke method may be used. Also, with respect to the stroke class, a draw stroke method, a draw stroke method with drawing attribute overrides, and a draw stroke method with both an object designation and a drawing attribute override.

Ink Rendering Algorithms

Figure 28:
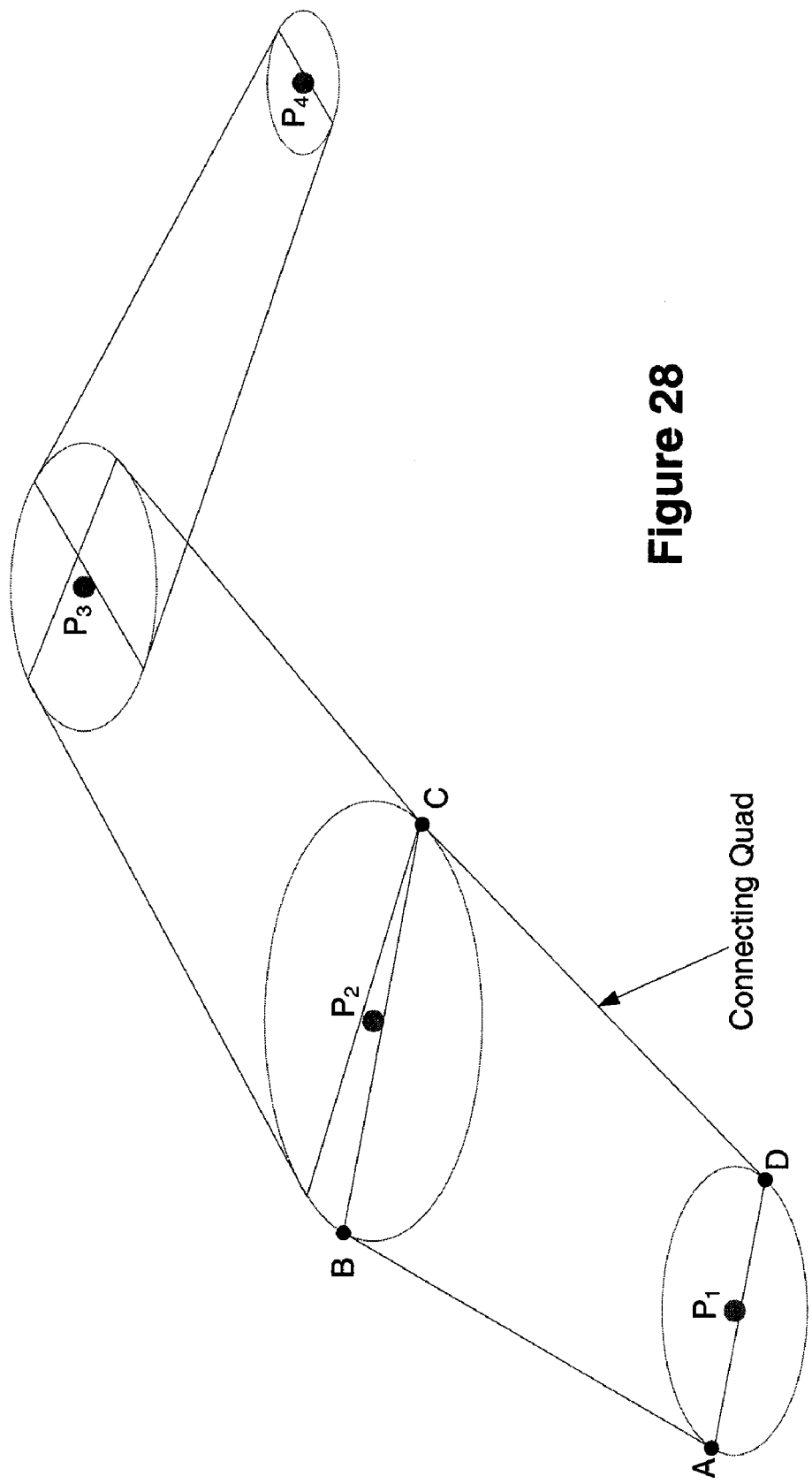

The following relates to ink rendering algorithms that may be used in conjunction with aspects of the present invention. FIG. 28 shows an example with elliptical stylus shape. P1, P2, P3, and P4 indicate sampling points from the stylus device. Each point may contain its X and Y coordinates as well as pressure values. The shapes of the ellipsis are all the same as defined by the user in the stylus shape, and the size is determined by the pressure factor.

A PathFigure is created for each point and added to the PathGeometry. Connecting points (resulting in connecting quadrangle, referred to herein as a ConnectingQuad) are calculated for two adjacent points (with the adjacent points being referred to as a StrokeNode), as indicated by points A, B, C and D in FIG. 28. A PathFigure is created for each ConnectingQuad and is added to the PathGeometry. Finally, the created PathGeometry is rendered.

Calculate ConnectingQuad—Ellipse

A connecting quad may also be determined between two ellipses. By definition, Quad's vertices (A,B,C,D) are ordered clockwise with points A and D located on the begin node (P1) and B and C on the end node (P2) as illustrated in FIG. 29A.

In order to calculate the ConnectingQuad for two ellipses, ellipse-to-circle transform matrix is applied first and the problem is simplified to the problem of finding ConnectingQuad for two circles.

$$S_{pine} = T_c(P_2 - P_1) \tag{2}$$

Where $T_c$ is the ellipse-to-circle transform matrix and $S_{pine}$ is the spine vector.

$$S = \frac{S_{pine}}{|S_{pine}|} \tag{3}$$

$$L = R_2 R_1 \cdot S \tag{4}$$

$$R_1 = \begin{bmatrix} \cos\theta & -\sin\theta \\ \sin\theta & \cos\theta \end{bmatrix} \tag{5}$$

$$R_2 = \begin{bmatrix} \cos 90° & -\sin 90° \\ \sin 90° & \cos 90° \end{bmatrix} = \begin{bmatrix} 0 & -1 \\ 1 & 0 \end{bmatrix} \tag{6}$$

-continued $$L = \begin{bmatrix} \cos\theta & -\sin\theta \\ \sin\theta & \cos\theta \end{bmatrix} \begin{bmatrix} 0 & -1 \\ 1 & 0 \end{bmatrix} \cdot S \quad (7)$$

$$R = \begin{bmatrix} \cos\theta & \sin\theta \\ -\sin\theta & \cos\theta \end{bmatrix} \begin{bmatrix} 0 & 1 \\ -1 & 0 \end{bmatrix} \cdot S \quad (8)$$

$$A = |r_1|L + P_1 \quad (9)$$
$$B = |r_2|L + P_2$$
$$C = |r_2|R + P_2$$
$$D = |r_1|R + P_1$$

In the above equations, $r_1$ and $r_2$ are radius of the begin node and the end node, respectively.

Create PathFigure—Ellipse

Figure 29B:
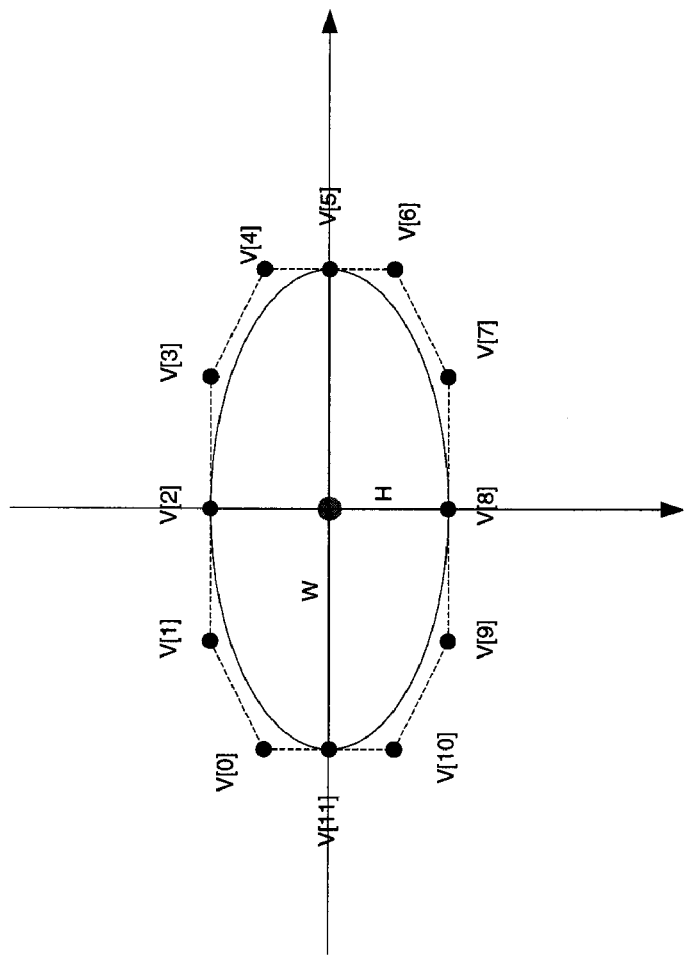
FIGS. 29A-33 show illustrative procedures for methods and other programmatical interfaces for electronic ink in accordance with aspects of the present invention.
Figure 29A:
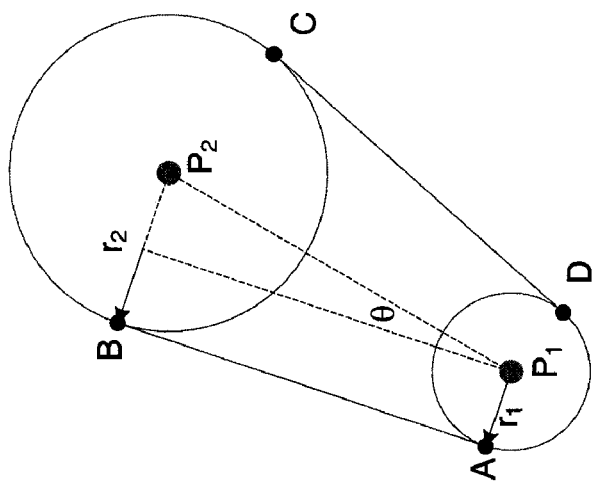

FIG. 29B shows an approximation of an elliptical stylus tip by using a polygon to attempt to follow the shape of the ellipse. Using a polygonal shape, one may be able to render an ink stroke by using the approximation.

The PathFigure for an ellipse can be approximated with a Bezier curve or any other type of curve or approximation. The control points for an ellipse centered at (0,0) with width of W and Height of H are:

$$V[0] = \left(-\frac{W}{2}, a\frac{H}{2}\right), V[1] = \left(-a\frac{W}{2}, -\frac{H}{2}\right), V[2] = \left(0, -\frac{H}{2}\right) \quad (10)$$

$$V[3] = \left(a\frac{W}{2}, -\frac{H}{2}\right), V[4] = \left(\frac{W}{2}, -a\frac{H}{2}\right), V[5] = \left(\frac{W}{2}, 0\right)$$

$$V[6] = \left(\frac{W}{2}, a\frac{H}{2}\right), V[7] = \left(a\frac{W}{2}, \frac{H}{2}\right), V[8] = \left(0, \frac{H}{2}\right)$$

$$V[9] = \left(-a\frac{W}{2}, \frac{H}{2}\right), V[10] = \left(-\frac{W}{2}, a\frac{H}{2}\right), V[11] = \left(-\frac{W}{2}, 0\right)$$

Where a=0.55228474 9830793398 4.

Calculate ConnectingQuad—Polygon

Figure 29C:
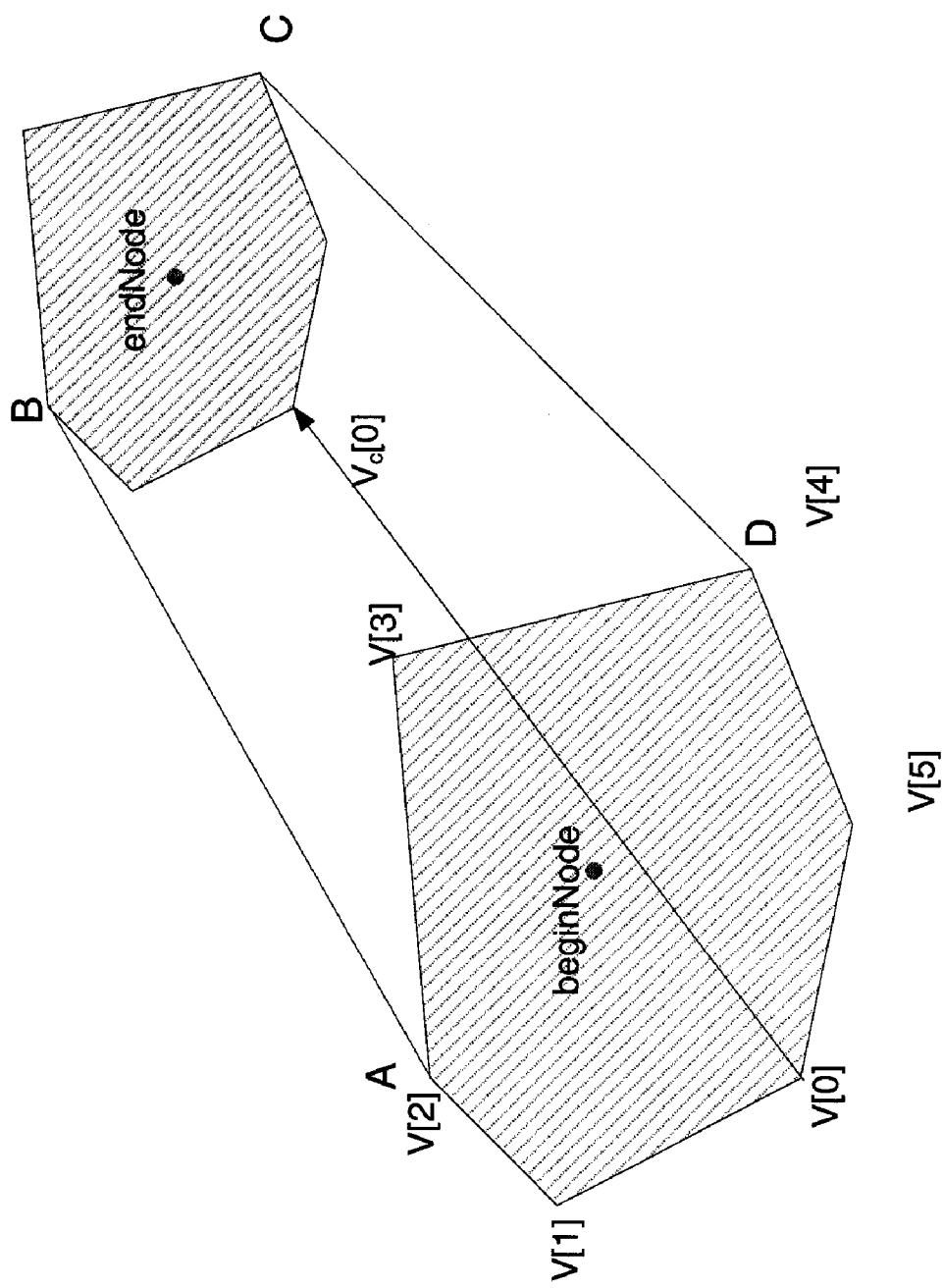

FIG. 29C shows an illustrative example of how to find connecting points for a pair of stroke counts of a polygonal shape. Basically, one is looking for segments AB and CD. The system iterates through the vertices of the begin node (P1), at each vertex the system analyzes a location of the connecting segment relative to the node's edges at the vertex, and follows the procedure as follows:

a. if the connection vector at a vertex V[i] is on the left from vector V[i]V[i+1] and not on the left from vector V[i−1]V[i], then it's the AB segment of the quad (V[i]==A).
 b. if the connection vector at a vertex V[i] is on the left from vector V[i−1]V[i] and not on the left from vector V[i]V[i+1], then it's the CD segment of the quad (V[i]==D).

The connection vector at vertex V[i] can be calculated as $$V_c[i]=(P_2-P_1)+(PF_2-PF_1)V[i] \quad (11)$$

Where $PF_2$ and $PF_1$ are the pressure factor at the end node and the start node, respectively.

Hit-Testing

The following relates to hit testing. Hit testing is separated into the following subsections including: features overview, static hit testing, incremental hit testing, and hit testing algorithms.

Features Overview

Integration with the Static Renderer

Almost all hit-testing and editing scenarios are view-based and suppose WYSIWYG results. Hit-testing and editing based on view, respecting current view settings, may provide more expected results for user.

Dynamic Hit-Testing

APIs May be provided for dynamic hit-testing that improves performance of hit testing scenarios with dynamic feedback.

Calculating Bounding Box

Calculating the bounding box of a StrokeCollection is more correct and advanced compared to conventional implementations. In this implementation, a bounding box is a tight rectangle bounding the exact contours of strokes in the view space (that is, with all view settings—including a transform—applied).

Selecting and Erasing Strokes

Hit-testing may provide an API for selecting strokes with a rectangle, lasso and a single tap. Hit-testing may also address view-based hit-testing, performance of dynamic feedback, lasso's "first loop" and the like.

In one or more aspects of the hit testing approach described herein, hit-testing may include one or more of the following aspects:

a. Hit-testing may take into account view settings—including a size or location transform.
 b. And API for dynamic selection with lasso and rubber-band rectangle.
 c. The lasso procedure that resolves which areas inside a lasso have been selected.
 d. A stroke as a new selection tool The API, in one aspect of the invention, may make no difference between selecting and erasing strokes. Both features are available via a set of HitTest methods that find strokes hit by a tap, or by a moving shape, or captured by lasso or rubber-band rectangle, so it's up to the user whether she wants to select those strokes or erase them.

Point Erasing

Point erasing, or erasing on stroke contours, is described herein. In at least some aspects, a user can erase with any StylusShape. The contour of an erasing stroke may be constructed the same way as a contour is constructed for ink strokes. One difference of erasing is that it may be indiscriminate or insensitive to pressure and rotation of the stylus.

Clipping and Extracting

In at least one aspect of the invention, clipping and extracting allows erase ink inside (extract) or outside (clip) of a rectangle or lasso. Though Clipping/Extracting supposes using a lasso or rectangle, it's not the same as Selecting with lasso/rectangle. In contrast, clipping and extracting is more like Point Erasing because it cuts through ink strokes.

The feature is available in static as well as dynamic lassoing/rubberbanding. The static (atomic) clipping/extracting is destructive to the stroke collection due to the same reasons as with point erasing. Dynamic clipping/extracting is not destructive and can be used for dynamic feedback.

Static Hit-Testing

The following lists APIs on the stroke collection.

HitTest(Point point, double diameter)

An API that relates to hit testing based on a double diameter point can be included. In one example, the point hit test API based on a central point and a diameter value of a circle returns a stroke collection that is either empty or contains the top hit stroke. This function iterates over each stroke and calls a stroke hit test method that hit tests based on a point and stylish shape.

HitTest(Point point)

This is just a special version of HitTest(Point point, double diameter) with diameter of Double.Epsilon.

---

HitTest(Point[ ] lassoPoints, int percentIntersect)

/// Hit-testing with lasso
/// <param name="lassoPoints">points making the lasso</param>
/// <param name="percentIntersect">the margin value to tell whether a
/// stroke is in or outside of the rect</param>
/// <returns>collection of strokes found inside the rectangle</returns>
public StrokeCollection HitTest (Point[ ] lassoPoints, int percentIntersect)

---

This API performs a hit test based on points making up a lasso and a margin value to tell whether a stroke is inside or outside of the lasso. This API returns a collection of strokes found inside the lasso. Here, the percentIntersect is considered as percentage of segment length within the lasso loop. The method simply iterate over the strokes, and for each stroke it calls Stroke.HitTest(Point[ ]) to get the segments contained in the lasso. Then it calculates the percentage of segment length within the lasso loop.

Clip(Point[ ] lassoPoints)

This API iterates over the StrokeCollection, and for each stroke, it calls Stroke.HitTest(Point[ ]) to find out the segments intersecting with the lasso. Then it asks the stroke for after-clipping leftovers using Stroke.Clip(StrokeIntersection [ ] cutAt).

Erase(Point[ ] lassoPoints)

This method erases all ink inside a lasso where the lasso-Points define the lasso.

This method iterates over the StrokeCollection, and for each stroke, it calls Stroke.HitTest(Point[ ]) to find out the segments intersecting with the lasso. Then it asks the stroke for after-erasing leftovers using Stroke.Erase(StrokeIntersection [ ] cutAt);.

Extract(Point[ ]lassoPoints)

The implementation is similar to clipping with lasso points. The only difference here is obtains the segments outside the lasso.

This method can be taken as the combination of clipping and erasing. It iterates over the StrokeCollection, and for each stroke, it calls Stroke.HitTest(Point[ ]) to find out the segments intersecting with the lasso. Then it asks the stroke for after-extracting leftovers using Stroke.Extract(StrokeIntersection [ ] cutAt).

Erase(StylusShape erasingShape, Point[ ] path)

This method erases the contour that is generated by moving the erasing shape along the path specified by the point array.

The following describes APIs on the stroke.

GetBounds( )

This method calculates the bound of a stroke as the union of the bounds of all the strokenodes.

HitTest(Point[ ] lassoPoints)

This function creates a Lasso class and calls an internal HitTest function to get the hit test results. This API hit tests all strokes within the lasso loops, and returns a StrokeIntersection array for these strokes. The hittesting may be conducted on segments between the rendering points.

Figure 30A:
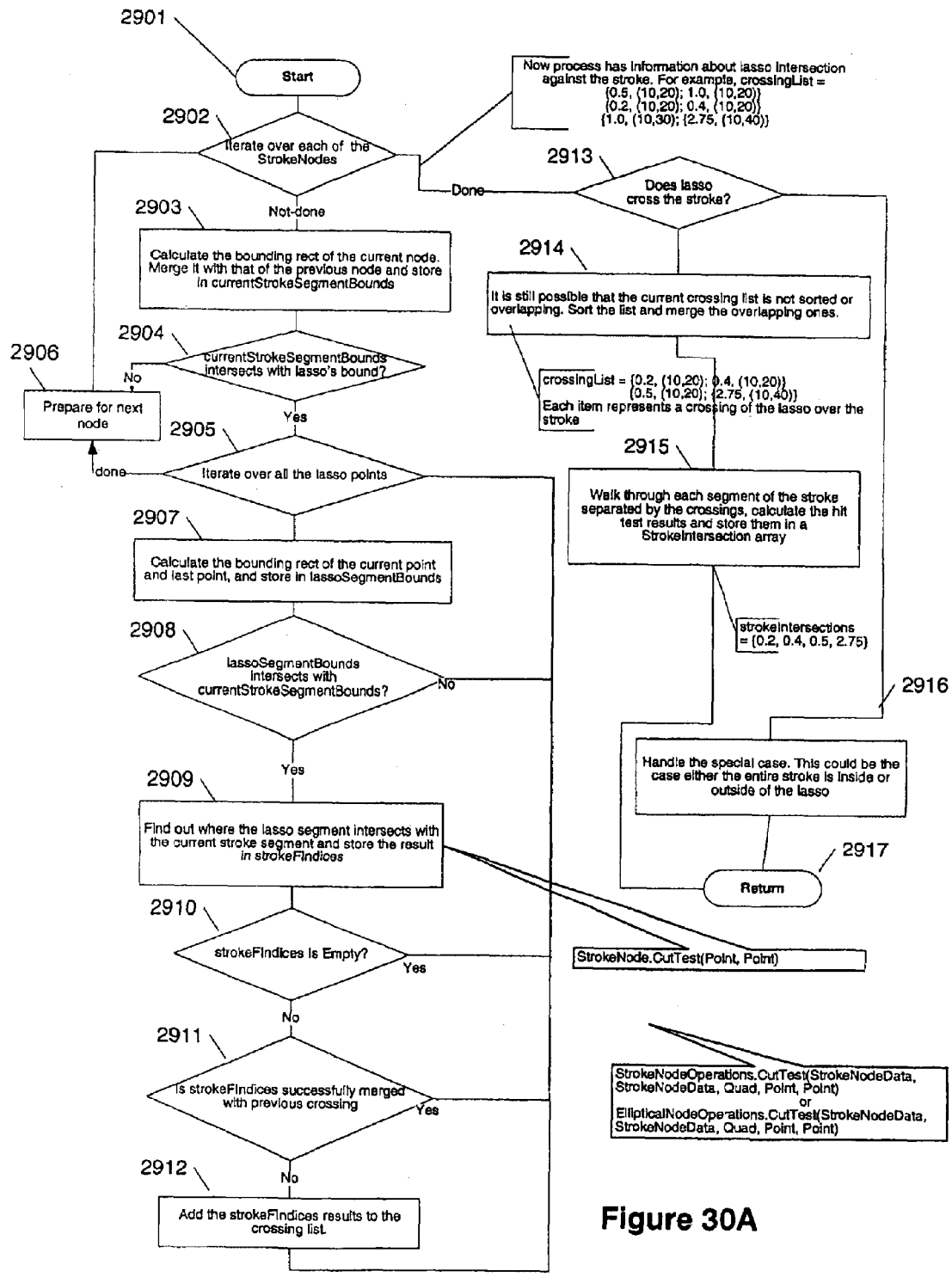

As shown in FIG. 30A, Lasso.HitTest( ) iterates over each of the StrokeNodes, and skips a node if the current stroke segment bounds does not intersect with the lasso's bound. Then it iterates over each of the lasso points and skips a point if the lasso segment bounds do not intersect with the current stroke segment bound. These bounding box intersection tests are applied to reduce unnecessary cut tests. After that, the cut test between a StrokeNode and two points are done by calling internal cut test methods in StrokeNode class, which in turn asks StrokeNodeOperations (or EllipticalNodeOperations) class for cut test result.

Finally, the crossing locations are analyzed and results are returned as a StrokeIntersection array.

HitTest(StylusShape shape, Point[ ] path)

Figure 30B:
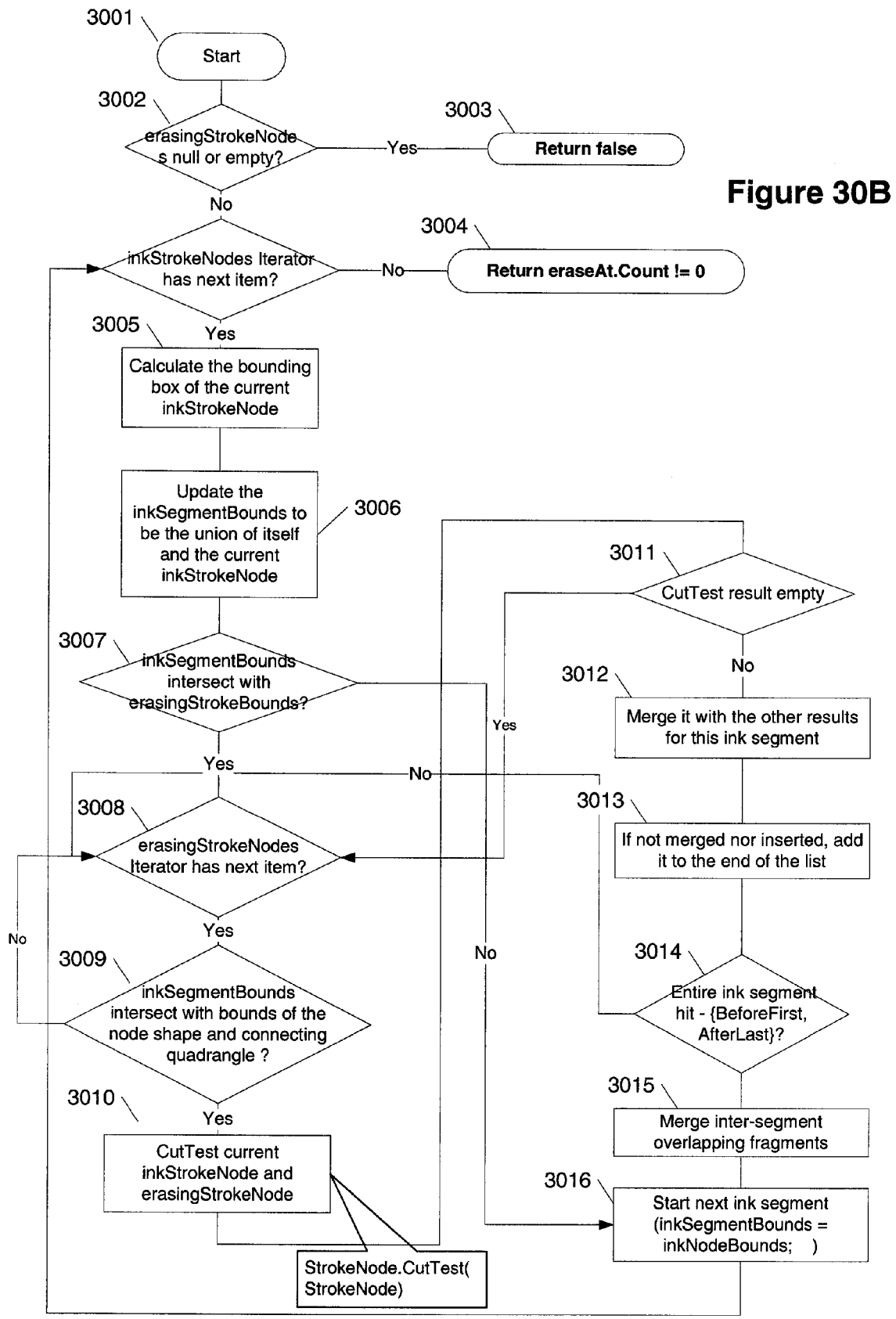

As shown in FIG. 30B, this method iterates over the Stroke Nodes in the ink stroke. For each node, it iterates over each of the erasing StrokeNode. Then it calls the CutTest method in StrokeNode Class to find out the crossing location. This API hit tests all strokes within a contour generated with shape & path, and returns a StrokFIndice array for these strokes. Hit-testing is conducted on segments between the rendering points.

The following defines the internal CutTest method in class StrokeNode. This API finds out if a given node interescts with this one and returns indicies of the interaction.

Figure 31:
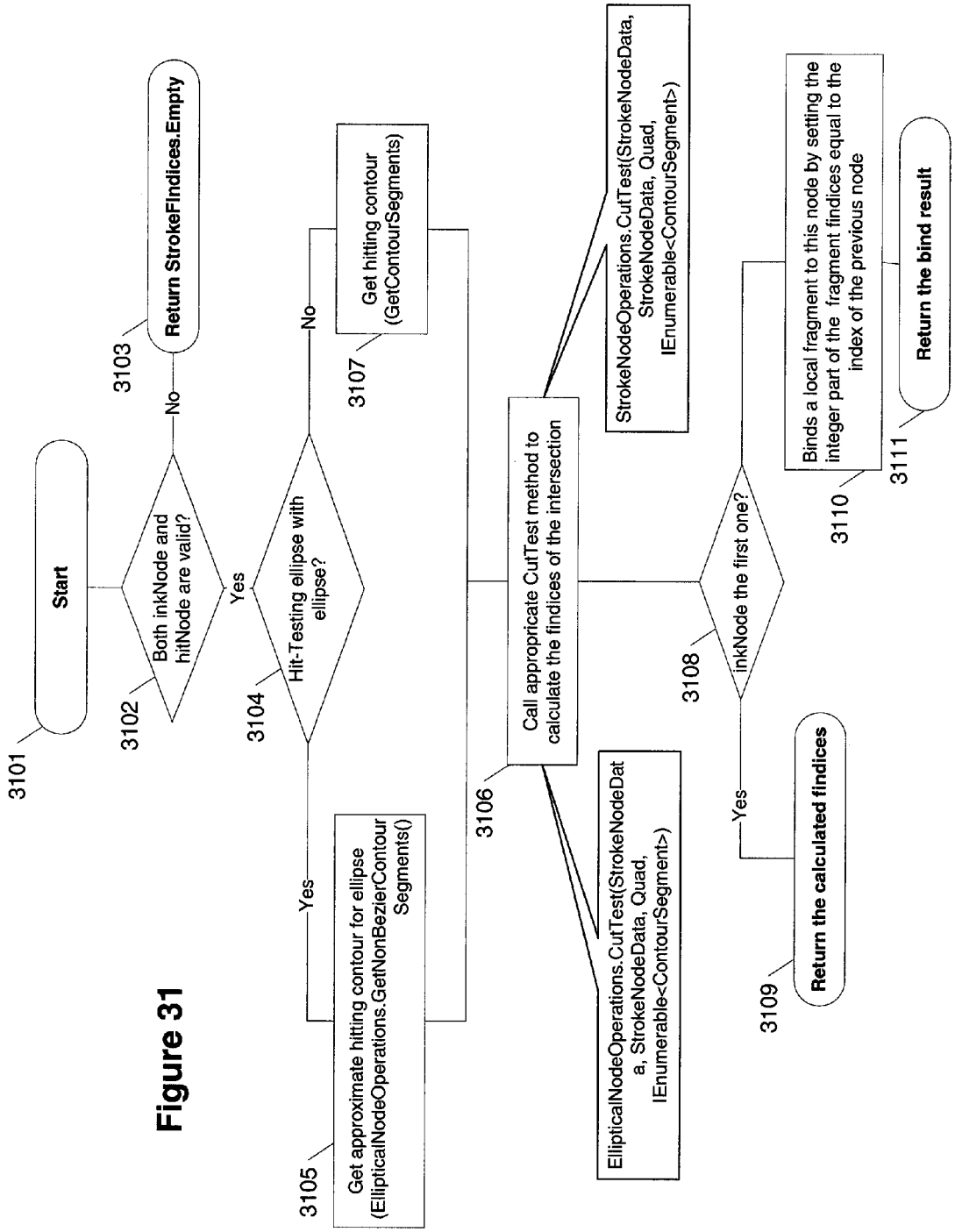

As shown in FIG. 31, the CutTest method in class Stroke NodeOperations (or EllipticalNodeOperations dependent on the StylusShape) is used to find out the cut-testing location.

HitTest(Point, StylusShape)

This method hit tests all strokes within a point X shape and returns a StrokeIntersection array for these strokes. The hit-testing is conducted on segments between the rendering points.

HitTest Between Two Strokes

The hit-test on a stroke is done by calling an internal method ErasingStroke.HitTest( ). The result is true of the strokes intersect, false otherwise.

Figure 32:
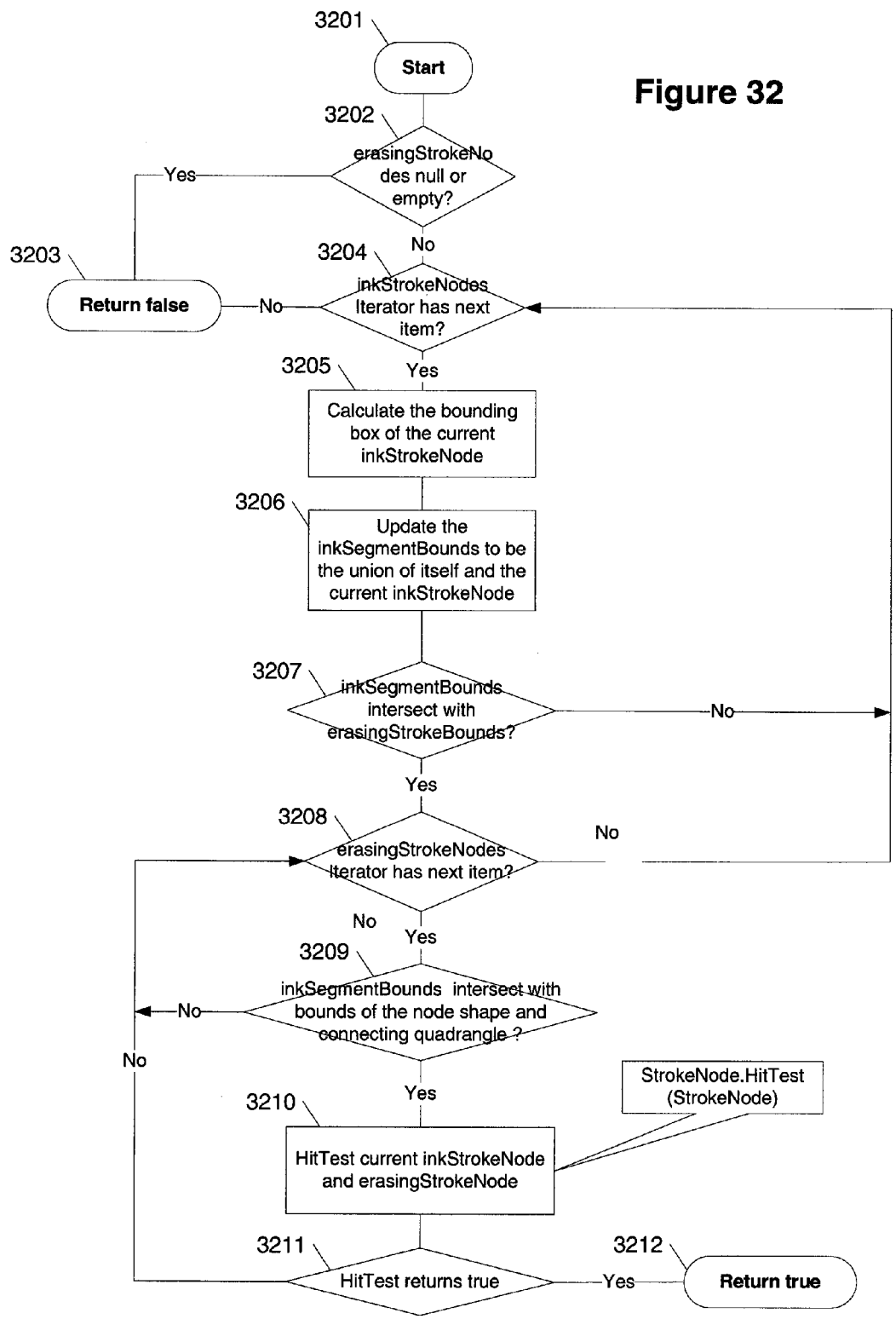

FIG. 32 shows a process for the hittesting between two strokes. The outer loop iterates over all the inking-StrokeNodes and the inner-loop iterates over the hitting-StrokeNodes. Method StrokeNode.HitTest(StrokeNode) is called to do the hit-testing between the two StrokeNodes.

Therefore, for the worst case scenario, the complexity of the algorithm is O(ml) where m is the number of ink-Stroke Nodes and l is the number of hitting-StrokeNodes. Two bounding-box intersect-tests are implemented in order to improve the algorithm by avoiding unnecessary hit-testing. The first one is in the outer loop, which checks whether the calculated inkSegmentBounds intersect with the erasing-StrokeBounds before entering the inner loop. The second one is in the inner loop, which checks whether the inkSegment-Bounds intersect with the bounds of the node shape and the connecting quadrangle.

As shown in FIG. 32, the problem now comes to the point where one needs to do hit-testing between two StrokeNodes, which can be implemented in StrokeNode.HitTest(Stroke Node). This method indicates whether the contour of a given stroke node intersects with the contour of this node. The contours of both nodes include their connecting quadrangles.

Figure 33:
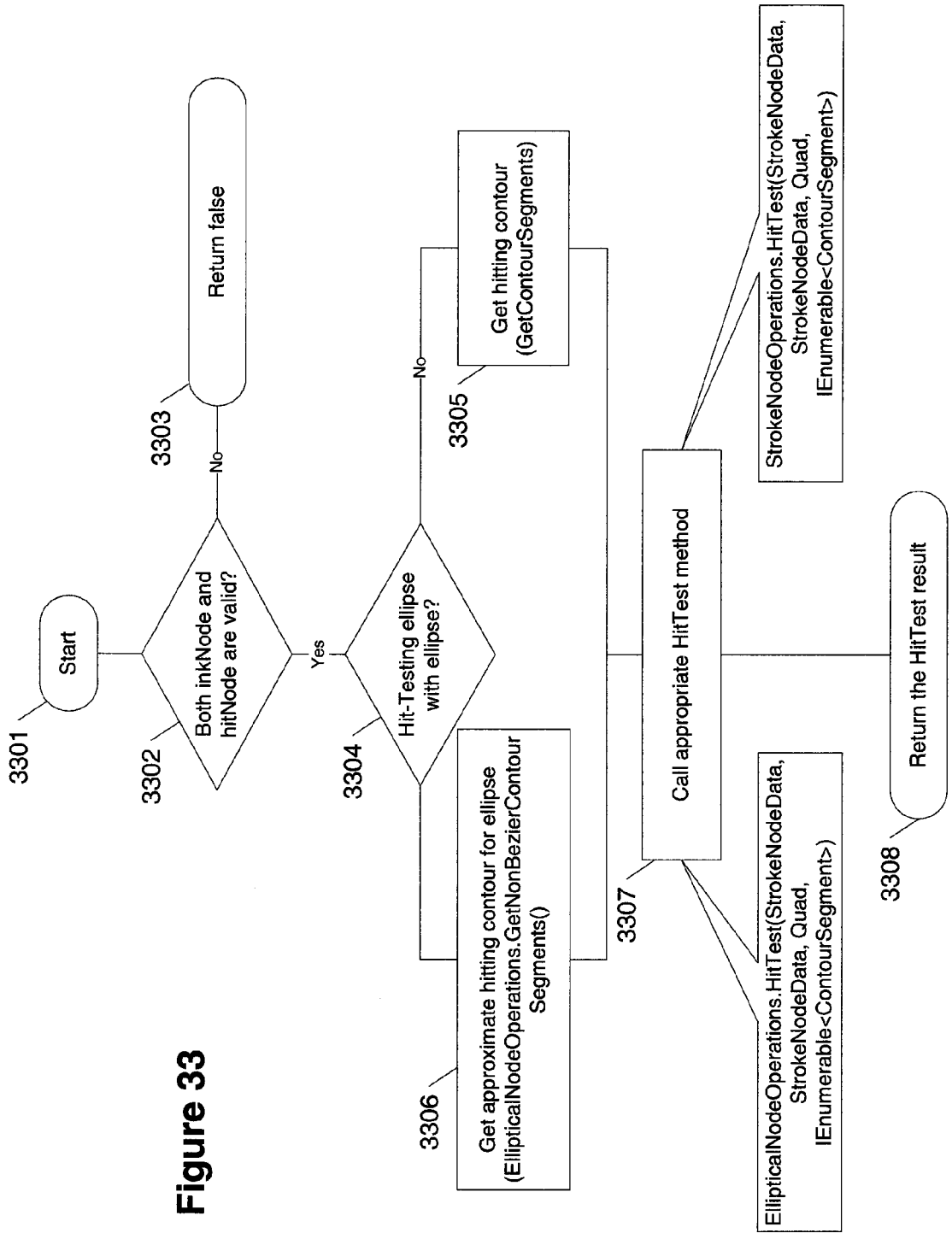

The logic of this method is described in FIG. 33. It merely get the ContourSegments for the hitting StrokeNode and then calls the StrokeNodeOperations.HitTest( ) to get the hit-testing result.

Figure 34:
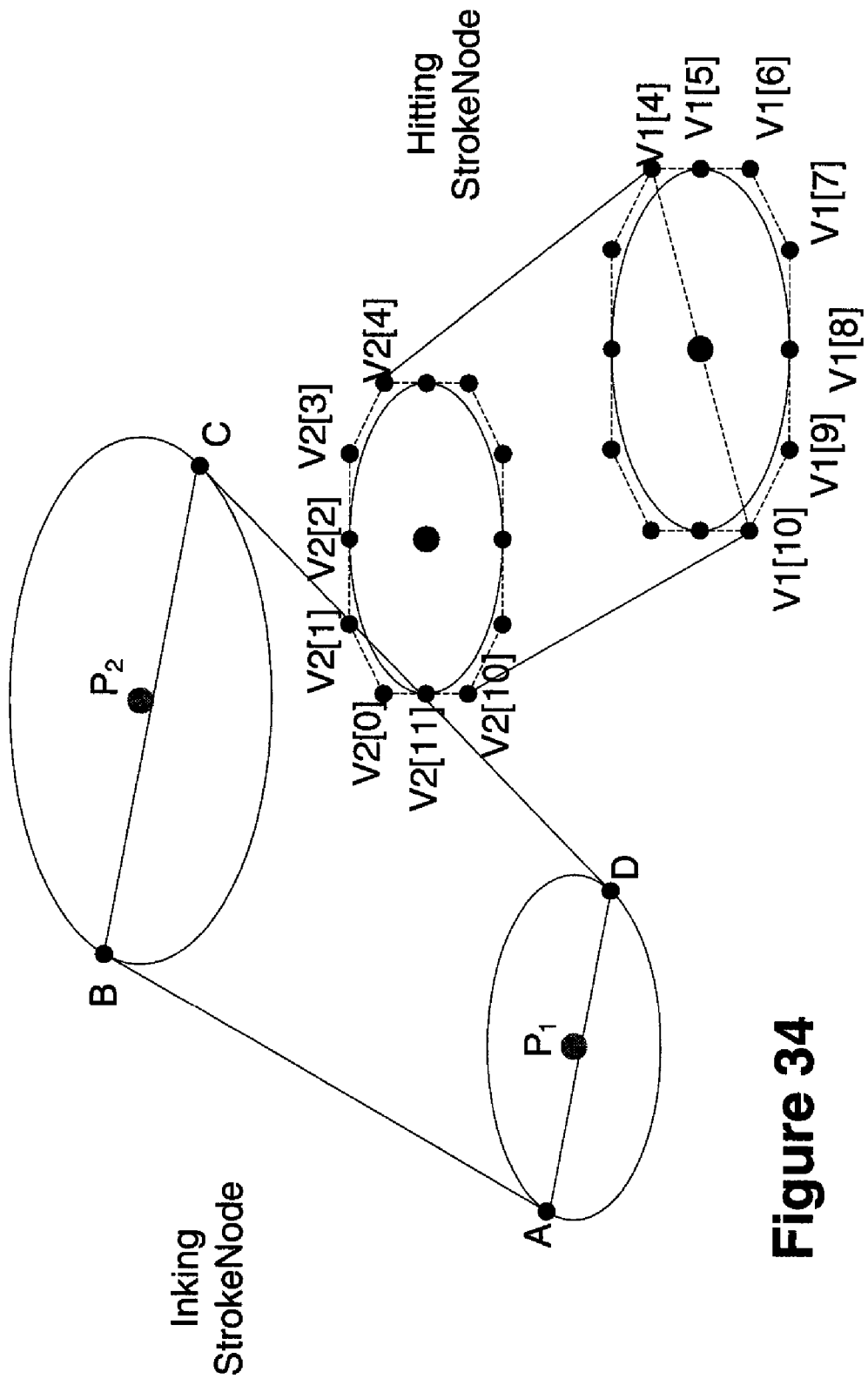
FIG. 34 shows an approximation for hit testing ellipses in accordance with aspects of the present invention.

Hit testing may possibly be performed as the intersection of two ellipses or an ellipse and a polygon. This latter approach is shown in FIG. 34. The hitting contour is approximated using the control points of ellipse, V2[10], V2[11], ..., V2[3], V2[4], V1[4], V1[5], ..., V1[10].

As shown in FIG. 33, the core algorithms of hit-testing can be implemented in two internal classes, StrokeNodeOperations and EllipticalNodeOperations. The EllipticalNodeOperations derives from StrokeNodeOperations and overrides all the algorithms for hit-testing.

Incremental Hit-Testing

Incremental Hit-Testing with Points

Figure 35:
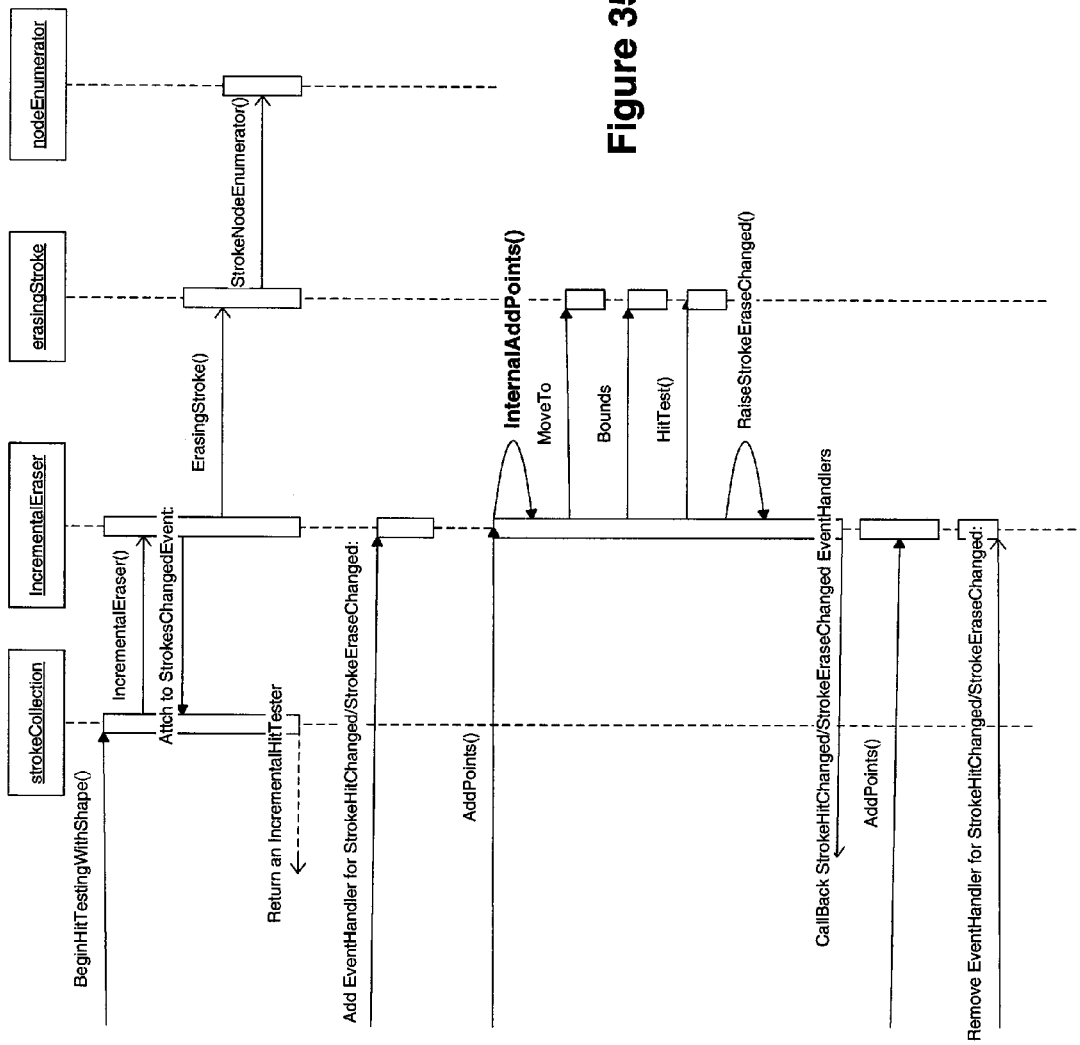
FIG. 35 shows a sequence diagram for dynamic hit testing with points in accordance with aspects of the present invention.
Figure 36:
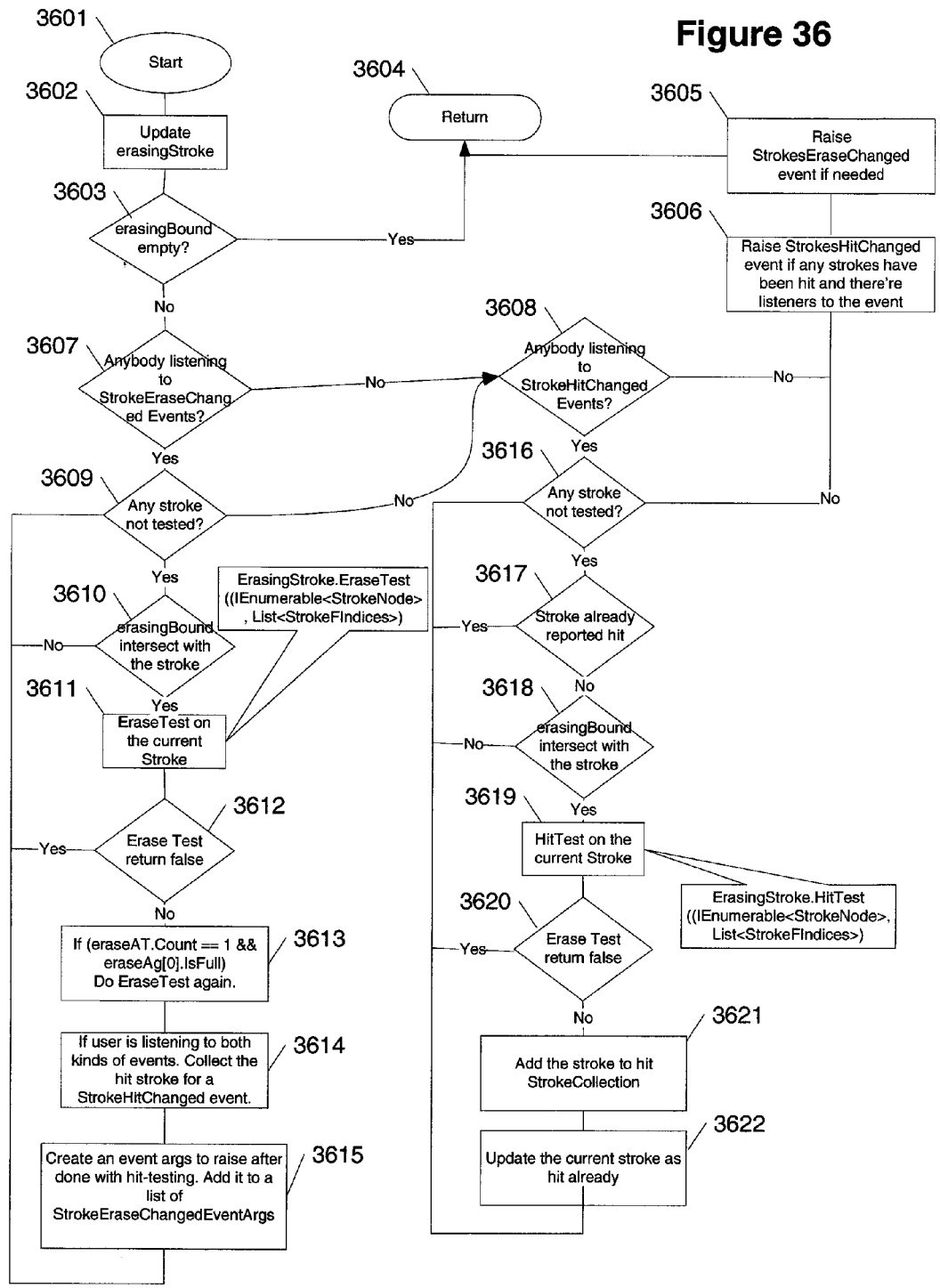
FIG. 36 shows a process for point erasing/hit-testing in accordance with aspects of the present invention.

As shown in FIG. 35, the user of this feature calls GetIncrementalHitTester( ), which creates an instance of type IncrementalEraser first. This method creates an incremental hit-tester for hit-testing with a shape. This may be used with stroke erasing and/or point erasing. This returns an instance of the incremental hit tester.

Then the user adds the EventHandler for StrokeHitChanged or StrokeEraseChanged to the returned instance.

After that, the user repeatedly calls AddPoints( ) in the IncrementalErasor to do incremental hit-testing. This then adds an array of points representing an incremental move of the hit-testing tool.

As shown in 36, this method first updates the erasingStroke based on the erasing points. Then it iterates over the Strokes and for each Stroke, it calls ErasingStroke.EraseTest (or HitTest) for erasing-test result. The StrokeEraseChangedEvent can be fired at the end of the function or inside the loop. Generally, the user is expected to modify the stroke collection in his event handler so the method would be fired at the end of the function.

Incremental Hit-Testing with Lasso

Figure 37:
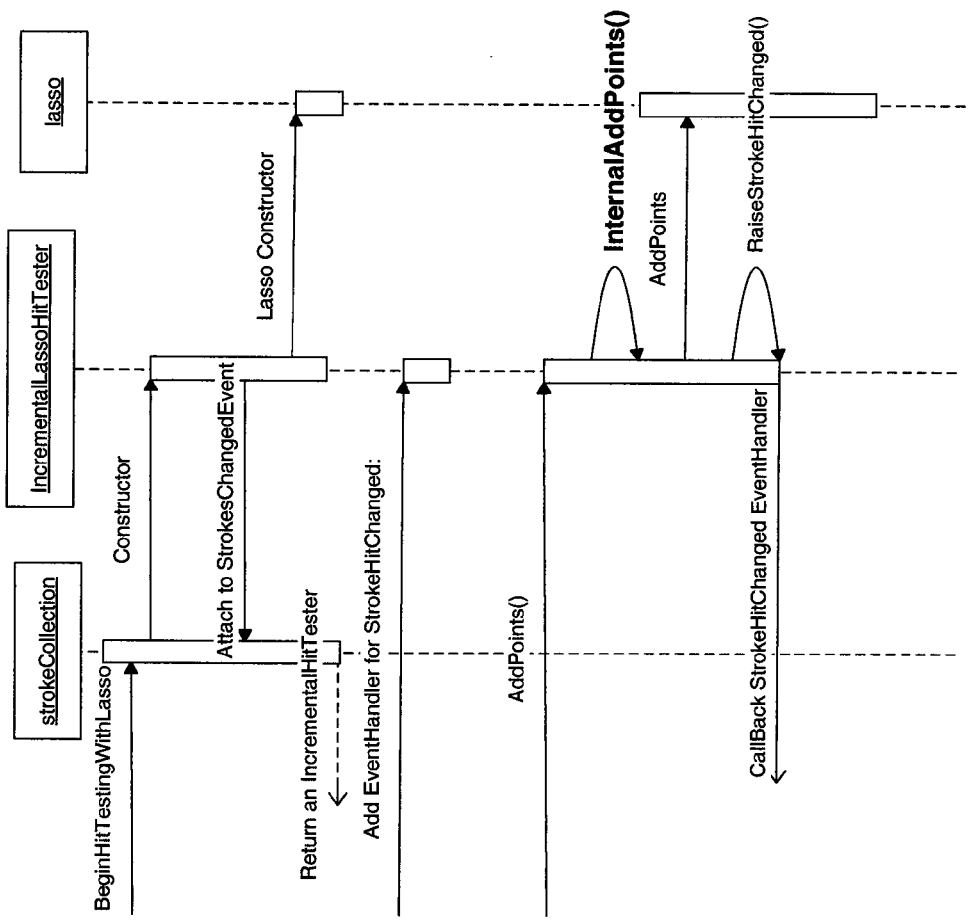
FIG. 37 shows a sequence diagram for dynamic hit testing with lasso selection in accordance with aspects of the present invention.

As shown in FIG. 37, the user of this feature calls StrokeCollection.BeginHitTestingWithLasso to obtain a dynamic hit-tester first. This creates an incremental hit-tester for selecting with lasso and returns an instance of the incremental hit tester.

Then the system adds the user defined event handler for StrokeHitChanged. After that, user repeatedly calls Addpoints( ) to start dynamic hit-testing.

Figure 38:
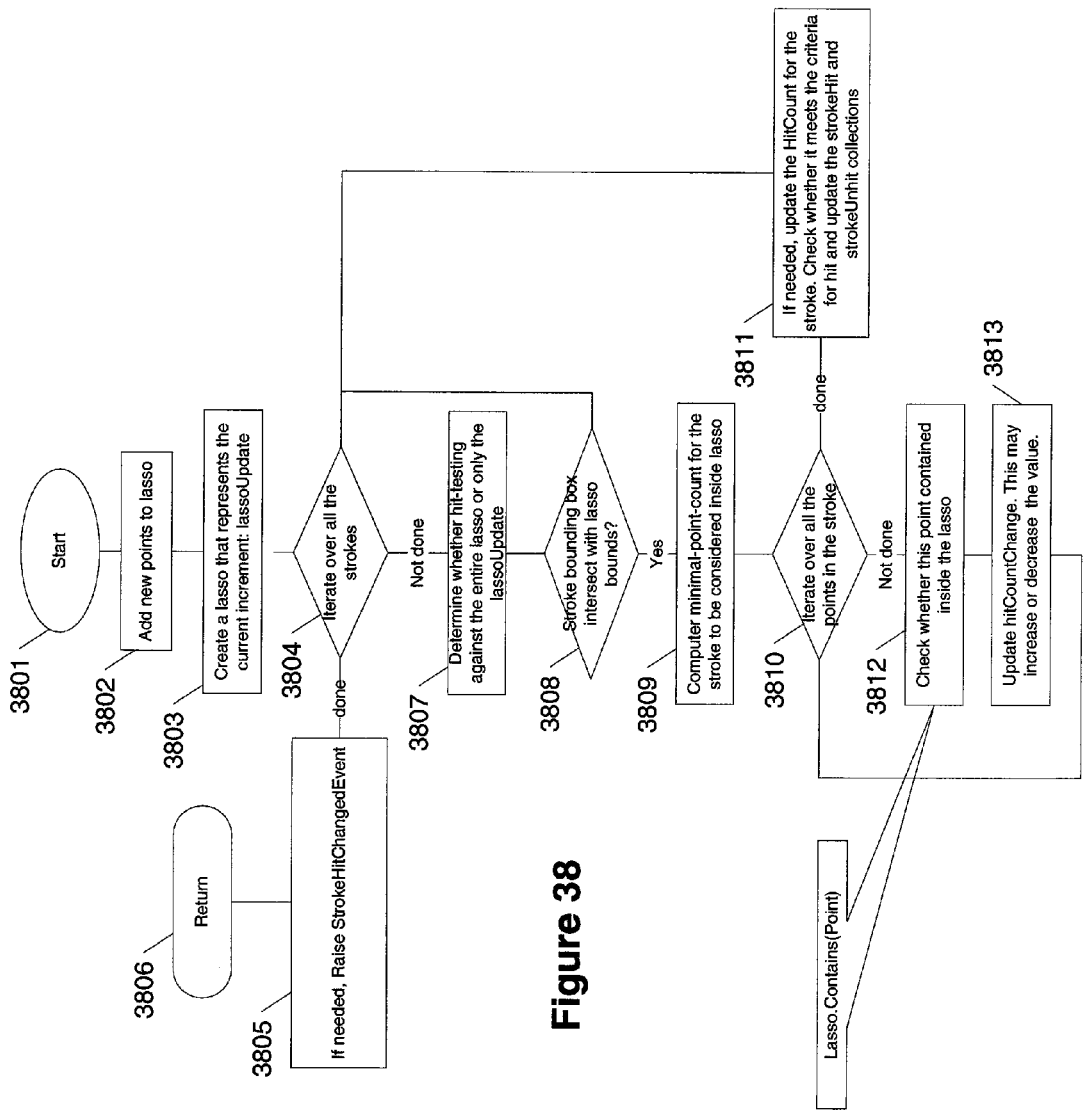
FIG. 38 shows a process for incremental lasso hit testing in accordance with aspects of the present invention.

The implementation may be represented in FIG. 38. An internal class StrokeInfo can be used to cache Stroke hit-testing results. If the stroke has been hit-tested with the current lasso before and if the stroke (or its DrawingAttributes) has not changed since the last hit-testing, it is hit-tested against the incremental lasso that contains only the new points. Since lasso increments are typically with small number of points, this is considered a significant optimization compared with hit-testing against the entire lasso each time.

Hit-Testing Algorithms

This section describes the "low-level" hit-testing algorithms that are used by both dynamic hit-testing and static hit-testing.

Hit-Testing a Point against a Lasso

The algorithm to check whether a given point is inside a lasso is implemented in Lasso.Contains( ). This tells whether a given point is captured by a lasso.

The definitive reference is "Point in Polygon Strategies" by Eric Haines (Graphics Gems IV, Paul S. Heckbert (ed.), Academic Press 1994, ISBN 0-12-336155-9 (with IBM disk) or 0-12-336156-7 (with Mac disk), pp. 24-46). Now also at http://www.erichaines.com/ptinpoly and http://www.acm.org/tog/editors/erich/ptinpoly/.

For other resources, see Subject 2.03: How do I find if a point lies within a polygon? at http://www.faqs.org/faqs/graphics/algorithms-faq/

Hit-Testing a Polygonal Stroke Segment against Hitting Contour Segments

This is implemented in StrokeNodeOperations.HitTest( ). This hit-tests a stroke segment defined by two nodes against another stroke segment.

Figure 39:
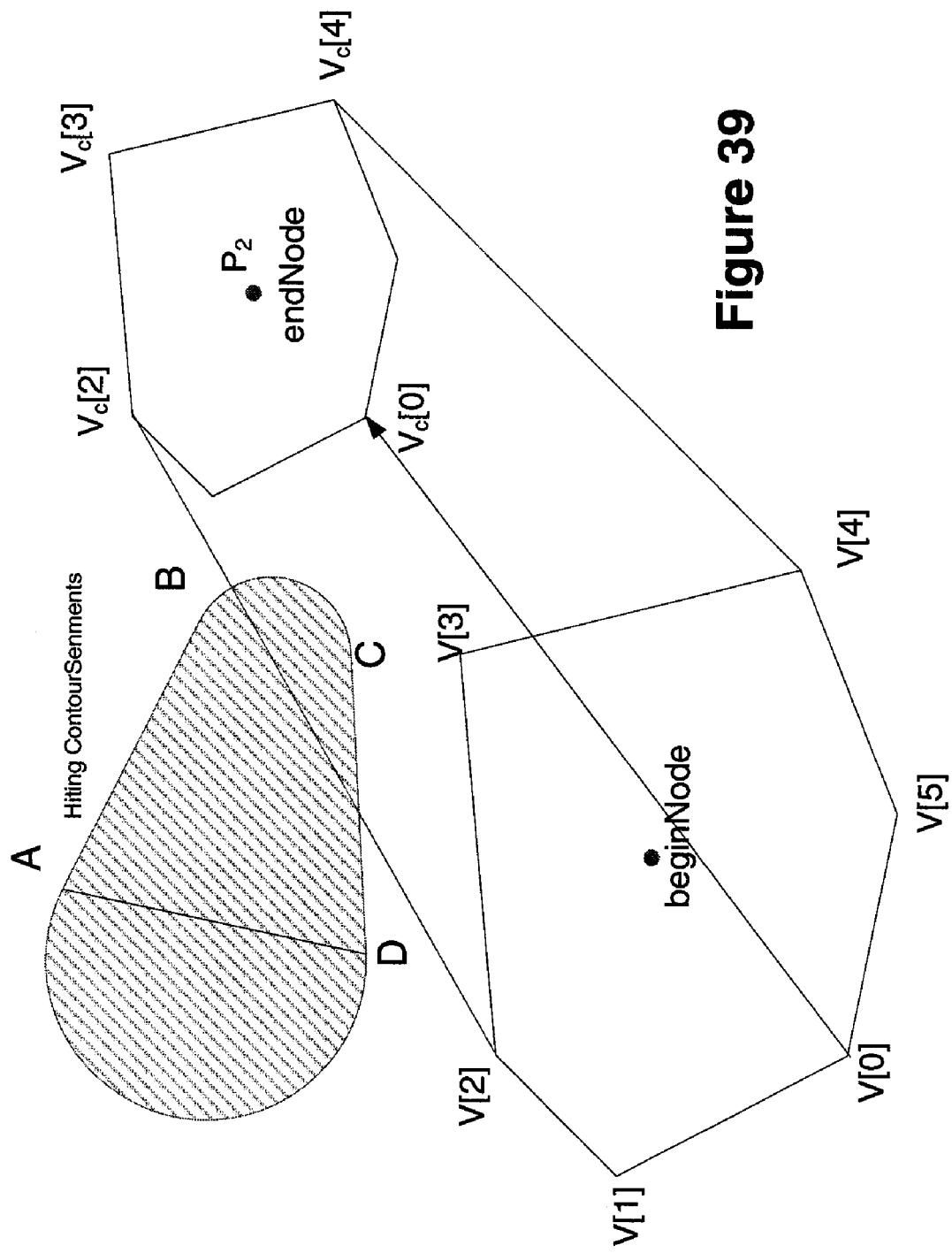
FIG. 39 shows hit testing of two stroke segments in accordance with aspects of the present invention.

FIG. 39 shows an example of hit-testing a polygonal stroke segment against hitting contour segments. The hitting ContourSegments are represented by an enumerator. For example, in FIG. 39 the segments are line AB, arc BC, line CD, and line DA.

Figure 40:
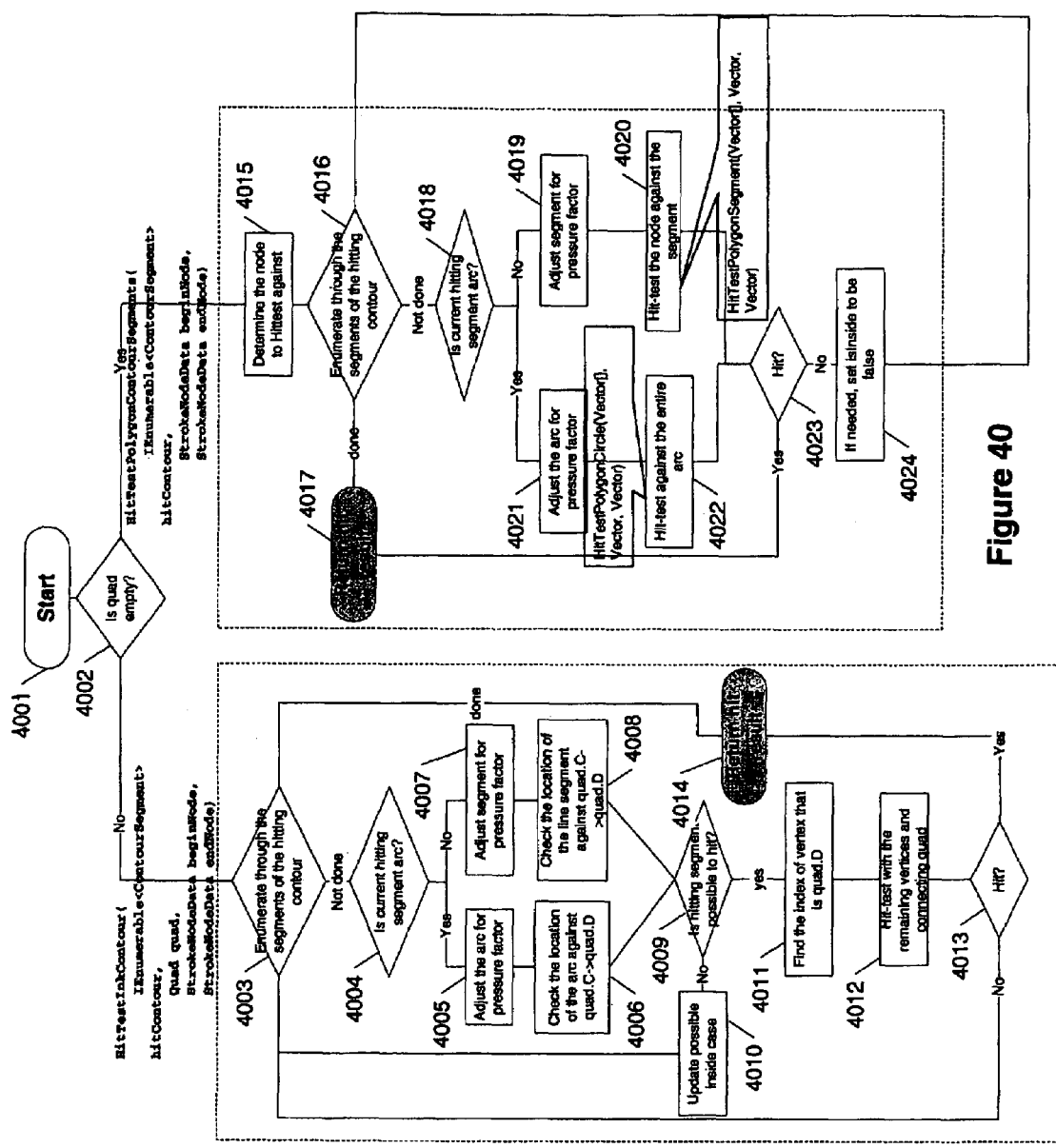
FIG. 40 shows hit testing of a polygonal stroke segment against hitting contour segments in accordance with aspects of the present invention.

The flow chart for this method is shown in FIG. 40. It first checks whether the ink connecting quad is empty or not. If it is empty, then this may be the case that the beginNode does not exist or one node is completely inside another one.

If the ink connecting quad is not empty, it enumerates through the segments of the hitting contour and hit-test each of the segment against the ink contour. For example, in FIG. 39 the ink contour is (V[2], Vc[2]), (Vc[3], Vc[4]), (Vc[4], V[4]), (V[4], V[5]), (V[5], V[0]), (V[0], V[1]) and (V[1], V[2]).

Hit-Testing an Elliptical Stroke Segment against Hitting Contour Segments

This is implemented in EllipticalNodeOperations.HitTest( ). This hit-tests a stroke segment defined by two nodes against another stroke segment.

Figure 41:
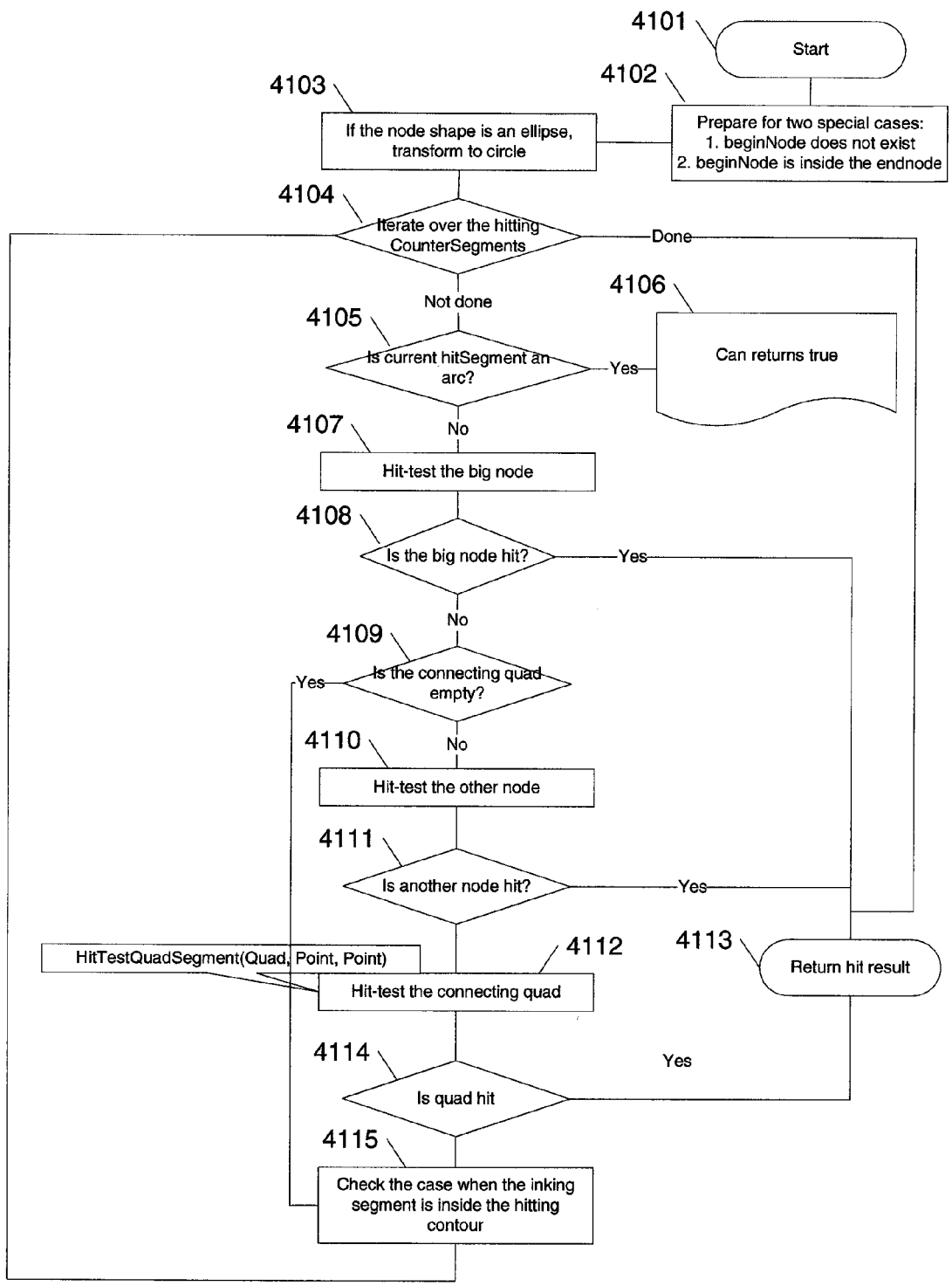
FIG. 41 shows hit testing of an elliptical stroke segment against hitting contour segments in accordance with aspects of the present invention.

As shown in FIG. 41, it iterates over the hitting segments and for each segment, the algorithm checks whether the segment hits either one of the node. If not, it calls an internal method, HitTestQuadSegment, to hit-test against the connecting quad. Please refer to section 0 for details about hit-testing a quad against a linear segment.

Cut-Testing a Polygonal Stroke Segment against Hitting Contour Segments

This is implemented in class StrokeNodeOperations.

Figure 42:
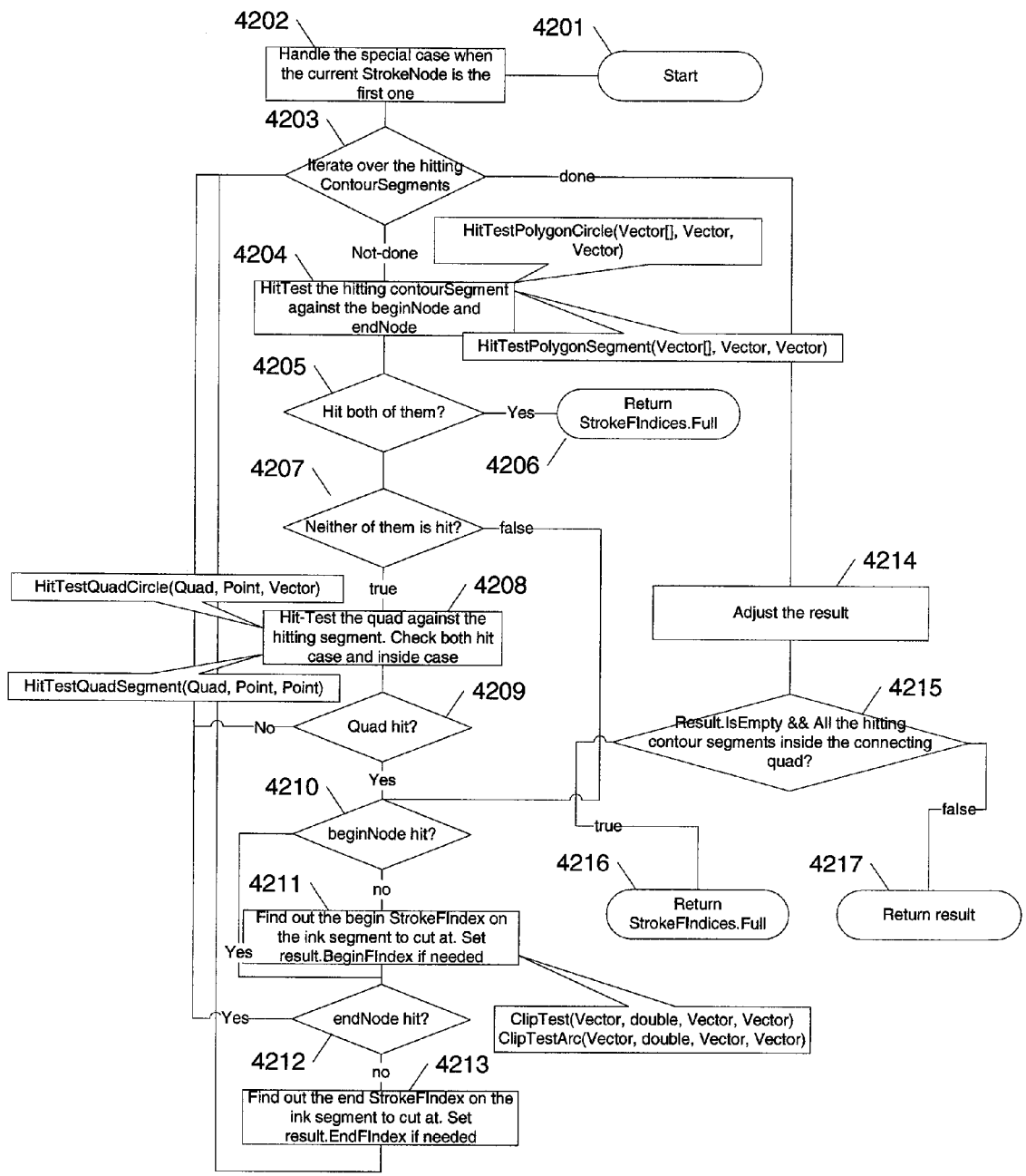
FIG. 42 shows cut-testing a polygonal ink stoke segment against hitting segments in accordance with aspects of the present invention.

As shown in FIG. 42, the method iterates over each of the hitting ContourSegments. For each segment, it first handles the special case when the hitting segment hits both the beginNode and the endNode. Then it calls HitTestQuadCircle or HitTestQuadSegment to hit-test the connecting quad against the hitting segment. After that, it calls internal methods ClipTest or ClipTestArc to find out the exact location to cut.

Cut-Testing a Elliptical Stroke Segment against Hitting Contour Segments

This is implemented in class EllipticalNodeOperations. This API cut tests an inking StrokeNode segment (two nodes and a connecting quadrangle) against a hitting contour.

Figure 43:
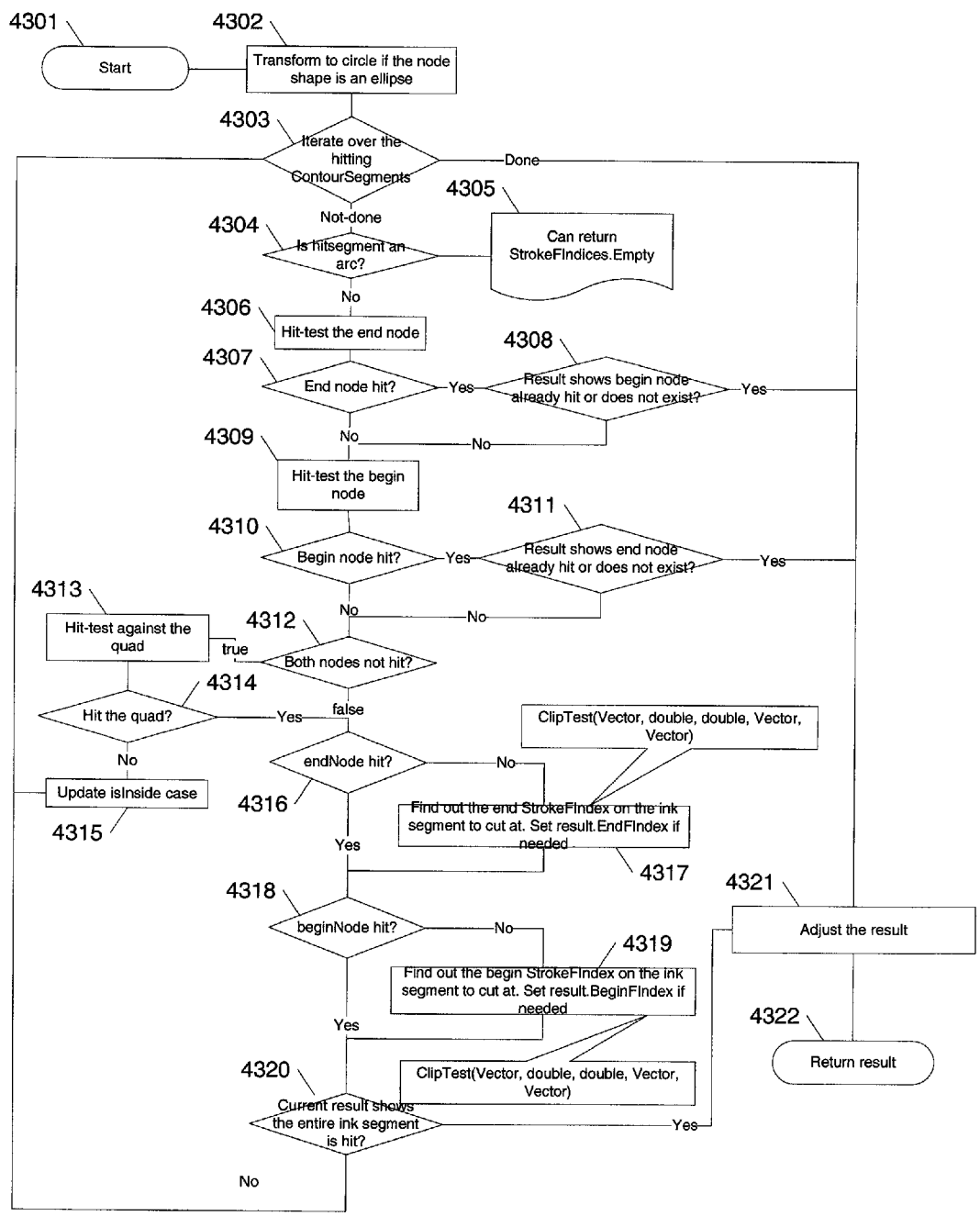
FIG. 43 shows cut-testing an elliptical ink stroke segment against hitting segments in accordance with aspects of the present invention.

As shown in FIG. 43, the method iterates over each of the hitting ContourSegments. For each segment, it first handles the special case when the hitting segment hits both the beginNode and the endNode. Then it calls HitTestQuadSegment to hit-test the connecting quad against the hitting segment. After that, it calls internal methods ClipTest to find out the exact location to cut.

Cut-Testing a Polygonal Stroke Segment against a Linear Segment

The method is implemented in StrokeNodeOperations.CutTest( ). This API hit-tests ink segment defined by two nodes against a linear segment.

Figure 44:
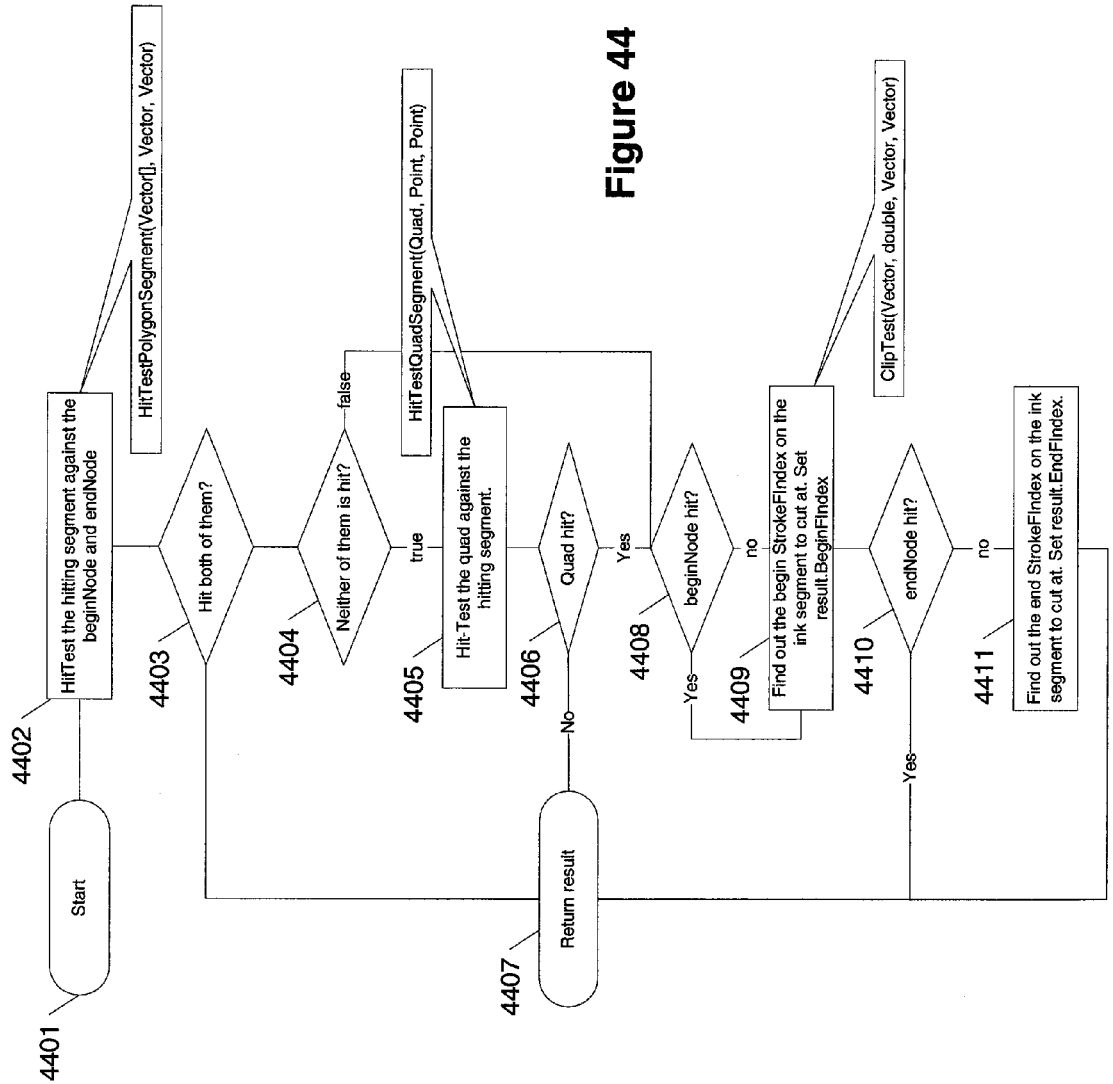
FIG. 44 shows cut testing a polygonal ink stroke segment against a linear segment in accordance with aspects of the present invention.

As shown in FIG. 44, the method first handles two special cases: (1) when the hitting linear segment hit both the two inking nodes; (2) when the hitting segment neither hits any of the two nodes nor hits the connecting quad. After that, it calls an internal ClipTest method to find out the exact location to cut at.

Cut-Testing an Elliptical Stroke Segment against a Linear Segment

StrokeNodeOperations.CutTest( ) is overridden in EllipticalNodeOperations for cut-testing on elliptical StrokeNodes. This API cut-tests ink segment defined by two nodes and a connecting quad against a linear segment.

Figure 45:
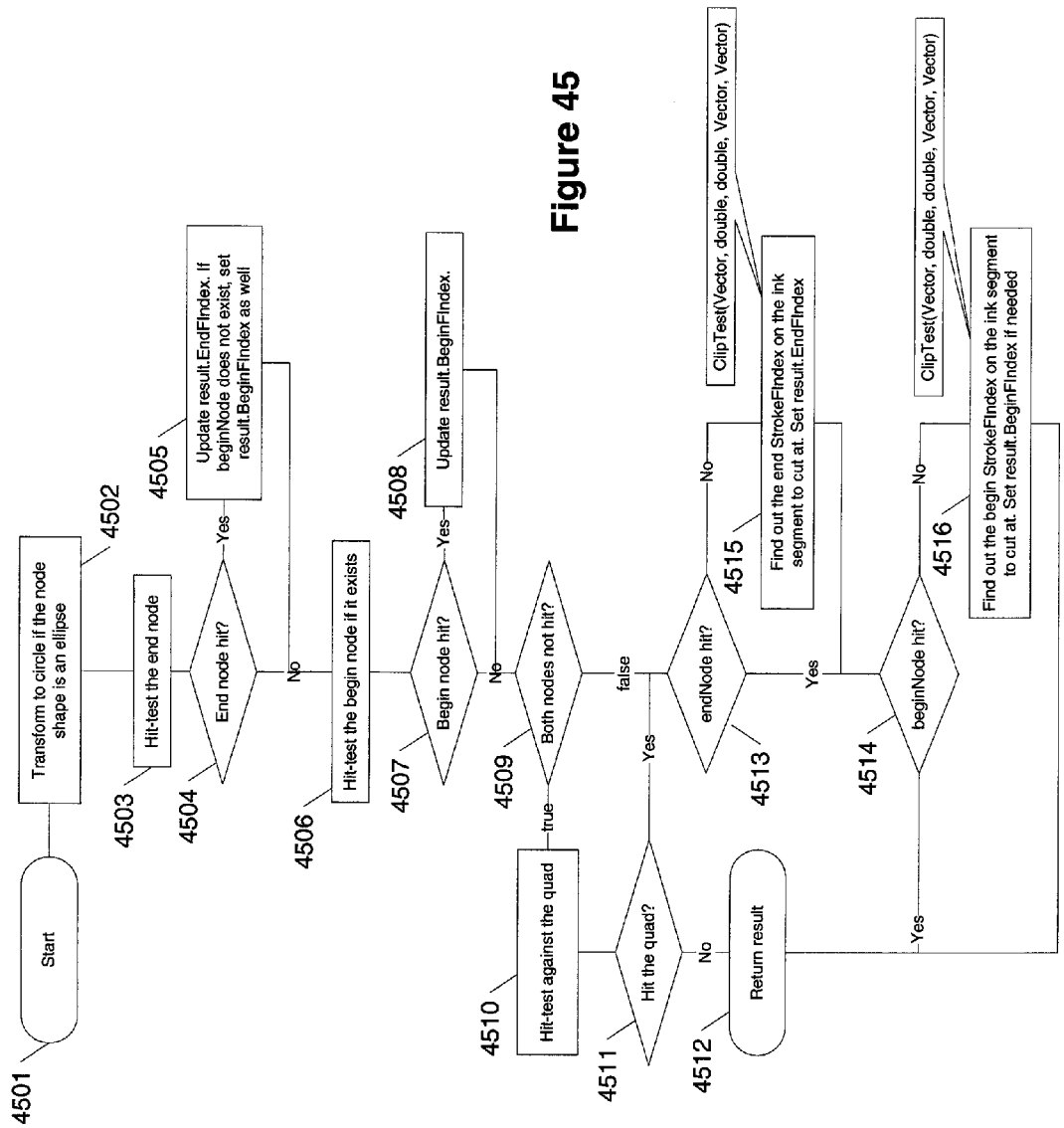
FIG. 45 shows cut testing an elliptical inking stroke node against a linear segment in accordance with aspects of the present invention.

As shown in FIG. 45, the method first handles two special cases: (1) when the hitting linear segment hit both the two inking nodes; (2) when the hitting segment neither hits any of the two nodes nor hits the connecting quad. After that, it calls an internal ClipTest method to find out the exact location to cut at.

It should be noted that cut-testing on elliptical StrokeNodes can always transform to operations on circular shapes. Therefore one can simplify the description to circular ink tip shapes.

Hit-Testing a Convex Polygon Against a Circle

This is implemented as a static function in class StrokeNodeOperations. This hit tests a polygon against a circle.

Figure 46:
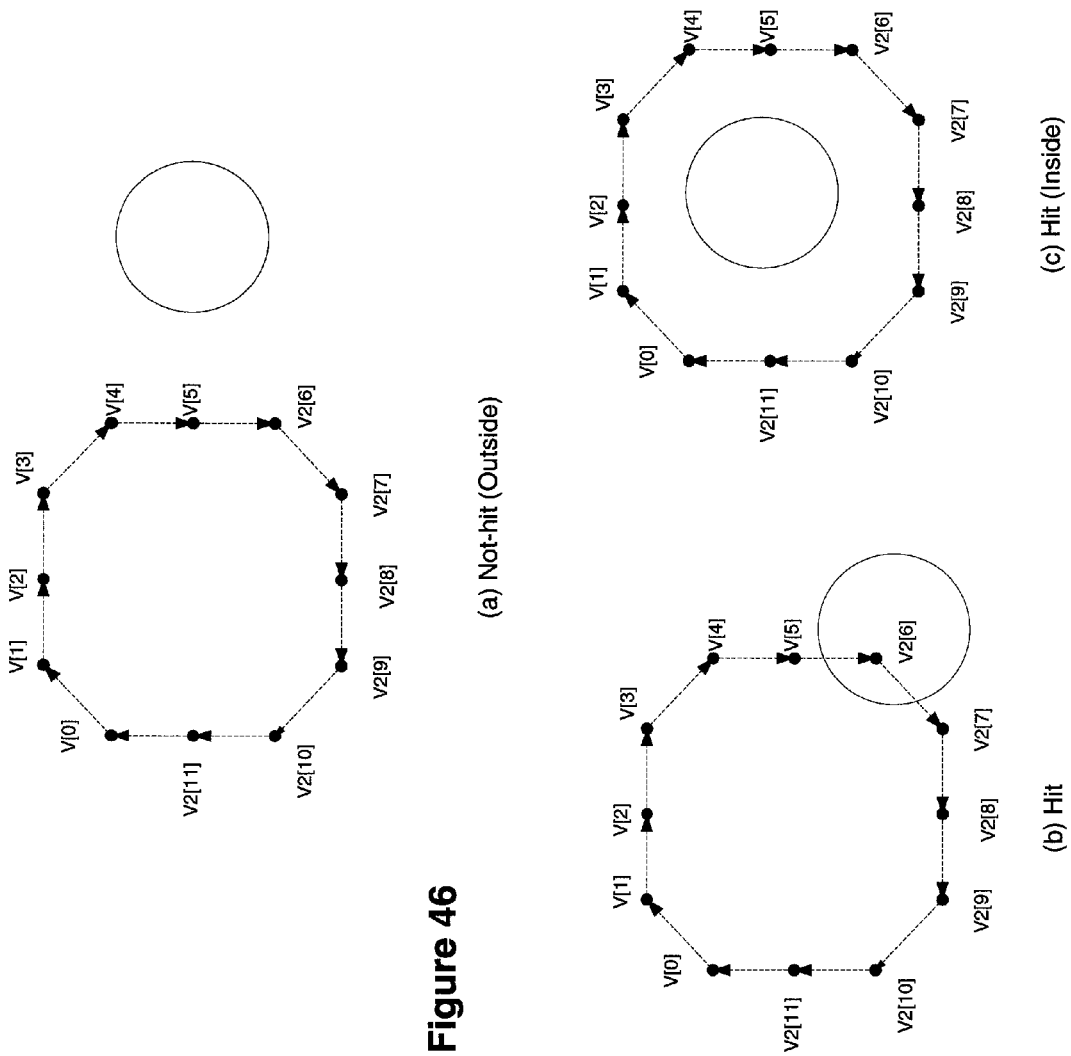
FIGS. 46A-C shows hit testing a polygon against a circle in accordance with aspects of the present invention.

As shown in FIGS. 46A-46C, the algorithm walks through the vertices of the polygon in clockwise order. For each edge vector, i.e. V[0]V[1], it checks the location of the circle with respect to the vector. There are three cases:
  a. Case 1: (FIG. 46b) the vector hits the circle, return "true".
  b. Case 2: (FIG. 46a) the circle is at the left side of the vector. One knows the circle must be outside of the polygon, so return "false".
  c. Case 3: otherwise, continue to the next edge vector.

After one is done with all the edges and it's neither "outside" nor "hit", the circle must be inside the polygon ((FIG. 46c).

Hit-Testing a Convex Polygon Against a Linear Segment

This is implemented in class StrokeNodeOperations. This hit tests a linear segment against a convex polygon.

The algorithm is similar to Hit-testing a Convex Polygon against a Circle. The only difference is that here one needs to check the location of vector against another vector.

Hit-Testing a Quad Against a Linear Segment

This is implemented in class StrokeNodeOperations. This is a specialized version of HitTestPolygonSegment that takes a Quad for a polygon. This method is called very intensively by hit-testing API and one does not want to create Vector[ ] for every quad it hit-tests.

Hit-Testing a Quad Against a Circle

This is implemented in class StrokeNodeOperations. This is a specialized version of HitTestPolygonCircle that takes a Quad for a polygon. This method is called very intensively by hit-testing API and one does not want to create Vector[ ] for every quad it hit-tests.

Clip-Testing a Polygonal Inking Segment against an Arc (Circle)

This is implemented in class StrokeNodeOperations. Clip-Testing a polygonal inking segment against an arc (circle The following four Vectors are defined as:

$$spineVector = endNode - beginNode \quad (12)$$

$$nextNode = lastVertex + spineVector \quad (13)$$

$$nextVertex\ NextNode = vertex + spineVector \quad (14)$$

$$nextVertex = vertex - lastVertex \quad (15)$$

Figure 47:
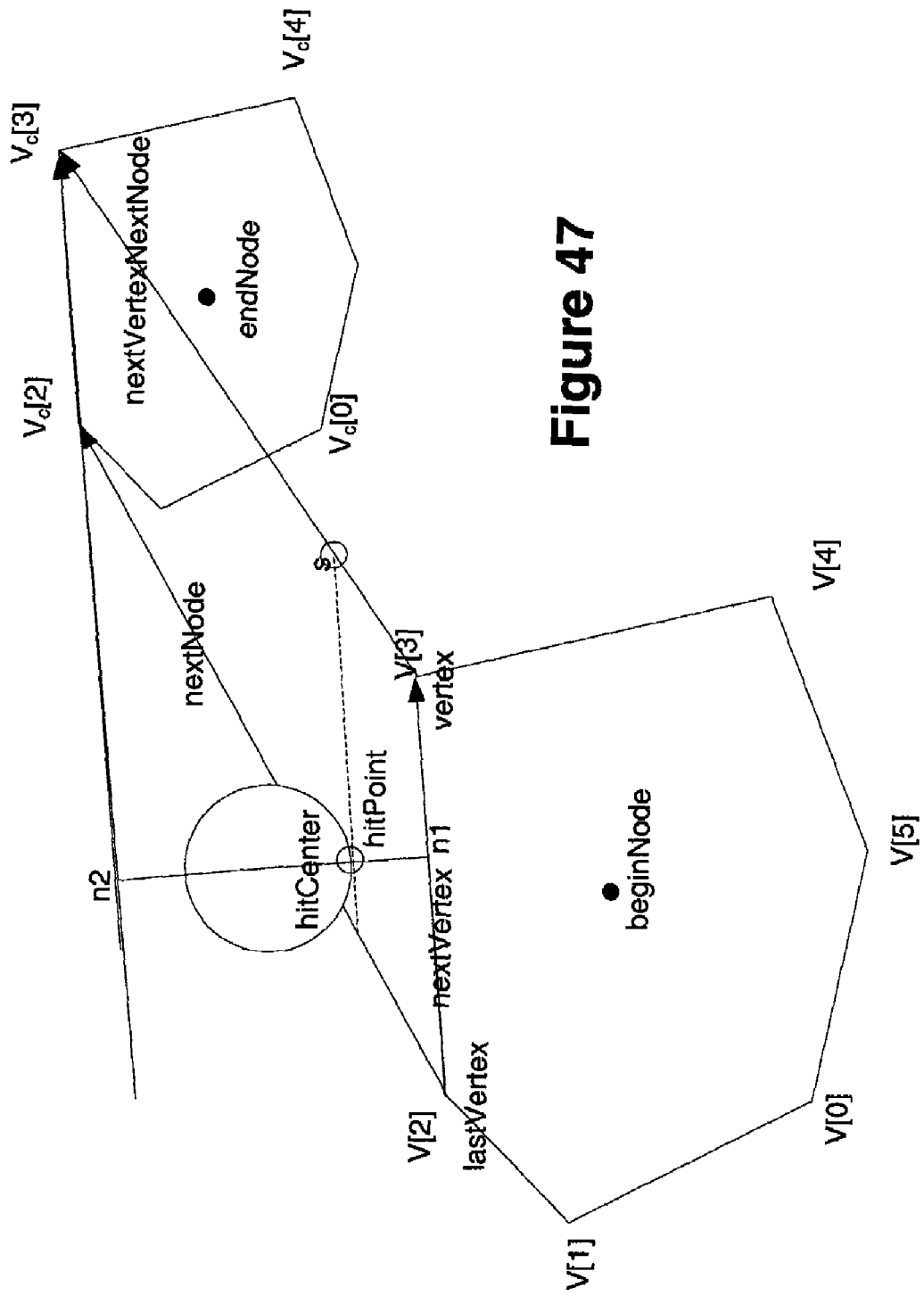
FIGS. 47-48 show clip testing a polygonal inking segment against an arc in accordance with aspects of the present invention.
Figure 48:
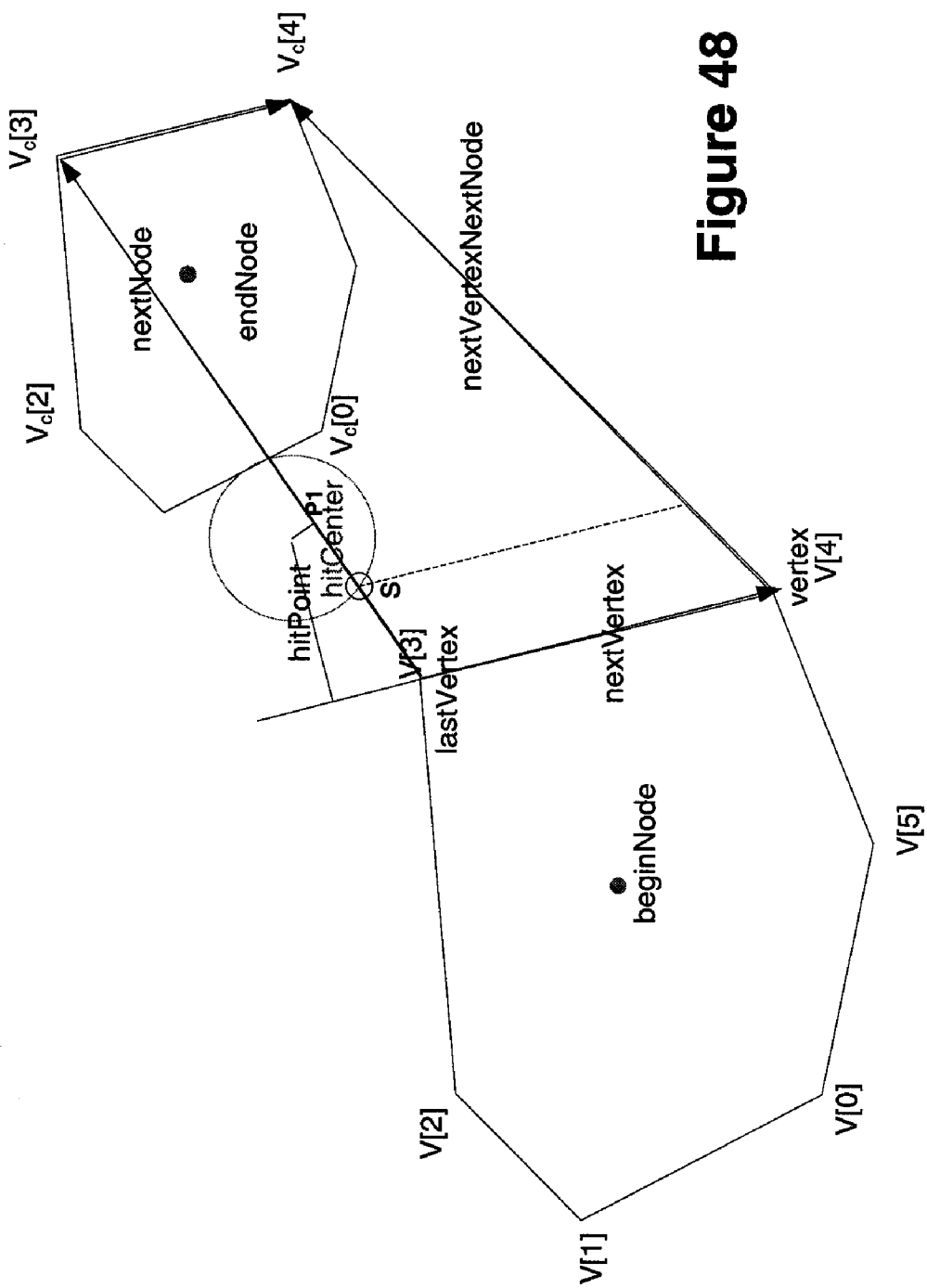

There are two different cases, as shown FIG. 47 (case a) and FIG. 48 (case b).

For case (a), the following steps are followed to get the clip-testing position
  a. Get the projection of point hitCenter on nextVertex
  b. Calculate hitPoint
  c. Get the project of hitPoint on nextVertex and nextNode+nextVertex, n1 and n2.
  d. Calculate the position for clipping $$s = \frac{LengthOf\ (hitPoint - n1)}{LengthOf\ (n1 - n2)} \quad (16)$$

The following condition needs to be satisfied for case (a):
  a. The Vector nextNode is at the left of nextVertex
  b. The radius of the hitting circle is less than or equal to LengthOf(hitCenter−n1)
  c. Vector hitPoint-vertex is at the left of nextVertexNextNode
  d. Vector hitPoint-lastVertex is at the right of nextNode For case (b), the following steps are followed to calculate s:
  a. Get the projection of hitCenter on nextNode, point P1
  b. Calculate s $$s = \frac{LengthOf\ (P1 - lastVertex) - \sqrt{(hitRadius^2 - LengthOf\ (hitCenter - P1)^2)}}{LengthOf\ (nextNode)} \quad (17)$$

Clip-Testing a Polygonal Segment against a Linear Segment

This is implemented in class StrokeNodeOperations. This API relates to cutting ink with polygonal tip shapes with a linear segment.

Figure 49:
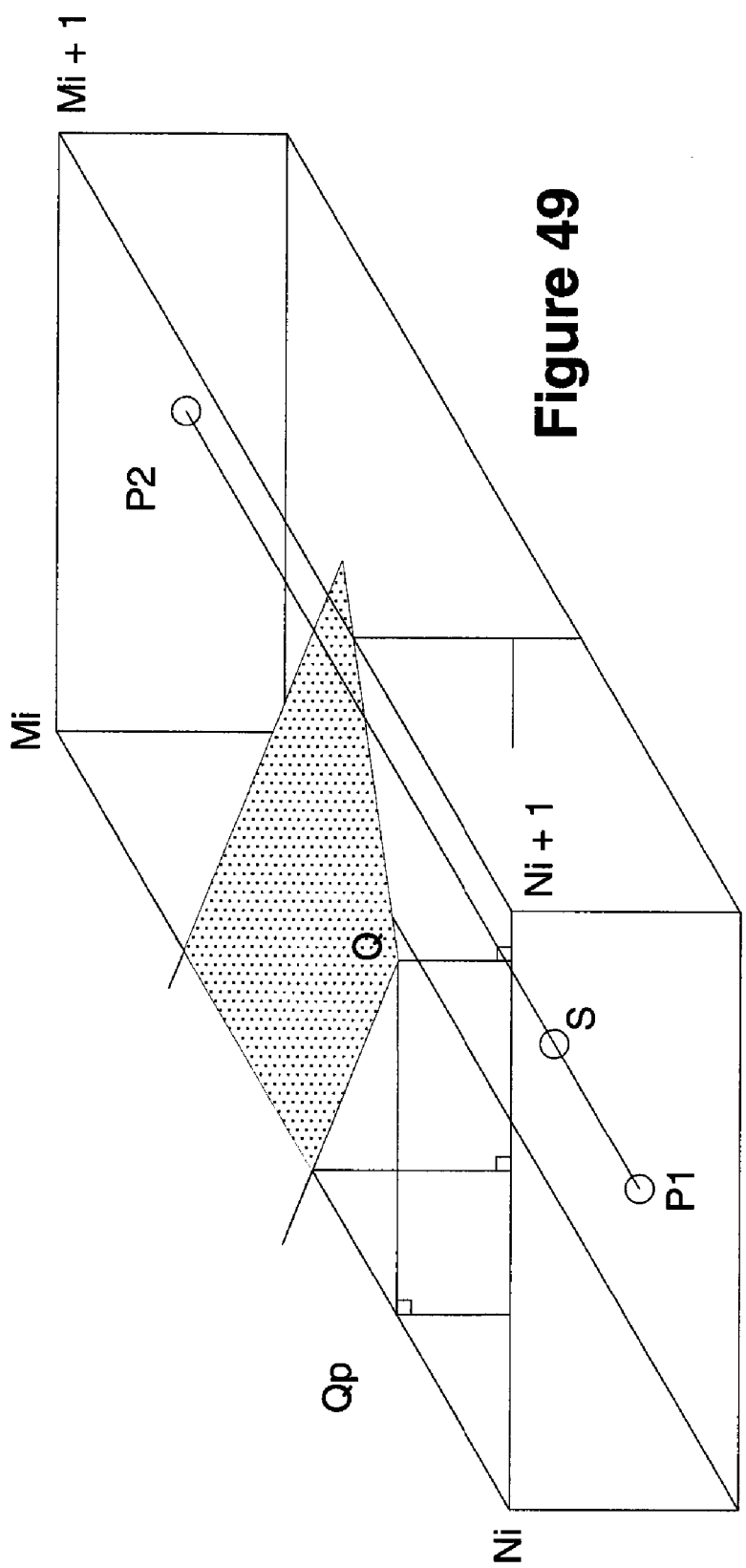
FIG. 49 shows cutting ink with polygonal tip shapes with a linear segment in accordance with aspects of the present invention.

As shown in FIG. 49, when an ink tip shape is a convex polygon, one may iterate in a constant direction (for instance, clockwise) through the edges of the polygon P1 and hit test the cutting segment against quadrangles NIMIMI+1NI+1 with MI on the left side off the vector NINI+1. If the cutting segment intersects the quadrangle, on the intersected part of the segment, one may then find point Q (the nearest to the line NINI+1) and point QP (the point of the intersection of the segment NIMI and vector NI+1NI started at Q). Next, $$QP = NI + s * LengthOf(MI - NI) \quad (18)$$

$$s = LengthOf(QP - NI)/LengthOf(MI - NI). \quad (19)$$

If the cutting segment intersects more than one quadrant, one may then use the smallest s to find the split point:

$$S = P1 + s * LengthOf(P2 - P1) \quad (20)$$

Using this approach, one may also approximate other shapes including is that sees diamond points, and odd-shaped figures so as to provide a user with additional erasing tips or contours.

Clip-Testing a Circular Inking Segment against a Linear Segment

This is implemented in class EllipticalNodeOperations. This API relates to clip-testing a circular inking segment against a linear segment.

The following describes an ink tip shape being a circle. By definition of ink contour geometry, dimensions of an ink tip shape are changing linearly between any two subsequent ink nodes. Of course, it is a simpler case if all ink tip shapes (or sizes) are constant. The more complex and general approach is shown here. This means that for any point S located on the ink segment P1, P2 one may use the following:

$$S = P_1 + s \cdot (P_2 - P_1) \quad 0 \leq s \leq 1 \quad (21)$$

$$R = R_1 + s \cdot (R_2 - R_1) \quad 0 \leq s \leq 1 \quad (22)$$

where $R_1$, $R_2$ and R are the radii of the round ink tip at the points $P_1$, $P_2$ and S respectively.

Figure 50:
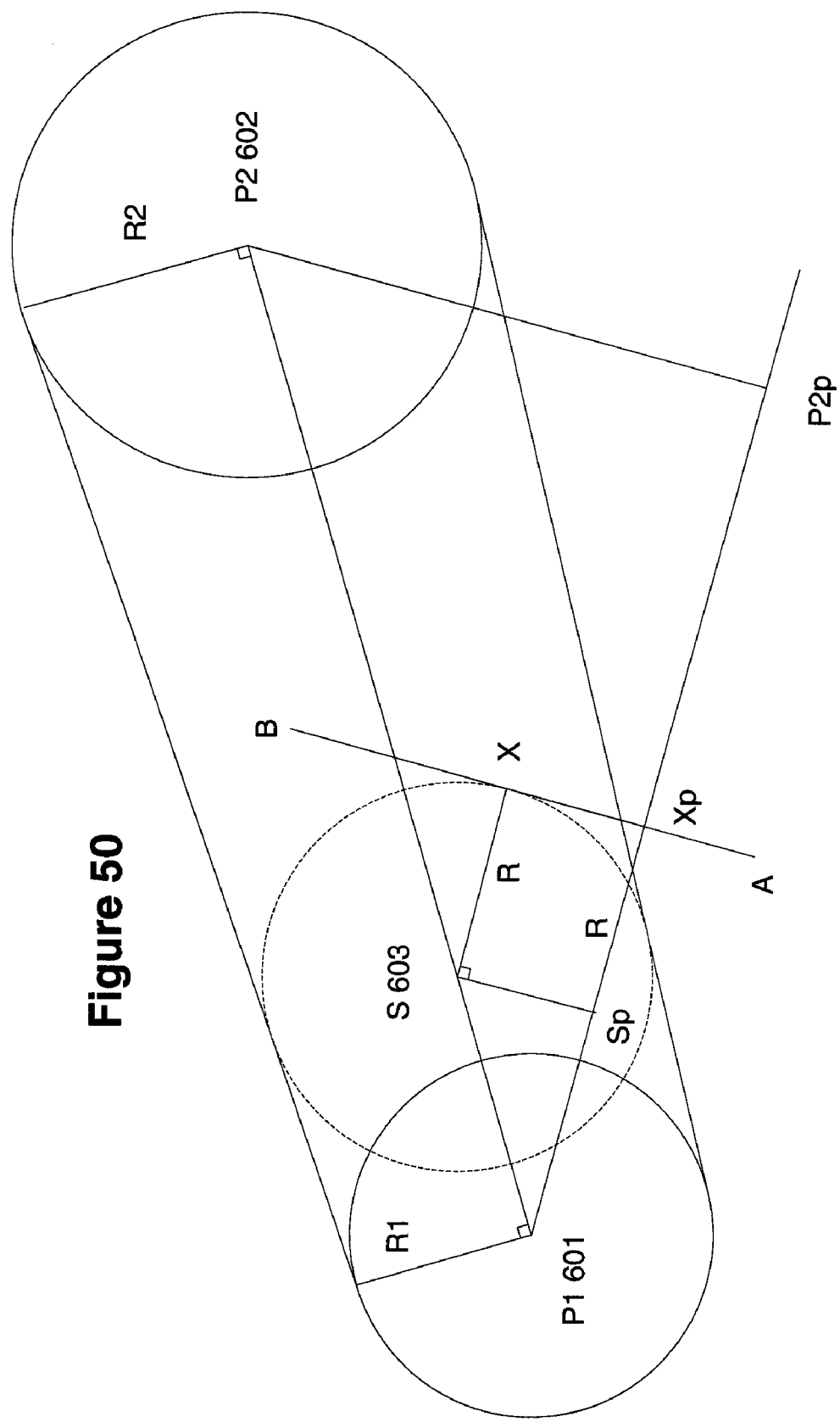
FIG. 50 shows cutting ink with circular tip shapes with a linear segment in accordance with aspects of the present invention.

FIG. 50 shows an input erasing contour line segment AB intersecting the ink segment created by points P1 601 and P2 602.

Point P1 is defined as having an ink tip shape radius of R1. Point P2 is defined as having an ink tip shape radius of R2. Point S 603 is defined as having an ink tip shape radius R. The contact point between line segment AB and the ink shape at point S 603 with radius R is represented as point X.

Here, the locations of points P1, P2 and erasing contour one segment AB are known. The locations of point S 603 and point X are not known.

At the outset, one does not know where on the line AB the intersection point X is (if at all), but one can tell that, if a normal is drawn from P1 to the line AB, the point Xp is the projection of X onto P1Xp.

The segment SX is perpendicular to AB and therefore parallel to P1Xp. This means that point Sp (the projection of S onto P1Xp) is at the distance R from Xp to P1.

One can also find point P2*p* (the projection of P2 on P1Xp). With this information, one can find s:

$$s = x - \frac{R}{LengthOf(P1P2p)} \quad (23)$$

where $$x = \frac{LengthOf(P1Xp)}{LengthOf(P1P2p)} \quad (24)$$

which provides $$s = \frac{LengthOf(P1Xp) - R1}{LengthOf(P1P2p) + R2 - R1} \quad (25)$$

Having s, one can find S for the cutting line AB:

$$S = P1 + s \cdot LengthOf(P2 - P1) \quad (26)$$

and X as the projection of S onto AB.

It is noted that the above S is relevant for X located on the actual cutting segment AB. If X is on the cutting segment AB, then S is the split point where to cut segment P1P2. However, X may not be on cutting segment AB. In that situation, then the end point of the segment AB nearest to the X is the intersection point for the cutting segment AB and the ink stylus shape for the actual split point S still needs to be found. Here, finding S based on a point (Clip-Testing a Circular Inking Segment against a Point) may be used.

Clip-Testing a Circular Inking Segment against a Point

This is implemented in class EllipticalNodeOperations. The following relates to clip-testing a circular inking segment again a hitting point.

Figure 51:
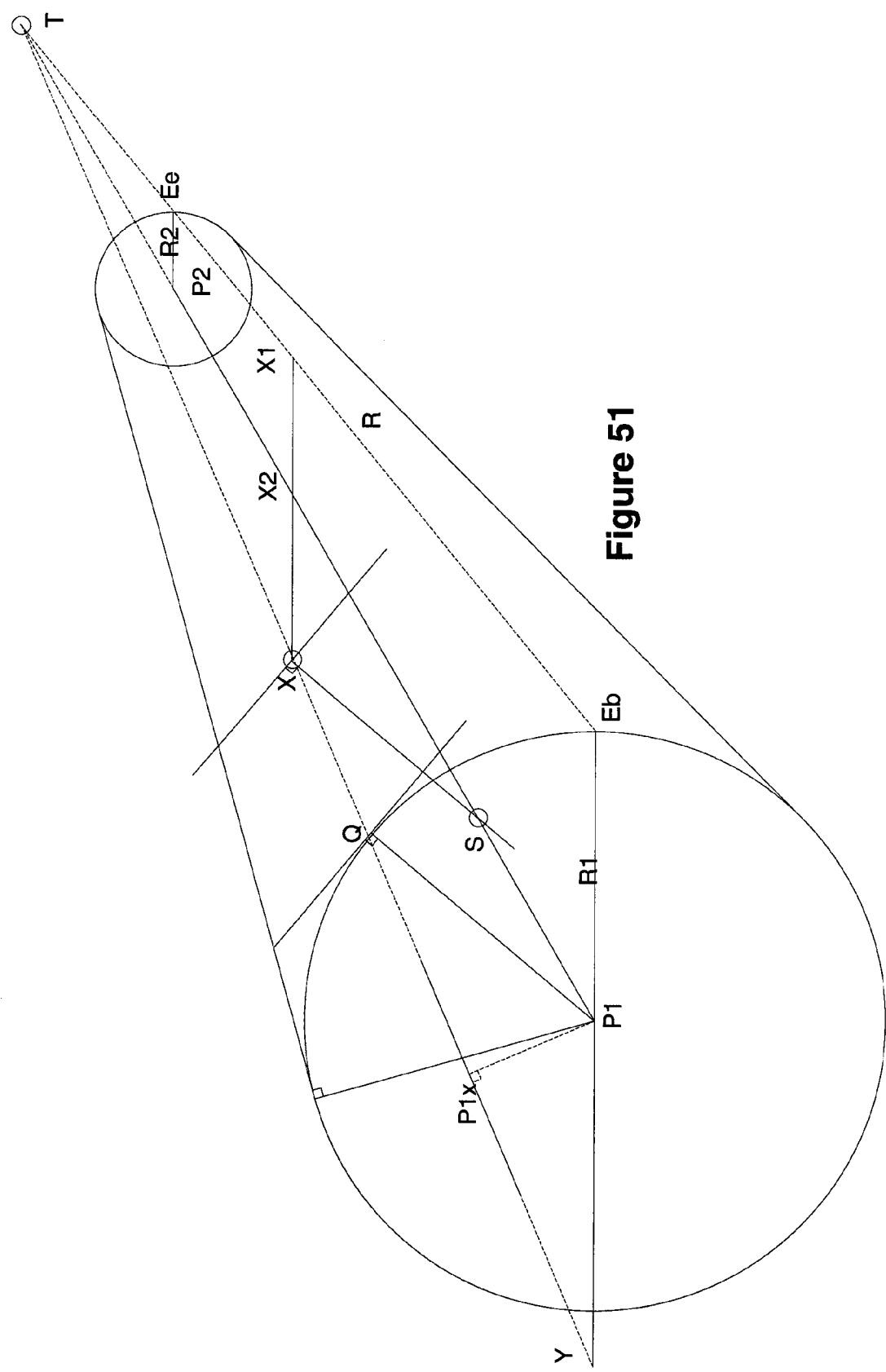
FIG. 51 shows cutting ink with circular tip shapes with a point in accordance with aspects of the present invention.

The following describes how to determine S from a cutting point X. Here, in FIG. 51, X is inside the contour of the line segment.

If X is on the line P1P2, then $$s = (LengthOf(P1X) - R1)/(LengthOf(P1P2) + R2 - R1) \quad (27)$$

Otherwise, X is not on line P1P2 and performs the following:

a. Computer Eb and Ee as $$For\ Eb.Y \neq 0, \begin{cases} Eb = P1 + (R1, 0) \\ Ee = P2 + (R2, 0) \end{cases} \quad (28)$$

$$For\ Eb.Y = 0, \begin{cases} Eb = P1 + (0, R1) \\ Ee = P2 + (0, R2) \end{cases}$$

b. Compute the intersection of line EbEe and X(X+Eb)

$$r_1 = \frac{Det\begin{bmatrix} Eb \\ Eb - X \end{bmatrix}}{Det\begin{bmatrix} Ee - Eb \\ Eb \end{bmatrix}} \quad (29)$$

$$X1 = Eb + r_1(Ee - Eb) \quad (30)$$

c. Compute the ratio r2

$$r_2 = \frac{LengthOf(X1, X2)}{LengthOf(X1, X)} = \frac{Det\begin{bmatrix} P2 - P1 \\ X1 \end{bmatrix}}{Det\begin{bmatrix} X - X1 \\ P2 - P1 \end{bmatrix}} \quad (31)$$

d. One has $$\frac{LengthOf(X1, X2)}{LengthOf(X2, X)} = \frac{LengthOf(Eb, P1)}{LengthOf(P1, Y)} = \frac{r}{1 - r} \quad (32)$$

Therefore:

$$Y = P1 + \frac{r - 1}{r}(Eb - P1) \quad (33)$$

e. Compute P1*x* as the projection of P1 onto XY.
f. Find the distance from P1*x* to Q:

$$d = \sqrt{R1^2 - LengthOf(P1x, P1)^2} \quad (34)$$

$$Q = P1x + \frac{d}{LengthOf(P1x, X)}(X - P1x) \quad (35)$$

g. Compute s as the intersection of the line P1P2 and the Vector QP1 applied at X Aspects of the present invention have been described in terms of preferred and exemplary embodiments thereof. Numerous other embodiments, modifications and variations within the scope and spirit of the appended claims will occur to persons of ordinary skill in the art from a review of this disclosure.

The Appendix referenced above follows.

APPENDIX

The following appendix relates Application Programming Interfaces that may be used in one or more of the following areas:
- Receiving and handling ink
- Ink and rendering
- Receiving and displaying ink
- Rendering and hit-testing ink The following are illustrative examples of how APIs may be used in a tree-based presentation system as described in the accompanying specification.

APIs for receiving and handling ink may include the following.

Common Stylus APIs

| Inheritance Hierarchy |
|---|
| Object<br>- UIContextObject<br>    - DependencyObject<br>        - ContentElement<br>            - FrameworkContentElement<br>Object<br>- UIContextObject<br>    - DependencyObject<br>        - Visual<br>            - OnDemandVisual<br>                - UIElement<br>                      - FrameworkElement |

Both UIElement and ContentElement implement IInputElement.

Common Stylus APIs

| Inheritance Hierarchy |
|---|
| Object<br>- UIContextObject<br>    - DependencyObject<br>        - ContentElement<br>            - FrameworkContentElement<br>Object<br>- UIContextObject<br>    - DependencyObject<br>        - Visual<br>            - OnDemandVisual<br>                - UIElement<br>                      - FrameworkElement |

Both UIElement and ContentElement implement IInputElement.

Unless otherwise stated, all static members are safe for use by multiple threads, and all instance members are not thread safe.

| IInputElement ( System.Windows , PresentationCore.dll ) |
|---|
| public interface IInputElement |

This is the interface which defines common events and properties on UIElement and ContentElement.

Note the implementation:

```
public interface IFrameworkInputElement : IInputElement
public class UIElement : OnDemandVisual, IInputElement,
ICommandTarget, IAnimatable
public class FrameworkElement : UIElement, IFrameworkInputElement,
IInputElement, ISupportInitialize
public class ContentElement : DependencyObject, IInputElement,
IAnimatable
``` public event StylusEventHandler PreviewStylusInRange
    Behavior—Just as mouse button down is routed although it is a global device state change, inrange/outofrange is being positioned as a routed event. If developers are interested in subscribing to global inrange/outofrange notifications, they can listen at the root element. If they are interested in subscribing to element local inrange/outofrange, then can listen at the local element.

public event StylusEventHandler StylusInRange
    Behavior—Just as mouse button down is routed although it is a global device state change, inrange/outofrange is being positioned as a routed event. If developers are interested in subscribing to global inrange/outofrange notifications, they can listen at the root element. If they are interested in subscribing to element local inrange/outofrange, then can listen at the local element.

public event StylusEventHandler PreviewStylusOutOfRange
    Behavior—Just as mouse button down is routed although it is a global device state change, inrange/outofrange is being positioned as a routed event. If developers are interested in subscribing to global inrange/outofrange notifications, they can listen at the root element. If they are interested in subscribing to element local inrange/outofrange, then can listen at the local element.

public event StylusEventHandler StylusOutOfRange
    Behavior—Just as mouse button down is routed although it is a global device state change, inrange/outofrange is being positioned as a routed event. If developers are interested in subscribing to global inrange/outofrange notifications, they can listen at the root element. If they are interested in subscribing to element local inrange/outofrange, then can listen at the local element.

public event StylusEventHandler StylusEnter;
    Behavior—Fires when IsStylusDirectlyOver property changes to true. Raised on application context.

public event StylusEventHandler StylusLeave;
    Behavior—Fires when IsStylusDirectlyOver property changes to false. Raised on application context.

public event StylusEventHandler PreviewStylusUp
    Behavior—Preview event that gets fired prior to StylusUp. StylusUp can occur via physical stylus up, or mouse left/right button up. Raised on application context.

public event StylusEventHandler StylusUp
    Behavior—Event that gets fired via physical stylus up, or mouse left/right button up. Raised on application context.

public event StylusDownEventHandler PreviewStylusDown
    Behavior—Preview event that gets fired prior to StylusDown. StylusDown can occur via physical stylus down, or mouse left/right button down. Raised on application context.

public event StylusDownEventHandler StylusDown
    Behavior—Event that gets fired via physical stylus down, or mouse left/right button down. Raised on application context.

public event StylusEventHandler PreviewStylusMove
  Behavior—This event fires even if there is no movement by the Stylus. This is because the Move semantic used in Presentation input is closest to the original NewPacket or InAirPacket semantic. This specific event gets fired prior to StylusMove. Raised on application context.
public event StylusEventHandler StylusMove
  Behavior—This event fires even if there is no movement by the Stylus. This is because the Move semantic used in Presentation input is closest to the original NewPacket or InAirPacket semantic. Raised on application context.
public event StylusSystemGestureEventHandler PreviewStylusSystemGesture
  Behavior—Preview event that gets fired prior to StylusSystemGesture. Raised on application context.
public event StylusSystemGestureEventHandler StylusSystemGesture
  Behavior—Event that gets fired to indicate system gestures. Raised on application context.
public event StylusButtonEventHandler PreviewStylusButtonDown
  Behavior—Preview event that gets fired prior to StylusButtonDown. StylusButtonDown can occur via physical stylus button down (including the tip), or mouse left/right button down. Raised on application context.
  Just as mouse button down is routed although it is a global device state change, inrange/outofrange is being positioned as a routed event. If developers are interested in subscribing to global inrange/outofrange notifications, they can listen at the root element. If they are interested in subscribing to element local inrange/outofrange, then can listen at the local element.
public event StylusButtonEventHandler StylusButtonDown
  Behavior—Event that gets fired via physical stylus button down, or mouse left/right button down. Raised on application context.
  Just as mouse button down is routed although it is a global device state change, inrange/outofrange is being positioned as a routed event. If developers are interested in subscribing to global inrange/outofrange notifications, they can listen at the root element. If they are interested in subscribing to element local inrange/outofrange, then can listen at the local element.
public event StylusButtonEventHandler PreviewStylusButtonUp
  Behavior—Preview event that gets fired prior to StylusButtonUp. StylusButtonUp can occur via physical stylus button up (including the tip), or mouse left/right button up. Raised on application context.
  Just as mouse button down is routed although it is a global device state change, inrange/outofrange is being positioned as a routed event. If developers are interested in subscribing to global inrange/outofrange notifications, they can listen at the root element. If they are interested in subscribing to element local inrange/outofrange, then can listen at the local element.
public event StylusButtonEventHandler StylusButtonUp
  Behavior—Event that gets fired via physical stylus button up, or mouse left/right button up. Raised on application context.
  Just as mouse button down is routed although it is a global device state change, inrange/outofrange is being positioned as a routed event. If developers are interested in subscribing to global inrange/outofrange notifications, they can listen at the root element. If they are interested in subscribing to element local inrange/outofrange, then can listen at the local element.
public event StylusEventHandler GotStylusCapture
  Behavior—Event that gets fired when capture is set. Raised on application context.
public event StylusEventHandler LostStylusCapture
  Behavior—Event that gets fired when capture is cleared. Raised on application context.
public bool CaptureStylus( )
  Behavior—Method that sets capture. Designed to be called from application context.
  Returns—'true' if capture successful, 'false' if capture fails.
  Event—GotStylusCapture
  Exceptions—No Exceptions
public void ReleaseStylusCapture( )
  Behavior—Method that clears capture. Designed to be called from application context.
  Event—LostStylusCapture
  Exceptions—No Exceptions
public bool IsStylusCaptured { get; }
  Behavior—Property which returns the current capture state. Designed to be called from application context.
  Event—No Events
  Exceptions—No Exceptions
public bool IsStylusOver { get; }
  Behavior—This is a reverse tree lookup which gets positive results if any of it's child element has IsStylusDirectlyOver. Designed to be called from application context.
  Event—No Events
  Exceptions—No Exceptions
public bool IsStylusDirectlyOver { get; }
  Behavior—This requires the stylus to be immediately over the element. Designed to be called from application context.
  Event—No Events
  Exceptions—No Exceptions

| UIElement ( System.Windows, PresentationCore.dll ) |
| --- |
| Public class UIElement : OnDemandVisual, IInputElement, ICommandTarget, IAnimatable |

Same as on IInputElement
  public event StylusEventHandler PreviewStylusInRange
  public event StylusEventHandler StylusInRange
  public event StylusEventHandler PreviewStylusOutOfRange
  public event StylusEventHandler StylusOutOfRange
  Public event StylusEventHandler StylusEnter
  Public event StylusEventHandler StylusLeave
  public event StylusEventHandler PreviewStylusUp
  public event StylusEventHandler StylusUp
  Public event StylusDownEventHandler PreviewStylusDown
  Public event StylusDownEventHandler StylusDown
  public event StylusEventHandler PreviewStylusMove
  public event StylusEventHandler StylusMove
  public event StylusSystemGestureEventHandler PreviewStylusSystemGesture
  public event StylusSystemGestureEventHandler StylusSystemGesture
  public event StylusButtonEventHandler PreviewStylusButtonDown public event StylusButtonEventHandler StylusButtonDown
public event StylusButtonEventHandler PreviewStylusButtonUp
public event StylusButtonEventHandler StylusButtonUp
public event StylusEventHandler GotStylusCapture
public event StylusEventHandler LostStylusCapture
public bool CaptureStylus( );
public void ReleaseStylusCapture( );
public bool IsStylusCaptured { get; }
public bool IsStylusOver { get; }
public bool IsStylusDirectlyOver { get; }
public event DPCEventHandler IsStylusDirectlyoverChanged;
public event DPCEventHandler IsStylusCapturedChanged;
protected virtual void OnStylusPreviewStylusInRange(StylusEventArgs e)
  Events—No events
  Exceptions
    ArgumentNullException MSG1 "Null is not allowed as the value", if the arguments are null
protected virtual void OnStylusInRange(StylusEventArgs e)
  Events—No events
  Exceptions
    ArgumentNullException MSG1 "Null is not allowed as the value", if the arguments are null
protected virtual void OnPreviewStylusOutOfRange(StylusEventArgs e)
  Events—No events
  Exceptions
    ArgumentNullException MSG1 "Null is not allowed as the value", if the arguments are null
protected virtual void OnStylusOutOfRange(StylusEventArgs e)
  Events—No events
  Exceptions
    ArgumentNullException MSG1 "Null is not allowed as the value", if the arguments are null
protected virtual void OnStylusEnter(StylusEventArgs e)
  Behavior—Fires when IsStylusOver property changes. Designed to be called on application context.
  Events—No events
  Exceptions
    ArgumentNullException MSG1 "Null is not allowed as the value", if the arguments are null
protected virtual void OnStylusLeave(StylusEventArgs e)
  Behavior—Fires when IsStylusOver property changes. Designed to be called on application context.
  Events—No events
  Exceptions
    ArgumentNullException MSG1 "Null is not allowed as the value", if the arguments are null
protected virtual void OnPreviewStylusUp(StylusEventArgs e)
  Events—No events
  Exceptions
    ArgumentNullException MSG1 "Null is not allowed as the value", if the arguments are null
protected virtual void OnStylusUp(StylusEventArgs e)
  Events—No events
  Exceptions
    ArgumentNullException MSG1 "Null is not allowed as the value", if the arguments are null
protected virtual void OnPreviewStylusDown(StylusDownEventArgs e)
  Events—No events
  Exceptions
    ArgumentNullException MSG1 "Null is not allowed as the value", if the arguments are null
protected virtual void OnStylusDown(StylusDownEventArgs e)
  Events—No events
  Exceptions
    ArgumentNullException MSG1 "Null is not allowed as the value", if the arguments are null
protected virtual void OnPreviewStylusMove(StylusEventArgs e)
  Events—No events
  Exceptions
    ArgumentNullException MSG1 "Null is not allowed as the value", if the arguments are null
protected virtual void OnStylusMove(StylusEventArgs e)
  Events—No events
  Exceptions
    ArgumentNullException MSG1 "Null is not allowed as the value", if the arguments are null
protected virtual void OnPreviewStylusSystemGesture (StylusSystemGestureEventArgs e)
  Events—No events
  Exceptions
    ArgumentNullException MSG1 "Null is not allowed as the value", if the arguments are null
protected virtual void OnStylusSystemGesture(StylusSystemGestureEventArgs e)
  Events—No events
  Exceptions
    ArgumentNullException MSG1 "Null is not allowed as the value", if the arguments are null
protected virtual void OnPreviewStylusButtonDown(StylusButtonEventArgs e)
  Events—No events
  Exceptions
    ArgumentNullException MSG1 "Null is not allowed as the value", if the arguments are null
protected virtual void OnStylusButtonDown(StylusButtonEventArgs e)
  Events—No events
  Exceptions
    ArgumentNullException MSG1 "Null is not allowed as the value", if the arguments are null
protected virtual void OnPreviewStylusButtonUp(StylusButtonEventArgs e)
  Events—No events
  Exceptions
    ArgumentNullException MSG1 "Null is not allowed as the value", if the arguments are null
protected virtual void OnStylusButtonUp(StylusButtonEventArgs e)
  Events—No events
  Exceptions
    ArgumentNullException MSG1 "Null is not allowed as the value", if the arguments are null
protected virtual void OnGotStylusCapture(StylusEventArgs e)
  Events—No events
  Exceptions
    ArgumentNullException MSG1 "Null is not allowed as the value", if the arguments are null protected virtual void OnLostStylusCapture(StylusEventArgs e)
Events—No events
Exceptions
ArgumentNullException MSG1 "Null is not allowed as the value", if the arguments are null
protected virtual void OnIsStylusCapturedChanged (DPCEventArgs e)
Events—No events
Exceptions
ArgumentNullException MSG1 "Null is not allowed as the value", if the arguments are null
protected virtual void OnIsStylusDirectlyoverChanged (DPCEventArgs e)
Events—No events
Exceptions
ArgumentNullException MSG1 "Null is not allowed as the value", if the arguments are null
protected virtual void OnActivePointingDeviceChanged (DPCEventArgs e)
Events—No events
Exceptions
ArgumentNullException MSG1 "Null is not allowed as the value", if the arguments are null
public static readonly DependencyProperty IsStylusDirectlyOverProperty
public static readonly DependencyProperty IsStylusCapturedProperty;
public static readonly DependencyProperty ActivePointingDeviceProperty;
protected StylusPluginCollection StylusPlugins { get; }
Behavior—Returns a reference to the collection of stylus plugins—derived classes use this to add custom plugins (eg: DynamicRenderer). Designed to be accessed on application context.

| ContentElement ( System.Windows, PresentationCore.dll ) |
| --- |
| Public class ContentElement : DependencyObject, IInputElement, IAnimatable |

Same as UIElement, less StylusPlugins.

| Stylus ( System.Windows.Input, PresentationCore.dll ) |
| --- |
| public static class Stylus |

Stylus is the equivalent to RealTimeStylus in XP SP2, although the difference lies in that Stylus is static whereas RealTimeStylus was not. Therefore, the Stylus APIs are designed explicitly w\ scope information (which element it applies to) in mind. The static pattern is modeled after how mouse and keyboard is designed in Presentation input.
public static void Enable( );
Behavior—Hooks up PenIMC/WispTis interop plumbing, allows stylus events to fire. Accessible on both the real time context and application context.
Events—No events
Exceptions—No exceptions
public static void Synchronize( );
Behavior—This is intended to synchronize the applications' understanding of where the stylus is when layout changes but the stylus didn't actually move. Accessible on both the real time context and application context.
Events—No events
Exceptions—No exceptions
public static IInputElement Captured { get; }
Behavior—Returns the element which currently has capture. Accessible on both the real time context and application context. The IInputElement that is acquired here is not accessible on the real time context though, since the IInputElement instance is owned by the application context.
Events—No events
Exceptions—No exceptions
public static bool Capture(IInputElement e);
Behavior—This should internally be working against Mouse.Capture and keep it always in sync. If e is null, turns off capture. Accessible on both the real time context and application context.
Events—Raises the following:
GotStylusCapture on the new IInputElement
LostStylusCapture on the previous IInputElement
IsStylusOverChanged on the both previous and new IInputElement
StylusEnter on the new IInputElement
StylusLeave on the previous IInputElement
Exceptions
InvalidOperationException MSG27 "IInputElement must be a UIElement or ContentElement", if the inputelement is not a UIElement or Contentelement
public static bool Capture(IInputElement e, CaptureMode captureMode);
Behavior—This should internally be working against Mouse.Capture and keep it always in sync. If e is null, turns off capture. Accessible on both the real time context and application context.
Events—Raises the following:
GotStylusCapture on the new IInputElement
LostStylusCapture on the previous IInputElement
IsStylusOverChanged on the both previous and new IInputElement
StylusEnter on the new IInputElement
StylusLeave on the previous IInputElement
Exceptions
InvalidOperationException MSG27 "IInputElement must be a UIElement or ContentElement", if the inputelement is not a UIElement or Contentelement
public static StylusDevice CurrentStylusDevice { get; }
Behavior—Returns the last stylus device which last provided input. Accessible on both the real time context and application context.
Events—No events
Exceptions—No exceptions
public static IInputElement DirectlyOver { get; }
Behavior—Returns the element which the physical stylus is directly over. Accessible on both the real time context and application context.
Events—No events
Exceptions—No exceptions
public static DP ActiveStylusDeviceType { get; }
Behavior—Indicates the type of pointing device last used: Mouse, Stylus, Touch, or None. Designed to be called from application context.
Event—No Events
Exceptions—No Exceptions
public static StylusDeviceType GetActiveStylusDeviceType (DependencyObject d);

```
public static void SetActiveStylusDeviceType(Dependency-
    Object d, StylusDeviceType deviceType);
public static readonly DP IsPressAndHoldEnabledProperty;
    Behavior—Defines DP to specify whether P&H is enabled
        on an element or not. Accessible on both the real time
        context and application context.
    Events—No events
    Exceptions—No exceptions
public static bool GetIsPressAndHoldEnabled(Dependency-
    Object d);
    Behavior—Returns whether P&H is enabled on the argu-
        ment. Accessible on both the real time context and appli-
        cation context.
    Events—No events
    Exceptions—No exceptions
public static void SetIsPressAndHoldEnabled(Dependency-
    Object d, bool enabled);
    Behavior—Sets whether P&H is enabled on the argument.
        Accessible on both the real time context and application
        context.
    Events—No events
    Exceptions—No exceptions
public static readonly DP IsFlicksEnabledProperty;
    Behavior—Defines DP to specify whether flicks is enabled
        on an element or not. Accessible on both the real time
        context and application context.
    Events—No events
    Exceptions—No exceptions
public static bool GetIsFlicksEnabled(DependencyObject d);
    Behavior—Returns whether flicks is enabled on the argu-
        ment. Accessible on both the real time context and appli-
        cation context.
    Events—No events
    Exceptions—No exceptions
public static void SetIsFlicksEnabled(DependencyObject d,
    bool enabled);
    Behavior—Sets whether flicks is enabled on the argument.
        Accessible on both the real time context and application
        context.
    Events—No events
    Exceptions—No exceptions
public static readonly RoutedEventId GotStylusCapture
    EventId;
public static readonly RoutedEventId LostStylusCapture
    EventId;
public static readonly RoutedEventId PreviewStylusInRange
    EventId;
public static readonly RoutedEventId StylusInRangeEvent
    Id;
public static readonly RoutedEventId PreviewStylusOutOf-
    RangeEventId;
public static readonly RoutedEventId StylusOutOfRange
    EventId;
public static readonly RoutedEventId PreviewStylusButton-
    DownEventId;
public static readonly RoutedEventId StylusButtonDown-
    EventId;
public static readonly RoutedEventId PreviewStylusBut-
    tonUpEventId;
public static readonly RoutedEventId StylusButtonUpEvent
    Id;
public static readonly RoutedEventId PreviewStylusDown-
    EventId;
public static readonly RoutedEventId StylusDownEventId;
public static readonly RoutedEventId PreviewStylus-
    MoveEventId;
public static readonly RoutedEventId StylusMoveEventId;
public static readonly RoutedEventId PreviewStylusUpE-
    ventId;
public static readonly RoutedEventId StylusUpEventId;
public static readonly RoutedEventId PreviewStylusSys-
    temGestureEventId;
public static readonly RoutedEventId StylusSystemGesture
    EventId;
public static readonly RoutedEventId PreviewStylusButton-
    DownEventId;
public static readonly RoutedEventId StylusButtonDown-
    EventId;
public static readonly RoutedEventId PreviewStylusBut-
    tonUpEventId;
public static readonly RoutedEventId StylusButtonUpEvent
    Id;
public static readonly RoutedEventId StylusEnterEventId;
public static readonly RoutedEventId StylusLeaveEventId;
```

| StylusPoint ( System.Windows.Input, PresentationCore.dll ) |
| --- |
| public struct StylusPoint : IEquatable<StylusPoint> |

The class formerly known as StylusPackets has been refactored into StylusPoint (this struct) and StylusPointCollection (an implementation of IList<StylusPoint>).

```
public StylusPoint(double x, double y);
    Behavior—Initializes a StylusPoint struct with specified X
        and Y values, in Presentation coordinate system.
    Exceptions—ArgumentOutOfRangeException if X or Y
        are < > MinXYValue,MaxXYValue. These limits are in
        place to ensure consistent round-trip serialization with
        classic (WIC) platform.
public StylusPoint(double x, double y, float pressureFactor);
    Behavior—Initializes a StylusPoint struct with specified X
        and Y values in Presentation coordinate system, and
        pressure factor [0,1].
    Exceptions—ArgumentOutOfRangeException if X or Y
        are < > MinXYValue,MaxXYValue. These limits are in
        place to ensure consistent round-trip serialization with
        classic (WIC) platform.
public StylusPoint(double x, double y, float pressureFactor,
    StylusPointDescription description, int[ ] additionalVal-
    ues);
    Behavior—Initializes a StylusPoint struct with specified X
        and Y values in Presentation coordinate system, pressure
        factor [0.1], and additional packet fields/values.
    Exceptions—ArgumentOutOfRangeException if X or Y
        are < > MinXYValue,MaxXYValue. These limits are in
        place to ensure consistent round-trip serialization with
        classic (WIC) platform.
public StylusPoint(double x, double y, StylusPointDescrip-
    tion description, int[ ] additionalValues);
    Behavior—Initializes a StylusPoint struct with specified X
        and Y values in Presentation coordinate system, addi-
        tional packet fields/values, but no pressure field.
    Exceptions—ArgumentOutOfRangeException if X or Y
        are < > MinXYValue,MaxXYValue. These limits are in
        place to ensure consistent round-trip serialization with
        classic (WIC) platform.
public override int GetHashCode( );
    Overridden.
public override bool Equals(object other);
    Overridden.
public bool Equals(StylusPoint other);
```

Implements IEquatable<StylusPoint>.
public static bool Equals(StylusPoint a, StylusPoint b);
   Behavior—Compares two stylus points—X, Y, pressure, and additional fields are considered.
   Exceptions—No exceptions
public static bool operator==(StylusPoint a, StylusPoint b);
   Behavior—Compares two stylus points—X, Y, pressure, and additional fields are considered.
   Exceptions—No exceptions
public static bool operator!=(StylusPoint a, StylusPoint b);
   Behavior—Compares two stylus points—X, Y, pressure, and additional fields are considered.
   Exceptions—No exceptions
public static explicit operator Point(StylusPoint stylusPoint);
   Behavior—Returns a Point representing the X,Y values of this stylus point.
   Exceptions—No exceptions
public double X { get; set; }
   Behavior—Gets or sets the X coordinate, in Presentation logical-pixel space.
   Exceptions—ArgumentOutOfRangeException if set argument is>MaxXYValue or<MinXYValue.
public double Y { get; set; }
   Behavior—Gets or sets the Y coordinate, in Presentation logical-pixel space.
   Exceptions—ArgumentOutOfRangeException if set argument is>MaxXYValue or<MinXYValue.
public float PressureFactor { get; set; }
   Behavior—Gets or sets the pressure value, scaled to the range [0,1] according to the min/max limits reported by the StylusPointPropertyInfo in the associated StylusPointDescription. Note, values are clipped to the range [0,1], even if digitizer hardware misreports its maximum (eg: reports max=255 but returns 256).
   Exceptions—ArgumentOutOfRangeException if set argument is outside the range [0,1].
public bool HasProperty(StylusPointProperty property);

Returns a value indicating whether the specified property is included in the StylusPointDescription.
public int GetPropertyValue(StylusPointProperty property);

Returns the raw 32-bit integer value of the specified property, if present in the StylusPointDescription—else, throws ArgumentException.
public void SetPropertyValue(StylusPointProperty property, int value);

Sets the raw 32-bit integer value of the specified property, if present in the StylusPointDescription—else, throws ArgumentException.
public StylusPointDescription Description { get; }

Returns a reference to the associated StylusPointDescription.
public static readonly double MaxXYValue Represents the largest possible X or Y coordinat value that can be represented by a 32-bit HiMetric integer, for ISF serialization and compatibility with classic platform . . . something on the order of 13 miles to the right (or below) the origin.
public static readonly double MinXYValue Represents the largest possible X or Y coordinat value that can be represented by a 32-bit HiMetric integer, for ISF serialization and compatibility with classic platform . . . something on the order of 13 miles to the left (or above) the origin.

| StylusPointCollection ( System.Windows.Input, PresentationCore.dll ) |
|---|
| public class StylusPointCollection : Collection<StylusPoint> |

The class formerly known as StylusPackets has been refactored into a list of StylusPoint structs.

Although the API signatures return and accept doubles, this class internally continues to store as int arrays and a matrix. If no matrix is set via internal APIs, an Presentation 96 DPI to himetric identity transform is set to increase the int array resolution.

These APIs originally took IInputElement in many places when retrieving data to adjust the coordinate system from root element relative to element relative, and to internally maintain the StylusPointCollection coordinate system to be root element relative. Recently we have realized that StylusPointCollection cannot always be root element relative due to the need of Stroke coordinates to be element relative (e.g. imagine cutting and pasting a stroke from one element to the other), and StylusPointCollection being exposed off of Stroke. Therefore, we are making the assumption that Stylus PointCollection is always element relative, and thus not require IInputElement arguments to be on the API. Stating this, input maintains root element relative throughout and only when StylusPointCollection is retrieved from the StylusEventArg will the coordinate system becomes element relative.
public StylusPointCollection( );
   Behavior—Constructs a new, empty StylusPointCollection instance capable of representing X, Y, and Pressure stylus point properties.
   Exceptions—No exceptions
public StylusPointCollection(int initialCapacity);
   Behavior—Constructs a new, empty StylusPointCollection instance capable of representing X, Y, and Pressure stylus point properties.
   Exceptions—ArgumentException if initialCapacity<0.
public StylusPointCollection(StylusPointDescription stylusPointDescription);
   Behavior—Constructs a StylusPointCollection instance, capable of representing packet data with the specified description. Primary usage scenario is to synthesize stylus input, and then to pass the synthesized StylusPointCollection for Stroke construction, etc. Accessible on both the real time context and application context.
   Exceptions
     ArgumentNullException MSG1 "Null is not allowed as the argument value", if any of the parameters are null
public StylusPointCollection(StylusPointDescription stylusPointDescription, int initialCapacity);
   Behavior—Constructs a StylusPointCollection instance, capable of representing packet data with the specified description. Primary usage scenario is to synthesize stylus input, and then to pass the synthesized StylusPointCollection for Stroke construction, etc. Accessible on both the real time context and application context.
   Exceptions
     ArgumentNullException MSG1 "Null is not allowed as the argument value", if any of the parameters are null
     ArgumentException if initialCapacity<0.
public StylusPointCollection (IEnumerable<StylusPoint> stylusPoints);

Behavior—Constructs a StylusPointCollection instance. Primary usage scenario is to queue stylus input coming from various events, and then to pass the queued StylusPointCollection to the Stroke constructor. Note the developer must be conscious to ensure integrity of the coordinate systems of the passed in StylusPointCollection. Accessible on both the real time context and application context.
Events—No events
Exceptions
 ArgumentNullException MSG1 "Null is not allowed as the argument value", if any of the parameters are null
 System.ArgumentException MSG2 "Empty arrays are not allowed as the argument value" if packets is empty
 System.ArgumentOufOfRangeException MSG15 "Values are out of range" if any of the stylusPoints values are outside the specified metric range in description
 System.ArgumentException MSG38 "Packet description of packets must be uniform" if the packet description on the StylusPointCollection are not the same
public StylusPointCollection(IEnumerable<Point> points);
 Behavior—Constructs the most simple StylusPointCollection instance capable of being used for Stroke creation. StylusPointDescription defaults to [X,Y,Pressure]. The min/max/resolution/units fields of the StylusPointPropertyInfo records are defaulted to MinInt/MaxInt/Zero/None. Accessible on both the real time context and application context.
 Events—No events
 Exceptions
  ArgumentNullException MSG1 "Null is not allowed as the argument value", if any of the parameters are null
  ArgumentException MSG2 "Empty arrays are not allowed as the argument value" if rawPackets is empty
  ArgumentOufOfRangeException MSG15"Values are out of range" if any of the rawPackets values are outside the specified metric range in description
public void Add(StylusPointCollection stylusPoints);
 Behavior—Appends points from the specified collection to this collection.
 Events—No events
 Exceptions—ArgumentNullException if null, ArgumentException if property descriptions incompatible.
public StylusPointDescription StylusPointDescription { get; }
 Behavior—Returns the packet description for the StylusPointCollection. Accessible on both the real time context and application context.
 Events—No events
 Exceptions—No exceptions
p protected override void ClearItems( );
 Overridden.
rotected override void InsertItem(int index, StylusPoint point);
 Overridden.
protected override void RemoveItem(int index);
 Overridden.
protected override void SetItem(int index, StylusPoint point);
 Overridden.
protected virtual void OnChanged( );
 Behavior—Fires the Changed event.
public void AddRange(StylusPointCollection stylusPoints);
 Behavior—Appends an existing collection of stylus points to this collection. Accessible on both the real time context and application context.
 Events—No events
 Exceptions
  ArgumentNullException MSG1 "Null is not allowed as the argument value", if any of the parameters are null
  ArgumentException MSG2 "Empty arrays are not allowed as the argument value" if rawPackets is empty
  ArgumentOufOfRangeException MSG15 "Values are out of range" if any of the rawPackets values are outside the specified metric range in description
public StylusPointCollection Clone( );

Returns a deep copy of the points in this collection, without modifying the packet description. See Reformat( ) method to return a copy of the points in the collection with a subset of the original packet description, or Transform( ) to return a copy of the points in a different coordinate system.
public StylusPointCollection Reformat(StylusPointDescription subsetToReformatTo);

Returns a copy of the points in this collection, modified to include only the properties in the specified packet description. This method is used to "thin out" unneeded or unwanted data from the packet stream, to lessen storage requirements.
 Behavior—Reformats the StylusPointCollection according to the packetdescription. Sequence for button integers, and their bit positions are re-layed out as well. Accessible on both the real time context and application context.
 Events—No events
 Exceptions
  ArgumentNullException MSG1 "Null is not allowed as the argument value", if any of the parameters are null
  ArgumentException MSG44 "StylusPacketValues specified in StylusPointDescription are not available" if packetDescription specifies a StylusPacketValue not in the StylusPointCollection instance where this method is being called on.
public int[ ] ToHiMetricArray( );

Returns a packet array of geometric point data (alternating sequence of X/Y values) in himetric coordinates, used by Ink Analysys runtime.
public event EventHandler Changed;

Indicates change, removal, or addition of stylus points.

| StylusPointDescription ( System.Windows.Input, PresentationCore.dll ) |
| --- |
| public class StylusPointDescription |

This is semantically a collection of StylusPointPropertyInfo, which represents the Guid, Min, Max, Resolution, and Units of a StylusPointProperty. We do not expose it as a formal collection though, since there are many utility methods on this class for usability purposes. There are 2 usage patterns, namely (i) as a container to pass on device capabilities through the Presentation input system, and (ii) as an object by which developers can specify packet layout.
3.2.7.2 public StylusPointDescription( );

Default constructor—gives [X,Y,NormalPressure].
public StylusPointDescription(IEnumerable <StylusPointProperty> properties);
 Behavior—This is a convenience constructor optimized for scenario (ii) usage. Note min/max/resolution/units are defaulted to MinInt/MaxInt/1/None. Accessible on both the real time context and application context. Null/empty arrays allow instantiation of empty StylusPointDescriptions.
Events—No events
Exceptions—ArgumentException if properties does not begin with X,Y, and NormalPressure.
public StylusPointDescription (IEnumerable<StylusPointPropertyInfo> propertyInfo);
Behavior—This is a constructor optimized for scenario (i) usage. The typical scenario where this constructor would be used is to synthesize StylusPointCollection. Accessible on both the real time context and application context. Null/empty arrays allow instantiation of empty StylusPointDescriptions.
Events—No events
Exceptions—ArgumentException if properties does not begin with X,Y, and NormalPressure.
public static bool AreCompatible(StylusPointDescription lhs, StylusPointDescription rhs);
Behavior—Determines if two SPD instances represent a compatible set of properties.
Events—No events
Exceptions
ArgumentNullException MSG1 "Null is not allowed as the argument value", if any of the parameters are null
public static StylusPointDescription GetIntersectingDescriptions
(StylusPointDescription lhs,
StylusPointDescription rhs);
Behavior—Convenience method which returns a SPD representing the common subset (intersection) of two SPDs. Accessible on both the real time context and application context.
Events—No events
Exceptions
ArgumentNullException MSG1 "Null is not allowed as the argument value", if any of the parameters are null
public ReadOnlyCollection<StylusPointProperty> Properties { get; }
Behavior—Returns an array of StylusPointProperty objects or StylusPointPropertyInfo objects, depending on which constructor was used to initialize this SPD. Accessible on both the real time context and application context.
Events—No events
Exceptions—No exceptions
public bool HasProperty(StylusPointProperty property);

Returns a value indicating the presence or absence of the specified property.
public bool HasPropertyInfo(StylusPointProperty property);

Returns a value indicating the presence or absence of property info (min/max/res/etc) for the specified property.
public bool IsSusbsetOf (StylusPointDescription stylusPointDescriptionSuperset);

Returns a value indicating whether this SPD is a subset of the specified SPD.
public StylusPointPropertyInfo GetPropertyInfo(StylusPointProperty property);
Behavior—Returns the property info (min/max/res/etc) for this SPD. Accessible on both the real time context and application context.
Events—No events
Exceptions
ArgumentNullException MSG1 "Null is not allowed as the argument value", if any of the parameters are null
InvalidArgumentException MSG5 "Invalid identifier", if metrics for the value is not in the packet description
System.ArgumentException MSG46 "Invalid GUID specified" if button guids are passed as values

| StylusPointProperty ( System.Windows.Input, PresentationCore.dll ) |
|---|
| public class StylusPointProperty |

This class represents a stylus point property. In essence, it's little more than a strongly typed wrapper around Guid, which StylusPointPropertyInfo can derive from.
public StylusPointProperty(Guid id, bool is Button);
Behavior—Creates a StylusPointProperty representing the packet property or button with the specified GUID. Accessible on both the real time context and application context.
Exceptions
System.ArgumentException MSG46 "Invalid GUID specified" if button guids are passed as property guid, or vice versa.
protected StylusPointProperty(StylusPointProperty spp);
Behavior—Copy ctor used by derived class.
Exceptions
System.ArgumentException MSG46 "Invalid GUID specified" if button guids are passed as property guid, or vice versa.
public Guid Id { get; }
Behavior—Accessible on both the real time context and application context.
public bool IsButton { get; }
Behavior—Accessible on both the real time context and application context.

| StylusPointPropertyInfo ( System.Windows.Input, PresentationCore.dll ) |
|---|
| public class StylusPointPropertyInfo : StylusPointProperty |

This class extends StylusPointProperty to specify metrics (min, max, resolution, etc) on the packet descriptions.
public StylusPointPropertyInfo(StylusPointProperty id);
Behavior—Creates a StylusPointPropertyInfo object representing the default metrics of a StylusPointProperty. Accessible on both the real time context and application context.
Exceptions—No exceptions.
public StylusPointPropertyInfo(StylusPointProperty id, bool is Button, int minimum, int maximum, StylusPointPropertyUnit unit, float resolution);
Behavior—Creates a StylusPointPropertyInfo object representing the metrics of a StylusPointProperty. Accessible on both the real time context and application context.
Exceptions
ArgumentException MSG10 "Maximum must be larger than minimum", if maximum<minimum
System.ArgumentException MSG46 "Invalid GUID specified" if button guids are passed as property guid, or vice versa
public int Minimum { get; }
Behavior—Accessible on both the real time context and application context.

```
public int Maximum { get; }
    Behavior—Accessible on both the real time context and
        application context.
public StylusPointPropertyUnit Unit { get; }
    Behavior—Accessible on both the real time context and
        application context.
public float Resolution { get; }
    Behavior—Accessible on both the real time context and
        application context.
```

| StylusPointPropertyUnit Enum ( System.Windows.Input, PresentationCore.dll ) |
|---|
| public enum StylusPointPropertyUnit<br>{<br>    None = 0,<br>    Inches = 1,<br>    Centimeters = 2,<br>    Degrees = 3,<br>    Radians = 4,<br>    Seconds = 5,<br>    Pounds = 6,<br>    Grams = 7<br>} |

| StylusPointProperties ( System.Windows.Input, PresentationCore.dll ) |
|---|
| public static StylusPointProperties |

```
public static readonly StylusPointProperty X;
public static readonly StylusPointProperty Y;
public static readonly StylusPointProperty NormalPressure;
public static readonly StylusPointProperty PacketStatus;
public static readonly StylusPointProperty TimerTick;
public static readonly StylusPointProperty XTiltOrientation;
public static readonly StylusPointProperty YTiltOrientation;
public static readonly StylusPointProperty AltitudeOrienta-
    tion;
public static readonly StylusPointProperty AzimuthOrienta-
    tion;
public static readonly StylusPointProperty ButtonPressure;
public static readonly StylusPointProperty PitchRotation;
public static readonly StylusPointProperty RollRotation;
public static readonly StylusPointProperty SerialNumber;
public static readonly StylusPointProperty TangentPressure;
public static readonly StylusPointProperty TwistOrientation;
public static readonly StylusPointProperty YawRotation;
public static readonly StylusPointProperty Z;
public static readonly StylusPointProperty TipButton;
    Behavior—Value should be 0x39143d3, 0x78cb, 0x449c,
        {0xa8, 0xe7, 0x67, 0xd1, 0x88, 0x64, 0xc3, 0x32 }
public static readonly StylusPointProperty SecondaryTip-
    Button;
    Behavior—Value should be 0x67743782, 0xee5, 0x419a,
        {0xa1, 0x2b, 0x27, 0x3a, 0x9e, 0xc0, 0x8f, 0x3d }
public static readonly StylusPointProperty BarrelButton;
    Behavior—Value should be 0xf0720328, 0x663b, 0x418f,
        {0x85, 0xa6, 0x95, 0x31, 0xae, 0x3e, 0xcd, 0xfa }
```

| GestureRecognizer ( System.Windows.Ink, PresentationCore.dll ) |
|---|
| Public class GestureRecognizer : DependencyObject, IDisposable |

Phased delivery plan:

In LH, expose non-integrated gesture recognition building block component that works based off strokes and hold developers accountable for stitching strokes events and this component together. In BlackComb, expose integrated gesture recognition into the packet stream (e.g. LS RTS GestureRecognizer)

The current POR is to do an incremental approach, namely provide synchronized gesture recognition first.

```
Public GestureRecognizer( );
    Behavior—Instantiates a gesture recognizer instance.
    Events—No events
    Exceptions—No exceptions
Public GestureRecognizer
    (IEnumerable<ApplicationGesture> enabledApplication-
    Gestures);
    Behavior—Instantiates a gesture recognizer instance,
        while specifying enabled application gestures.
    Events—No events
    Exceptions
        ArgumentNullException MSG1 "Null is not allowed as
            the argument value", if any of the parameters are null
        System.ArgumentException MSG2 "Empty arrays are
            not allowed as the argument value" if the array is
            empty
Public bool RecognizerAvailable { get; }
    Behavior—Returns back whether the necessary compo-
        nents for gesture recognition are on the user system.
    Events—No events
    Exceptions—No exceptions
Public void SetEnabledGesture
    (IEnumerable<ApplicationGesture> applicationGes-
    tures);
    Behavior—Duplicate gesture entries are coerced silently
        (no exception if there is a duplicate). Accessible on both
        the real time context and application context.
    Events—No events
    Exceptions
        ArgumentNullException MSG1 "Null is not allowed as
            the argument value" if enabledApplicationGestures is
            null
        System.ArgumentException MSG2 "Empty arrays are
            not allowed as the argument value" if the array is
            empty
        ArgumentException MSG43 "AllGesture cannot be
            specified with other gestures" if AllGesture is speci-
            fied with some other gesture simultaneously
Public ReadOnlyCollection<ApplicationGesture> GetEna-
    bledGestures( );
    Behavior—Returns the currently enabled gestures. Acces-
        sible on both the real time context and application con-
        text.
    Events—No events
    Exceptions—No exceptions
Public ReadOnlyCollection<GestureRecognitionResult>
    Recognize(StrokeCollection strokes);
    Behavior—Returns recognition results. Results should be
        in order of confidence (high confidence=>low confi-
        dence). Only results that include all passed in strokes are
        returned.
    Return—Empty array when there are no gesture recogni-
        tion results
    Events—No events
    Exceptions
        ArgumentNullException MSG1 "Null is not allowed as
            the argument value" if stroke is null
```

InvalidArgumentException MSG42 "Maximum number of strokes is 2" if strokes has more than 2 strokes in it
InvalidOperationException MSG49 "Required components are not installed"—when mshwgst.dll is not on the user's system
Public void Dispose( );

---
GestureRecognitionResult ( System.Windows.Ink, PresentationCore.dll )
---
Public sealed class GestureRecognitionResult
--- public RecognitionConfidence RecognitionConfidence { get; }
    Behavior—Confidence of this result. Accessible on both the real time context and application context.
    Events—No events
    Exceptions—No exceptions
public ApplicationGesture ApplicationGesture { get; }
    Behavior—Id of the SystemGesture that occurred. Accessible on both the real time context and application context.
    Events—No events
    Exceptions—No exceptions ---
ApplicationGesture Enum ( System.Windows.Ink, PresentationCore.dll )
---
Public enum ApplicationGesture
{
    AllGestures = 0,
    ArrowDown = 61497,
    ArrowLeft = 61498,
    ArrowRight = 61499,
    ArrowUp = 61496,
    Check = 61445,
    ChevronDown = 61489,
    ChevronLeft = 61490,
    ChevronRight = 61491,
    ChevronUp = 61488,
    Circle = 61472,
    Curlicue = 61456,
    DoubleCircle = 61473,
    DoubleCurlicue = 61457,
    DoubleTap = 61681,
    Down = 61529,
    DownLeft = 61546,
    DownLeftLong = 61542,
    DownRight = 61547,
    DownRightLong = 61543,
    DownUp = 61537,
    Exclamation = 61604,
    Left = 61530,
    LeftDown = 61549,
    LeftRight = 61538,
    LeftUp = 61548,
    NoGesture = 61440,
    Right = 61531,
    RightDown = 61551,
    RightLeft = 61539,
    RightUp = 61550,
    Scratchout = 61441,
    SemiCircleLeft = 61480,
    SemiCircleRight = 61481,
    Square = 61443,
    Star = 61444,
    Tap = 61680,
    Triangle = 61442,
    Up = 61528,
    UpDown = 61536,
    UpLeft = 61544,
    UpLeftLong = 61540,
    UpRight = 61545,
    UpRightLong = 61541
}

---
RecognitionConfidence Enum (System.Windows.Ink, PresentationCore.dll )
---
Public enum RecognitionConfidence
{
    Intermediate = 1,
    Poor = 2,
    Strong = 0
}
---

EventHandlers & EventArgs

---
StylusEventHandler ( System.Windows.Input, PresentationCore.dll )
---
public delegate void StylusEventHandler (object sender, StylusEventArgs args);
---

---
StylusEventArgs ( System.Windows.Input, PresentationCore.dll )
---
public sealed class StylusEventArgs : InputEventArgs
---
Event argument used to subscribe to StylusEnter/Move/Leave/Down/Up events. The only information required to be passed by this argument is which button had the state change.

public StylusEventArgs(StylsuDevice stylus, int timestamp);

Initializes a new instance of StylusEventArgs, for the specified StylusDevice and timestamp.
public Point GetPosition(IInputElement relativeTo);
    Behavior—Retrieves the current position. Note when there are multiple packets in StylusPointCollection, the last point is returned. The coordinate is mapped to the relative position from the top left of the relativeTo element.
    Events—No events
    Exceptions—No exceptions
public StylusPointCollection GetStylusPoints (IInputElement relativeTo);
    Behavior—Returns a stylus packet that has it's X,Y coordinates mapped to the relativeTo element top left. Designed to be called from the application context. Setting relativeTo to null returns the X,Y coordinates based on the top left of the Presentation window.
    Events—No events
    Exceptions—No exceptions
public StylusPointCollection GetStylusPoints (IInputElement relativeTo, StylusPointDescription reformatTo);
    Behavior—Returns a stylus packet that has it's X,Y coordinates mapped to the relativeTo element top left. Designed to be called from the application context. Setting relativeTo to null returns the X,Y coordinates based on the top left of the Presentation window.
    Events—No events
    Exceptions—No exceptions
public StylusDevice StylusDevice { get; }
    Behavior—Returns the stylus device where the event originated. Designed to be called from the application context.
    Events—No events
    Exceptions—No exceptions
protected override void InvokeEventHandler(Delegate genericHandler, object genericTarget);
    Overridden.
public bool InAir { get; }
    Behavior—Retrieves whether the stylus is inair.
    Events—No events Exceptions—No exceptions
public bool Inverted { get; }
　　Behavior—Retrieves whether the stylus is inverted.
　　Events—No events
　　Exceptions—No exceptions

| StylusDownEventHandler ( System.Windows.Input, PresentationCore.dll ) |
|---|
| public delegate void StylusEventHandler (object sender, StylusEventArgs args); |

| StylusDownEventArgs ( System.Windows.Input, PresentationCore.dll ) |
|---|
| public sealed class StylusDownEventArgs : StylusEventArgs |

Event argument used to subscribe to StylusDown events. The only information required to be passed by this argument is which button had the state change.

public int Tap Count { get; }
　　Behavior—Designed to be called from the application context.
　　Events—No events
　　Exceptions—No exceptions

| StylusButtonEventHandler ( System.Windows.Input, PresentationCore.dll) |
|---|
| public delegate void StylusButtonEventHandler (object sender, StylusButtonEventArgs args); |

| StylusButtonEventArgs ( System.Windows.Input, PresentationCore.dll ) |
|---|
| public sealed class StylusButtonEventArgs : StylusEventArgs |

Event argument used to subscribe to StylusButtonDown/Up events. The only information required to be passed by this argument is which button had the state change.

public StylusButton StylusButton{ get; }
　　Behavior—Designed to be called from the application context.
　　Events—No events
　　Exceptions—No exceptions

| StylusSystemGestureEventHandler ( System.Windows.Input, PresentationCore.dll ) |
|---|
| public delegate void StylusSystemGestureEventHandler(object sender, StylusSystemGestureEventArgs e); |

| StylusSystemGestureEventArgs ( System.Windows.Input, PresentationCore.dll ) |
|---|
| public class StylusSystemGestureEventArgs : StylusEventArgs |

Event argument used to subscribe to system gesture events. The only information required to be passed by this argument is what system gesture was detected.

public System Gesture System Gesture { get; }
　　Behavior—Designed to be called from the application context.
　　Events—No events
　　Exceptions—No exceptions
protected override void InvokeEventHandler(Delegate genericHandler, object genericTarget);

| SystemGesture Enum ( System.Windows.Input, PresentationCore.dll ) |
|---|
| public enum SystemGesture<br>{<br>　　DoubleTap = 17,<br>　　Drag = 19,<br>　　HoldEnter = 21,<br>　　HoldLeave = 22,<br>　　HoverEnter = 23,<br>　　HoverLeave = 24,<br>　　None = 0,<br>　　// HoldEnter should serve for this purpose<br>　　RightDrag = 20,<br>　　RightTap = 18,<br>　　Tap = 16<br>} |

RealTimeStylus APIs

RealTimeStylus implies an extensible programming framework which provides an opportunity for developers to plug in their custom logic into the real time context (thread). This innovation was delivered as part of XP SP2 for .NET, and for COM in Longhorn. The Presentation Stylus is modeled after this, and is designed for scenario parity.

protected StylusPluginCollection UIElement::StylusPlugins( System.Windows)
　　Behavior—UIElement exposes a StylusPlugins property, which is a sequenced dictionary of StylusPlugin inheriting instances bound to elements.
　　Events—No events
　　Exceptions—No exceptions

| StylusPluginCollection ( System.Windows.Input.StylusPlugins, PresentationCore.dll ) |
|---|
| public class System.Windows.Ink.StylusPluginCollection : IList | public int Add(StylusPlugin plugin);
　　Behavior—Adds a plugin to the collection. Accessible from both the real time context and application context.
　　Events—No events
　　Exceptions—No exceptions
public void Clear( );
　　Behavior—Clears plugins from the collection. Accessible from both the real time context and application context.
　　Events—No events
　　Exceptions—No exceptions
public bool Contains(StylusPlugin plugin);
　　Behavior—Returns whether a plugin is in the collection. Accessible from both the real time context and application context.
　　Events—No events
　　Exceptions—No exceptions
public int IndexOf(StylusPlugin plugin);
　　Behavior—Returns the index of a plugin. Returns −1 if the plugin is not in the collection. Accessible from both the real time context and application context.
　　Events—No events
　　Exceptions—No exceptions
public void Insert(int index, StylusPlugin plugin);

Behavior—Inserts a plugin at a specific index in the collection. Accessible from both the real time context and application context.
Events—No events
Exceptions
ArgumentNullException MSG1 "Null is not allowed as the argument value", if any of the parameters are null
IndexOutOfRangeException MSG6 "Invalid index", if the index<0||index>collection.Count
public void Remove(StylusPlugin plugin);
Behavior—Removes a plugin from the collection. If the plugin is not in the collection, no-ops. Accessible from both the real time context and application context.
Events—No events
Exceptions
ArgumentNullException MSG1 "Null is not allowed as the argument value", if any of the parameters are null
public void RemoveAt(int index);
Behavior—Removes a plugin at a specific index. Accessible from both the real time context and application context.
Events—No events
Exceptions
IndexOutOfRangeException MSG6 "Invalid index", if the index<0||index>=collection.Count
public bool IsFixedSize { get; }
public bool IsReadOnly { get; }
StylusPlugin this [int index] { get; set; }
Behavior—Returns or sets a plugin at a specific index. Accessible from both the real time context and application context.
Events—No events
Exceptions
IndexOutOfRangeException MSG6 "Invalid index", if the index<0||index>=collection.Count
public int Count { get; }
Behavior—Returns the number of plugins in the collection. Accessible from both the real time context and application context.
Events—No events
Exceptions—No exceptions
public int IsSynchronized { get; }
public int SyncRoot { get; }
public void CopyTo(StylusPlugin[ ] array, int index)
Behavior—Copies the collection to the specified segment in the array.
Events—No events
Exceptions
ArgumentNullException MSG1 "Null is not allowed as the value", if the arguments are null
IndexOutOfRangeException MSG6 "Invalid index", if the index<0||index>=array.length
ArgumentException MSG7 "Insufficient length in the destination array", if index+current collection count is larger than the array length

| StylusPlugin ( System.Windows.Input.StylusPlugins, PresentationCore.dll ) |
| --- |
| public abstract class StylusPlugin : System.Object |

StylusPlugin is the base class from which developers should inherit should they want to implement a custom stylus plugin. All input is passed to the plugin via the OnRawStylusInput method.

protected StylusPlugin( );
Behavior—Base constructor.
Events—No events
Exceptions—No exceptions
protected virtual void OnAdded( );
Behavior—This method is called on the application context when the plugin is added to a StylusPluginCollection.
Events—No events
Exceptions—No exceptions
protected virtual void OnEnabledChanged( );
Behavior—Raised on the context wherever the property Enabled was set.
Events—No events
Exceptions—No exceptions
protected virtual void OnRemoved( );
Behavior—This method is called on the application context when the plugin is removed from a StylusPluginCollection.
Events—No events
Exceptions—No exceptions
protected virtual void OnStylusDown(RawStylusInput rawStylusInput);
Behavior—This API is invoked by Stylus from the real time context, and we ensure that args is a valid instance.
protected virtual void OnStylusDownProcessed(object callbackData, bool targetVerified);
Behavior—This method is used to execute custom logic sequenced in the packet stream on the application context.
There are 2 primary use cases for this in the platform;
To mark roll back states in the plugin internal state and use for transaction management between the raw stylus state and the application stylus state to cope w\ hittesting inaccuracies on the real time context.
As an application of (a) above, custom data is used to instruct the DynamicRenderer when to free it's cached visuals to represent wet ink (ink yet to be stored in the ink data on the application context).
Events—No events
Exceptions
ArgumentNullException MSG1 "Null is not allowed as the value", if the arguments are null
protected virtual void OnStylusEnter(RawStylusInput rawStylusInput, bool confirmed);
Behavior—This API is invoked by Stylus from the real time context, and we ensure that args is a valid instance.
protected virtual void OnStylusLeave(RawStylusInput rawStylusInput, bool confirmed);
Behavior—This API is invoked by Stylus from the real time context, and we ensure that args is a valid instance.
protected virtual void OnStylusMove(RawStylusInput rawStylusInput);
Behavior—This API is invoked by Stylus from the real time context, and we ensure that args is a valid instance.
protected virtual void OnStylusMoveProcessed(object callbackData, bool targetVerified);
Behavior—This method is used to execute custom logic sequenced in the packet stream on the application context.
There are 2 primary use cases for this in the platform;
To mark roll back states in the plugin internal state and use for transaction management between the raw stylus state and the application stylus state to cope w\ hittesting inaccuracies on the real time context.
As an application of (a) above, custom data is used to instruct the DynamicRenderer when to free it's cached visuals to represent wet ink (ink yet to be stored in the ink data on the application context).
Events—No events
Exceptions
ArgumentNullException MSG1 "Null is not allowed as the value", if the arguments are null
protected virtual void OnStylusUp(RawStylusInput rawStylusInput);
Behavior—This API is invoked by Stylus from the real time context, and we ensure that args is a valid instance.
protected virtual void OnStylusUpProcessed(object callbackData, bool targetVerified);
Behavior—This method is used to execute custom logic sequenced in the packet stream on the application context.
There are 2 primary use cases for this in the platform;
To mark roll back states in the plugin internal state and use for transaction management between the raw stylus state and the application stylus state to cope w\ hittesting inaccuracies on the real time context.
As an application of (a) above, custom data is used to instruct the DynamicRenderer when to free it's cached visuals to represent wet ink (ink yet to be stored in the ink data on the application context).
Events—No events
public UIElement Element { get; }
public bool Enabled { get; set; }
Behavior—Default false. Designed to be called from the application context.
Events—No events
Exceptions—No exceptions
public bool IsActiveForInput { get; }
protected virtual void OnIsActivateForInputChanged( );
public Rect Rect { get; }

| RawStylusInput ( System.Windows.Input.StylusPlugins, PresentationCore.dll ) |
| --- |
| Public class RawStylusInput |

RawStylusInput is the data container that goes through the stylus plugin chain. The coordinates of the data retrieved from RawStylusInput are element relative.
public void NotifyWhenProcessed(object callbackData);
Behavior—Registers for callback notification (via OnStylusXxxxProcessed methods).
Events—No events
Exceptions—No exceptions
public StylusPointCollection GetStylusPoints( );
Behavior—Returns the packets of the RawStylusInput.
Events—No events
public void SetStylusPoints(StylusPointCollection points);
Behavior—Sets the packets of the RawStylusInput.
Events—No events
Exceptions
ArgumentNullException MSG1 "Null is not allowed as the value", if the arguments are null
public int StylusDeviceId { get; }
public int TabletDeviceId { get; }
public int Timestamp { get; }
DynamicRenderer (System.Windows.Input.StylusPlugins, PresentationCore.dll)

The DynamicRenderer is a stylus plugin that ships in the platform. It's sole purpose is to render ink immediately after the stylus, and ensuring ink does not lag due to blockages in the application UI context (thread).
public DynamicRenderer( );
Behavior—Designed to be called from the application context.
Events—No events
Exceptions—No exceptions
protected Dispatcher GetDispatcher( );
Behavior—Returns a reference to the Dispatcher used by the real-time ink rendering thread.
protected void NotifyOnNextRenderComplete( );
Behavior—Registers a request to receive OnRenderComplete forwarded from rendering thread.
protected virtual void OnDraw(DrawingContext drawingContext, StylusPointCollection stylusPoints, PathGeometry path, Brush fillBrush);
Behavior—Derived classes can implement simple custom rendering by overriding this virtual method.
protected virtual void OnDrawingAttributesReplaced( );
Behavior—Notifies derived classes when DA has been replaced.
protected virtual void OnRenderComplete( );
Behavior—This method is called when rendering is complete—iff NotifyOnNextRenderComplete( ) was called.
public virtual void Reset(StylusDevice stylusDevice, StylusPointCollection stylusPoints);
public DrawingAttributes DrawingAttributes { get; set; }
Behavior—Accessible from both the real time context and the application context.
Events—No events
Exceptions
ArgumentNullException MSG1 "Null is not allowed as the value", if the arguments are null
public Visual RootVisual { get; }
Behavior—Accessible from both the real time context and the application context. The dynamic rendrer cannot be attached to multiple different visual trees, as this is restricted in System.Windows.Media.VisualCollection
Events—No events
Exceptions—No exceptions Hardware APIs

| StylusDevice ( System.Windows.Input, PresentationCore.dll ) |
| --- |
| Public sealed class StylusDevice : InputDevice | public void Synchronize( );
Behavior—This is intended to synchronize/update the applications' understanding of where the stylus is when layout changes when the stylus didn't actually move. Designed to be called from the application context.
Events—No events
Exceptions—No exceptions
public bool Capture(IInputElement element);
Behavior—If element is null, turns off capture. Designed to be called from the application context.
Events—No events
Exceptions
ArgumentNullException MSG1 "Null is not allowed as the value", if the arguments are null
InvalidOperationException MSG27 "IInputElement must be a UIElement or ContentElement", if the inputelement is not a UIElement or Contentelement

```
public bool Capture(IInputElement element, CaptureMode
    captureMode);
  Behavior—If element is null, turns off capture. Designed
    to be called from the application context.
  Events—No events
  Exceptions
    ArgumentNullException MSG1 "Null is not allowed as
      the value", if the arguments are null
    InvalidOperationException MSG27 "IInputElement
      must be a UIElement or ContentElement", if the
      inputelement is not a UIElement or Contentelement
public StylusPointCollection GetStylusPoints(IInputEle-
    ment relativeTo);
  Behavior—Returns points based on a X,Y coordinate sys-
    tem where the top left is that of the relativeTo element. If
    relativeTo is null, window root visual based value is
    returned. Designed to be called from the application
    context.
  Events—No events
  Exceptions
    InvalidOperationException MSG27 "IInputElement
      must be a UIElement or ContentElement", if the
      inputelement is not a UIElement or Contentelement
public StylusPointCollection GetStylusPoints(IInputEle-
    ment relativeTo, StylusPointDescription reformatTo);
  Behavior—Returns points based on a X,Y coordinate sys-
    tem where the top left is that of the relativeTo element. If
    relativeTo is null, window root visual based value is
    returned. Designed to be called from the application
    context.
  Events—No events
  Exceptions
    InvalidOperationException MSG27 "IInputElement
      must be a UIElement or ContentElement", if the
      inputelement is not a UIElement or Contentelement
public Point GetPosition(IInputElement relativeTo);
  Behavior—Returns points based on a X,Y coordinate sys-
    tem where the top left is that of the relativeTo element. If
    relativeTo is null, window root visual based value is
    returned. Designed to be called from the application
    context.
  Events—No events
  Exceptions
    InvalidOperationException MSG27 "IInputElement
      must be a UIElement or ContentElement", if the
      inputelement is not a UIElement or Contentelement
public override string ToString( );
public IInputElement Captured { get; }
  Behavior—Element where Stylus is captured. Designed to
    be called from the application context.
  Events—No events
  Exceptions—No exceptions
public IInputElement DirectlyOver { get; }
  Behavior—Element where Stylus is directly over.
    Designed to be called from the application context.
  Events—No events
  Exceptions—No exceptions
public int Id { get; }
  Behavior—The ID of the device. Designed to be called
    from the application context.
  Events—No events
  Exceptions—No exceptions
public bool InAir { get; }
  Behavior—Returns whether the stylus is in air. Designed to
    be called from the application context.
  Events—No events
  Exceptions—No exceptions
public bool InRange { get; }
  Behavior—Returns whether the stylus is in range.
    Designed to be called from the application context.
  Events—No events
  Exceptions—No exceptions
public bool Inverted { get; }
  Behavior—Returns whether the stylus is inverted.
    Designed to be called from the application context.
  Events—No events
  Exceptions—No exceptions
public string Name { get; }
  Behavior—Returns the name of the device. Designed to be
    called from the application context.
  Events—No events
  Exceptions—No exceptions
public StylusButtonCollection StylusButtons { get; }
  Behavior—Returns the buttons on the device. Designed to
    be called from the application context.
  Events—No events
  Exceptions—No exceptions
public TabletDevice TabletDevice { get; }
  Behavior—Returns the tablet device for the stylusdevice.
    Designed to be called from the application context.
  Events—No events
  Exceptions—No exceptions
public override IInputElement Target { get; }
  Behavior—Element where digitizer input is being sent to.
  Events—No events
  Exceptions—No exceptions
```

| StylusButton (Public class System.Windows.Input, PresentationCore.dll) |
| --- |
| Public class StylusButton |

```
public override string ToString( );
public Guid Guid { get; }
  Behavior—Returns the GUID for the button. Designed to
    be called from the application context.
  Events—No events
  Exceptions—No exceptions
public string Name { get; }
  Behavior—Returns the name for the button. Designed to
    be called from the application context.
  Events—No events
  Exceptions—No exceptions
public StylusButtonState StylusButtonState { get; }
  Behavior—Returns the state of the button. Designed to be
    called from the application context.
  Events—No events
  Exceptions—No exceptions
public StylusDevice StylusDevice { get; }
  Behavior—Returns the stylus device the button is on.
    Designed to be called from the application context.
  Events—No events
  Exceptions—No exceptions
```

| Tablet (System.Windows.Input, PresentationCore.dl ) |
| --- |
| Public static class Tablet | public static TabletDevice CurrentTabletDevice { get; }
  Behavior—Returns the last tablet device which last provided input. Accessible on both the real time context and application context.
  Events—No events
  Exceptions—No exceptions
public static TabletDeviceCollection TabletDevices { get; }
  Behavior—Returns the collection of Tablet devices. Designed to be called from the application context.
  Events—No events
  Exceptions—No exceptions

| StylusDeviceType Enum ( System.Windows.Input ) |
| --- |
| Public enum TabletDeviceType<br>{<br>    None = 0,<br>    Mouse = 1,<br>    Stylus = 2,<br>    Touch = 3,<br>} |

| TabletDevice ( System.Windows.Input ) |
| --- |
| Public sealed class TabletDevice : InputDevice | public StylusDeviceType Type { get; }
  Behavior—Returns the type of input device. Designed to be called from the application context.
  Events—No events
  Exceptions—No exceptions
public StylusPointDescription StylusPointDescription { get; }
  Behavior—Returns the packet description of packets being returned from this tablet. Designed to be called from the application context.
  Events—No events
  Exceptions—No exceptions
public override string ToString( );
public TabletHardwareCapabilities TabletHardwareCapabilities { get; }
  Behavior—Returns the hardware capabilities of the digitizer. Designed to be called from the application context.
  Events—No events
  Exceptions—No exceptions
public int Id { get; }
  Behavior—Returns the id of the TabletDevice. Designed to be called from the application context.
  Events—No events
  Exceptions—No exceptions
public string Name { get; }
  Behavior—Returns the name of the TabletDevice. Designed to be called from the application context.
  Events—No events
  Exceptions—No exceptions
public int ProductId { get; }
  Behavior—Returns the product id of the TabletDevice. Designed to be called from the application context.
  Events—No events
  Exceptions—No exceptions
    public StylusDeviceCollection StylusDevices { get; }
  Behavior—Returns the stylus devices associated with the TabletDevice. Designed to be called from the application context.
  Events—No events
  Exceptions—No exceptions
public override IInputElement Target { get; }
  Behavior—Returns the target of the TabletDevice. Designed to be called from the application context.
  Events—No events
  Exceptions—No exceptions

| TabletDeviceCollection ( System.Windows.Input ) |
| --- |
| public class TabletDeviceCollection : ICollection, IEnumerable | public void CopyTo(TabletDevice[ ] array, int index);
public int Count { get; }
public bool IsSynchronized { get; }
public TabletDevice this[int index] { get; }
public object SyncRoot { get; }

| StylusButtonState Enum ( System.Windows.Input ) |
| --- |
| Public enum StylusButtonState<br>{<br>    Up = 0,<br>    Down = 1<br>} |

| TabletHardwareCapabilities Enum ( System.Windows.Input ) |
| --- |
| public enum TabletHardwareCapabilities<br>{<br>    None = 0,<br>    Integrated = 1,<br>    StylusMustTouch = 2,<br>    HardProximity = 4,<br>    StylusHasPhysicalIds = 8<br>} |

APIs for ink and rendering may include the following.

Unless otherwise stated, all static members are safe for use by multiple threads, and all instance members are not thread safe.

Classes & Structs

| Stroke ( System.Windows.Ink, PresentationCore.dll ) |
| --- |
| Public class Stroke |

The Stroke object is the base data type of the Tablet PC platform. It encapsulates
  (i) packet data (array of integers and a transform to convert the coordinate system to Element space within Presentation)
  (ii) drawing attributes (defines how to render the packet data)

(iii) property data (store for meta data to be tagged onto the stroke)

public Stroke(StylusPointCollection stylusPoints);
    Behavior—Simple programmatic creation of strokes from points in element space—with default DA.
    Exceptions
        ArgumentNullException MSG1 "Null is not allowed as the value", if the arguments are null
        ArgumentException MSG2 "Empty arrays are not allowed as the argument value", if the array is empty public Stroke(StylusPointCollection stylusPoints, DrawingAttributes da);
    Behavior—Simple programmatic creation of strokes from points in element space, with specified DA.
    Exceptions
        ArgumentNullException MSG1 "Null is not allowed as the value", if either of the arguments are null
        ArgumentException MSG2 "Empty arrays are not allowed as the argument value", if the array is empty public DrawingAttributes DrawingAttributes { get; set; }
    Behavior—Stroke has context affinity, therefore this method can only be called from the UI context where the Stroke was instantiated.
    Eventing
        Set—Fires DrawingAtributesReplaced.
        Get and further modify values off of the returned DrawingAttribute—DrawingAttributesChanged fires
    Exceptions
        ArgumentNullException MSG1 "Null is not allowed as the value", if the arguments are null public StylusPointCollection StylusPoints { get; set; }
    Behavior—Stroke has context affinity, therefore this method can only be called from the UI context where the Stroke was instantiated.
    Eventing
        Set—Fires StylusPointsPacketsChanged.
    Exceptions
        ArgumentNullException MSG1 "Null is not allowed as the value", if the arguments are null public void AddPropertyData(Guid propertyDataId, object propertyData);
    Behavior—Adds or replaces meta data to the object this method hangs off of. Stroke has context affinity, therefore this method can only be called from the UI context where the Stroke was instantiated.
    Eventing—Raises PropertyDataChanged events
    Exceptions
        ArgumentNullException MSG1 "Null is not allowed as the arugment value", if the arguments are null
        ArgumentException MSG4 "Invalid value specified", if value is not one of the following

```
char
char[ ]
byte
byte[ ]
Int16
Int16[ ]
UInt16
UInt16[ ]
Int32
Int32[ ]
UInt32
UInt32[ ]
Int64
Int64[ ]
UInt64
UInt64[ ]
Single
Single[ ]
Double
Double[ ]
DateTime
DateTime[ ]
Boolean
Boolean[ ]
String
Decimal
Decimal[ ]
``` public virtual Stroke Clone( );
    Behavior—Conducts deep copy inclusive of values in property data (specifically the arrays in propertydata). Stroke has context affinity, therefore this method can only be called from the UI context where the Stroke was instantiated.
    Eventing—No events
    Exceptions—No exceptions public bool ContainsPropertyData(Guid propertyDataId);
    Behavior—Returns whether there is any meta data value for the specified identifier. Stroke has context affinity, therefore this method can only be called from the UI context where the Stroke was instantiated.
    Eventing—No events
    Exceptions—none.

public void Draw(DrawingContext context);
    Behavior—The draw method is a batch operation that uses the rendering methods exposed off of DrawingContext. The reason we are not putting a DrawStroke method on DrawingContext is because strokes are rendered using the more atomic DrawingContext methods. Stroke has context affinity, therefore this method can only be called from the UI context where the Stroke was instantiated.
    Eventing—No events
    Exceptions
        ArgumentNullException MSG1 "Null is not allowed as the value", if the arguments are null public void Draw(DrawingContext drawingContext, DrawingAttributes drawingAttributes);
    Behavior—This draw method uses the passing in drawing attribute to override that on the stroke—used primarily for rendering selected strokes as hollow, temporarily. Stroke has context affinity, therefore this method can only be called from the UI context where the Stroke was instantiated.
    Eventing—No events
    Exceptions
        ArgumentNullException MSG1 "Null is not allowed as the value", if the arguments are null public StylusPointCollection GetBezierStylusPoints( );
    Behavior—Returns points smoothed to fit bezier spline along the stroke, cusp to cusp. Stroke has context affinity, therefore this method can only be called from the UI context where the Stroke was instantiated.
    Eventing—No events
    Exceptions—No exceptions public virtual Rect GetBounds( );
    Behavior—Returns the bounding box of the stroke (accounting for DA width/height).
    Eventing—No events
    Exceptions—No exceptions public StrokeCollection GetClipResult(Point[ ] lassoPoints);

Behavior—Returns set of strokes that would be formed by clipping off portions of this stroke outside the specified lasso path (segment-based hit testing).
Eventing—No events
Exceptions
ArgumentNullException MSG1 "Null is not allowed as the argument value", if the arguments are null
ArgumentException MSG2 "Empty arrays are not allowed as the argument value", if the array is empty
public StrokeCollection GetClipResult(Rect rect);
Behavior—Same as GCR(Point[ ]), but with a rectangular "lasso".
Eventing—No events
Exceptions—No exceptions
public StrokeCollection GetEraseResult(Point[ ] lassoPoints);
Behavior—Returns set of strokes that would be formed by erasing portions of this stroke inside the specified lasso path (segment-based hit testing).
Eventing—No events
Exceptions
ArgumentNullException MSG1 "Null is not allowed as the arugment value", if the arguments are null
ArgumentException MSG2 "Empty arrays are not allowed as the argument value", if the array is empty
public StrokeCollection GetEraseResult(Rect rect);
Behavior—Same as GER(Point[ ]), but with a rectangular "lasso".
Eventing—No events
Exceptions—No exceptions
public StrokeCollection GetEraseResult(Point[ ] eraserPath, StylusShape eraserShape);
Behavior—Returns set of strokes that would be formed by cutting this stroke with the specified eraser shape moved through the specified path (contour-based hit testing).
Eventing—No events
Exceptions
ArgumentNullException MSG1 "Null is not allowed as the arugment value", if the arguments are null
ArgumentException MSG2 "Empty arrays are not allowed as the argument value", if the array is empty
public object GetPropertyData(Guid propertyDataId);
Behavior—Gets the meta data value (if it's there) from the object this method hangs off of Stroke has context affinity, therefore this method can only be called from the UI context where the Stroke was instantiated.
Eventing—No events
Exceptions—
ArgumentException MSG5 "Invalid identifier", if propertyDataId is not set on the object
public Guid[ ] GetPropertyDataIds( );
Behavior—Gets the meta data identifiers from the object this method hangs off of. If no meta data exists, an empty array is returned. Stroke has context affinity, therefore this method can only be called from the UI context where the Stroke was instantiated.
Eventing—No events
Exceptions—No exceptions
public bool HitTest(Point point);
Behavior—Returns 'true' if the specified point lies on the contour of the stroke.
public bool HitTest(Point point, double diameter);
Behavior—Returns 'true' if the specified point lies within specified diameter of the contour of the stroke.
public bool HitTest(Point[ ] lassoPoints, int percentage);
Behavior—Hit tests all segments within the lasso loops, returning 'true' if the contained percentage>=specified threshold. Stroke has context affinity, therefore this method can only be called from the UI context where the Stroke was instantiated. Conducts segment-based hit-testing.
Eventing—No events
Exceptions
ArgumentNullException MSG1 "Null is not allowed as the value", if the arguments are null
ArgumentException MSG2 "Empty arrays are not allowed as the argument value", if the array is empty
public bool HitTest(Rect rect, int percentage);
Behavior—Same as HitTest(Point[ ],int), wich a rectangular "lasso".
Eventing—No events
Exceptions—No exceptions
public bool HitTest(Point[ ] eraserPath, StylusShape eraserShape);
Behavior—Hit tests all segments within a contour generated w\ shape & path. Stroke has context affinity, therefore this method can only be called from the UI context where the Stroke was instantiated. Conducts contour based hittesting.
Eventing—No events fired
Exceptions
ArgumentNullException MSG1 "Null is not allowed as the value", if the arguments are null
ArgumentException MSG2 "Empty arrays are not allowed as the argument value", if the array is empty
public void RemovePropertyData(Guid propertyDataId);
Behavior—Removes meta data (if it's there) from the object this method hangs off of. Stroke has context affinity, therefore this method can only be called from the UI context where the Stroke was instantiated.
Eventing—Raises PropertyDataChanged events
Exceptions—
ArgumentException MSG5 "Invalid identifier", if propertyDataId is not set on the object
public virtual void Transform (Matrix transformMatrix, bool applyToStylusTip);
Behavior—Applies the specified transform the stylus points, and optionally the stylus tipo (sans translation compoment of transform).
Stroke has context affinity, therefore this method can only be called from the UI context where the Stroke was instantiated.
Eventing—Raises PacketsChanged event
Exceptions—Any exceptions raised from StylusPackets. Getpackets method
protected virtual void DrawCore(DrawingContext drawingContext, DrawingAttributes drawingAttributes);
Behavior—Allows derived classes to override default drawing of stroke. Stroke has context affinity, therefore this method can only be called from the UI context where the Stroke was instantiated.
protected PathGeometry GetPathGeometry(DrawingAttributes drawingAttributes);
Behavior—Allows derived classes access to default path geometry of stroke, which we have cached for efficiency's sake.
Stroke has context affinity, therefore this method can only be called from the UI context where the Stroke was instantiated.
protected virtual void OnDrawingAttributesChanged(PropertyDataChangedEventArgs e);
Behavior—Called when the drawingattribute values changes on the stroke
Eventing—No events Exceptions
   ArgumentNullException MSG1 "Null is not allowed as the value", if the arguments are null
protected virtual void OnDrawingAttributesReplaced(DrawingAttributesReplacedEventArgs e);
   Behavior—Called when the drawingattribute gets replaced on the stroke
   Eventing—No events
   Exceptions
      ArgumentNullException MSG1 "Null is not allowed as the value", if the arguments are null
protected virtual void OnInvalidated(EventArgs e);
   Behavior—Called when any visual aspect of the stroke has changed.
   Eventing—No events
   Exceptions
      ArgumentNullException MSG1 "Null is not allowed as the value", if the arguments are null
protected virtual void OnPropertyDataChanged(PropertyDataChangedEventArgs e);
   Behavior—Called when the propertydata changes on the stroke
   Eventing—No events
   Exceptions
      ArgumentNullException MSG1 "Null is not allowed as the value", if the arguments are null
protected virtual void OnStylusPointsChanged(EventArgs e);
   Behavior—Called when the styluspackets changes on the stroke
   Eventing—No events
   Exceptions
      ArgumentNullException MSG1 "Null is not allowed as the value", if the arguments are null
protected virtual void OnStylusPointsReplaced(StylusPointsReplacedEventArgs e);
   Behavior—Called when the styluspackets are replaced.
   Eventing—No events
   Exceptions
      ArgumentNullException MSG1 "Null is not allowed as the value", if the arguments are null
Events
public event PropertyDataChangedEventHandler DrawingAttributesChanged;
   Behavior—Note this event gets fired when the drawing attribute on the Stroke changes (e.g. color changes).
public event DrawingAttributesReplacedEventHandler DrawingAttributesReplaced;
   Behavior—Note this event gets fired when the drawing attribute on the Stroke gets replaced.
public event EventHandler Invalidated;
   Behavior—Note this event gets fired when any visual property of the stroke (size, thickness, color, etc) changes.
public event PropertyDataChangedEventHandler PropertyDataChanged;
   Behavior—Fires when property data is added or removed.
public event EventHandler StylusPointsChanged;
   Behavior—Fires when underlying stylus point data is modified.
public event StylusPointsReplacedEventHandler StylusPointsReplaced;
   Behavior—Fires when underlying stylus point data object is replaced.

| StrokeCollection ( System.Windows.Ink, PresentationCore.dll ) |
|---|
| Public class StrokeCollection : IList |

StrokeCollections represent the Ink class in the COM/Winform platform. It is the most commonly used class, as strokes by themselves do not have much use. It is when groups of strokes are created, that ink becomes meaningful. For this reason, the design team's belief is that this is the premiere class within the Tablet PC platform.

Note, StrokeCollection does not have context affinity—it can be used from any thread—however, it is not guaranteed thread safe: applications must provide their own locking.
public StrokeCollection( );
   Behavior—Constructs an empty collection instance to which one can add, reorder, and remove strokes
   Eventing—No events
   Exceptions—No exceptions
public StrokeCollection(System.IO.Stream isfData);
   Behavior—Deserializes a set of strokes from ISF back to memory.
   Eventing—No events
   Exceptions
      ArgumentNullException MSG1 "Null is not allowed as the value", if the arguments are null
      ArgumentException MSG39 "Invalid stream". If the array is ill formed
public int Count { get; }
   Implements ICollection.
public bool IsFixedSize { get; }
   Implements IList.
public bool IsReadOnly { get; }
   Implements IList.
public bool IsSynchronized { get; }
   Implements IList.
public Stroke this[int index] { get; set; }
   Implements IList.
public object SyncRoot { get; }
   Implements IList.
public intAdd(Stroke stroke);
   Behavior—Adds a stroke to the collection.
   Eventing—Raises one StrokesChanged
   Exceptions
      ArgumentNullException MSG1 "Null is not allowed as the value", if the arguments are null
      ArgumentException MSG16 "Duplciate strokes exist in the collection", if the stroke is already in the collection
public void Add(StrokeCollection strokes);
   Behavior—Adds strokes in a collection to the collection.
   Eventing—Raises one StrokesChanged
   Exceptions
      ArgumentNullException MSG1 "Null is not allowed as the value", if the arguments are null
      ArgumentException MSG16 "Duplciate strokes exist in the collection", if the stroke is already in the collection
public void AddPropertyData(GUID propertyDataId, object propertyData);
   Behavior—Adds or replaces meta data to the object this method hangs off of.
   Eventing—Raises PropertyDataChanged events Exceptions
  ArgumentNullException MSG1 "Null is not allowed as the arugment value", if the arguments are null
  ArgumentException MSG4 "Invalid value specified", if value is not one of the following

---

> char
> char[ ]
> byte
> byte[ ]
> Int16
> Int16[ ]
> UInt16
> UInt16[ ]
> Int32
> Int32[ ]
> UInt32
> UInt32[ ]
> Int64
> Int64[ ]
> UInt64
> UInt64[ ]
> Single
> Single[ ]
> Double
> Double[ ]
> DateTime
> DateTime[ ]
> Boolean
> Boolean[ ]
> String
> Decimal
> Decimal[ ]

--- public void Clear( );
  Behavior—When the stroke collection is empty, this still does not raise an exception and no-ops. Clears the collection.
  Eventing—Raises one StrokesChanged
  Exceptions—No exceptions
public void Clip(Rect rect);
  Behavior—Clips all strokes within the specified rect. Internally does StrokeCollection.Replace(Stroke, Stroke.Get ClipResult( Stroke.HitTest(rect)));. Conducts contour based hittesting, and then does a segment based editing operation.
  Eventing—Raises multiple StrokesChanged
  Exceptions
    ArgumentNullException MSG1 "Null is not allowed as the value", if the arguments are null
    ArgumentException MSG2 "Empty arrays are not allowed as the argument value", if the array is empty
public void Clip(Point[ ] lassoPoints);
  Behavior—Clips all strokes within the loops formed by the lasso points. Open lasso lines are closed by connecting the start point and end point. Internally does StrokeCollection.Replace(Stroke, Stroke.Clip( Stroke.GetClipResult( lassoPoints )));. Conducts contour based hittesting, and then does a segment based editing operation.
  Eventing—Raises multiple StrokesChanged
  Exceptions
    ArgumentNullException MSG1 "Null is not allowed as the value", if the arguments are null
    ArgumentException MSG2 "Empty arrays are not allowed as the argument value", if the array is empty
public virtual StrokeCollection Clone( );
  Behavior—Conducts a deep copy of the StrokeCollection (both stroke data and ext properties).
  Eventing—No events
  Exceptions—No exceptions
public bool Contains(Stroke stroke);
  Behavior—Returns whether a stroke is already in the collection.
  Eventing—No events
  Exceptions
    ArgumentNullException MSG1 "Null is not allowed as the value", if the arguments are null
public bool ContainsPropertyData(Guid propertyDataId);
  Behavior—Returns whether there is any meta data value for the specified identifier.
  Eventing—No events
  Exceptions—none.
public void CopyTo(Stroke[ ] array, int index)
  Implements ICollection.
public void Draw(DrawingContext context);
  Behavior—Internally does Stroke.Draw.
  Eventing—No events
  Exceptions
    ArgumentNullException MSG1 "Null is not allowed as the value", if the arguments are null
public void Erase(Point[ ] lassoPoints);
  Behavior—Erases all strokes within the loops formed by the lasso points. Open lasso lines are closed by connecting the start point and end point. Internally does StrokeCollection.Replace(Stroke, Stroke.GetEraseResult( lassoPoints)));. Conducts contour based hittesting, and then does a segment based editing operation.
  Eventing—Raises multiple StrokesChanged
  Exceptions
    ArgumentNullException MSG1 "Null is not allowed as the value", if the arguments are null
    ArgumentException MSG2 "Empty arrays are not allowed as the argument value", if the array is empty
public void Erase(Rect rect);
  Behavior—Same as Erase(Point[ ]) but with a rectangular "lasso". Internally does StrokeCollection.Replace (Stroke, Stroke. GetEraseResult( Stroke. GetEraseResult (rect)));. Conducts contour based hittesting, and then does a segment based editing operation.
  Eventing—Raises multiple StrokesChanged
  Exceptions
    ArgumentNullException MSG1 "Null is not allowed as the value", if the arguments are null
    ArgumentException MSG2 "Empty arrays are not allowed as the argument value", if the array is empty
public void Erase(Point[ ] eraserPath, StylusShape erasingShape);
  Behavior—Erases the contour that gets generated by moving the erasingShape along the path specified by the point array. Internally does StrokeCollection.Replace (Stroke, Stroke.Erase(Stroke.GetEraseResult (path, shape)));. Conducts contour based hittesting, and then does a segment based editing operation. Eventing—Raises multiple StrokesChanged
  Exceptions
    ArgumentNullException MSG1 "Null is not allowed as the value", if the arguments are null
    ArgumentException MSG2 "Empty arrays are not allowed as the argument value", if the array is empty
public Rect GetBounds( );
  Behavior—Does for each on Stroke.GetBounds and returns the union bounding box. Conducts contour based hittesting.
  Eventing—No events
  Exceptions—No exceptions
public StrokeCollection.StrokeCollectionEnumerator GetEnumerator( )
  Implements IEnumerable.

public IncrementalLassoHitTester GetIncrementalLassoHitTester(int percentage);
  Behavior—Instantiates an incremental lasso hit tester, for the specified containment threshold.
  Eventing—No events
  Exceptions
    ArgumentException MSG11 "Values are out of range", if percentIntersect>100 or percentIntersect<0
public IncrementalStrokeHitTester GetincrementalStrokeHitTester(StylusShape eraserShape);
  Behavior—Instantiates an incremental hit tester for point-erase operations.
  Eventing—No events
  Exceptions
    ArgumentNullException MSG1 "Null is not allowed as the value", if the arguments are null
public object GetPropertyData(Guid propertyDataId);
  Behavior—Gets the meta data value (if it's there) from the object this method hangs off of
  Eventing—No events
  Exceptions—
    ArgumentException MSG5 "Invalid identifier", if propertyDataId is not set on the object
public Guid[ ] GetPropertyDataIds( );
  Behavior—Gets the meta data identifiers from the object this method hangs off of. If no meta data exists, an empty array is returned.
  Eventing—No events
  Exceptions—No exceptions
public StrokeCollection HitTest(Point point);
  Behavior—Hit tests all strokes within a point, and returns a StrokeCollection for these strokes. Internally does Stroke.HitTest(Point, 1pxlRectShape). Conducts contour based hittesting.
  Return—Hiftest results should be ordered in the return StrokeCollection respecting z-order relationships. The z-order highest should be at the beginning of the stroke collection.
  Eventing—No events
  Exceptions
    ArgumentNullException MSG1 "Null is not allowed as the value", if the arguments are null
public StrokeCollection HitTest(Rect rect, int percentage);
  Behavior—Same as HitTest(Point[ ],int) but with a rectangular "lasso".
public StrokeCollection HitTest(Point[ ] lassoPoints, int percentage);
  Behavior—Hit tests all strokes which have more than the specified percentage of segment length within the lasso loops, and returns a StrokeCollection for these strokes. Internally does Stroke.HitTest(Point[ ] lassopoints) to calculate segment length. Conducts contour based hittesting and then calculates inclusiong percentage using segment based.
  Return—Hittest results should be ordered in the return StrokeCollection respecting z-order relationships. The z-order highest should be at the beginning of the stroke collection.
  Eventing—No events
  Exceptions
    ArgumentNullException MSG 1 "Null is not allowed as the value", if the arguments are null
    ArgumentException MSG2 "Empty arrays are not allowed as the argument value", if the array is empty
    ArgumentException MSG11 "Values are out of range", if percentIntersect>100 or percentIntersect<0
public StrokeCollection HitTest(Point point, double diameter);
  Behavior—Hit tests all strokes within a diameter from the point, and returns a StrokeCollection for these strokes. Internally does Stroke.HitTest(Point, diameterCircleShape). Conducts contour based hittesting.
  Return—Hittest results should be ordered in the return StrokeCollection respecting z-order relationships. The z-order highest should be at the beginning of the stroke collection.
  Eventing—No events
  Exceptions
    ArgumentNullException MSG1 "Null is not allowed as the value", if the arguments are null
    ArgumentException MSG11 "Values are out of range", if diameter is negative
public StrokeCollection HitTest(Point[ ] eraserPath, StylusShape eraserShape);
  Behavior—Returns set of strokes hit by the eraser path. Conducts contour based hittesting.
public int IndexOf(Stroke stroke);
  Implements IList.
public void Insert(int index, Stroke stroke); Implements IList.
  Eventing—Raises one StrokesChanged
  Exceptions
    ArgumentNullException MSG 1 "Null is not allowed as the value", if the arguments are null
    IndexOutOfRangeException MSG6 "Invalid index", if the index<0||index>=collection count
    ArgumentException MSG 16 "Duplicate strokes exist in the collection", if the stroke is already in the StrokeCollection
protected virtual void OnPropertyDataChanged(PropertyDataChangedEventArgs e);
  Behavior—Called when the propertydata changes on the stroke collection
  Eventing—No events
  Exceptions
    ArgumentNullException MSG1 "Null is not allowed as the value", if the arguments are null
protected virtual void OnStrokesChanged(StrokeCollectionChangedEventArgs e);
  Behavior—Called when strokes are added or removed from the stroke collection
  Eventing—No events
  Exceptions
    ArgumentNullException MSG1 "Null is not allowed as the value", if the arguments are null
public void Remove(Stroke stroke);
  Implements IList.
public void Remove(StrokeCollection strokes);
  Behavior—Removes strokes from a collection.
  Eventing—Raises one StrokesChanged
  Exceptions
    ArgumentNullException MSG1 "Null is not allowed as the value", if the arguments are null
    ArgumentException MSG17 "Specified strokes are not in the collection", if the stroke is not in the collection
public void RemoveAt(int index);
  Implements IList.
public void RemovePropertyData(Guid propertyDataId);
  Behavior—Removes meta data (if it's there) from the object this method hangs off of.
  Eventing—Raises PropertyDataChanged events
  Exceptions—
    ArgumentException MSG5 "Invalid identifier", if propertyDataId is not set on the object

```
public void Replace(Stroke strokeToReplace, StrokeCollec-
    tion strokesToReplaceWith);
    Behavior—Replaces the specified stroke w\ a strokecollec-
        tion.
    Eventing—Raises one StrokesChanged
    Exceptions
        ArgumentNullException MSG 1 "Null is not allowed as
            the value", if the arguments are null
        ArgumentException MSG17 "Specified strokes are not
            in the collection", if the strokeToReplace is not in the
            StrokeCollection
        ArgumentException MSG 16 "Duplicate strokes exist in
            the collection", if any of the strokes in strokeToRe-
            placeWith is already in the StrokeCollection
        ArgumentException MSG20 "The stroke collections
            must not be empty", if strokesToReplaceWith is
            empty
public void Replace(StrokeCollection strokesToReplace,
    StrokeCollection strokesToReplaceWith);
    Behavior—Replaces the specified strokecollection w\
        another strokecollection.
    Eventing—Raises multiple StrokesChanged
    Exceptions
        ArgumentNullException MSG1 "Null is not allowed as
            the value", if the arguments are null
        ArgumentException MSG17 "Specified strokes are not
            in the collection", if the strokesToReplace is not in the
            StrokeCollection
        ArgumentException MSG 16 "Duplicate strokes exist in
            the collection", if any of the strokes in strokeToRe-
            placeWith is already in the StrokeCollection
        ArgumentException MSG18 "Strokes being replaced
            must be in consecutive sequence in the collection", if
            any of the strokes in strokeToReplace are not next to
            one another in the collection
        ArgumentException MSG20 "The stroke collections
            must not be empty", if strokesToReplace or
            strokesToReplaceWith is empty
public void Save(System.IO.Stream stream);
    Behavior—Saves a stroke collection into the specified
        stream, as binary ISF and default compression.
    Eventing—No events
    Exceptions—No exceptions
public void Save(System.IO.Stream stream, bool compress);
    Behavior—Saves a stroke collection into the specified
        stream, as binary ISF and optional compression.
    Eventing—No events
    Exceptions—No exceptions
public void Transform (Matrix transformMatrix, bool apply-
    ToStylusTip);
    Behavior—Applies the specified transform to each
        stroke's point data, and optionally stylus tips.
    Eventing—No events
    Exceptions—No exceptions
public event StrokeCollectionChangedEventHandler Strokes
    Changed;
    Behavior—This event occurs on the UI context where the
        StrokeCollection was instantiated, when strokes are
        added/removed. Value changes on the stroke does not
        trigger this event.
public event PropertyDataChangedEventHandler Property-
    DataChanged;
    Behavior—This event occurs on the UI context where the
        StrokeCollection was instantiated, when meta data is set
        or removed from the stroke collection.
public static readonly string InkSerializedFormat;
```

| DrawingAttributes ( System.Windows.Ink, PresentationCore.dll ) |
|---|
| Public class DrawingAttributes |

DrawingAttributes represent how a stroke is to be rendered.

| COM/WF Property | Presentation Property | Description |
|---|---|---|
| AntiAliased | N/A - always true | Gets or sets the value that indicates whether a stroke is antialiased. |
| Color | Color | Gets or sets the color of the ink that is drawn with this DrawingAttributes object. |
| ExtendedProperties | N/A - property data | Gets the collection of application-defined data. |
| FitToCurve | FitToCurve | Gets or sets the value that indicates whether Bezier smoothing is used to render ink. |
| Height | Height | Gets or sets the y-axis dimesion, or height, of the pen tip when drawing ink. |
| IgnorePressure | IgnorePressure | Gets or sets the value that indicates whether ink gets wider with increased pressure of the pen tip on the tablet surface. |
| PenTip | StylusTip | Gets or sets a value that indicates which pen tip to use when drawing ink that is associated with this DrawingAttributes object. |
| RasterOperation | IsHighlighter | Gets or sets a value that defines how the colors of the pen and background interact. IsHighlighter is not as rich as RasterOperation, but it is semantically equivalent for 99% scenarios. |
| Transparency | N/A - alpha channel of Color property | Gets or sets a value that indicates the transparency value of ink. |

-continued

| COM/WF Property | Presentation Property | Description |
|---|---|---|
| Width | Width | Gets or sets the y-axis dimension, or width, of the pen tip when drawing ink. |
| N/A - NEW! | StylusTipTransform | Gets or sets the transform to apply to the tip shape. | public DrawingAttributes( );
  Behavior—Constructs a new drawing attribute.

[Default construction]
Color = black
Width = 2.00
Height = 2.00
StylusTip = Ellipse
FirToCurve = false
IgnorePressure = false
IsHighlighter = false
StylusTipTransform = Identity Exceptions—No events
public Color Color { get; set; }
  Behavior—ARGB value for color.
  Eventing—Set fires AttributeChanged.
  Exceptions—no exceptions
public bool FitToCurve { get; set; }
  Behavior—Gets or sets a value indicating if curve-fitting is enabled.
  Eventing—Set fires AttributeChanged.
  Exceptions—no Exceptions
public double Height { get; set; }
  Behavior—Gets or sets a value indicating the height of the stylus tip.
  Eventing—Set fires AttributeChanged.
  Exceptions—ArgumentOutOfRange if set value is non-zero and outside the range [0.0000377952755905512, 162329.4614173230]. Zero value is interpreted as default height (2.0 pixels).
public bool IgnorePressure { get; set; }
  Behavior—Gets or sets a value indicating if pressure is ignored in rendering.
  Eventing—Set fires AttributeChanged.
  Exceptions—no exceptions
public bool IsHighlighter { get; set; }
  Behavior—Gets or sets a value indicating if the stroke is rendered as a highlighter.
  Eventing—Set fires AttributeChanged.
  Exceptions—no exceptions
public StylusTip StylusTip { get; set; }
  Behavior—Gets or sets the stylus tip description.
  Eventing—Set fires AttributeChanged.
  Exceptions—InvalidEnumArgumentException if set value is not Ellipse or Rectangle
public Matrix StylusTip Transform { get; set; }
  Behavior—Gets or sets the stylus tip transform.
  Eventing—Set fires AttributeChanged.
  Exceptions—ArgumentException if OffestX or OffsetY components are non-zero.
public double Width { get; set; }
  Behavior—Gets or sets a value indicating the width of the stylus tip.
  Eventing—Set fires AttributeChanged.
  Exceptions—ArgumentOutOfRange if set value is non-zero and outside the range [0.0000377952755905512, 162329.4614173230]. Zero value is interpreted as default width (2.0 pixels).
public void AddPropertyData(Guid propertyDataId, object propertyData);
  Behavior—Adds or replaces meta data to the object this method hangs off of. Stroke has context affinity, therefore this method can only be called from the UI context where the Stroke was instantiated.
  Eventing—Raises PropertyDataChanged events
  Exceptions
    ArgumentNullException MSG1 "Null is not allowed as the arugment value", if the arguments are null
    ArgumentException MSG4 "Invalid value specified", if value is not one of the following char
char[ ]
byte
byte[ ]
Int16
Int16[ ]
UInt16
UInt16[ ]
Int32
Int32[ ]
UInt32
UInt32[ ]
Int64
Int64[ ]
UInt64
UInt64[ ]
Single
Single[ ]
Double
Double[ ]
DateTime
DateTime[ ]
Boolean
Boolean[ ]
String
Decimal
Decimal[ ]

public virtual DrawingAttributes Clone( );
  Behavior—Conducts deep copy inclusive of values in property data (specifically the arrays in propertydata). Since DA has context affinity, this method can only be called from the UI context where instantiated.
  Events—No events
  Exceptions—No events
public bool ContainsPropertyData(Guid propertyDataId);
  Behavior—Returns whether there is any meta data value for the specified identifier. Stroke has context affinity, therefore this method can only be called from the UI context where the Stroke was instantiated.
  Eventing—No events
  Exceptions—none.
public override bool Equals (object o);

Behavior—Value-equality semantics. Since DA has context affinity, this method can only be called from the UI context where instantiated.
Eventing—No events
Exceptions—No exceptions
public override int GetHashCode( );
Overridden.
public object GetPropertyData(Guid propertyDataId);
Behavior—Gets the meta data value (if it's there) from the object this method hangs off of. Stroke has context affinity, therefore this method can only be called from the UI context where the Stroke was instantiated.
Eventing—No events
Exceptions—
ArgumentException MSG5 "Invalid identifier", if propertyDataId is not set on the object
public Guid[ ] GetPropertyDataIds( );
Behavior—Gets the meta data identifiers from the object this method hangs off of. If no meta data exists, an empty array is returned. Stroke has context affinity, therefore this method can only be called from the UI context where the Stroke was instantiated.
Eventing—No events
Exceptions—No exceptions
protected virtual void OnAttributeChanged(PropertyDataChangedEventArgs e);
Behavior—Gets called when an attribute on the drawing attribute changes.
Events—No events
Exceptions
ArgumentNullException MSG1 "Null s not allowed as the value", if the arguments are null
protected virtual void OnPropertyDataChanged(PropertyDataChangedEventArgs e);
Behavior—Gets called when a property on the drawing attribute changes.
Events—No events
Exceptions
ArgumentNullException MSG1 "Null s not allowed as the value", if the arguments are null
public static bool operator ==(DrawingAttributes first, DrawingAttributes second);
Behavior—Required to override equality
Eventing—No events
Exceptions—No exceptions
public static bool operator!=(DrawingAttributes first, DrawingAttributes second);
Behavior—Required to override equality
Eventing—No events
Exceptions—No exceptions
public void RemovePropertyData(Guid propertyDataId);
Behavior—Removes meta data (if it's there) from the object this method hangs off of. Stroke has context affinity, therefore this method can only be called from the UI context where the Stroke was instantiated.
Eventing—Raises PropertyDataChanged events
Exceptions—
ArgumentException MSG5 "Invalid identifier", if propertyDataId is not set on the object
public event PropertyDataChangedEventHandler AttributeChanged;
Behavior—This event is raised when an attribute on the drawing attribute changes. Since DA has context affinity, this event only occurs on the UI context where the instance was instantiated.
public event PropertyDataChangedEventHandler PropertyDataChanged;
Behavior—This event is raised when a property on the drawing attribute changes. Since DA has context affinity; this event only occurs on the UI context where the instance was instantiated.

---

StylusShape ( System.Windows.Ink, PresentationCore.dll )

Public abtract class StylusShape

---

The StylusShape is an object which represents the actual tip of the stylus. StylusTip above is used as a simplified representation of the underlying StylusShape class. The reason why StylusShape is not directly exposed on DrawingAttributes is because the use of this class raises the barrier to entry to use DrawingAttributes if done so.

The reason why StylusShape is still kept public although we're not using it in DrawingAttributes is because some of the hittesting APIs require StylusShape instances as arguments to indicate what stylus tip to be used in hittesting. The StylusShape is capable of representing 2 shapes, namely an ellipse and a polygon. Polygons can support up to 32 vertices.

public double Width { get; }
Behavior—Returns the width of the stylus shape (the width of the shape bounding box disregarding rotation). StylusShape has context affinity, therefore this property can only be called from the UI context where the StylusShape was instantiated.
Eventing—No events
Exceptions—No exceptions
public double Height { get; }
Behavior—Returns the height of the stylus shape (the height of the shape bounding box disregarding rotation). StylusShape has context affinity, therefore this property can only be called from the UI context where the StylusShape was instantiated.
Eventing—No events
Exceptions—No exceptions
public double Rotation { get; }
Behavior—Degrees of rotation of the stylus shape. StylusShape has context affinity, therefore this property can only be called from the UI context where the StylusShape was instantiated.
Eventing—No events
Exceptions—No exceptions
public Stylus Tip Tip{ get; }
Behavior—The shape of the tip. StylusShape has context affinity, therefore this property can only be called from the UI context where the StylusShape was instantiated.
Eventing—No events
Exceptions—No exceptions

---

EllipseStylusShape ( System.Windows.Ink, PresentationCore.dll )

Public sealed class EllipseStylusShape : StylusShape

--- public EllipseStylusShape(double width, double height, double rotation);
Behavior—Creates elliptical stylus shape. Rotation is in degrees, and there is no specific min/max Eventing—No events
Exceptions
    System.ArgumentOufOfRangeException MSG15 "Values are out of range" if value <Double.Epsilon*10 or is NAN public EllipseStylusShape(double width, double height, double rotation);
  Behavior—Creates elliptical stylus shape.
  Eventing—No events
  Exceptions
    System.ArgumentOufOfRangeException MSG15 "Values are out of range" if value<Double.Epsilon*10 or is NAN

| RectangleStylusShape ( System.Windows.Ink, PresentationCore.dll ) |
| --- |
| Public sealed class RectangleStylusShape : StylusShape | public RectangleStylusShape(double width, double height, double rotation);
  Behavior—Creates rectangular stylus shape. Rotation is in degrees, and there is no specific min/max
  Eventing—No events
  Exceptions
    System.ArgumentOufOfRangeException MSG15 "Values are out of range" if value<Double.Epsilon*10 or is NAN
public RectangleStylusShape (double width, double height, double rotation);
  Behavior—Creates rectangular stylus shape.
  Eventing—No events
  Exceptions
    System.ArgumentOufOfRangeException MSG15 "Values are out of range" if value<Double.Epsilon*10 or is NAN

| InkPresenter ( System.Windows.Controls, PresentationFramework.dll ) |
| --- |
| Public class InkPresenter : Decorator |

An element which binds to ink data.
public InkPresenter( );
  Behavior—Creates a new ink presenter
  Exceptions—No exceptions
public void Attach Visuals(Visual visual, DrawingAttributes drawingAttributes);
  Behavior—Attaches a visual to the presenter visual tree according the drawingattribute. InkPresenter has context affinity, therefore this method can be called from any UI context.
  Eventing—No events
  Exceptions
    ArgumentNullException MSG1 "Null is not allowed as the value", if the arguments are null
    ArgumentException ; Exception is raised by System.Windows.Media.VisualCollection if the specified visual is already in the visual tree elsewhere.
public void Detach Visuals(Visual visual);
  Behavior—Detaches a visual from the presenter visual tree. InkPresenter has context affinity, therefore this method can be called from any UI context.
  Eventing—No events
  Exceptions
    ArgumentNullException MSG1 "Null is not allowed as the value", if the arguments are null
    InvalidOperationException MSG37 "Specified visual cannot be detached", if the visual is not an instance which can be removed from the visual tree
public StrokeCollection Strokes { get; set; }
  Behavior—InkPresenter has context affinity, therefore this method can be called from any UI context. Default null.
  Eventing—No events
  Exceptions—No exceptions

| IncrementalHitTester ( System.Windows.Ink, PresentationCore.dll ) |
| --- |
| Public abstract class IncrementalHitTester |

The IncrementalHitTester is different from the hittesting APIs on StrokeCollection, in that they support incremental result updates.

The standard usage of the IncrementalHitTester is (i) instantiation from hittesting APIs on StrokeCollection, (ii) subscription to events, and (iii) appending of points.

The core scenario for the IncrementalHitTester is to be used for lasso selection and point erase—IHT is an abstract base class implemented by IncrementalLassoHitTester and IncrementalStrokeHitTester, below.
public bool Is Valid { get; }
  Behavior—Returns true if EndHitTesting has not been called yet. If called, returns false. Used for flow control scenarios.
  Eventing—No events
  Exceptions—No exceptions
public void AddPoint(Point point);
  Behavior—Feeds additional points to hittesting. IncrementalHitTester has context affinity, therefore this method can only be called from the UI context where the IncrementalHitTester was instantiated.
  Eventing
    StrokeIntersectionChanged, when instantiated by StrokeColleciton. GetIncrementalHitTester(Stylus Shape)
    StrokesHitChanged, when instantiated by StrokeColleciton.GetIncrementalHitTester(int)
  Exceptions
    InvalidOperationException MSG47 "EndHitTesting has already been called"
public void AddPoints(StylusPackets packets);
  Behavior—Feeds additional points to hittesting. IncrementalHitTester has context affinity, therefore this method can only be called from the UI context where the IncrementalHitTester was instantiated.
  Eventing
    StrokeIntersectionChanged, when instantiated by StrokeColleciton. GetIncrementalHitTester(Stylus Shape)
    StrokesHitChanged, when instantiated by StrokeColleciton.GetIncrementalHitTester(int)
  Exceptions
    ArgumentNullException MSG1 "Null is not allowed as the value", if the argument points is null
    InvalidOperationException MSG47 "EndHitTesting has already been called"

public void AddPoints(Point[ ] points);
- Behavior—Feeds additional points to hittesting. IncrementalHitTester has context affinity, therefore this method can only be called from the UI context where the IncrementalHitTester was instantiated.
- Eventing
  - StrokeIntersectionChanged, when instantiated by StrokeColleciton. GetIncrementalHitTester(StylusShape)
  - StrokesHitChanged, when instantiated by StrokeColleciton.GetIncrementalHitTester(int)
- Exceptions
  - ArgumentNullException MSG1 "Null is not allowed as the value", if the argument points is null
  - ArgumentException MSG2 "Empty arrays are not allowed as the argument value", if the array is empty
  - InvalidOperationException MSG47 "EndHitTesting has already been called"

public void EndHitTesting( );
- Behavior—Called to shut down incremental hittesting. This is required because IHT internally subscribes to the target StrokeCollection events and does not GCed unless unsubscribed.
- Eventing—No events
- Exceptions—No exceptions

| IncrementalLassoHitTester ( System.Windows.Ink, PresentationCore.dll ) |
|---|
| Public class IncrementalLassoHitTester : IncrementalHitTester | public event LassoSelectionChangedEventHandler SelectionChanged;
- Behavior—This event occurs on the UI context where the IncrementalHitTester was instantiated, when a stroke becomes enclosed by (or falls out of) the lasso path.

| IncrementalStrokeHitTester ( System.Windows.Ink, PresentationCore.dll ) |
|---|
| Public class IncrementalStrokeHitTester : IncrementalHitTester | public event StrokeHitEventHandler StrokeHit;
- Behavior—This event occurs on the UI context where the IncrementalHitTester was instantiated, when a stroke is intersected by the erasure path.

| StylusTip Enum ( System.Windows.Ink, PresentationCore.dll ) |
|---|
| The StylusTip enumeration is used in the DrawingAttributes to represent the tip of the stylus. This effects (i) how the contour (outline) of a stroke is rendered, as well as (ii) how the end points of a stroke look like. |
| Public enum StylusTip<br>{<br>    Ellipse = 1,<br>    Rectangle = 0<br>} |

| DrawingAttributeIds ( System.Windows.Ink, PresentationCore.dll ) |
|---|
| public static class DrawingAttributeIds<br>{<br>    public static readonly Guid Color;<br>    public static readonly Guid DrawingFlags;<br>    public static readonly Guid IsHighlighter;<br>    public static readonly Guid StylusWidth;<br>    public static readonly Guid StylusHeight;<br>    public static readonly Guid StylusTip;<br>    public static readonly Guid StylusTipTransform;<br>} |

EventHandlers & EventArgs

| PropertyDataChangedEventHandler ( System.Windows.Ink ) |
|---|
| Public delegate void PropertyDataChangedEventHandler(object sender, PropertyDataChangedEventArgs args); |

| PropertyDataChangedEventArgs ( System.Windows.Ink ) |
|---|
| Public class PropertyDataChangedEventArgs : EventArgs |

This event argument is used to provide what changed in property data or drawing attributes. The PreviousValue may be null in cases where new property data is added.

| public Guid PropertyGuid ( get; )<br>public object NewValue ( get; )<br>public object PreviousValue ( get; ) |
|---|

| StrokeCollectionChangedEventHandler (System.Windows.Ink ) |
|---|
| Public delegate void StrokeCollectionChangedEventHandler(object sender, StrokeCollectionChangedEventArgs args); |

| StrokeCollectionChangedEventArgs (System.Windows.Ink ) |
|---|
| Public class StrokeCollectionChangedEventArgs : EventArgs<br>{<br>    public StrokeCollectionChangedEventArgs(StrokeCollection added, StrokeCollection removed);<br>    // [Exceptions]<br>    // ArgumentNullException MSO1 "Null is not allowed as the value", if the arguments are null<br>    public StrokeCollection Added { get; }<br>    public StrokeCollection Removed { get; }<br>} |

| StrokeHitEventHandler ( System.Windows.Ink ) |
|---|
| Public delegate void StrokeHitEventHandler(object sender, StrokeHitEventArgs args); |

| StrokeHitEventArgs ( System.Windows.Ink ) |
|---|
| Public class StrokeHitEventArgs : EventArgs<br>{<br>    public Stroke HitStroke { get; }<br>    public StrokeCollection GetPointEraseResults( );<br>} |

| LassoSelectionChangedEventHandler ( System.Windows.Ink ) |
|---|
| Public delegate void LassoSelectionChangedEventHandler(object sender, LassoSelectionChangedEventArgs args); |

| LassoSelectionChangedEventArgs ( System.Windows.Ink ) |
|---|
| Public class LassoSelectionChangedEventArgs : EventArgs<br>{<br>    public StrokeCollection SelectedStrokes { get; }<br>    public StrokeCollection DeselectedStrokes { get; }<br>} |

| DrawingAttributesReplacedEventHandler ( System.Windows.Ink, PresentationCore.dll ) |
|---|
| public delegate void DrawingAttributesReplacedEventHandler(object sender, DrawingAttributesReplacedEventArgs e); |

| DrawingAttributesReplacedEventArgs ( System.Windows.Ink, PresentationCore.dll ) |
|---|
| public class DrawingAttributesReplacedEventArgs : EventArgs<br>{<br>    public DrawingAttributes NewDrawingAttributes { get; }<br>    public DrawingAttributes PreviousDrawingAttributes { get; }<br>} |

APIs for receiving and displaying ink may include the following.

API Design

Classes, Structs & Enums

| InkCanvasEditingMode (System.Windows.Controls, PresentationFramework.dll) |
|---|
| public enum InkCanvasEditingMode<br>{<br>    None = 0,<br>    Ink = 1,<br>    GestureOnly = 2,<br>    InkAndGesture = 3,<br>    Select = 4,<br>    EraseByPoint = 5,<br>    EraseByStroke = 6<br>} |

| InkCanvas (System.Windows.Controls, PresentationFramework.dll ) |
|---|
| public class InkCanvas : FrameworkElement, IAddChild |

Constructors
public InkCanvas( );
    Behavior—Instantiates an InkCanvas
    Exceptions—No exceptions Properties
public Brush Background { get; set; }[Category("Appearance"), Bindable(true)]
    Behavior—Gets or sets the background brush.
    Default—Transparent.
    Events—None.
    Exceptions—No exceptions. (Null brush=>transparent background.)
public UIElementCollection Children { get; }[DesignerSerializationVisiblity.Content]
    Behavior—The return results do not have the InkCanvasSelection in it. In the element tree, we remove the InkCanvas selection from these child APIs.
    Default—n/a
    Events—No events
    Exceptions—No exceptions
public DrawingAttributes DefaultDrawingAttributes { get; set; }
    Behavior—Gets or sets a reference to the drawing attributes to be used for newly collected strokes on the InkCanvas.
    Default—DA from default ctor.
    Events—DrawingAttributesReplaced
    Exceptions—ArgumentNullException if the set argument is null.
publicStylusPointDescription DefaultStylusPointDescription { get; set; }[DesignerSerializationVisibility.Hidden]
    Behavior—Gets or sets the default packet description.
    Default—Includes X, Y, Pressure.
    Events—No events
    Exceptions
        1. ArgumentNullException if the set argument is null
        2. ArgumentException MSG22 "X must be the $1^{st}$ value, and Y the $2^{nd}$ value in the packet layout" if X and Y GUIDs are not in the $1^{st}$ and $2^{nd}$ location in the packetdescriptions
public InkCanvasEditingMode EditingMode { get; set; }
    Behavior—Returns or sets the editingmode.
    Default—Ink mode.
    Events—EditingModeChanging, EditingModeChanged
    Exceptions—InvalidEnumArgumentException MSG28 "Enum value is invalid" if enum value is invalid
public InkCanvasEditingMode EditingModeInverted { get; set; }
    Behavior—Returns or sets the editingmodeinverted.
    Default—EraseByStroke.
    Events—EditingModeInvertedChanging, EditingModeInvertedChanged
    Exceptions—InvalidEnumArgumentException MSG28 "Enum value is invalid" if enum value is invalid
public StylusShape EraserShape { get; set; } [DesignerSerializationVisibility.Hidden]
    Behavior—Returns or sets the shape for point erase.
    Default—Rectangle, size (8,8).
    Events—No events Exceptions—ArgumentNullException if the set argument is null.

public InkCanvas FeedbackAdorner FeedbackAdorner { get; set; } [DesignerSerializationVisibility.Hidden]
    Behavior—Returns or sets a reference to the feedbackadorner to implement custom editing behaviors.
    Default—n/a
    Events—No events
    Exceptions—ArgumentNullException if the set argument is null.

public bool IsGestureRecognizerAvailable { get; } [DesignerSerializationVisibility.Hidden]
    Behavior—Returns whether the gesture recognizers are on the system or not.
    Events—No events
    Exceptions—No exceptions public bool HighContrast { get; set; }
    Behavior—Returns or sets whether to do high contrast rendering
    Events—No events
    Exceptions—No exceptions protected interval override IEnumerator LogicalChildren { get; }
    Overriden.

public bool MoveEnabled { get; set; }
    Behavior—Returns or sets whether move is enabled for selection
    Default—true.
    Events—No events
    Exceptions—No exceptions public bool ResizeEnabled { get; set; }
    Behavior—Returns or sets whether resize is enabled for selection
    Default—true.
    Events—No events
    Exceptions—No exceptions public InkCanvasSelectionAdorner SelectionAdorner { get; set; } [DesignerSerializationVisibility.Hidden]
    Behavior—Returns or sets a reference to the selectionadorner to implement custom editing behaviors.
    Default—n/a
    Events—No events
    Exceptions—ArgumentNullException if the set argument is null.

public StrokeCollection Strokes { get; set; }
    Behavior—Returns or sets a reference to the strokes on the InkCanvas.
    Default—n/a
    Events—StrokesReplaced.
    Exceptions—ArgumentNullException if the set argument is null.

public bool UseCustomCursor { get; set; }
    Behavior—Returns or sets whether custom cursors are to be used (hide InkCanvas's cursors).
    Events—No events
    Exceptions—No exceptions Methods (Non-Virtuals)

public bool CanPaste( );
    Behavior—Returns whether the current clipboard content can be pasted. Note, this method returns true is no guarantee that subsequent calls to Paste won't throw—CanPaste doesn't check for valid ISF, and even if it did, contents of the clipboard can be changed by any thread, in any program, at any time.
    Events—No events
    Exceptions—No exceptions public void CopySelection( );
    Behavior—Copies the selection to the clipboard.
    Events—No events
    Exceptions—No exceptions public void CutSelection( );
    Behavior—Cuts the selection to the clipboard.
    Events—No events
    Exceptions—No exceptions public ReadOnlyCollection<ApplicationGesture> GetEnabledGestures( );
    Behavior—Returns collection of currently enabled gestures. Default set includes all application gestures.
    Events—No events
    Exceptions—InvalidOperationException $MSG_{49}$ "Required components are not installed"—when mshwgst.dll is not on the user's system.

public ReadOnlyCollection<UIElement> GetSelectedElements( );
    Behavior—Returns the currently selected elements.
    Events—No events
    Exceptions—No exceptions public StrokeCollection GetSelectedStrokes( );
    Behavior—Returns the currently selected strokes.
    Events—No events
    Exceptions—No exceptions public Rect GetSelectionBounds( );
    Behavior—Returns the union bounding box of selected strokes and elements. If there are no selections, an empty rectangle is returned.
    Events—No events
    Exceptions—No exceptions public void Paste( );
    Behavior—Pastes the clipboard to the InkCanvas. Existing selection is not replaced. Newly pasted strokes are selected. Requires UIPermission.AllClipboard.
    Events—No events
    Exceptions—No exceptions public void Paste(Point point);
    Behavior—Pastes the clipboard to the InkCanvas at a specific position. Existing selection is not replaced. Newly pasted strokes are selected. Requires UIPermission.AllClipboard.
    Events—No events
    Exceptions—No exceptions public void SelectEnumerable<UIElement> selectedElements);
    Behavior—Selects elements. Empty set and null ref specify no element selection.
    Events—SelectionChanging, SelectionChanged
    Exceptions—No exceptions public void Select(StrokeCollection selectedStrokes);
    Behavior—Selects strokes. Empty set and null ref specify no stroke selection.
    Events—SelectionChanging, SelectionChanged
    Exceptions—No exceptions public void Select(StrokeCollection selectedStrokes, IEnumerable<UIElement> selectedElements;
    Behavior—Selects elements and/or strokes. Empty sets or null references specify no stroke/element selection, respectively.
    Events—SelectionChanging, SelectionChanged
    Exceptions—No exceptions public void SetEnabledGestures (IEnumerable<ApplicationGesture> applicationGestures);
    Behavior—Empty set specifies no gesture event. The InkCanvas only supports single stroke gestures.

Events—No events
Exceptions
    InvalidArgumentException $MSG_{48}$ "Multi stroke gestures are not supported", if argument contains one or more multi stroke gestures.
    InvalidOperationException $MSG_{49}$ "Required components are not installed"—when mshwgst.dll is not on the user's system.

Methods (Virtuals and Overrides)
public override bool EnsureVisuals( );
    Overridden.
protected override Size ArrangeOverride(Size arrangeSize);
    Overridden.
protected override PointHitTestResult HitTestCore(PointHitTestParameters hitTestParams);
    Overridden.
protected override Size MeasuredOverride(Size availableSize);
    Overridden.
protected virtual void OnDefaultDrawingAttributesReplaced(DrawingAttributesReplacedEventArgs e);
    Behavior—Fires the correspondingly named event.
    Events—Directly fires the correspondingly named event.
    Exceptions—ArgumentNullException if e is null.
protected virtual void OnEditingModeChanged(EventArgs e);
    Behavior—Fires the correspondingly named event.
    Events—Directly fires the correspondingly named event.
    Exceptions—ArgumentNullException if e is null.
protected virtual void OnEditingModeChanging(InkCanvasEditingModeChaningEventArgs e);
    Behavior—Fires the correspondingly named event.
    Events—Directly fires the correspondingly named event.
    Exceptions—ArgumentNullException if e is null.
protected virtual void OnEditingModeInvertedChanged(EventArgs e);
    Behavior—Fires the correspondingly named event.
    Events—Directly fires the correspondingly named event.
    Exceptions—ArgumentNullException if e is null.
protected virtual void OnEditingModeInvertedChanging(InkCanvasEditingModeChangingEventArgs e);
    Behavior—Fires the correspondingly named event.
    Events—Directly fires the correspondingly named event.
    Exceptions—ArgumentNullException if e is null.
protected virtual void OnGestured(InkCanvasGestureEventArgs e);
    Behavior—Fires the correspondingly named event.
    Events—Directly fires the correspondingly named event.
    Exceptions—ArgumentNullException if e is null.
protected virtual void OnSelectionChanged(eventArgs e);
    Behavior—Fires the correspondingly named event.
    Events—Directly fires the correspondingly named event.
    Exceptions—ArgumentNullException if e is null.
protected virtual void OnSelectionChanged(InkCanvasSelectionChangingEventArgs e);
    Behavior—Fires the correspondingly named event.
    Events—Directly fires the correspondingly named event.
    Exceptions—ArgumentNullException if e is null.
protected virtual void OnSelectionMoved(EventArgs e);
    Behavior—Fires the correspondingly named event.
    Events—Directly fires the correspondingly named event.
    Exceptions—ArgumentNullException if e is null.
protected virtual void OnSelectionMoving(InkCanvasSelectionEditingEventArgs e);
    Behavior—Fires the correspondingly named event.
    Events—Directly fires the correspondingly named event.
    Exceptions—ArgumentNullException if e is null.
protected virtual void OnSelectionResized(EventArgs e);
    Behavior—Fires the correspondingly named event.
    Events—Directly fires the correspondingly named event.
    Exceptions—ArgumentNullException if e is null.
protected virtual void OnSelectionResizing(InkCanvasSelectionEditingEventArgs e);
    Behavior—Fires the correspondingly named event.
    Events—Directly fires the correspondingly named event.
    Exceptions—ArgumentNullException if e is null.
protected virtual void OnStrokeCollected(InkCanvasStrokeCollectedEventArgs e);
    Behavior—Fires the correspondingly named event.
    Events—Directly fires the correspondingly named event.
    Exceptions—ArgumentNullException if e is null.
protected virtual void OnStrokeErased(EventArgs e);
    Behavior—Fires the correspondingly named event.
    Events—Directly fires the correspondingly named event.
    Exceptions—ArgumentNullException if e is null.
protected virtual void OnStrokeErasing(InkCanvasStrokeErasingEventArgs e);
    Behavior—Fires the correspondingly named event.
    Events—Directly fires the correspondingly named event.
    Exceptions—ArgumentNullException if e is null.
protected virtual void OnStrokesReplaced(InkCanvasStrokesReplaceEventArgs e);
    Behavior—Fires the correspondingly named event.
    Events—Directly fires the correspondingly named event.
    Exceptions—ArgumentNullException if e is null.

Events
public event DrawingAttributesReplacedEventHandler DefaultDrawingAttributesReplaced;
    Behavior—Event fires when a different drawing attribute is set on the InkCanvas.
public event EventHandler EditingModeChanged;
    Behavior—Event fires after the editingmode is changed.
public event InkCanvasEditingModeChangingEventHandler EditingModeChanging;
    Behavior—Event fires before the editingmode is changed.
public event EventHandler EditingModeInvertedChanged;
    Behavior—Event fires after the inverted (top of pen) editingmode is changed.
public event InkCanvasEditingModeChangingEventHandler EditingModeInvertedChanging;
    Behavior—Event fires before the inverted (top of pen) editingmode is changed.
public event InkCanvasGestureEventHandler Gesture
    Behavior—Event fires when a gesture is recognized. Note the array in the event args will always be sorted in descending confidence, and will always contain at least one element; also note that "NoGesture" may appear in the midst of the array.
public event EventHandler SelectionChanged;
    Behavior—Event fires after the selection changed.
public event InkCanvasSelectionChangingEventHandler SelectionChanging;
    Behavior—Event fires before the selection changed.
public event EventHandler SelectionMoved;
    Behavior—Event fires after the selection moved.
public event InkCanvasSelectionEditingEventHandler SelectionMoving;
    Behavior—Event fires before the selection moved.
public event EventHandler SelectionMoved;
    Behavior—Event fires after the selection is resized.
public event InkCanvasSelectionEditingEventHandler SelectionResizing;

Behavior—Event fires before the selection is resized.
public event InkCanvasStrokeCollectedEventHandler StrokeCollected;
Behavior—Event fires after a stroke is collected.
public event EventHandler StrokeErased;
Behavior—Event fires after a stroke is erased.
public event InkCanvasStrokeErasingEventHandler StrokeErasing;
Behavior—Event fires before a stroke is earased.
public event InkCanvasStrokeReplacedEventHandler StrokesReplaced;
Behavior—Event fires after a different stroke collection is set on the InkCanvas.

Static Members and Nested Types
public static readonly DependencyProperty BackgroundProperty;
DP field.

| InkCanvasSelectionAdorner (System.Windows.Controls, PresentationFramework.dll) |
|---|
| public class InkCanvasSelectionAdorner : Adorner |

The InkCanvas exposes a get/set SelectionAdorner property, where developers can plug in their custom adorners. Developers can subscribe to stylus events and do custom hittesting against custom adorners, and realize complex custom selection editing behaviors.

Constructors
public InkCanvasSelectionAdorner(InkCanvas inkCanvas);
   Behavior—Instantiates a selectionadorner.
   Exceptions—No exceptions Methods
protected override void OnRender(DrawingContext drawingContext);
   Behavior—Developer code to do custom rendering of selection.
   Events—No events
   Exceptions—No exceptions
public virtual InkCanvasSelectionHandle SelectionHandleHitTest(Point point);
   Behavior—Developer code to do custom hittesting against selection to get an InkCanvasSelectionHandle.
   Events—No events
   Exceptions—No exceptions
protected virtual void OnBoundsUpdate (Rect rect);
   Behavior—Developer code to do custom logic when the bounds of the adorner should be updated based on editing behaviors (move/resize).
   Events—No events
   Exceptions—No exceptions

| InkCanvasSelectionHandle (System.Windows.Controls, PresentationFramework.dll) |
|---|
| public enum InkCanvasSelectionHandle<br>{<br>   None = 0,<br>   SelectionFrame = 1,<br>   TopCenter = 3,<br>   TopLeft = 2,<br>   TopRight = 4,<br>   LeftCenter = 5, |

| -continued |
|---|
| InkCanvasSelectionHandle (System.Windows.Controls, PresentationFramework.dll) |
|    RightCenter = 6,<br>   BottomLeft = 7,<br>   BottomCenter = 8,<br>   BottomRight = 9<br>} |

| InkCanvasFeedbackAdorner |
|---|
| public class InkCanvasFeedbackAdorner : Adorner |

The InkCanvas exposes a get/set InkCanvasFeedbackAdorner property, where developers can plug in their custom adorners. Developers can do custom rendering of selection while being moved around.

Constructors
public InkCanvasFeedbackAdorner(InkCanvas inkCanvas);
   Behavior—Instantiates a feedbackadorner.
   Exceptions—No exceptions Methods
public override Transform GetDesiredTransform(Transform transform);
   Overridden.
protected override Size MeasuresOverride(Size constraint);
   Overridden.
protected virtual void OnBoundsUpdated(Rect rect);
   Behavior—Developer code to do custom logic when the bounds of the adorner should be updated based on editing behaviors (move/resize).
   Events—No events
   Exceptions—No exceptions
protected override void OnRender(DrawingContext drawingContext);
   Behavior—Developer code to do custom rendering of selection.
   Events—No events
   Exceptions—No exceptions EventHandlers & EventArgs

| InkCanvasEditingModeChangingEventHandler ( System.Windows.Control, PresentationFramework.dll ) |
|---|
| public delegate void InkCanvasEditingModeChangingEventHandler(object sender, InkCanvasEditingModeChangingEventArgs e); |

| InkCanvasEditingModeChangingEventArgs ( System.Windows.Control, PresentationFramework.dll ) |
|---|
| public class InkCanvasEditingModeChangingEventArgs : CancelEventArgs<br>{<br>   public InkCanvasEditingMode EditingMode { get; set; }<br>   // Setter throws InvalidEnumArgumentException if argument not a<br>   // valid enum value.<br>} |

| InkCanvasSelectionEditingEventHandler ( System.Windows.Control, PresentationFramework.dll) |
|---|
| public delegate void InkCanvasSelectionEditingEventHandler(object sender, InkCanvasSelectionEditingEventArgs e); |

| InkCanvasSelectionEditingEventArgs ( System.Windows.Control, PresentationFramework.dll ) |
|---|
| public class InkCanvasSelectionEditingEventArgs : CancelEventArgs<br>{<br>    public Rect NewRectangle { get; set; }<br>    public Rect OldRectangle { get; }<br>} |

| InkCanvasStrokeErasingEventHandler ( System.Window.Control, PresentationFramework.dll ) |
|---|
| public delegate void InkCanvasStrokeErasingEventHandler (object sender, InkCanvasStrokeErasingEventArgs e); |

| InkCanvasStrokeErasingEventArgs ( System.Windows.Control, PresentationFramework.dll) |
|---|
| public class InkCanvasStrokeErasingEventArgs : CancelEventArgs<br>{<br>    public Stroke Stroke { get; }<br>} |

| InkCanvasSelectionChangingEventHandler ( System.Windows.Control, PresentationFramework.dll) |
|---|
| public delegate void InkCanvasSelectionChangingEventHandler(object sender, InkCanvasSelectionChangingEventArgs e); |

| InkCanvasSelectionChangingEventArgs ( System.Windows.Control, PresentationFramework.dll) |
|---|
| public class InkCanvasSelectionChangingEventArgs : CancelEventArgs<br>{<br>    public ReadOnlyCollection<UIElement> GetSelectedElements( );<br>    public StrokeCollection GetSelectedStrokes( );<br>    public void SetSelectedElements(IEnumerable<UIElement> selectedElements);<br>    public void SetSelectedStrokes(StrokeCollection selectedStrokes);<br>} |

| InkCanvasGestureEventHandler ( System.Windows.Controls, PresentationFramework.dll) |
|---|
| public delegate void InkCanvasGestureEventHandler(object sender, InkCanvasGestureEventArgs e); |

| InkCanvasGestureEventArgs ( System.Windows.Controls, PresentationFramework.dll) |
|---|
| public class InkCanvasGestureEventArgs : CancelEventArgs<br>{<br>    public InkCanvasGestureEventArgs(StrokeCollection strokes, IEnumerable<GestureRecognitionResult>gestureRecognitionResults);<br>    public ReadOnlyCollection<GestureRecognitionResult> GetGestureRecognitionResults( );<br>    public StrokeCollection Strokes { get; }<br>} |

When the Cancel bool flag derived from CancelEventArgs is true, the Strokes resulting in the gesture are added to the Strokes instance on the InkCanvas.

When the Cancel bool flag derived from CancelEventArgs is false, the Strokes resulting in the gesture are NOT added to the Strokes instance on the InkCanvas.

Default, the Cancel bool flag is true if the top recognition result is NoGesture. If the top recognition result is other than NoGesture, the default is false.

| InkCanvasStrokeCollectedEventHandler ( System.Windows.Control, PresentationFramework.dll) |
|---|
| public delegate void InkCanvasStrokeCollectedEventHandler(object sender, InkCanvasStrokeCollectedEventArgs e); |

| InkCanvasStrokeCollectedEventArgs ( System.Windows.Control, PresentationFramework.dll) |
|---|
| public class InkCanvasStrokeCollectedEventArgs : EventArgs<br>{<br>    public Stroke Stroke { get; }<br>} |

| InkCanvasStrokesReplacedEventHandler ( System.Windows.Control, PresentationFramework.dll) |
|---|
| public delegate void InkCanvasStrokesReplacedEventHandler(object sender, InkCanvasStrokesReplacedEventArgs e); |

| InkCanvasStrokesReplacedEventArgs ( System.Windows.Control, PresentationFramework.dll) |
|---|
| public class InkCanvasStrokesReplacedEventArgs : EventArgs<br>{<br>    // Properties<br>    public StrokeCollection NewStrokes { get; }<br>    public StrokeCollection PreviousStrokes { get; }<br>} |

We claim:

1. A computer-implemented method for interacting with stroke objects in a tree-based rendering environment, said stroke objects including first information relating to electronic ink, said method comprising the steps of:

identifying a stroke object of said stroke objects;
exchanging second information with said stroke object relating to at least one of a method and a property and an event associated with said stroke object in said tree-based rendering environment;
said exchanging step exchanging first transform matrix information with said stroke object;
said first transform matrix relating to how said stroke object is to be transformed from a first coordinate space into a second coordinate space;
obtaining a second transform matrix relating to how said second coordinate space is to be transformed into a third coordinate space; and
applying said first transform matrix and said second transform matrix to said stroke object, the first and second transformation matrix applying linear transformation to said stroke object; and
rendering an output of said output of said applying step in said tree-based rendering environment.

2. The computer-implemented method according to claim 1, said exchanging step exchanging point information with said stroke object.

3. The computer-implemented method according to claim 1, said exchanging step exchanging drawing attribute information with said stroke object.

4. The computer-implemented method according to claim 1, said exchanging step exchanging drawing information with said stroke object.

5. The computer-implemented method according to claim 1, said exchanging step exchanging path geometry information with said stroke object.

6. The computer-implemented method according to claim 1, said exchanging step exchanging drawing attribute information with said stroke object, said exchanging step further performing the step of
at least one of changing said drawing attribute information of said stroke object and replacing said drawing attribute information of said stroke object.

7. The computer-implemented method according to claim 1, said exchanging step exchanging data point information relating to said electronic ink information with said stroke object, said exchanging step further performing the step of
at least one of changing said data point information of said stroke object and replacing said data point information of said stroke object.

8. The computer-implemented method according to claim 1, further comprising the steps of:
rendering electronic ink in said stroke object thicker than normal electronic ink in said stroke object;
rendering said normal electronic ink in said stroke object on top of said thicker electronic ink, said normal electronic ink being rendered in a color different than a color of said normal electronic ink in said ink object.

9. The computer-implemented method according to claim 1, said method further comprising the step of:
determining a selection of one or more stroke objects based on a selection lasso, said determining step including
finding at least a first self intersection of said selection lasso;
designating an area encompassed by said selection lasso between said at least first self intersections as at least a first selection loop;
hit-testing said one or more stroke objects based on said at least said first selection loop; and
designating one or more stroke objects at least partially contained in said at least said first selection loop as said selection.

10. The computer-implemented method according to claim 1, said method further comprising the step of:
determining a selection of one or more stroke objects based on a selection lasso, said determining step including
determining an area at least partially enclosed by said selection lasso;
hit-testing said one or more stroke objects with said area using a weight-based model; and
designating one or more stroke objects at least partially contained in said area as said selection.

11. A computer-implemented method for interacting with stroke objects in a tree-based rendering environment, said stroke objects including first information relating to electronic ink, said method comprising the steps of:
identifying a stroke object of said stroke objects; and
exchanging second information with said stroke object relating to at least one of a method and a property and an event associated with said stroke object in said tree-based rendering environment,
said exchanging step exchanging first transform matrix information with said stroke object, said first transform matrix relating to how said stroke object is to be transformed from a first coordinate space into a second coordinate space, said method further comprising the steps of:
obtaining a second transform matrix relating to how said second coordinate space is to be transformed into a third coordinate space; and
applying said first transform matrix and said second transform matrix to said stroke object,
rendering an output of said applying step in said tree-based rendering environment.

12. A computer system for interacting with stroke objects in a tree-based rendering environment, said stroke objects including first information relating to electronic ink, said system comprising:
a storage having one or more stroke objects stored therein;
a processor that interacts with said storage, said processor supporting said tree-based rendering environment, said processor configured to identify a stroke object of said stroke objects and exchange second information with said stroke object relating to at least one of a method and a property and an event associated with said stroke object in said tree-based rendering environment, said exchange exchanging first transform matrix information with said stroke object, said first transform matrix relating to how said stroke object is to be transformed from a first coordinate space into a second coordinate space;
said processor obtaining a second transform matrix relating to how said second coordinate space is to be transformed into a third coordinate space; and
said processor applying said first transform matrix and said second transform matrix to said stroke object; and
rendering an output of said applying step in said tree-based rendering environment.

13. The computer system according to claim 12, said processor further configured to exchange point information with said stroke object.

14. The computer system according to claim 12, said processor further configured to exchange drawing attribute information with said stroke object.

* * * * *